United States Patent [19]

Bangs et al.

[11] Patent Number: 4,877,940
[45] Date of Patent: Oct. 31, 1989

[54] USING INFRARED IMAGING TO MONITOR AND CONTROL WELDING

[75] Inventors: Edmund R. Bangs, Indian Head Park; Nicholas E. Longinow, Oak Park; James R. Blaha, Palos Heights, all of Ill.

[73] Assignee: IIT Research Institute, Chicago, Ill.

[21] Appl. No.: 68,620

[22] Filed: Jun. 30, 1987

[51] Int. Cl.$^4$ .............................................. B23K 9/12
[52] U.S. Cl. ........................... 219/124.34; 219/130.01; 219/130.21; 364/200; 364/275.3
[58] Field of Search ...................... 219/124.34, 130.01, 219/130.21, 137 PS, 125.1, 110; 364/200, 275.3

[56] References Cited

U.S. PATENT DOCUMENTS 4,555,614 11/1985 Morris et al. .................. 219/130.01
4,594,497  6/1986 Takashi et al. ................. 219/124.34
4,611,111  9/1986 Baheti et al. ................... 219/124.34

OTHER PUBLICATIONS

R. Brosilow, "Commentary", *Welding Design & Fabrication*, page 8, March, 1986.

Primary Examiner—Clifford C. Shaw
Attorney, Agent, or Firm—Fitch, Even, Tabin & Flannery

[57] ABSTRACT

The technique and arrangement of distributed, real time, intelligent control of welding including IR detection and measurement of process conditions, and controlling process parameters in view of a knowledge base including a predetermined rule set for interpreting the results of IR detection. The arrangement includes a multilevel communication scheme internally and between hardware nodes of the arrangement, and the data-driven scheduling of inference processes under direction of a semantic network.

105 Claims, 16 Drawing Sheets

— 0.012 (0.310 M) MISALIGNMENT
--- 0.037 (0.929 M) MISALIGNMENT
ooo 0.073 (1.859 M) MISALIGNMENT
••• 0.110 (2.788 M) MISALIGNMENT

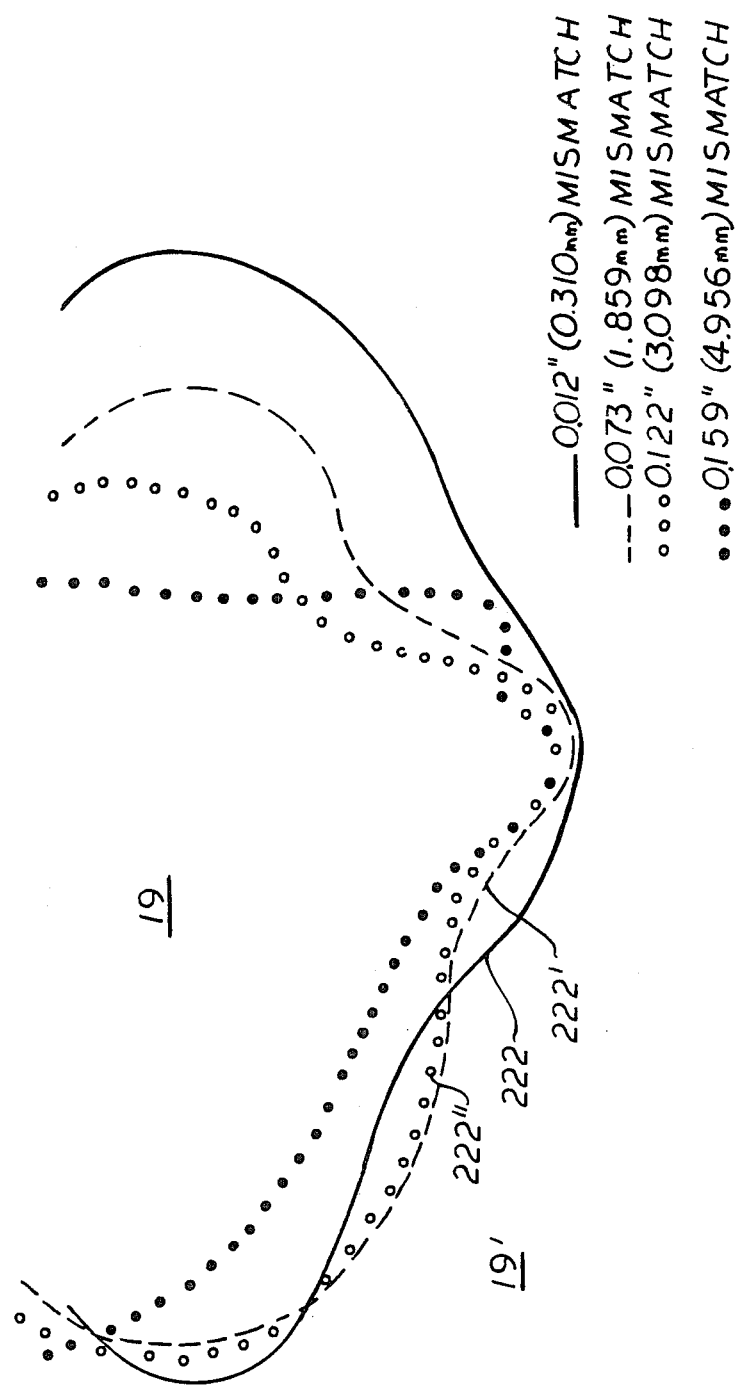

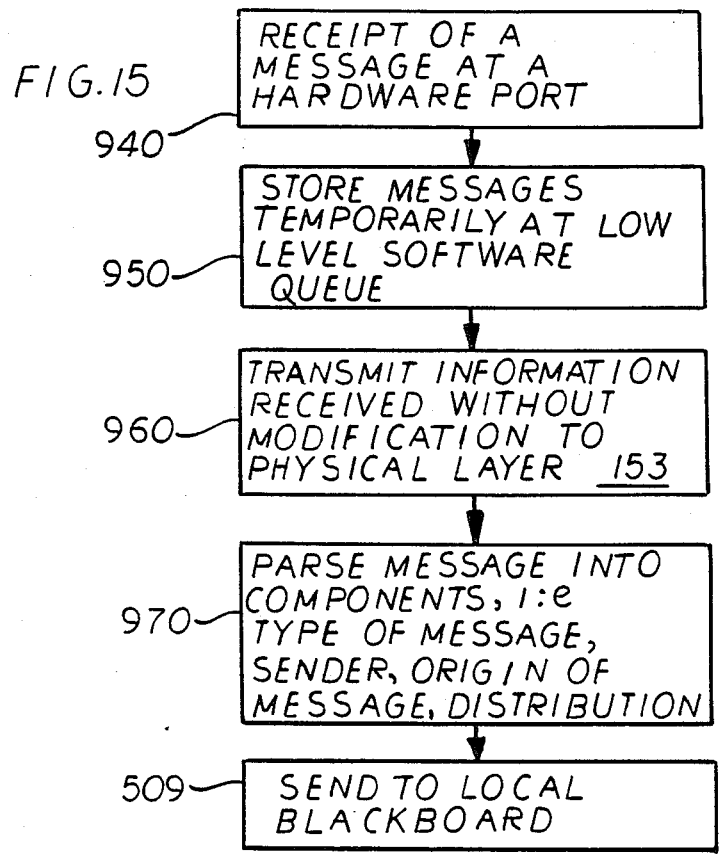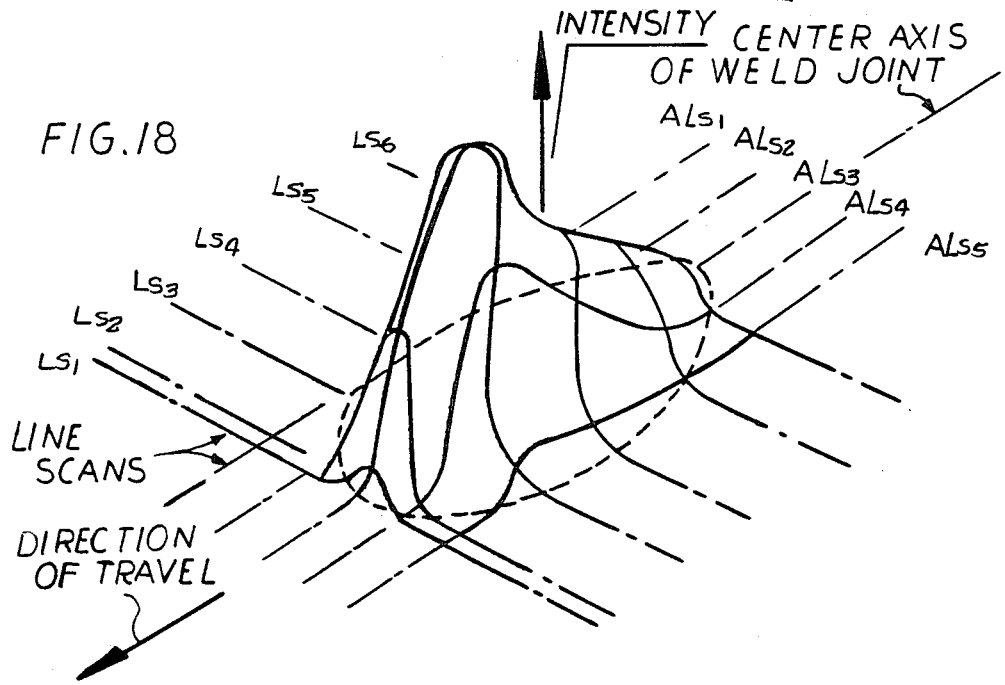

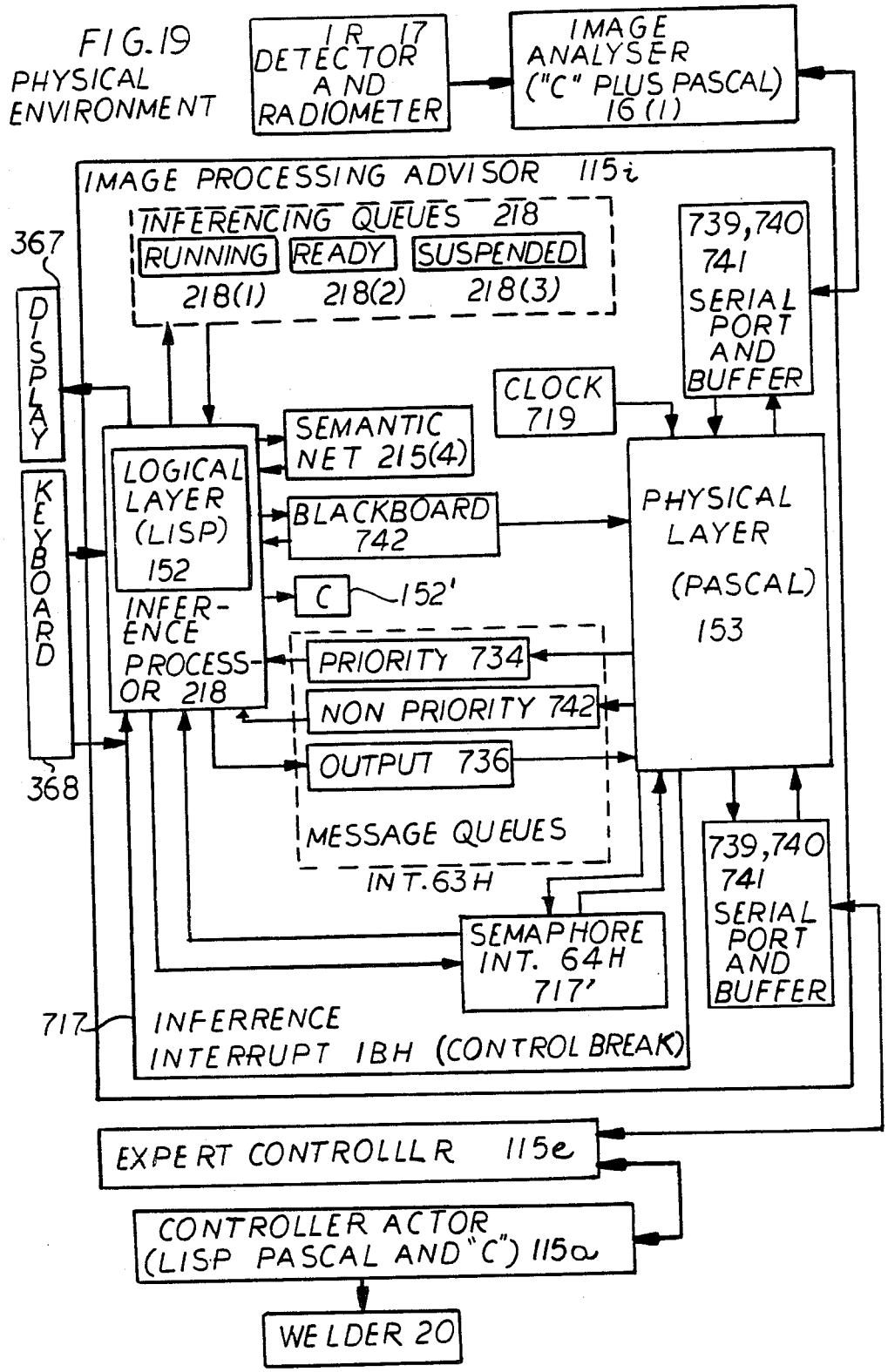

USING INFRARED IMAGING TO MONITOR AND CONTROL WELDING

TECHNICAL FIELD

This invention relates to a method and apparatus for welding and/or control of welding in real time by analysis of the weld being made.

BACKGROUND

The present invention is directed to welding various materials and will be described hereinafter in conjunction with the welding of metals. It is directed to welding systems such as gas tungsten arc welding (GTAW), gas metal arc welding (GMAW), fluxed cored arc welding (FCAW), plasma arc welding (PAW), and resistance or spot welding.

The analysis, in real time, of the weld puddle has been attempted with closed circuit television, but the light emitted at the weld is extremely bright, and for various metals there may be insufficient contrast to obtain good definition of the weld puddle. Further, the video scanner must work in a hostile environment where there are sparks and spattering metal. Dirt, dust, and foreign materials may also be present, as well as stray light. Although a video system may be useful in viewing the weld puddle geometry, it still lacks the ability to determine puddle depth and quality, and to provide temperature variation data except through an exterior color analysis of the puddle.

A video system for weld puddle analysis is shown in U.S. Pat. No. 4,595,820 which discloses that video data indicative of some weld conditions can be generated by a video camera directly observing welding operations. According to the technique disclosed in this patent, the width of the weld puddle is monitored by observing local minima of light intensity associated with the edges of the weld puddle. However, this technique or approach is not able to respond effectively to trends of weld speed, current, or resulting puddle geometrics. Further, this approach is not able to recognize conditions below the surface of the weld puddle. This is clear because under video observation, reflected external light is received from the surface of the weld puddle.

Present commercially available adaptively controlled systems that use weld puddle analysis are very limited not only in analysis of the weld, but in their ability to operate in real time at commercially desired speeds, e.g., of nine to twenty-five inches per minute. Typically, current adaptively controlled welding systems using weld puddle analysis operate at a speed of about two to four inches per minute. Current systems further analyze only a few of the variables involved in influencing weld puddle geometry including joint geometry, welding process parameters, chemistry of the materials, and internal defects. In arc welding, the number of process and procedure variables involved in an adaptively controlled welding system becomes particularly large and includes such process variables as heat input, filler wire input, current flow characteristics, shielding gas flow, power supplied (a function of amperage and voltage), material, part position, torch operation, torch position, and torch travel speed. With so many variables, it is little wonder that present day adaptively controlled welders operating at commercial speeds are not able to effectively make an analysis of such a multitude of variables but instead, on occasion, rely upon no more than simple timers and electro-mechanical control arrangements, and monitor simply such parameters as amperage, voltage, and shielding gas temperature. Even the aforesaid patented system analyzes only a few of these processes and procedure parameters or variables, and, nonetheless, operates at a relatively slow weld speed. While laser and video systems for seam tracking are available, they, too, process but a limited amount of information about the seam and the track being followed. These prior art systems also do not, in real time, effectively analyze and assure proper alignment of the torch and joint, and correct effectively for deviations therefrom where the parts are mismatched in the vertical or horizontal directions, or correct for variations in the penetration of the puddle or for the joint root opening between the parts. Further, it would be desirable in real time to be able to make weld size measurements and to correlate them in real time with the mechanical properties of the weld such as tensile and shear strength. In addition to controlling the welding process, it is desirable to have a real time weld inspection system that could determine its physical properties and strength properties. Also, it would be desirable to have a welding system which records and stores information regarding all welding events for later use in the analysis of failed weld joints, analysis of welding consumables used, and welding process conditions encountered when completing a particular weld.

The achievement of a welding system having many or most of the above described features should reduce defects in welds and control weld inspection costs, as well as improve productivity. Such a weld control and weld inspection system requires considerable computing technology. But such systems traditionally require large amounts of computing power and tend to be too slow for real time process control. Accordingly, an object of the present invention is to promote the practical application of artificial intelligence technology to welding process control.

A more general object is to provide a new and improved welding apparatus or method, and to promote the development of adaptively controlled welding techniques, including welding techniques effective for producing high quality welds because of their ability to monitor and control critical processes and procedural variables in real time.

It is an object of the invention herein to adaptively conduct resistance welding, and particularly adaptive resistance spot welding. Adaptive welding techniques generally ensure the creation of better welds. While this does not eliminate the need to consider testing or inspecting the weld after its creation, it is certainly better to do it right the first time. In the case of resistance spot welds, as are particularly useful in the manufacture of automobiles, air frames, aircraft engines, and other sheet metal items, there is frequently no cost effective way to inspect the welds after the fact. Thus, they need to be made correctly the first time. Thus, adaptive control of the weld variables during welding is essential. More automatic production, without in-process inspection and responsive modification of the variables is inadequate.

It is a further object of the invention to more than merely perform seam tracking, but to conduct weld process control and real time weld inspection in the same arrangement for a plurality of weld variables and parameters. Further, it is an object to reduce defects and inspection costs in welding, to improve productivity, to monitor critical process and procedure variables, and to inspect weld defects in real time.

SUMMARY OF THE INVENTION

According to the invention, four independent processors are interconnected for serial communication to form a control system for an automated welding arrangement. Infrared images of the weld are captured by scanning with an infrared camera, by digitizing the information scanned, and by feeding the information into a first image processor and thereafter transferring the processed, compressed output of the first image processor into a second image processing expert system processor. The first processor locates the center of the weld puddle by determining the average center of brightness of the image.

Next, it determines a brightness level that corresponds to the puddle boundary, establishes the puddle boundary in view of said brightness level, and then measures the width of the puddle (perpendicular to the direction of travel) through the image center. Next, it measures, within predetermined peripheral zones of interest, including for example left, right, and front or tip zones of the puddle, the area of the weld puddle within each zone, the length of puddle perimeter within each zone, and the number of "zero crossings" or major reversals of the perimeter within the front or tip zone. The zones defined in the weld puddle for analysis include side zones straddling the center of the weld puddle, and showing the width of the weld puddle.

The tip zone of the weld puddle assists in the determination of weld puddle speed and position in real time, and the side zones permit effective puddle tracking and ascertainment of weld quality during operation. Further, the side zones provide information regarding the cooling gradient at the edge of the weld puddle, which is indicated by the sharpness of the gray scale change at the puddle edges, thereby establishing the rate of change in puddle brightness at the puddle boundary within the left and right side zones.

The information thus acquired is analyzed by the second image processing expert system processor, which then determines features relevant to the tracking of the weld puddle, and interprets selected geometric and metallurgical data characteristics of the weld puddle such as the speed and direction of the welding process, temperature, and whether the welding is proceeding normally or is in need of correction.

A third controller expert system processor further analyzes this information to produce information defining control strategies relating to power, speed, and direction. In particular, weld speed and weld current are controlled in response to the size of the weld puddle. For example, if the size of the puddle is too small, weld speed can be decreased or weld current increased. This information is fed into a fourth machine control expert system processor, which may contain special machine control programs possibly written in "C", and which actually controls the welding apparatus.

The detection of infrared information, according to the invention, is particularly useful in providing information not otherwise available because the heat gradient established during welding dissipates through the materials being welded and also through the air adjacent the weld puddle. Light reflected from the surface of the weld puddle, does not present the same wealth of interpretable heat gradient information.

According to the invention, most of the processors contain a semantic network of goals and forward and backward chaining rules as well as rule sets and data frames, which together permit data-driven, message-interruptible inference processing through the interplay of interrupting and scheduling in real time of pre-established ready, running, and suspended goal-driven inference processes. Further, the rule bases are hierarchically, transparently distributable among processors (hereinafter called "nodes").

The present invention further contemplates transparently distributing the process controller artificial intelligence components among a plurality of nodes, some of which may reside on independent hardware and all of which are able to communicate effectively with each other in real time, thereby achieving parallel processing with conventional hardware to whatever degree is necessary to achieve acceptable real time performance. This artificially intelligent controller arrangement can distribute inference processes multi-nodally. The knowledge base including, for example, frames, rules, and a semantic network representing the goals and subgoals of the process controller, and containing forward chaining rules that define processes which may be scheduled for execution, and backward chaining rules that drive the inferencing and communication processes, can thereby direct all real time operations. In particular, the semantic network permits data-driven, message-interruptible inference processing through the interplay of pre-established, scheduled processes organized into queues of ready, running, and suspended goal-driven processes whose execution is governed in real time by a time-sharing scheduler. The rule bases are thus hierarchically, as well as transparently distributed among the nodes for inference processing, and real time process control is achieved in an artificial intelligence environment.

Further, according to the invention, the process controller employs multiple software communications layers including a physical layer to communicate knowledge between nodes, a logical layer to identify the location of sought information, and a knowledge layer to communicate knowledge within a particular node. The logical layer evaluates requests for information in terms of local availability at a particular active node. If the information required for a particular node or process is missing locally, a communications sequence is initiated with the physical layer to search other nodes for the information of interest. In the preferred embodiment of the invention, the knowledge and logical layers are implemented using Lisp, and the physical layer is implemented using Pascal. The interface to the real world sensors and controllers is implemented in "C".

According to the invention, the queues are data structures that include pointers to Lisp stack groups which define inference processes. The Lisp scheduler maintains ready, running, and suspended queues of inference processes and controls the inference nominated by the running queue. Further, a context switcher and an inference scheduler (implemented respectively in Pascal and Lisp), invoke the Lisp scheduler with a command to change inference processes periodically and also in response to incoming messages from other nodes.

The Lisp scheduler has a semaphore flag which the context switcher can toggle. This flag, implemented through an interrupt, can direct the Lisp scheduler to take the running process, put it on the ready queue, and get the next process off the ready queue, or to take a process signalled by an incoming message and set it running. Thus, according to the invention, the context scheduler can inform Lisp that it is either to switch contexts, i.e., swap one of the ready processes with the running process, or that it is to process an incoming message. Accordingly, the high level Lisp scheduler can do one of two activities. Either it can swap processes, known as context switching, or it can acquire a message from the Pascal system for processing. The Pascal handles all communication with the outside world and also processes low level messages.

According to the invention, the controller arrangement further includes a consistency checker arrangement for establishing and evaluating new, proposed rules for introduction into the rule base, which ensures that the new rules will be consistent, non-redundant, and non-subsuming with regard to the established set of rules already integrated into the controller arrangement.

According to the invention, adaptive control of weld process variables is undertaken for all kinds of welds including fusion or arc welding, and resistance welding, for example. In short, the process variables are modified in response to thermographic measurements, which are based upon inspection of heat patterns or the geometry of the weld puddle and its associated heat affected zone. By thermographic measurement of the weld geometry, it is meant that the heat pattern actually observed is analyzed into isotherms, which can be established to correspond to predetermined heat levels. Further, the isotherms follow the contour of heat along each of the predetermined levels. Typically, the isotherms will be rounded, circular, or oval when measuring a proper fusion weld puddle between aligned, matched materials without a gap or excessive root opening therebetween.

This invention recognizes and takes advantage of the fact that the isotherms deviate from their normal rounded pattern and are characterized by interpretable protrusions extending from the previous, ideal rounded shape of the isotherms when there are errors or defects found in the weld puddle, which may be due to any of a number of circumstances. Such circumstances may include impurities or material problems in the weld itself. Further, they may indicate misalignment, mismatch or excessive root opening defects, as discussed herein.

The isotherms not only exhibit interpretable shape variations, according to the invention, but their very separation may be indicative of useful information. Both of these sources of information, shape and separation of isotherms, is considered interpretation of the weld puddle and heat affected zone geometry.

In the case of resistance spot welding, the weld puddle is frequently referred to as the weld nugget. Because the electrodes in resistance spot welding extend directly against the materials being spot welded, only the heat affected zone adjacent the electrodes, in the form of a smile, can be observed. This smile is called the weld nugget. For purposes of this invention, the weld puddle is considered to include its heat affected zone, and the term "weld nugget" is generally considered to have the same meaning as the weld puddle, as defind herein. The pattern of isotherms, in effect, constitutes the signature of the weld being performed. Of course, neither is directly observed, but takes on dimensional meaning and geometric shape in terms of the isotherms or heat patterns indicative thereof. These heat conditions are not visually determined herein, but only in terms of the information produced by an infrared detector system, as discussed below.

BRIEF DESCRIPTION OF THE DRAWINGS

FIGS. 2A-2C are illustrations of respective weld puddle isotherm information zones detected, and the contour of weld puddles under conditions of misalignment, mismatch, and excessive root opening;

FIG. 15 illustrates the handling of messages according to the communication technique of the invention herein;

FIG. 18 shows a three-dimensional representation of heat in the weld puddle as produced by the image analyzer;

FIG. 19 is a block diagram illustrating the physical environment of the system, including the system-level hardware software design of the preferred embodiment of the invention.

DETAILED DESCRIPTION OF A BEST MODE OR PREFERRED VERSION OF THE INVENTION

Figure 1:
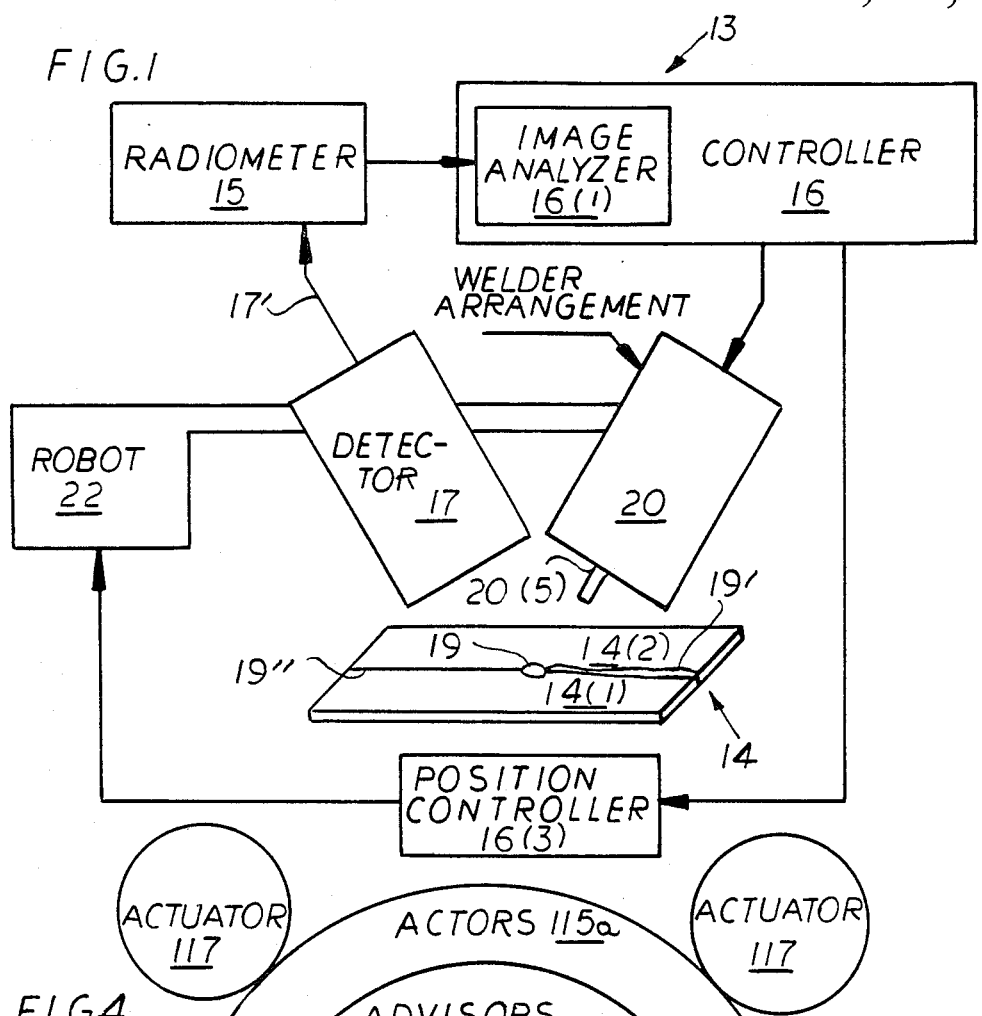
FIG. 1 is a schematic drawing of an artificial intelligence welding system, according to the invention herein.

According to one version, as shown in FIG. 1, the welding system 13, according to the invention, includes a radiometer 15, a controller 16 including an image analyzer 16(1), and an infrared (IR) detector 17 including, for example, a twelve-inch, close-up lens with a 10.6 micron wavelength upper range lens filter which produces clear images of the weld puddle 19 under observation.

The detector 17 and the welder arrangement 20 are carried in a controllably cooperative relationship by robot 22 to insure that the weld puddle 19 produced by welder 20 is in the field of view of the detector 17 The robot 22 can position and/or tilt the detector 17 in an (x,y) plane and about several axes of rotation, as is conventionally known in robotics technology.

The detector 17 can be adapted to operate for low range detection at 3.0 microns wavelengths as well as at 10.6 microns. This enables identification of puddle defects by observation of both the cooler and the hotter portions of the weld puddle at generally the same degree of resolution. Image analysis by the image analyzer 16(1) can be performed by image processing algorithms written in the "C" language, for example as discussed below, either on an IBM AT computer or a similar device. The image analyzer 16(1) can, accordingly, be implemented as an image processing computer directly interfaced with the infrared radiometer 15, and then, as will be discussed (with reference to FIG. 8), to an image processing advisor 115i.

The detector 17, the radiometer 15, and the image analyzer 16(1) preferably include features for black and white shape data recording, multiple horizontal, and vertical line scanning, gray scale imaging and color imaging, shape recognition, geometric comparison, seam tracking and defect detection to determine actual weld process parameters and variables. The arrangement includes line scan recognition features to enable defect detection based upon metallurgical data and to permit recording of both actual defects and the location of defects.

The detector 17 and the radiometer 15 are preferably an Inframetrics Model 525 arrangement made by Inframetrics, Inc. of Bedford, Mass. This arrangement enables image production on a 30 Hz cycle basis, based upon a mercury-cadmium-telerude sensor, which is preferably liquid nitrogen cooled. The lens of the detector 17 is selected to accommodate the radiance of the weld puddle being scanned. The output of the detector 17 to the radiometer 15 is indicative of the difference in radiance "dI" between an elected reference radiation level, and the amount of radiation from the weld puddle under observation. The difference "dI" particularly equals:

$$e_t N_t + (1-e_t)N_b - e_r N_r N_b + (1-e_r)N_b,$$

where "$e_t$" is the emittance of the weld puddle 19 surface as a function of temperature, "$N_t$" is the radiance value of a black body at temperature "$T_t$" at an unknown target surface, "$N_b$" is the radiance measured directly from background, "$e_r$" is the emittance of the reference surface, and "$N_r$" is the reference system radiance of a black body at the selected puddle temperature "$T_r$".

The detector 17 produces individual frames of information, which define 256 by 256 pixel matrices. The output of the detector 17 is particularly a video signal for transmission on a parallel bus 17' to radiometer 15. The video signal produced is an 8-bit 256 by 256 pixel representation having a broad-based gray scale capability. The radiometer 15 is setable to operate at selected temperature ranges. The radiometer 15 is further programmably setable by an input signal in RS232 format. The radiometer 15 further includes built-in tables and mapping functions that convert the received detector signal along the bus 17' into video representations of the image viewed by detector 17.

The output of the radiometer 15 is connected to an image analyzer 16(1). The image analyzer 16(1) processes the data received with selected shape recognition algorithms preferably written in "C". The determination of the shape of the weld puddle and finding its outer boundary is accomplished by tracking the weld puddle 19 along its boundary, and by determining the maximum puddle width and the centroid of the puddle. This is done digitally, as discussed below. In particular, the radiometer 15 provides a video signal which is received by an image processing board on the image analyzer 16(1). This board converts the analog video signal into a digital representation as an array of bytes on the image processing computer 16(1). Each byte represents one of 256 different gray levels. The image processing array on the computer 16(1) is able to accommodate and store a complete imaginary of up to 512 by 512 pixels, 8 bits of information per pixel. The array is scanned 30 times per second permitting the radiometer 15 effectively to employ a video display (not shown) with controls that permit setting cross hairs over specific features on the weld puddle using manual dials and knobs. Line scanning, according to the invention, includes shape recognition in three-dimensions using a single camera which has an (x,y) axis, and is capable of presenting (x,y) information plus the brightness associated with particular points on the (x,y) representation plane. The two-dimensional (x,y) image has numerical values indicative of intensity. This produces a three-dimensional, displayable effect. By examining the actual images generated, certain features, such as the slope of the sides of this three-dimensional image, become apparent as a qualitative measure of how fast the sides of the weld puddle are cooling. In such a representation, defects in the weld puddle 19 show up as dark spots.

In the preferred embodiment of the invention, the precise technique whereby the image analyzer 16(1) extracts information from the digital representation of the infra-red image of the puddle 19 is as follows. First, the center of the puddle 19 is determined by locating a point at the center of brightness of the image. Assuming that the upper left corner of the image has the coordinates (o,o), with the x-axis increasing in value to the right across the top of the image and the y-axis increasing in value downwards along the right edge of the image, and if P(x,y) is the brightness of the pixel at position (x,y), the center of the weld puddle is determined as follows:

S = sum from y=0 to y=Ymax of the sums from x=0 to x=Xmax of P(x,y); R = sum from y=0 to y=Ymax of the sum from x=0 to x=Xmax of the product y times P(x,y); and C = sum from y=0 to y=Ymax for the sum from x=0 to x=Xmax of the product x times P(x,y), where P(x,y) is the pixel intensity as a function of x and y, and x and y are planar position coordinates of the puddle 19.

The coordinates of the center of brightness, i.e., XB and YB, are then $$XB = R/S$$

and $$YB = C/S$$

Having found the puddle center, the image analyzer 16(1) subtracts the value 40 from the brightness magnitude at this center point to give rise to a pre-established edge brightness value. The value "40" was selected by an expert metallurgist as giving a reasonable definition of the puddle edge brightness, according to the preferred embodiment of the invention. (The puddle edge is fairly well defined in the image, and naturally different hardware and software would require a different edge brightness value or method of computing the same.)

Next, the analyzer 16(1) scans from the puddle center of brightness towards the puddle edge to the left, right, and downwards, and possibly in other directions as well, thereby defining points on the puddle's edge. The x-axis width of the puddle 19 is then determined as a first puddle parameter. A rectangular box of predetermined adequate dimensions, e.g., a centered square with sides equal to the radius of the measured weld puddle 19 is then established about each of three puddle edge points, i.e., the front tip and the sides. Within each box the following puddle parameters are computed: the area of the puddle 19 within the box; the length of the puddle perimeter; and the number of times that the puddle boundary doubles back upon itself and crosses an imaginary "smooth" puddle boundary. All of this information is presented in digital, floating-point form and is readily retrievable by the image processing advisor 115i.

The weld puddle line scanning effectively enables the establishment of isotherms in the weld puddle image, as shown in FIG. 18. Establishing the isotherms is particularly accomplished by examining each line of the pixel matrix, and evaluating the data on the line pixel by pixel. At each transition across a selected reference level, a particular isotherm value is established corresponding to the selected reference level. Thus, by using line scan data and examining each of the points in the pixel matrix, line by line, a three-dimensional isotherm representation, as shown in FIG. 18, can be established from the raw line data.

Additionally, as suggested above, by examining the pixel matrix, a mathematical operation can be performed to determine the approximate center of the data clusters in the frame, which are specifically indicative of the image of the weld puddle. This is useful for focusing effectively on the centroid of the weld puddle 19 and helps tracking the weld puddle and further processing of the image in view of cognizance of its actual center. It further improves puddle tracking according to a selected boundary tracking algorithm. Image processing further includes the establishment of a theoretical box around the weld puddle. By scanning along the box edge and checking the brightness of the image along its perimeter, one may determine whether bright pixels are present, which would indicate the puddle has reached the edge of the box. If no such bright pixels are present, it is clear that the puddle has not grown outside the established box boundary. This provides a very simple measure of how big puddle 19 is, which is particularly useful in resistance welding shape recognition. One image processing algorithm looks at the leading edge portion of the weld puddle 19 and performs a length calculation of the perimeter, which is useful as a defect indication. The side zones are employed for determining the puddle width by locating the sideward edges of the weld puddle and doing a subtraction. The tip zone of the weld puddle 19 produces substantial amounts of tracking information, because the weld seam passes directly under the tip of the progressing weld puddle 19. The side zones are useful for establishing the patterns and derivatives of predetermined isotherms, the latter indicative of the cooling rates of said weld puddle 19.

Tracking is further accomplished by measuring transverse displacement of the weld puddle 19 from the seam it is intended to follow. In particular, by viewing the front edge or tip of the weld puddle 19, it can be determined in what direction the seam of the weldment is proceeding. The seam of the weldment may deviate from the general direction of the robot and the welding torch it carries, defining an offset angle. According to the invention, this causes welder 20 to turn transversely back toward the interface 19" between the members 14 being welded, to ensure their effectively being joined.

Further, mismatch errors can occur, according to which one plate 14(1) is misaligned with the other plate 14(2), establishing undesired weld puddle protrusions. This causes the weld puddle to flow from the edge of one of plates 14 into the space between the plates 14. In order to effectively counter this, the welder torch 20 is rotatably adjusted to aim directly between plates 14 from an oblique angle to ensure creation of a strong weld.

According to the thermographic detection techniques employed herein, and as suggested in the Appendix, a box is defined about the center of the weld puddle 19 to determine whether or not it has obtained a minimum acceptable size for data to be permitted to be taken by the detector 15 in order to establish a pixel array frame for use in image processing, as indicated herein. If the weld puddle 19 crosses the perimeter of the box, the pixel brightness will exceed a predetermined threshold, and the puddle 19 is deemed sufficiently large for taking data arrays for image processing. According to this technique of determining the minimum acceptable weld puddle size, resistance welding can be implemented effectively.

As before, the technique includes establishing the size of the box, and determining a pixel brightness threshold value based upon weld process parameters. The selected box is, for example, established at suitable coordinates, (e.g., 100,100) in a field of 200 by 200 pixel elements, with a pixel intensity threshold value set at 150, for example. These values are established in view of the predetermined minimum acceptable size of the weld puddle 19 and the camera imaging factors such as zoom ratio and emissivity of heat from the weld puddle 19, for example. To determine the position of the box established around the weld puddle 19, the infrared detector 15 is calibrated with respect to the axis of the welder torch. A looping process accomplishes this by continuous scanning of consecutive pixel array frames at successively increased pixel threshold values until the box contains a sufficient number of pixel values. When the weld puddle 19, accordingly seen, exceeds the bounds of the box, a signal of that event initiates calculation of the center or centroid of the weld puddle 19. Finally, this information is communicated to the image processing computer through a suitable communication interface.

FIG. 18 shows line scan information generated from an array of pixels representing infrared intensities of a weld puddle plotted as a function of position on a flat planar projection of the weld puddle. A fairly good representation of puddle intensities can be established with even a limited number of line scans as shown in FIG. 18. A more precise representation might include 500 row scans and 500 column scans, or 250,000 pixels. This would permit the development of an extremely accurate set of predetermined isotherms along the contour of the line scan information in FIG. 18. However, this kind of accuracy is not required and the desired isotherms can be produced with only several scans, as suggested in FIG. 18.

Specific zones within the weld puddle, such as the tip zone, the width zone, and the diagonal or shoulder zones, respectively. Selected zones of interest are established for examination by referencing the selected zone relative to some known feature, for example, such as the center of the area of the puddle. Once the center of the weld puddle 19 has been determined, one can then fix selected zones of interest relative to this established center. Alternatively, by detecting certain features on the edge of the puddle 19 such as the tip of the puddle 19, the position of these special interest zones can be fixed as well. Other such edge features include, for example, protrusions or fingers on the leading edge of the puddle. As already discussed, the central zone is employed for determining puddle width.

To determine the center of the weld puddle, according to the invention, the center of mass of the puddle is determined. According to this technique, the entire puddle image is considered to be a single region, and the area and the centroid of that region are calculated. From the centroid of that area, all of the special interest puddle zones are established on an (x,y) coordinate system. Accordingly, the puddle side zones are fixed between the tip or leading edge of the weld puddle 19 and the side zones. The sizes of the special interest zone are predetermined. As noted above, the actual positioning of the zones in the (x,y) coordinate system is fixed, according to the image analysis techniques indicated. As the weld puddle image or position changes within successive pixel frames, the images on the indicated zones will bear evidence to these changes.

In spot welding operation, according to the invention, an image processing window is established over the expected position of the developing puddle or nugget to ascertain the current physical size of the nugget. When a sufficient size has been attained, the weld current is halted.

The slope, derivative, or gradient of the detected isotherms is monitored to determine the maximum weld puddle coding rate. The hotter the puddle or nugget gets, and the greater the difference between the ambient temperature and the plasma of the puddle, the greater its cooling rate will be. This cooling rate is additionally affected by other factors, such as the shielding gas temperature, the particular materials being welded, the massivity of the material, and whether or not the materials welded have been pre-heated, for example. To ensure a quality weld according to the particular metallurgical characteristics of the metals being welded, predetermined maximum and minimum cooling rates must be maintained during welding operation. In other words, the best metallurgical properties occur within a certain band of cooling rates. Thus, according to the invention, to maintain the cooling rate within desired bounds, the weld current and weld speed are modified to keep the cooling rate within bounds. If the cooling rate is too great, for example, the weld current is reduced and the weld speed is increased. According to the invention, preference is given to decreasing the weld current or increasing the weld speed alone, without modifying both parameters. Further, according to the invention, an increase in weld speed is preferred as a parameter modification because this tends to increase the throughput at a particular work station, within bounds, of course. Further, if the cooling rate is quickly to be modified, weld current is modified first because weld current is more responsive to speedy modification than weld speed.

To determine the rate of cooling, the pixels in the side zones are examined because the maximum cooling rate is expected in those regions. In particular, selected pixel rows in the side zones are examined, looking particularly at the peripheries of the side zones, namely, the transition between the molted puddle and the heat affected zone immediately adjacent the puddle, which is still solid but not metal. There is a narrow band of about 10 to 20 pixels which constitute the interface zone between the molten and the solid regions. By observing the pixel values in this portion of the pixel array, one can establish derivative of the heat in terms of the maximum and minimum values that occur in this threshold region. Further, the difference of maximum and minimum is divided by the number of pixels over which the change occurs. That establishes the proportional cooling rate desired. In particular, that establishes the transverse proportional cooling rate be along the "x" axis, while the robot and the welding progress along the "y" axis.

In addition to controlling and monitoring weld speed and weld current, the process controller tracks and controls torch position and disposition by monitoring the location of the weld puddle 19. The process controller further monitors error conditions, such as mismatch (when the surfaces being welded together are not coplanar and substantially coincident at the weld point), misalignment between the plate seam and the path followed by the welder and excessive root opening, for example, and adjusts torch position, altitude, and disposition to minimize or eliminate such error conditions. In response to detection of such mismatch, misalignment and excessive root opening conditions, weld speed or current is modified, or the torch is tilted or shifted to ensure clear establishment of an adequate weld seam between the plates to be welded. The torch angle is typically perpendicular, or normal to the surfaces being welded. However, the welding robot can tilt the welding torch sideways, forward or backward, as required, and can position the torch forward, backward, and sidewards anywhere on the (x,y) coordinate plane, as well as shift it along the z-axis to control the arc length of the torch.

The image analysis further includes an algorithm that observes the shape of protrusions at the leading edge of the weld puddle. In particular, the image analysis algorithm generates an indicative notation that the puddle is in a state of vertical mismatch between plates being welded, if a weld puddle signature indicative of mismatch has been noted. The rule set then determines the torch orientation change needed to counter the effects of mismatch. Such an orientation change, for example, might call for the torch to be tilted sideways during welding of the mismatched segment, and the position of the torch might be slightly offset as well, if necessary.

Figure 2A:
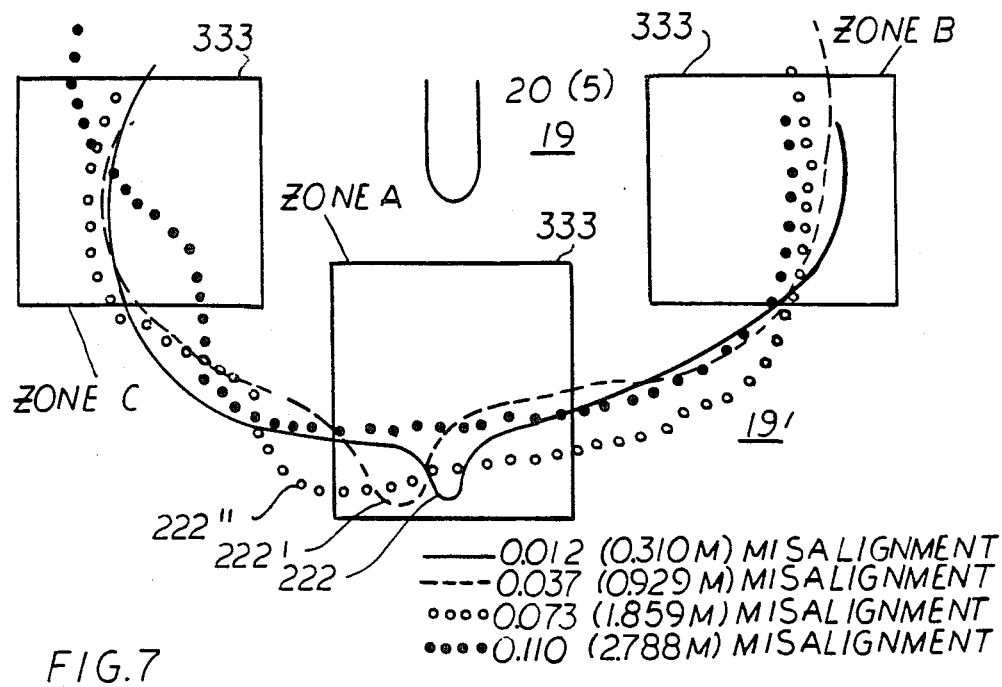
Figure 7:
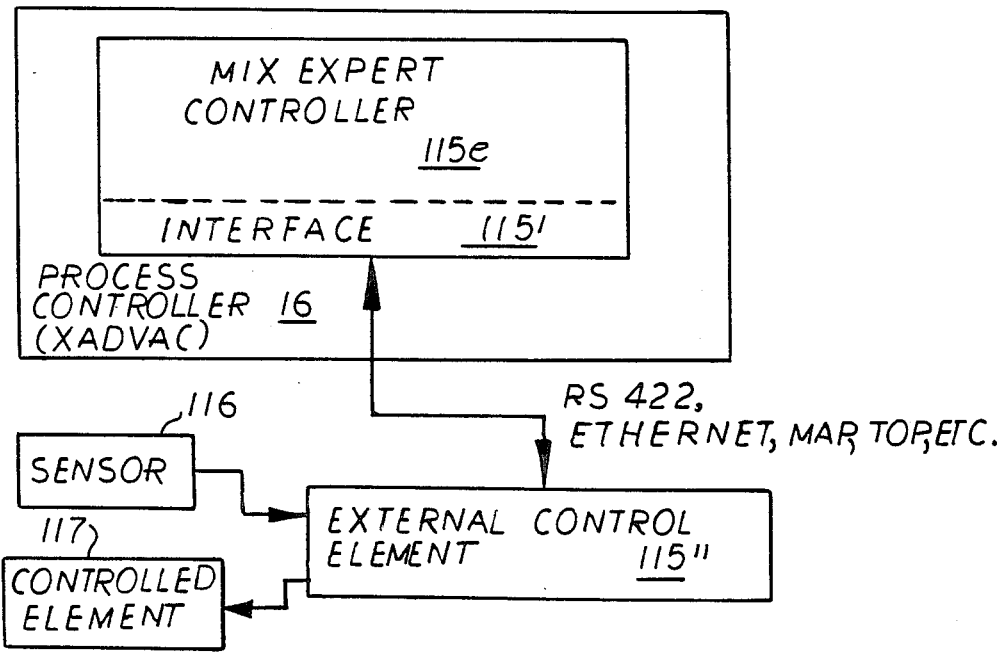
FIG. 7 shows the process controller, according to the invention herein, including a MIX expert controller module, which is effective for communication with an external control element.
Figure 2C:
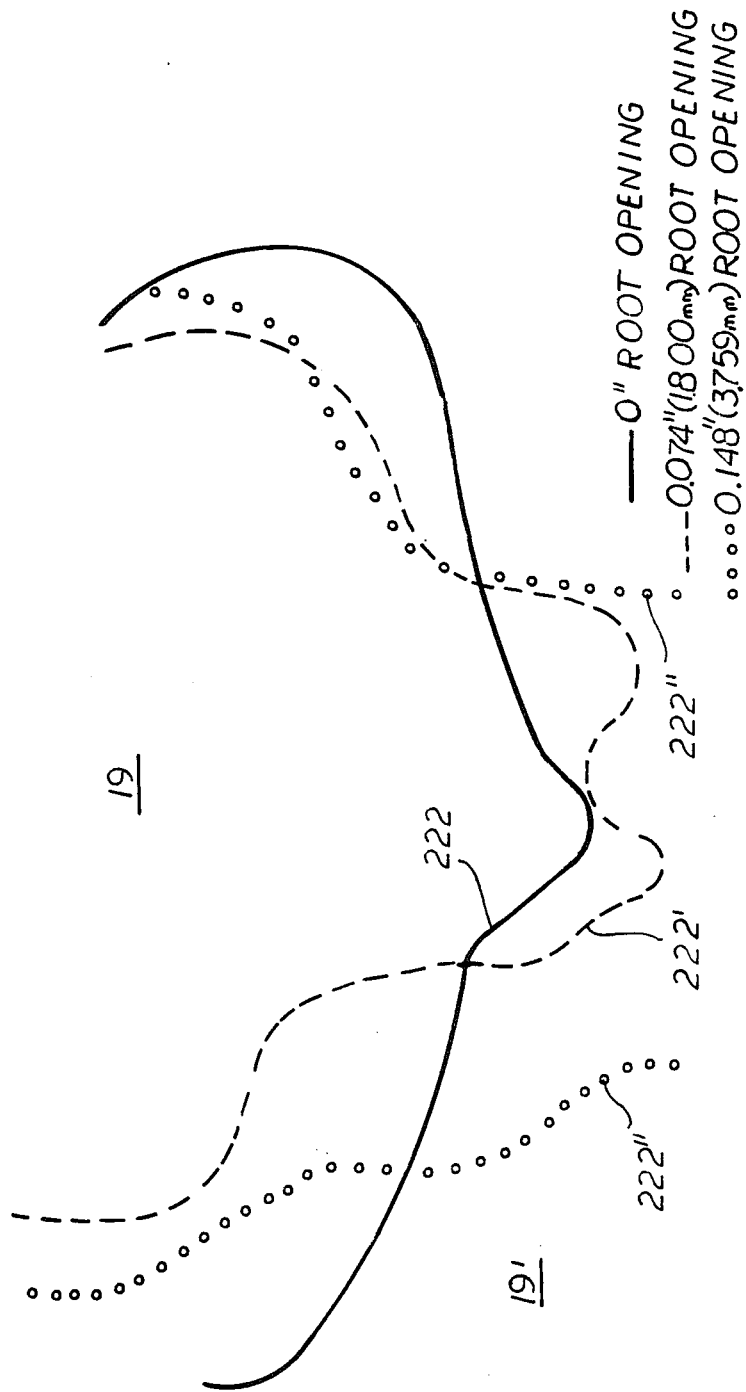

The signature of mismatch, as indicated in FIG. 2B, is a characteristic protrusion or pair of fingers at the leading edge of the weld puddle. Misalignment, as can be seen in FIG. 2A, is also indicated by a protrusion or finger 222, 222', and 222" at the leading puddle edge, depending upon the degree or amount of misalignment. In particular, misalignment occurs when the direction of travel of the torch is not parallel and on center with the weld seam. Excessive root opening, as suggested in FIG. 2C, develops as the adjacent plates being welded separate for a period and then come together again. This also shows up in terms of a rather large protrusion 222, 222', or 222" on the front edge of the weld puddle, which may or may not progress, depending upon what the actual opening does. According to the invention, welding speed is slowed, weld current is pulsed more heavily or is increased to ensure that both sides of the weldment are effectively fused.

The arc length between the torch 20(5) and the weld puddle 19 is controllable, according to the invention. An excessive arc length will be insufficient to cause a weld because not enough current will be transferred between the torch and the plate being welded to actually perform welding.

The image processing, according to the invention, includes comparing pixel images acquired against a qualified body of information on weld puddle images, which has previously been stored for comparison with actual sensed weld puddle information and/or images. The center of area or centroid of the weld puddle 19 is determined, as well as the partial perimeter of the weld puddle 19. The weld puddle cooling rate can, for example, be determined from change in the puddle width over time. According to the invention, the partial perimeter in the tip zone indicates the absence or presence of protrusion 222, 222', or 222".

Additionally, by counting zero crossings of the fingers 222, 222' or 222" and their location, the precise character of the defect can be determined. The number of zero crossings are determined by applying a smoothing filter to the zone of interest. A large number of fingers 222 indicates mismatch, for example.

Further, by observing the relative sizes of the fingers in terms of width and area, mismatch and misalignment between seam and torch can be differentiated. Additionally, as misalignment is progressive from frame to frame of pixel matrix information, the trends indicated in the image processing can suggest a tracking error due to misalignment. As one finger 222 moves farther and farther from the center of the travel direction, misalignment is indicated rather than mismatch. In misalignment, one would naturally expect to see a major protrusion 222 grow and also go off at an angle from one frame to the next. Other minor protrusions may be present as well. Thus, if angular progression of a major protrusion 222 is not seen, there is no misalignment, but instead there is another defect.

The image processing algorithms determine the raw features of the weld puddle, and actual error determination is performed in the image processing expert system, which employs a predetermined rule set to establish those determinations. All incipient weld errors look very similar. Accordingly, no effort is immediately expended to distinguish the kinds of defects. Instead, the weld defect is permitted to grow a bit under observation. As it grows, a characteristic pattern begins to emerge, including one or more protrusion 222.

In the case of mismatch, there is typically one protrusion 222 which is larger than another. It is a primary object of the inference techniques of the invention herein to notice such a trend. Weld root opening errors are, for example, indicated by the growing and shrinking of a single finger or protrusion 222. Misalignment errors are generally indicated by one or more protrusions that diverge at an angle relative to the axis of the weld seam. The direction of the weld in this instance has a progressively changing angle with the weld seam. Mismatch, on the other hand, is not a very progressive event and it is signified by at least two protrusions, one of which is noticeably smaller than the other. Misalignment is characterized by equally-sized multiple protrusions.

As set forth explicitly in the Appendices hereto, image processing computer 115*i* thus calculates features such as weld puddle perimeters, zero crossings through a selected area of the weld puddle, the centroid of the weld puddle 19 and various combinations of features which produce a high level description of the type of weld error, indicated by the protrusions.

Figure 8:
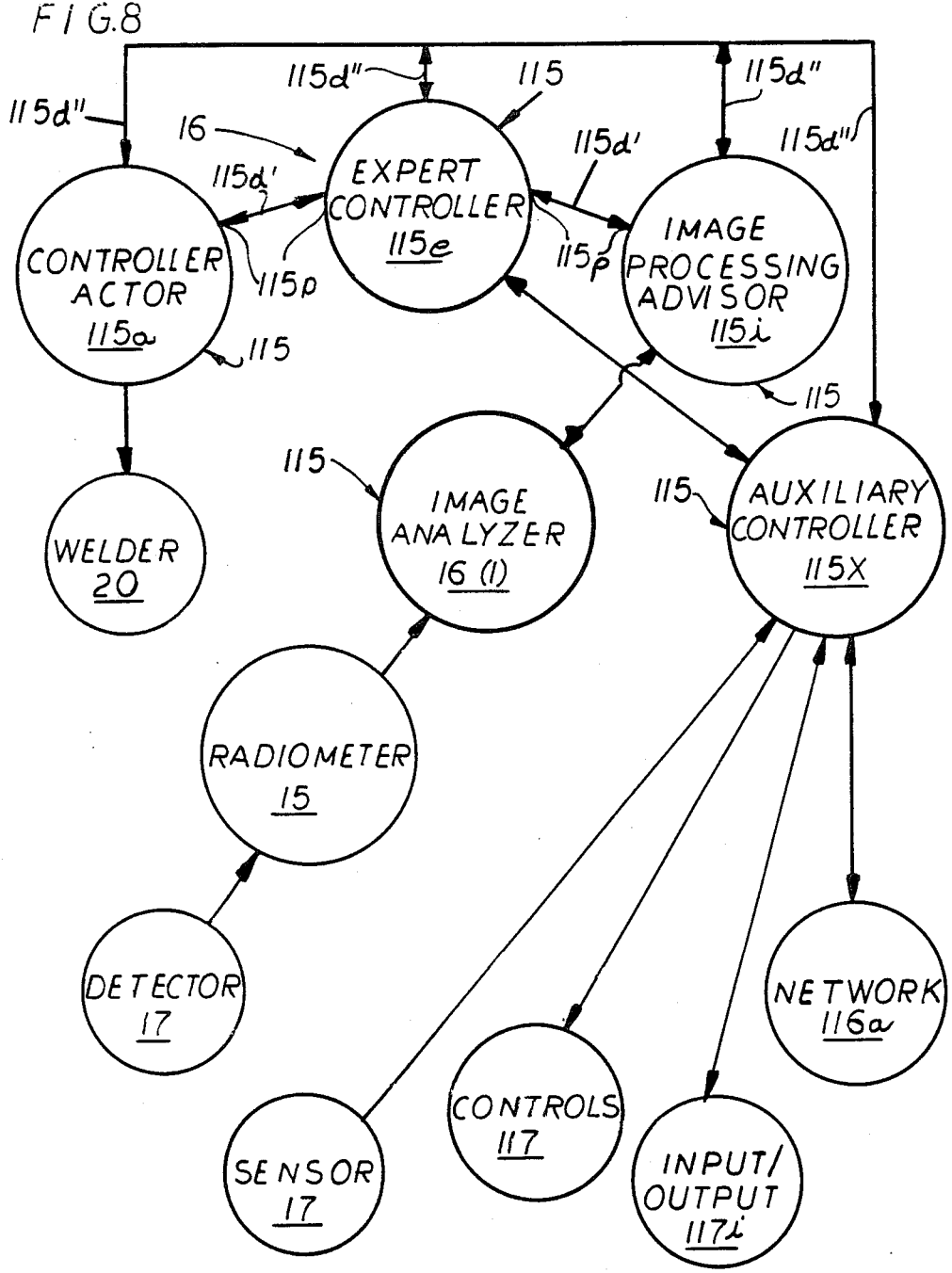
FIG. 8 is a block diagram of the process controller arrangement, according to the invention herein, comprising a network of MIX modules.

To operate the invention, according to one version thereof, four IBM AT microcomputers 115 are employed, as suggested in FIG. 8, with one of them 116(1) specifically designed to do image analysis with an installed board. Connected to the auxiliary controller or image analysis node 115*x* is another advisor node 115*i* which has the image-processing rule set loaded up. Referring now to FIG. 19, the physical environment of the present invention is disclosed. The invention contemplates using a plurality of distributed processors to spread out the logical computations and thereby enable multiple processes of control to proceed together in real time. In the preferred embodiment, four AT-class IBM personal computers are utilized, as is shown in FIG. 19. A first computer is an image analyzer 16(1) which accepts the infrared image from the infrared detector 17 and the radiometer 15 and extracts, therefrom, the useful image data, which is used by the remaining logical systems to control the welding process. A second computer is used to implement the image processing advisor 115*i*, which accepts the image data and, by the application of rules thereto, determines the state of the welding process and whether there is any need for corrective action. A third computer is then used to implement the expert controller 115*e*, which then responds to the data generated by the image processing advisor 115*i* by determining the proper control strategies. These strategies are then fed as commands into the fourth and final processor, the controller actor 115*a*, which ultimately controls the welder 20.

Each of these computers is set up preferably using the industry standard MS-DOS operating system of Microsoft. Each of these computers includes an industry standard 80286 microprocessor equipped with extended memory so that logical computations can be carried out in extended memory space, while normal programs run in a 640,000 unit memory bank of each of the processors.

All four of the processors are set up and programmed in a similar manner, and so FIG. 19 highlights the internal structure of the image processing advisor 115*i* as representative of the internal structures of each system. Very broadly described, the image processing advisor 115i contains a physical layer 153 which, in the preferred embodiment, is implemented using Borland's Turbo Pascal programming language. This physical layer 153 interacts with the serial ports and buffers 739, 740 and 741 of the AT-Class computer using standard software utilities provided by Blaise to service data flowing into the serial ports, to buffer that data, and to present it to the Pascal programming system. In the preferred embodiment of the invention, each of the four computers contains a physical layer 153 implemented in Pascal, and, therefore, all four systems are able to communicate among themselves using this common programming physical layer. When any of the systems is initially turned on, the Blaise Computing software that services and buffers the serial ports is first made resident within the MS/DOS operating system. Then, in the case of the processors 115i, 115e, and 115a, a Lisp programming system kernel is loaded over the operating system and given program control. The Lisp kernel then sets up a variety of storage areas within the extended memory of the computers. The Lisp kernel implements a logical layer 152 within each of the three computers just mentioned. Because of its ability to "shell" into other programs, the logical layer implemented in Lisp may execute programs written in the "C" language, as is indicated at 152' in FIG. 19. In the case of the image processing advisor 115i, there are no "C" language sub-routines. But in the case of the controller/actor 115a, a plurality of "C" programs are run by the logical layer to control the welder 20.

Once the logical layer 152 gains program control and allocates its memory for its own needs, it launches the Pascal layer 153 by shelling into a Pascal program. Through the use of shared, common memory locations in low memory beginning at hexadecimal address 4F0, the logical layer 152 places pointers to various addresses, which it sets up to be shared with the physical layer 153. By accessing the locations beginning at 4F0, the physical layer 153 gains access to these address pointers and is thereby able to share certain memory locations with the logical layer 152. In particular, a blackboard region 742 is set up into which the logical layer 152 may write the values of variables, later access the values of those variables, and from which the physical layer 153 may access the values of those variables without having to interrupt the operation of the logical layer 152. In this manner, one processor may request the values of certain variables from another processor directly from the physical layer 153 without having to interrupt the logical processing proceeding in the logical layer 152.

A second shared memory location is the message queues 734, 742, and 736. A first message queue is a priority message queue 734 into which the physical layer 153 writes high priority messages that must be serviced immediately by the logical layer 152. Whenever such a message is entered into the queue 734, the physical layer 153 sets a semaphore 717', generates an inference interrupt 717 to interrupt the observations of the logical processor 152, and directs its attention to the priority matter. Other matters not requiring the interruption of the logical layer are messages placed in the non-priority queue 742. The logical layer generates output messages by placing them into an output queue 736 from which they may be read by the physical layer 153.

While the physical layer 153 is initially running, it attaches itself to the real time clock 719 interrupt of the AT computer, thereby causing itself to be placed into operation roughly every 1/18th of a second during a normal operation of the computer. Having thus attached itself to the real time clock, the physical layer 153 returns program control to the logical layer 152 which then commences its normal operations of processing logical functions of the image processing advisor 115i.

The image analyzer 16(1) includes a physical layer similar to the layer 153 in the image processing advisor 115i, but does not include a logical layer 152 implemented in Lisp. Because of the need for speed in the processing of large quantities of image information, the image analyzer 16(1) contains programs written in "C" that accept and process image information, and generate messages for the physical layer 153 to transmit back to the image process advisor about the state of the image in response to requests received from the image processing advisor 115. Naturally, it would be possible to have additional logical layer operations proceeding in the image analyzer 166, if that computer were fast enough to handle those in addition to its immediate task of condensing the large quantity of image information into the small amount that is needed to implement control in accordance with the teachings of the present invention.

The controller actor 115a is essentially the same as the image processing advisor 115i but contains many "C" programs analogous to 152' that control the welder 20. It is thus labeled as containing "Lisp, Pascal and 'C'" programs.

Returning now to the image processing advisor 115i, the normal operation of this advisor proceeds as follows. The logical layer 152 establishes a semantic net 215(4) which contains the goals of the system, all of the "forward-chaining" rules which define the various processes that the system may carry out, and all of the "backward-chaining" rules which define how various system results are computed from external and internal system variables. The logical layer 152 is implemented using Golden Hill Lisp Large Memory Version 2.2, according to a preferred version of the invention. This is a conventional Lisp processor, and other suitable A-I processors could be used as well.

As it comes, this Lisp processor is capable of managing multiple operating environments and processes, and switching between them upon request. Each of these operating environments is called a "stack group" and contains a complete inference process together with all of the relevant data. The logical layer 152 is capable of maintaining a plurality of stack groups, alternatively executing them, and suspending them under program control. However, the logical layer 152 does not include any provision for real time scheduling of these tasks but only for maintaining multiple tasks and switching between them. It was, therefore, necessary to achieve the present real time process control scheduler by integrating the logical layer 152 with a physical layer 153 that is connected to a real time clock 719.

In accordance with the teachings of the present invention, the logical layer 152 maintains a plurality of inferencing queues 218 including a running queue 218(1), a ready queue 218(2), and a suspended queue 218(3). The names of stack groups are stored within these queues. The running queue contains the name of the stack group that is currently active and being processed by the logical layer 152. The ready queue 218(2) contains a linked list of the names of inference processes that are running on a "time-shared" basis, but that are currently not being processed by the logical layer 152. The suspended queue 218(3) contains the name of tasks that have been suspended pending the result of an input-output request for information from the logical layer 152 to some other machine, such as the image analyzer 16(1) or the expert controller 115e.

To achieve real time switching between inference tasks, the physical layer 153 is driven by the real time clock 719 to count the passage of time. Periodically, the physical layer 153 decides it is time to schedule the running of a new task. Accordingly, the physical layer 153 sets the semaphore 717' to indicate that it is time for a new task to be run and generates an inference interrupt 717 to interrupt the operations of the logical layer 152. The inference interrupt is actually the "control-break" interrupt of the computer, since the control-break interrupt is already used by the logical layer 132 as a means for responding to keyboard interrupts from the keyboard 368, as is conventional in software programs designed to run on AT class computers. But the logical layer 152, in response to the control-break interrupt, checks the semaphore 717'.

If the semaphore 717' is in its reset state, then the logical layer 152 knows that a keyboard interrupt has been received from the keyboard 368 and processes it in a normal manner, servicing a keyboard request from the knowledge engineer or system supervisor. But if the semaphore 717' is in a state indicating that it is time to switch tasks, then the logical layer 152 moves the process at the top of the ready queue 218(2) into the running queue 218(1) and moves the task from the running queue to the end of the ready queue 218(2). In this manner, the physical layer 153 and the logical layer 152 combine to form a real time process control inference task scheduler that rotates program control systematically through the inference tasks in the ready queue 218(2), devoting a fixed amount of time during each period to each of the tasks waiting to be completed.

When the logical layer 152 needs to communicate with other processors, it places a message in an output queue 736. The physical layer 153, when next awakened by the real time clock 719, senses the presence of this message and initiates the feeding of the message out of the serial ports and buffers 739, 740, and 741 to one of the other computers. In this manner, the logical layers 152 within the computers may pass data back and forth, and may also pass requests for the performance of various inference tasks.

In response to an incoming message from another processor at the serial ports and buffers 739, 740, and 741, the physical layer 153 places a message either into the priority message queue 734 or into the non-priority message queue 742. When a message is placed in the priority message queue 734, the physical layer 153 also adjusts the semaphore 717' to signal that a priority message has arrived, and then it initiates an inference interrupt (actually a "control-break" interrupt) in the manner that has been described. In response, the logical layer 152 checks the semaphore, and upon finding that it signals a message, retrieves the message from the priority queue 734. Non-priority messages in the queue 742 are processed by the logical layer 152 without the assistance of an interrupt or the semaphore 717'. While the logical layer 152 is processing a priority message, it leaves the semaphore 717' set, and this semaphore blocks the physical layer 153 from taking further action with the message queues until the logical layer 152 has finished and cleared semaphore 717'.

Some incoming messages simply require the return of data from the blackboard 742 to one of the other computers. In this case, the physical layer does not need to generate a message for the message queue but simply goes directly to the blackboard 742, retrieves the necessary information, and forwards it to the other machine. However, if a message contains data that is to be placed in the blackboard 742, the physical layer 153 must place the message into a message queue and allow the logical layer 152 to transfer it into the blackboard 742.

Communications between the logical layer 152 and the physical layer 153 to access the message queues, and the semaphore 717' are carried out by assembly language programs that are tied respectively to the computer interrupt 63H in the case of the message queues, and the computer interrupt 64H in the case of the semaphore. These machine language programs enter data into the message queues, remove data from the queues, read and set the semaphore 717', and do so with all interrupts locked out, so that when one of the systems 152 or 153 is accessing a message queue or the semaphore 717', the other is prevented from simultaneously accessing the same entity, thereby destroying some data. These assembly language programs are loaded by the Pascal layer 153 when layer 153 is itself initiated.

The display 367 and keyboard 368 of the Lisp processing advisor 1152 interact primarily with the logical layer 152 and are used by the knowledge engineer to monitor system performance, to add new rules, and to alter the performance of existing rules in the expert system which is controlling the welding process.

According to a preferred version and referring now to FIG. 8, the basic start-up activity of the system includes presentation of a top-level goal such as "to perform GTA welding" (GTA means "gas tungsten arc"), for example, to the root node or expert controller 115e. This goal is analyzed on node 115e by the semantic network and its interpreter. In order to perform the particular welding goal, a certain rule set and possibly other knowledge bases, such as frames containing constant data, are required to analyze that goal. These are accordingly loaded dynamically from a hard disk (directly or via Ethernet) along data lines 115d", for example, from a file transfer network 116a, when that goal is presented. From that point, the controller 115e starts generating subgoals and passing these goals to the other computers or nodes. Those nodes receive the goals, evaluate them, and determine which particular rule sets they need to perform their particular analyses, and accordingly they dynamically load the needed knowledge bases and frames. Parallel processing is thus initiated.

The detector 17 and the welder 20 are mounted on the robot 22 for transportation. The detector 17 is preferably positioned at a 30 degree angle from the surface of the workpiece 19' (FIG. 1), focusing directly at the weld puddle 19 to enable the scanning thereof. The detector 17 is further preferably positioned about 12 inches from the weld puddle 19. The weld puddle 19 accordingly remains in the same place relative to both the detector 17 and the welder 20 as the robot 22 moves to conduct welding. This effectively permits controlled, closed-loop arc welding to be accomplished with respect, for example, upon a pair of adjacent, square grooved workpiece elements 14(1) and 14(2) of AISI 1010 carbon steel, which are about 0.250" thick.

Figure 3A:
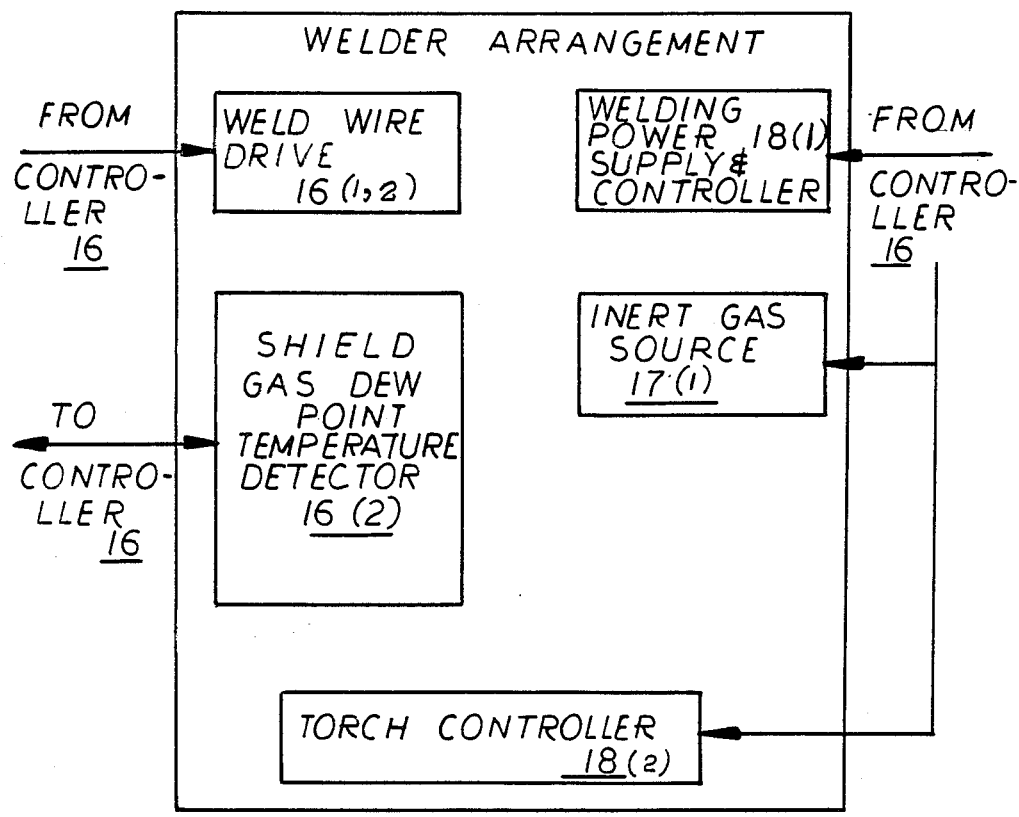
FIGS. 3A and 3B show schematic details of the complete welder arrangement which permits actual implementation of adaptive welding in real time.
Figure 3B:
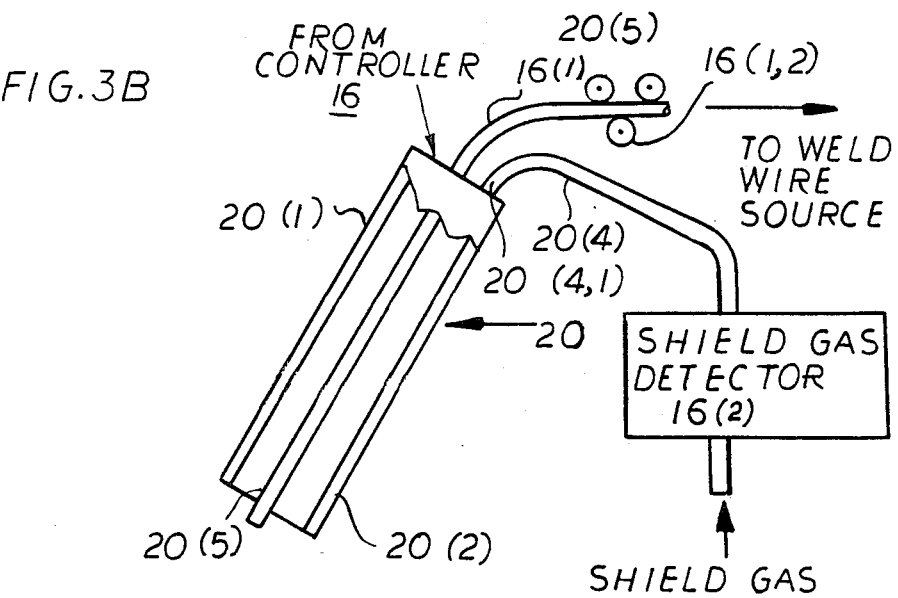

After analysis by the image analyzer 16(1), the results are input to the other elements of the controller 16, which directly governs selected weld parameters and variables, including weld current and speed, for example. Other parameters such as weld voltage, torch arc oscillation, arc pulsing, arc length, and wire feed speed are controllable as well, according to the invention. Shield gas dew point temperature, as suggested at FIG. 3A, is additionally detected, and the results are provided to the controller 16 to shut down operation if the shield gas quality diminished unacceptably. The shield gas employed is inert and is typically argon, for example. The quality of gas is established with a dew point temperature measurement of the shielding gas by a detector 16(2) through which shield gas line 20(4) (FIG. 3B) passes. Shield gas dew point temperature, as is well known, is related to the moisture content of the gas. A device for making the measurement is available from Alnor Company in its humidity detection series. The shield gas must be very cold, which prevents oxides from forming. FIGS. 3A and 3B additionally show elements of the welder arrangement 20 including a weld wire drive 16(1,2), weld wire 16(1), the shield gas dew point temperature detector 16(2), a source of inert shield gas 17(1), a welding power supply and controller 18(1), and an arc controller 18(2). The electrode 20(5) is consumable or non-consumable tungsten, depending upon the weld process employed. If it is non-consumable, as in the GTA process, no weld wire is used, as the electrode is not made of consumable weld wire. Each of these elements is controlled by the controller 16. The weld wire 16(1) is used to fill in the gap between the welded parts 14. Accordingly, the weld wire is fed in at a speed proportional to the torch and robot travel speeds. The robot speed, of course, depends also upon the gap between the parts 14 being welded. The shield gas electrode 20 further includes a cylindrical cup 20(1) which surrounds the central electrode 20(5). It is out of this cup 20(1) that the shield gas flows to prevent oxidation of the weld puddle during welding. Accordingly, there is an inlet 20(4,1) in the top side of the cup 20(1) into which the shield gas flows. Accordingly, it flows out of weld cup 20(1) at its lower open end. FIG. 2A shows the weld puddle 19 adjacent the electrode tip 20(5) and indicates the respective special interest zones 333 of weld puddle 19, which provide information required for image processing, as is discussed herein. Several weld puddle contours are shown, depending upon the degree of misalignment of the electrode tip 20(5) from the seam between the parts 14(1) and 14(2) (FIG. 1) being welded together.

Figure 4:
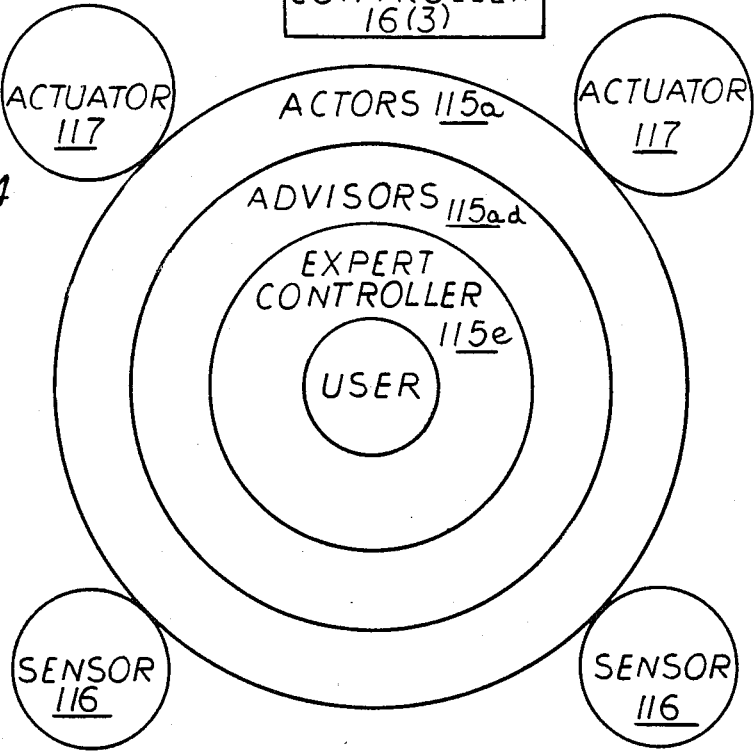
FIG. 4 shows, in schematic form, one version of the process controller, according to the invention herein.

FIG. 4 shows in schematic form the general scheme of one version of the process controller 16 designed in accordance with the invention herein. In particular, it illustrates that the actors 115a which control the real-world process are data driven, while the inner nodes, such as the expert controller 115e and the advisors 115ad, are goal driven (by the centrally positioned user 400, for example).

Figure 5:
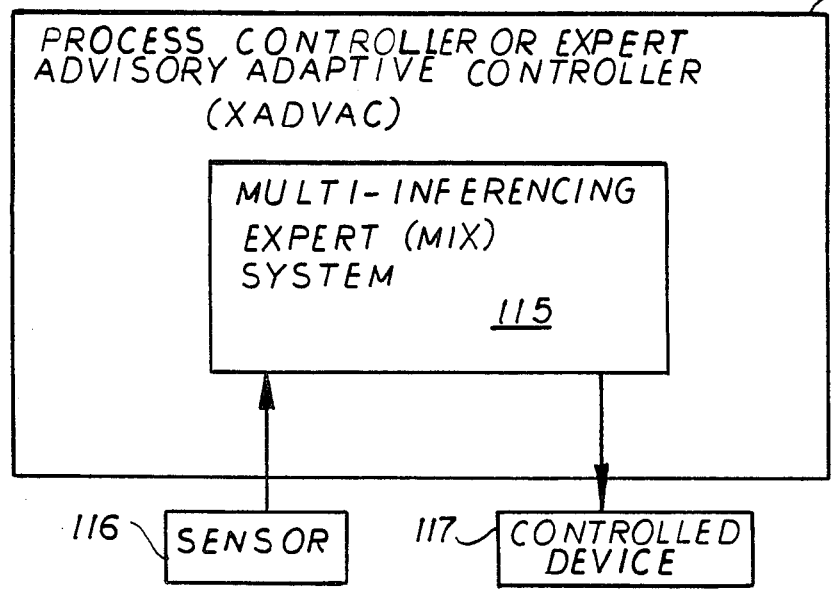
FIG. 5 is a generalized block diagram of the process controller arrangement, according to the invention herein, comprising in particular a minimal process controller arrangement, which includes a single multi-inferencing expert (MIX) module responsive as shown to a sensor and effective for controlling a selected controllable external device.

FIG. 5 shows a preferred version of the invention herein, in which the controller 16 includes a single multi-inferencing expert (MIX) hardware node 115. The hardware node 115, which might be implemented using a single AT-class computer programmed in Lisp, "C", and Pascal, may communicate with devices such as sensor 116 and/or one or more controlled devices 117. The present invention contemplates providing multiple nodes, each of which may reside on a different hardware processor, but some of which may share the same processor.

Figure 6:
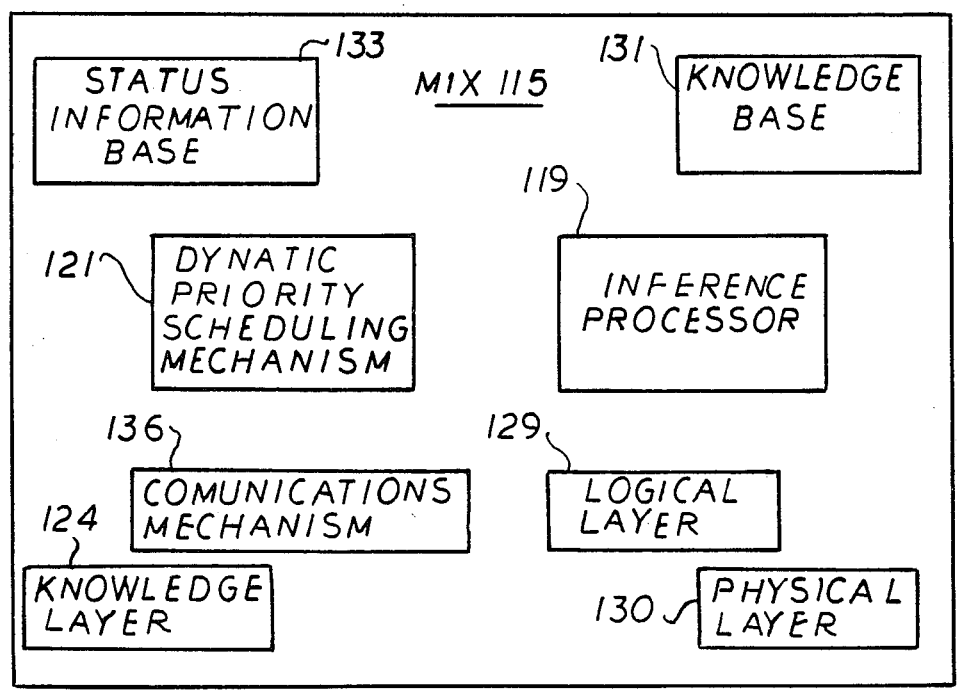
FIG. 6 is a generalized block diagram of the MIX module including artificial intelligence elements, according to the invention herein.

As indicated in FIG. 6 according to one version of the invention, each MIX hardware node 115 particularly comprises an inference processor 119, a dynamic priority scheduling mechanism 121, a knowledge layer 124, a logical layer 129, a knowledge base 131, a status information base 133, a physical layer 130, and a communications mechanism 136. The node 115 acts in response to information contained in a knowledge base 131, as well as in response to real time information provided by the sensors 116 (FIG. 5), for example. The inference processor 119 is loaded in a particular hardware node 115 to conduct inference processing interpreting pre-established rules, which are stored in the knowledge base 131 with other knowledge elements (FIG. 13) such as frames 215(1), objects 215(3), and semantic networks 215(4), as indicated in FIG. 6. The nodes 115 conduct inference processing under direction of a dynamic priority scheduling mechanism 121, which operates as an inference multiplexer. The logical layer 129 thus associates each inference process with a selected logical location in any one of a number of the nodes 115. The logical layer 129 thus implements a mapping operation which enables the operation of scheduled inference processes by insuring the availability of information to complete particular operating reference processes. In particular, the scheduling mechanism 121 schedules inference processes in a regular, clocked sequence from a ready queue of waiting inference processes into the running queue. Then, the inference processor 119 evaluates the selected inference process by interpreting a corresponding rule 215(2) in conjunction with selected knowledge base elements, including the semantic network 215(4), objects 215(3) and frames 215(1), for example, as will be discussed below.

As illustrated in FIG. 8, a particular node 115 can operate as an expert controller with one or more elements, such as sensor 116 or controlled element 117 through external control 117. A suitable interface layer, discussed above, is, however, required to accommodate the specialized connection thereby established. This interface enables the use of specific data transmission types as required. In particular, data transmission can follow RS422, Ethernet, MAP, or TOP format. The interface layer or mechanism could be part of physical layer 130 in FIG. 6.

FIG. 8 further shows controller 13 to include a plurality of nodes 115 distributed to form a network interconnected by data busses 115d' at respective ports 115p. The hardware nodes 115 in FIG. 8 are variously configured as expert controllers 115e, advisors 115ad, or actors 115a. Expert controller 115e communicates with auxiliary controller 115x as to sensor 17, controls 117, the network 169, and input/output (I/O) element 117i. The expert controller 115x is a selected configuration of a hardware node 115 with particular features activated to perform expert controller functions including, for example, certain actor-directed features. In particular, the hardware node 115 features which are actor-directed or actor-characterizing include interface features enabling operational and functional compatibility with the selected sensor 117 or a control 117.

Figure 9:
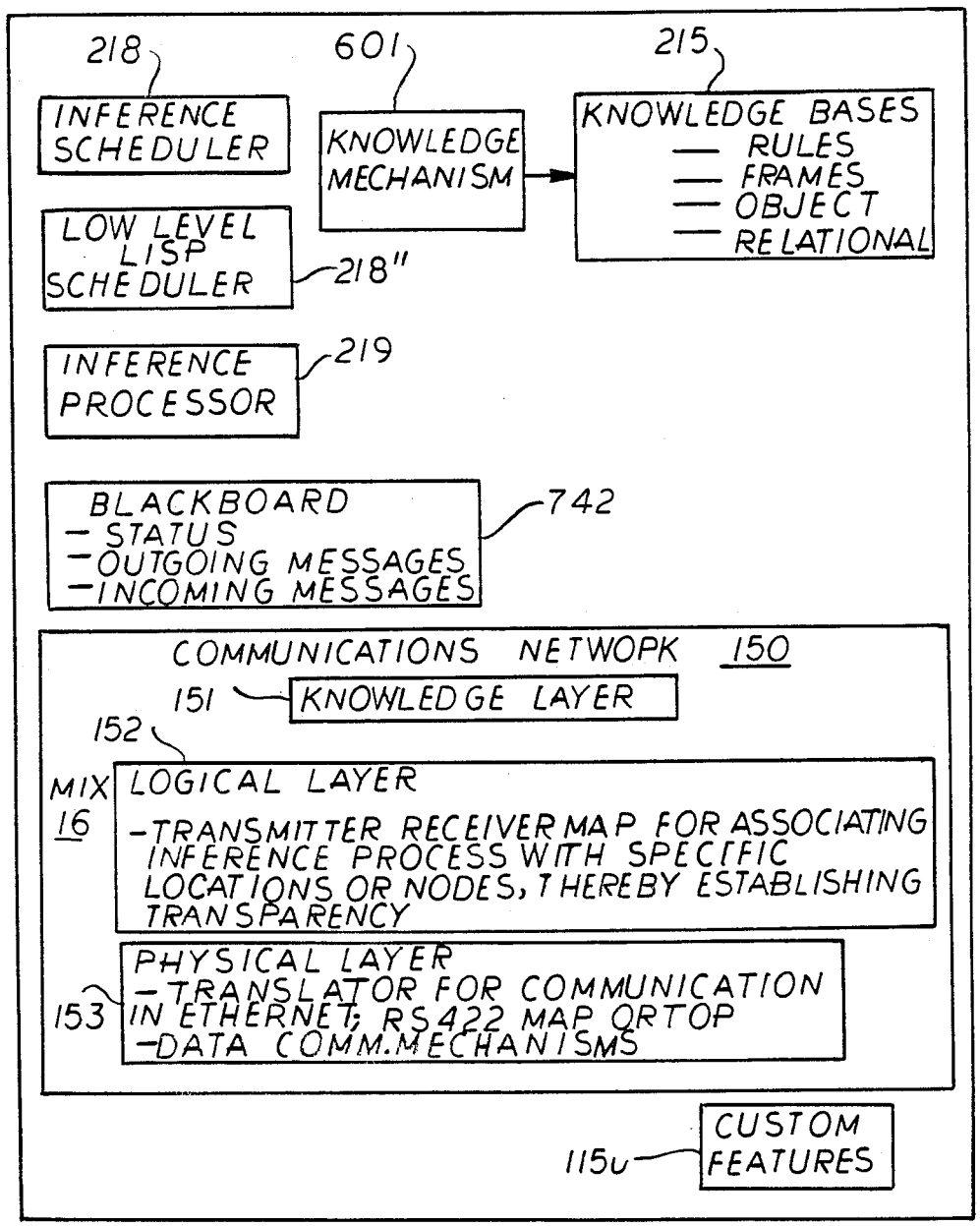
FIG. 9 is a block diagram of a generalized MIX module architecture, according to the invention herein, with the actor and advisor features explicitly set forth.

With reference to FIG. 9, the various actor-characterizing features of a node 115 are the knowledge layer, the logical layer 152, including transmitter/receiver map features effective for establishing the location of inference operations, and the physical layer 153, which features a translator for data communications in Ethernet, RS422, MAP or TOP, as well as specific data communication mechanisms effective to implement the translation operations performed by the knowledge layer 151.

The disclosed arrangement interfaces the detector 17 and the radiometer 15 directly to the image analyzer 16(1) which, in turn, is interfaced to image processing advisor 115i. (No auxiliary controller 115x exists in the currently operative arrangement; it is shown as an additional alternative or enhancement to the invention.) The image analyzer 16(1) node contains programs which process and condense the information received from the radiometer 15 in preparation for rule base analysis one node up in the image processing advisor 115i. The auxiliary controller 115x is preferably interfaced directly with the expert controller 115e node, rather than with an advisor node, such as image processing advisor 115i. The auxiliary controller 115x can be employed as a work cell controller, for example, which provides an initial goal to the expert controller 115e. The work cell controller, for example, could conceivably be a CAD system or a robot controller. What characterizes the auxiliary controller 115x is that it requires special interfacing that takes into account the external components. The key factor in being an actor is the inclusion of specific control or sensor processing algorithms for particular associated hardware devices. This additional software, for example, might include "C" algorithms for image processing.

Each hardware node 115 additionally includes at least a single generic communication port 155p which is customized to interface with other computer nodes 115 of the controller arrangement 16. Additionally, according to the invention, each hardware node 115 is capable of managing a plurality of inference processes, in sequence or in parallel, under control of a dynamic priority scheduling mechanism 121 (FIG. 6), subject to a predetermined adaptive process control language (APCL) (See Appendix IX), which features block scoping techniques, the use of various type variables and assignments, standard and user defined data structures, and, additionally, literal and conditional control structures. The language itself implements such features of artificial intelligence as frames 215(1), objects 215(3), semantic nets 215(4), and pattern matching 217, as is suggested at FIGS. 6 and 9.

Further, as suggested in FIGS. 6 and 9, the controller 16 architecture includes a logical layer 152, which associates particular inference processes with specific nodes in the network. Thus, the logical layer prevents controller 16 from having to concern itself with the question of at which node an inference process is to be carried out. Further, by utilizing knowledge-base communications, the controller 16 ties together the nodes into a single intelligent controller. Simply stated, a distributed expert system, designed according to the invention herein, is an expert system which has its knowledge distributed among more than one node 115 but which nonetheless operates as a single process.

In operation, the various pre-established process variables including weld speed and current, for example, are determined, and any defects in the weld puddle are discovered through image processing of the sensed information in view of the contents of the knowledge base 151 (FIG. 9), subject to predefined rules. For example, if the materials 14(1) and 14(2), which are being square groove butt joined in a plasma arc process are subject to joint mismatch, there will be a substantial, definable transverse puddle shift and decreased puddle width, or the puddle 19 may have an elliptical leading edge. If the materials 14 are subject to excessive root opening, there may be present two notches on the leading edge of the puddle 19. If the materials are axially misaligned, the weld seam may be on the side of the puddle. Unacceptable axial misalignment in a fillet joint weld using the flux cored arc technique is indicated by a defined transverse puddle shift.

The width of the weld puddle 19 is continuously monitored during welding. Weld travel speed is governed by microprocessor control, as is the current supplied to the welder 20. Further, the axial or longitudinal weldline 19" or centerline of the weld joint is continuously monitored for notches, which are suggestive of failures in fusion between the plate edges. Thus, according to the invention, controlled welding of square groove butt joints is enabled without substantial root openings.

The controller 16 employs primarily Lisp source code in a typical Lisp operating environment. The hardware environment for implementation preferably includes, for example, several IBM AT computers arranged in a network of nodes 115. To achieve a general goal which has been input by the operator, backward chaining occurs in the semantic network 215(4) (FIG. 13) so that the rules 215(2) applied produce intermediate goals until a plurality of intermediate goals are established and satisfied.

Figure 10:
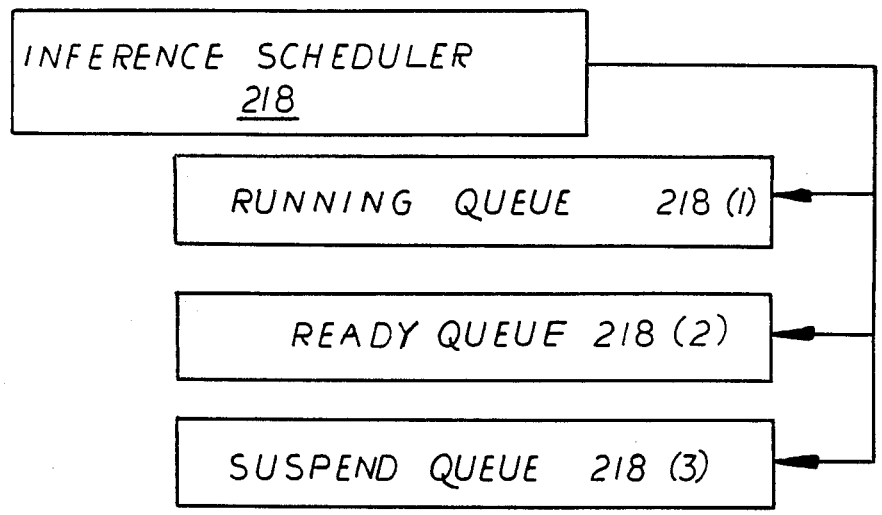
FIG. 10 is a block diagram of the scheduler arrangement for scheduling inference processes on respective running, ready, and suspended queues.
Figure 11:
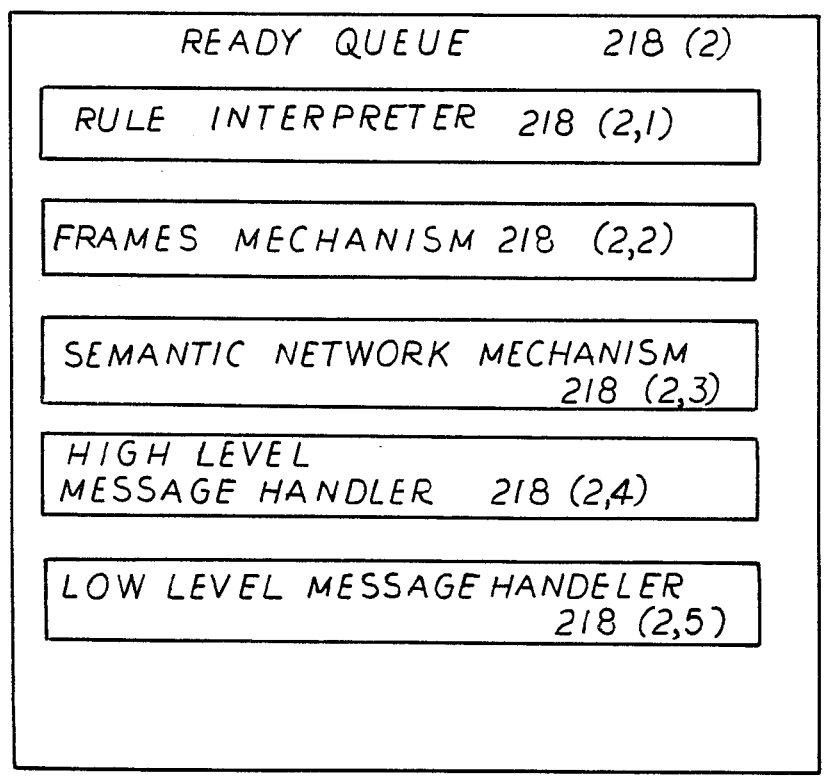
FIG. 11 is a block diagram of a number of inference processes typically held in the ready process queue when not actually running.
Figure 13:
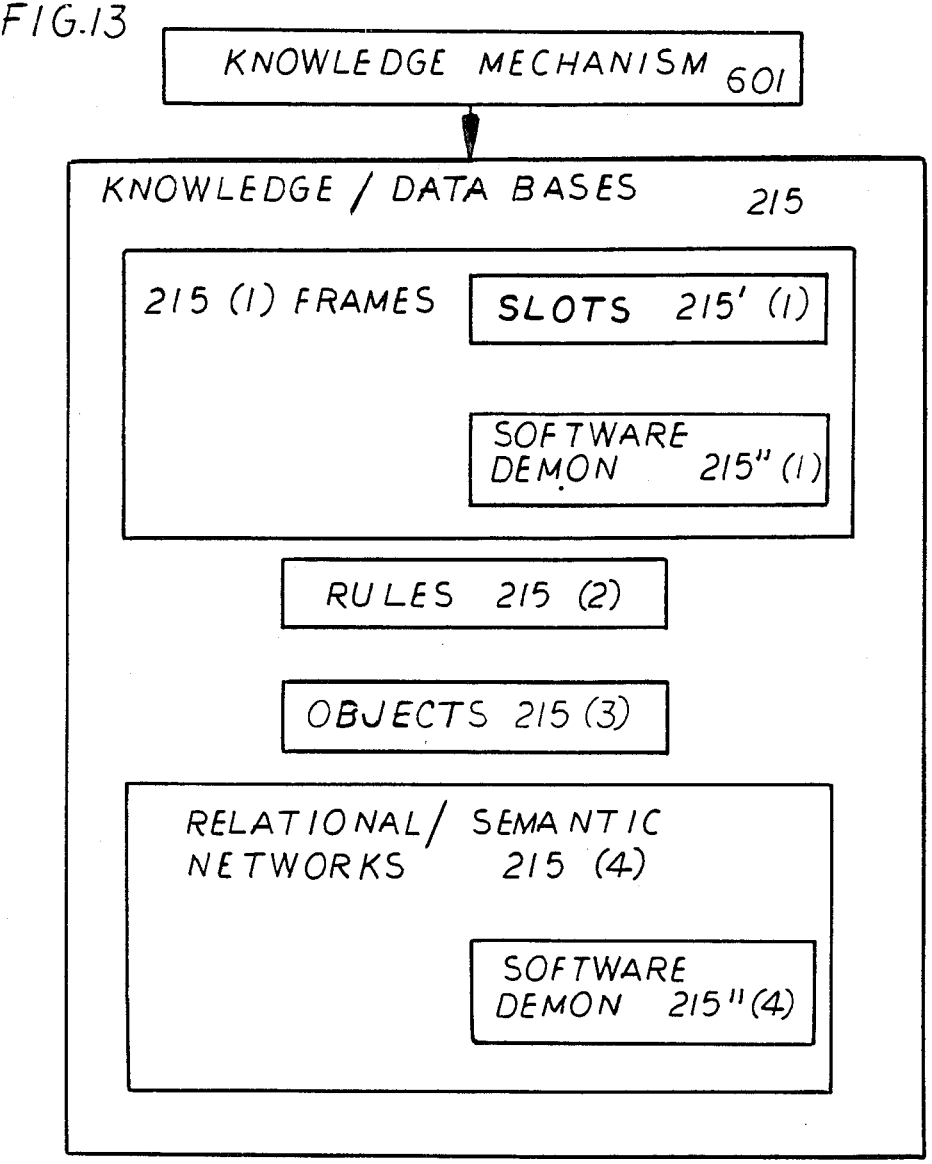
FIG. 13 is a block diagram illustrating control of the knowledge bases, according to the invention herein, by corresponding knowledge mechanisms.
Figure 14:
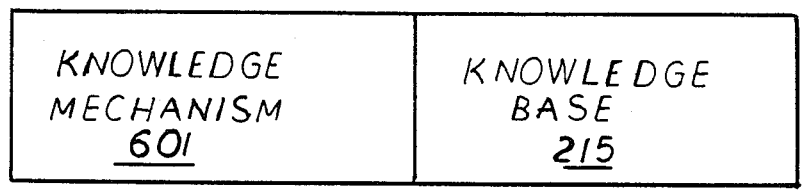
FIG. 14 shows schematically the relationship between particular knowledge bases and the associated knowledge mechanisms which direct their operation.

The controller 16 is a single expert system which is distributed over a plurality of nodes connected as a network, without each node being a separate and distinct expert system in its own right. In other words, according to the invention herein, a single, overall expert system is distributed over several nodes or machines. Accordingly, the arrangement herein distributes the inference mechanism over several processors, rather than simply distributing the knowledge components themselves among several processors by employing the technique of knowledge-based communications, according to the invention herein. Thus, a plurality of inference mechanisms or nodes can operate concurrently to achieve selected goals by continually updating sets of current knowledge until each set includes specific goal-desired information. Recursive searching to satisfy goals is thus conducted by both forward- and backward-chaining. Further, generalized knowledge mechanisms 601, as suggested in FIG. 14, are provided to operate, for example, as rule interpreter 218(2,1) and frame mechanism 218(2,2), as indicated in FIGS. 11 and 14. These knowledge mechanisms 601 are subject to control by the scheduler 218 (FIG. 10) to implement inferencing, forward- and backward-chaining, inheritance, and other implication schemes. Information regarding instances of the weld process is stored as a database in a frame 215(1) (FIG. 13) including values and procedures used to accomplish inferencing procedures. Attached to each frame 215(1), there may be software demons, which are procedures written in Lisp and invoked during the searching or inference processing to accomplish specified tasks, such as gathering data from hardware sensors or initiating communication between particular nodes 115 of the controller 16. Further, according to the invention, the scheduler 218 (FIG. 10) and knowledge mechanisms 601 (FIG. 14) operate upon semantic networks 215(4) (FIG. 13). The semantic networks 215(4) contain the goals and the forward- and backward-chaining rules, some of which launch software demons, and which initiate Lisp inference procedures as stack frames managed by the scheduler and queues 218 (FIG. 10). The scheduler 218 is clocked, according to one version of the invention, at regular interrupt intervals to switch between inference procedures defined by the Lisp stack frames. The scheduler 218 implements object processes or inferences on a selected basis. During inferencing, specific instances of the particular welding process being conducted and particular parameter values of these selected instances are developed in response to the base materials being used, and subject to the particular constraints on the configuration of the equipment used and the specifics of the welding arrangement 13 in fact employed.

The rule interpreter 218(2,1), as suggested in FIG. 11, is one of the knowledge mechanisms 60' indicated in FIG. 9. This rule interpreter 218(2,1) matches the system goals in the semantic network 215(4) to particular sets of rules 215(2) (FIG. 8). The rules then trigger the establishment of new goals in the semantic network 215(4). When a value is needed which does not exist at a particular node, the communications network 150, as indicated in FIG. 9, including the knowledge layer 151, logical layer 152, and physical layer 153, arranges for transfer of the needed information to the node 15 which actually does need it. According to the invention, knowledge mechanisms 601 are thus paired up with corresponding knowledge bases 215, as suggested in FIG. 14.

The purpose of a knowledge mechanism 215 as shown in FIG. 14 attached to a particular knowledge base 215 is to examine the contents of its corresponding knowledge base 215 and to glean from it specific values and information necessary to the accomplishment of system goals and inferences, insofar as any relevant information exists in the particular knowledge base 215. Each knowledge mechanism 601 attached to a knowledge base 215 is further responsible for the processing of various predefined inference processes, and to return an answer resulting from inferencing back to the semantic network 215(4). When the originator of that system goal or task becomes scheduled for operation, it will accordingly note that its assigned work has been completed and that its request has been fulfilled. Frames 215(1) are used because they are particularly effective for the storage of static process knowledge relating specifically, for example, to the particulars of welding procedures. By their nature, frames 215(1) define these particulars as entity relationships which set forth and establish the processes and factors that bear upon the specifics of the welding process. Further, the frames 215(1) define a class structure as to the particular process to be performed, specifying inter alia the particular base welding materials 14 to be used, the particular current levels to be employed in a welding operation, the particular weld travel speeds to be developed during welding, as well as the history of the desired weld in terms of information that has been accumulated from previous welds. According to the invention, frames 215(1) are used for the storage of process knowledge like entities and relationships. Rules and rule sets 215(2) are employed effectively for control and decision making. Semantic nets or networks 215(4) function for matching goals to the previously determined schemes, rules, frames, and objects, and for maintaining the forward- and backward-chaining rules that implement software demons which execute Lisp processes. The semantic network, in effect, establishes a tree structured database of knowledge. The frames 215(1) have slots and values, thereby permitting the employment of tree searching mechanisms which are called inheritance mechanisms. Each frame 215(1) includes software demons which are invoked by the action of accessing particular slots in a frame knowledge base. Information can be inherited from the knowledge representations of superclasses. For example, the class structures established in the semantic network 215(4) can serve to enhance particular feature descriptions of the welding process. Welding operation requires, for example, that the weld current actually be on. This information may not be present on a particular welding frame knowledge representation scheme, but it is, nonetheless, available through the process of inheritance of information from a superclass. To accomplish one version of welding operation, one further needs to specify the particulars of the gas tungsten arc (GTA) process to be employed. Inheritance is made possible because any inference process which needs to determine certain particularities or details can access the GTA welding process definition and can acquire the facts needed, namely for example that, yes, the weld current has to be on in order to perform welding operations, and also, for example, that the shield gas must be turned on.

Rules 215(2), accordingly, become paired up with tasks to be performed and are effective to control these tasks during performance. The semantic networks 215(4) established in the knowledge base 215 are further effective for matching goals and tasks to other knowledge representation schemes present in the system. The semantic networks 215(4) provide the mechanism by which, as discussed, an event can be caused to happen simply by accessing or modifying a particular variable in the system. The semantic net 215(4) itself is essentially a tree structured data base containing simple premises for triggering forward- and backward-chaining operations. The rule syntax for semantic nets is independent of that used in the rule interpreter knowledge mechanism. However, it is the forward-chaining process which establishes use of the demon capability and enables software interrupt capabilities, according to the invention herein.

Further, at the interface to each knowledge base 215, there is a collection of functions employable primarily for searching. Also included at each data base interface is a procedure for accessing the semantic network 215(4). In addition, there are two primary software mechanisms associated with these tree structured semantic networks 215(4). The premise portion of the semantic network structure constitutes a tree structure. The branches in the semantic network 215(4), in fact, contain the actual goals and subgoals to be implemented during operation.

The input of a high level goal such as "welding" may, for example, be accomplished by user entry. If the user actually types in or enters an expression such as "start welding process" through a particular input/output device 117i (FIG. 8), this input expression is entered in the premise portion of the semantic net 215(4) (FIG. 13). This entry is effective to trigger a forward-chaining rule, which has been previously defined in the semantic network 215(4) for this purpose. This, in turn, triggers the scheduler 218 to invoke a rule interpreter 218(2,1) (FIG. 11) to examine the semantic network 215(4) for any related goals which it might be able to process. Simply stated, the assertion of a system goal onto the semantic network 215(4) can cause the scheduler 218 to direct the implementation of inference processing in proper portions of the overall knowledge representation scheme by means of forward-chaining demons. In this particular case, the appropriate action in response to the insertion of a system goal to start welding is to schedule the rule interpreter 218(2,1) for operation in the running queue 218(1) of the scheduler 218. This allows the rule interpreter 218(2,1) to take control and establish a data path between the semantic net 215(4) and the rule interpreter 218(2,1), enabling the rule interpreter 218(2,1) to accept the particular goal entered and to start work on it. Inserting a system goal onto the semantic network 215(4) automatically triggers the scheduling of appropriate software processes to achieve the goal desired. The semantic network 215(4) and mechanism 218(2,3) function as a system interpreter having data base access capabilities and, additionally, the ability to trigger selected process modifications, additions, or deletions. The notion of using a semantic net 215(4) to drive the scheduling of processes, according to the invention herein, is unique. Tying the scheduler to the semantic network establishes a unique scheme of data driven scheduling, according to the invention herein.

Object processes are maintained in operation on one of three queues, respectively, 218(1), 218(2), and 218(3) established in the scheduler 218. These queues include a suspended queue 281(3) for processes that are viable but not immediately operable. For example, if a process makes a particular request for information, that process is suspended until the answer is provided from some other node. There is, additionally, a running queue 218(1) maintained by the system process scheduler which handles only one process at a time because the Lisp processor can, of course, do no more than that. Once a particular running process has been accomplished, its processing terminates or is suspended and entered into the suspended queue 218(3). Each process is given a particular predetermined amount of time to operate on the running queue 218(1). Particular processes can finish or terminate during the assigned running period allocated. They can come to a point where they need to be suspended or they can continue running until the end of their allotted time, and, as such, since they still need to be worked on at some point, they are not suspended but are directed to the ready queue 218(2). Accordingly, the process can be returned later to the running 218(1) queue for continued, subsequent processing. Accordingly, a particular unfinished process either goes on to being performed or it is held suspended.

This arrangement of the invention is clearly data driven because if a goal is provided to the system, it need not be independently scheduled—it schedules itself automatically. Thus, a system goal is a data driven thing which will trigger its own scheduling.

In view of the established three queues in the scheduler 218, there are correspondingly three states in which an inference process can find itself. For example, it can find itself in the running queue 218(1), which is a queue that can handle only one inference at a time. It can find itself in a ready queue 218(2) of pending processes which are not quite complete but which have not been suspended. These processes are still being conducted and when their turn comes up to be performed in the running queue 218(1), they will be processed for an additional predetermined period of time, thus incrementally coming closer to ultimate completion. Additionally, as noted above, there is a suspended queue 218(3) which holds processes that are in a suspended state of operation. The key aspect of being on the suspended queue 218(3) is the ability to come out of suspension once the answer to the particular request for information has been returned. This waking up of a process is accomplished by a particular software demon embedded in the semantic network 215(4). The scheduler 218 itself directs the selection at each next running process, and particular processes can become the next running process because the scheduler 218 determines it is to be the next one to be scheduled, whether it is a currently pending process, or a process which has been suspended but now awakened with new information.

Figure 17:
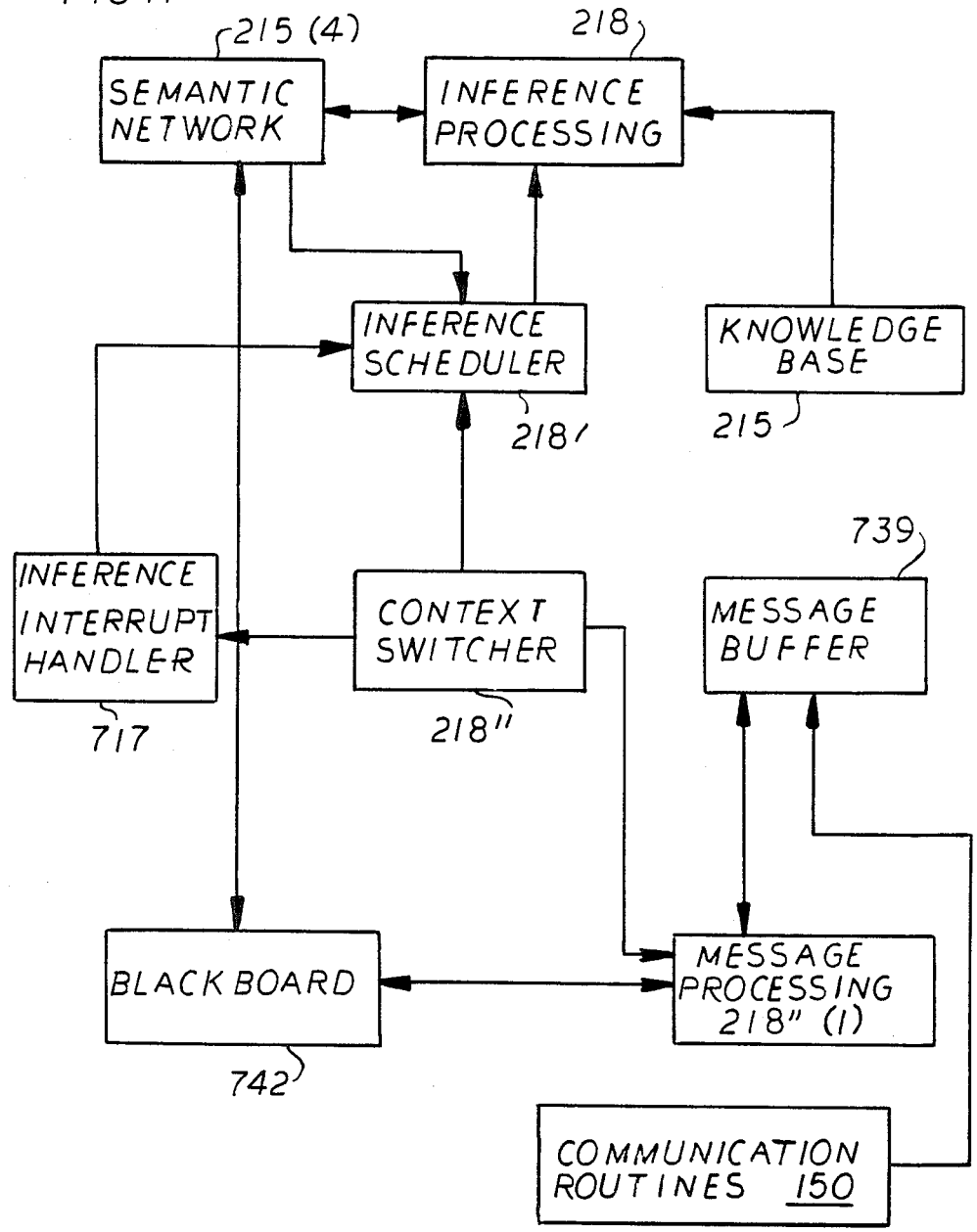
FIG. 17 illustrates overall operation of the controller, according to the invention herein.

Between each set of hardware nodes 115 there are a pair of communication ports 115p which require a communication schedule for each of the ports 115p. All the communication processes that are to take place need to be suitably scheduled according to a context switcher 218", as suggested in FIG. 17, which operates at a selected switching frequency in response to the control breakhandler 717 of the Lisp system. The context switcher 218", when activated, checks the semaphore 717' (FIG. 1a) by a call to interrupt 64H to determine whether to cause the inference scheduler 218 to promote the first inference process in the ready queue to the running queue or whether to initiate message processing, as has been explained.

According to the invention, in communicating messages at a low level through a number of ports 115p, both read and write messages need to be implemented for transmission. This need to schedule read and write messages requires the establishment of the context switcher 218". According to the invention, there is further established a queue 734, as suggested in FIG. 16, for maintaining the most important messages that have been received, such as those which generate inference interrupts through the control break handler 717, for example. Further, there is a need to schedule how often messages on this particular queue 734 will be handled for disposition. Accordingly, a control break interrupt, resulting from such a message, intervenes in the scheduled operation of the ready queue 218. The inference interrupt feature of such messages is typically utilized to insert new system goals at a particularly high level. An inference interrupt is indicated by a specific key in the message itself. When this key is noted, it forces the context switch 218" of the Lisp scheduler 218 to add the message directly to the running queue 219(1) for immediate processing. Other kinds of messages are generally blackboard read or write messages. These are regularly scheduled, without interruption. Inference interrupts are scheduled immediately upon receipt since they need to be performed quickly. These require lengthy processing and need to be scheduled much sooner than the particular software routine that is merely performing the reading of the messages. The system, accordingly, includes multiple reads to accommodate each port handling its own associated buffer mechanism. The port buffer 739 associated with each port 115p is large enough to permit scheduling. The invention, herein, thus permits suitable scheduling according to dynamic priority assignment techniques, as indicated.

The priority of a process can be based on a number of considerations, including the inherent priority of a particular process and how much data has been received by the port, and stored in the internal buffer which, for example, is represented as a level indicator. According to the invention, there is an intermediate level at which messages come in. When the full message arrives, the information received can be loaded into the queue 739' associated with that port, so there is a high level way to figure out what your current message level is. This is done by looking at an internal queue (not shown) which maintains messages. This limits the scheduling of processes to only the first three processes available. According to context switching, the overall current clock frequency is monitored and modifiable. In fact, the context switch 218″ can be held frozen, to stay at a particular context for a selected, extendable period of time. This enables the elimination of inappropriate processes which might happen with data transmission from one port subject to error, perhaps, as a result of a machine crash, for example. It, accordingly, makes little sense to complete the transmission. Thus, the first port 115p is abandoned completely and the particular process being performed is suspended indefinitely. On the other hand, it might be desirable to temporarily freeze such a process because a great deal of attention might need to be directed toward other processes. Thus, instead of subjecting it to suspension, the process could just be delayed in its implementation.

The process scheduler software shown in Appendix VII(A) performs multi-tasking on inference processes defined by frames, rules, semantic nets, and objects. Appendix VII(A) includes several functions which are invoked by the software interrupt in view of the clock tick scheduler established in the Pascal communication layer, which is invoked every eighteenth of a second. Appendix VII(A) particularly shows Pascal code communication routines that are used in the physical layer 152 (FIG. 19), including a message handler routine which prioritizes the existing messages defining inference processes to be scheduled, and selects the highest priority process for submission via the inference interrupt mechanism to the logical layer 152.

Communication processes are performed by Pascal and Lisp code, as suggested in Appendices VII(A) and VII(B). In order to invoke a Lisp process, a control break interrupt is generated in Pascal, which forces the Lisp control break handler to determine which process to run next. Among communication processes are read and write processes which can be performed with respect to the ports 115p. Each of these ports 115p is controlled and maintained by the Pascal queue management software, as indicated in Appendix VII(B). The general manager routine maintains a queue of messages and data relevant to those messages, and at selected times, the messages on that queue are "de-queued." Additionally, the memory addresses and lengths of the messages are separately transmitted by a different routine.

Communications can be conducted on the knowledge layer 151 (FIG. 9) which resides primarily on the semantic network in Lisp. The knowledge layer 151 is a set of inference rules that form a grammar to enable translation from a particular knowledge representation scheme to a general language. Processes communicate with each other in general language. The general language might, for example, call for the production of a particular value corresponding to an attribute in the frames' knowledge representation scheme. This general language representation is translated by the knowledge layer into a specific function which actually fetches the value from a particular slot in a frame 215(1) (FIG. 13). There is, accordingly, a specific language feature in each semantic network that corresponds to the general idea of fetching something which is implemented by a backward-chaining rule that triggers a software demon in the semantic network 215(4) (FIG. 13).

The knowledge layer 151 thus comprises a set of transformation procedures that perform the translation of a generic request for data from a particular knowledge base in terms of a specific syntax which calls out information from the particular knowledge mechanism. The knowledge mechanism 215 is a small entity means by which to access a knowledge representation. It is, for example, a query handler and a knowledge base maintainer. A query is simply a request for information containing variables which need to be matched to one or more elements in the knowledge base.

The semantic network 215(4) includes portions of the knowledge layer 151 used for the translation of specific requests into a form needed by the particular process to enable a response process which makes sense as a logical connection from one process to another. The semantic network 215(4) also handles the syntax of that interprocess communication. If it turns out that the process does not reside on a particular node or machine that needs to be communicated with, then the information is communicated through the logical layer 152 down through the physical layer 153 and out through a selected communications port. Accordingly, the semantic network 215(4) encompasses both portions of the knowledge layer 151 and the logical layer 152.

The semantic network 215(4) is a discrimination tree data structure which is composed of nodes and links between the nodes. Information can be stored at these nodes in the form of goals and rules, for example. When rules, goals, or similar mechanisms are entered into the discrimination tree, it becomes a semantic network. Inferencing is a search process for either a conclusion or for particular premises. In the case of inferencing a semantic network, the discrimination tree is searched or a value is entered into the discrimination tree. Appendix IV illustrates how the discrimination tree is implemented to create links and nodes. In particular, it sets forth the definition of a predicate calculus frame weld. A predicate calculus variable is a placeholder variable which may have a value, and it is used in a quantitative sense across a goal expression. For example, the statement, "For all "X", where "X" is a weld puddle, "X" is 0.6", is a statement of the kind used in a semantic network. All structures represented in the semantic network have quantified variables, with respect to which unification is performed. Unification is a way of resolving conflicts. If there is a desire to bind variable "X" to the numbers, "1, 2 and 3", for example, and another procedure seeks to bind "X" to the numbers, "1 and 2", both procedures aim to bind "X" to "1 and 2". This is an example of the notion of unification. Appendix IV further illustrates several basic access functions that index information, effectively putting it into the discrimination tree data base, or looking up information in the database and building the necessary links in the data base, if they don't already exist. The file name index list contains some additional utility functions which create and use databases. Unindex, for example, is a way to retract information from a database such as a discrimination tree.

Appendix IV further shows a file chain which illustrates how a software demon can be implemented according to the invention. During the search process through the discrimination tree, a node may be discovered that contains a Lisp program. If a Lisp program is encountered, then it is immediately evaluated since it is a software demon. The functions, "chain" and "add" in Appendix IV, are further examples of software demons implemented according to the invention herein. The unification algorithm, in particular, contains a recursive check according to which patterns are being matched. They may themselves have variables in them which would require a complicated procedure to fully resolve the findings. This procedure requires recursion. Appendix IV further shows a procedure to rename variables in the course of search. The basic search function shown may invoke backward-chaining if the information sought is not directly discovered. The search procedure chains backwards to find additional premises to support the particular conclusion indicated. Further, there is shown a system function which shows the database and prints it. Data structure is defined as self-maintaining objects. If one sends a command to an object or sends a request to the object, the object structure has mechanisms for evaluating the request or command. One example of an object is the welding power supply. It is treated, conceptionally, as an object which can receive messages. You can, for example, send the welding power supply a message such as "set the weld current to 10 amps". The power supply definition is part of the hierarchy of equipment in the factory. Accordingly, the message which goes out to the object welding power supply may inherit some procedures. Simply stated, objects have procedures and information. The object acts on that information and also informs other procedures that are related to this object. With regard to frames, information is requested from them or information is put into them in a static fashion. Of course, other frames may be accessed to inherit information but there are no inherent procedures to be actuated. A frame is a list plus the structure with attributes. According to the invention, there are from one to twenty frames to use.

The knowledge layer 151, on the other hand, is simply a language translator. The logical layer 152 is a location translator, and the physical layer 153 enables the actual translation from software to hardware and from machine to machine. Furthermore, the semantic network 215(4) is a structure which holds goals that need to be satisfied by information in knowledge base such as a frame, for example, frame 215(1). In different parts of the frame, there is information regarding different goals to be satisfied. Thus, the semantic network 215(4) communicates with the various knowledge representations.

The semantic network 215(4) further relates entities and attributes as a knowledge base. In particular, the semantic network 215(4) uses pointers to establish the relationship between entities and attributes.

The program, which actually accesses a particular knowledge base, is called the knowledge mechanism 601. This mechanism 601 transforms user queries into particular programs which are used to search a particular knowledge base for answers. In the course of searching the database, the semantic network triggers software demons just by virtue of accessing a particular attribute or value. A query is thus automatically converted into a search technique to go through the entire frame 215(1). If the search does not produce an answer to the particular question, another demon program is invoked to find, for example, particular bounds within which the answer must fall according to information in the particular database. Demons are typically attached to a slot in the structure of frame, but may also be triggered by rules in the semantic network 215(4). The knowledge layer 151 takes a simplified natural language and translates it into a small expression that initiates a search of a particular corresponding knowledge base.

Each node of controller 16 acquires the semantic network 215(4) at initialization. The controller 16 will then create inference processes from the rule 215(2) (FIG. 13) to implement the goals in the semantic network and places the processes into the scheduled queues. As goals are presented by the user to the network 215(4), each node of controller 16 acquires the portions of the overall knowledge base needed to perform the particular goals. The nodes 115 have no specific goals within them at start-up time. It is up to the user or some other program to provide the controller 16 with selected goals to achieve.

The semantic network 215(4) is, accordingly, just a framework driven by goals. The semantic network 215(4) insures that these goals are transferred to a node which can achieve them. The rules 215(2) themselves further have information which is not included in the semantic network 215(4), and the semantic networks 215(4) establish a virtual link between the rules 215(2) and all the other knowledge representations in the controller 16. The semantic network 215(4) thus enables semantic translations between different information representations.

Figure 16:
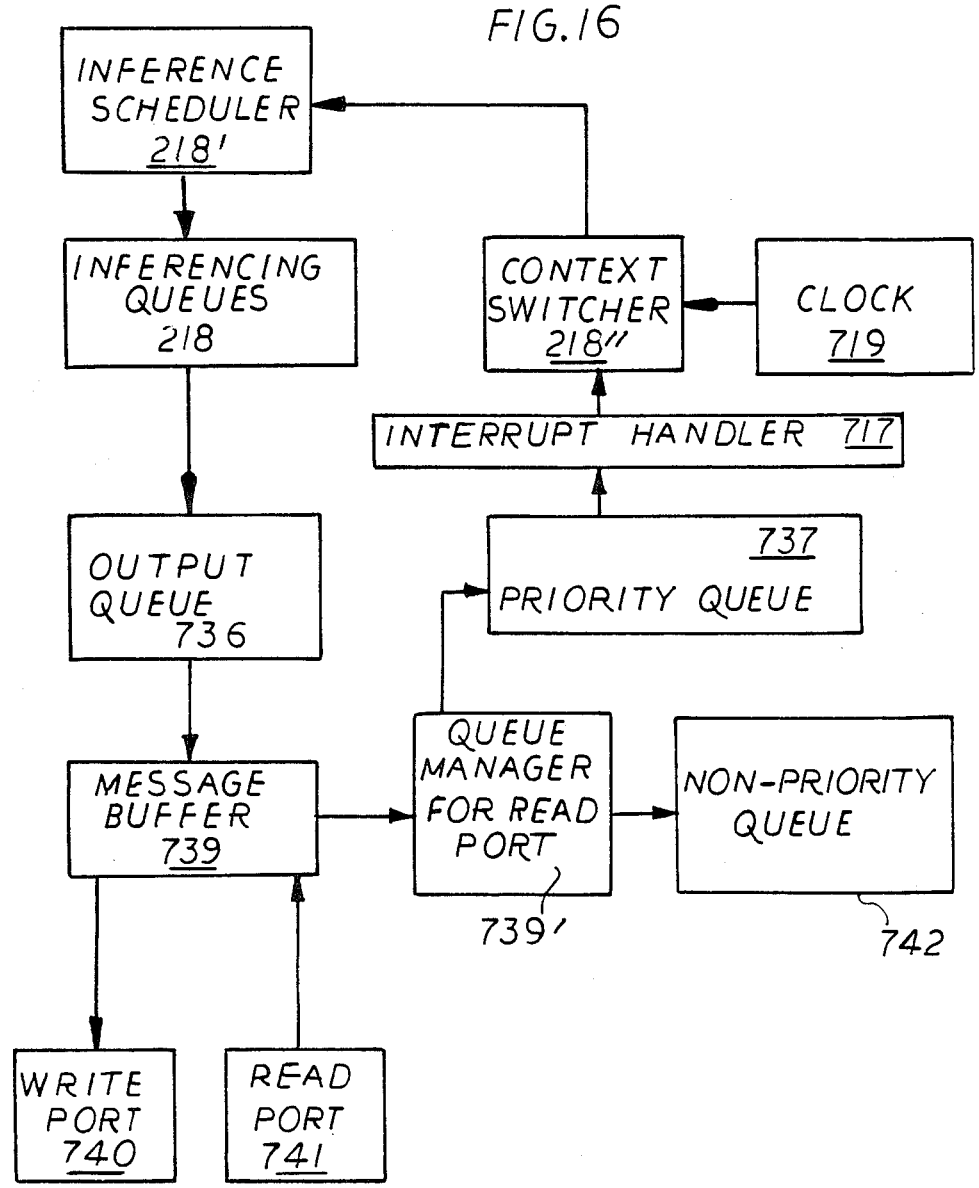
FIG. 16 illustrates the communications scheme of the invention.

Appendix VII(A) contains the communication routines which are part of the knowledge layer 151. These routines are independently loaded at each of the nodes 115 during initialization. The routines specifically include a control break procedure 718, which is scheduled as specifically indicated in Appendices VII(A) and VII(B), with a low-level Pascal clock service 719, as indicated in FIG. 16. This service 719 schedules particular hardware and software services for the input and output ports 115p, as well as perform context switching and servicing of the message queues. Control break is invoked by hardware interrupt (hex)IB every eighteenth of a second. Scheduling is otherwise performed based on priorities established in the ready process queue 218(2).

Appendix VII(A) further shows how non-critical messages arrive at the low-level blackboard 742, as indicated in FIG. 16, while "important" messages are scheduled in an important message queue 734 for reading at a suitable time. Reading is not implemented immediately because that would throw off system timing. Accordingly, messages are scheduled for reading into the ready queue 218(2) if there is a message to be read. In addition, the routines in Appendix VII(B) include procedures for writing with respect to particular ports. Write port 740, moreover, involves a procedure very similar to control break, in that both procedures turn output queue 736 on and off. Appendix VII(B) further discloses how the output queue 736 is filled with messages that are to be dispatched. Output queue 736 is filled by Lisp. The write port 740 monitors the output queue 736 and sends out the messages through its associated hardware as required. Output queue 736 itself has a variable level, and repeatedly picks up information and parcels out messages.

Appendix VII(B) shows the procedures for reading incoming images through a synchronous port buffer 739. Incoming messages are processible only if a busy flag (not shown) associated with the buffer 739 is "false". On the other hand, if the busy flag indicates "true", the routine blocks the entry of another routine. A typical message arrives header first, indicating its length and identification, and providing some error checking information. Next comes the text of the message itself.

To process a message, a high priority control break is asserted by context switcher 218''. Additionally shown are blackboard 742 writes and reads. A blackboard "read" simply de-queues the normal blackboard queue 742, as indicated. The write port routine selects a port for transmission and ascertains where the message is and how long it is. Thus, to invoke a write port 740, one must indicate which port is selected for transmission, the location and memory of the message to be sent, and the length of that message.

The blackboard 742 is a partial reflection of the semantic net. It is a subset of the semantic net reduced to Pascal, permitting information with another computer to be repeatedly and rapidly accessed in Pascal without having to go to Lisp. Accordingly, some information is simply reflected down into Pascal from the semantic network in order to avoid the lengthy process of transferring it directly from Lisp. The kind of information involved includes triplets, variables, attributes, and values. Triplets are three values in a set, namely value, name, and attribute. This is a technique for short-circuiting the control break message handler to access values in the machine without going through extra software layers. The blackboard 742 is essentially a status board, as indicated in FIG. 9.

Appendices VII(A) and VII(B), there is shown a queue manager 739' for the read port 741. This queue manager 739' holds both control and non-control break messages. Thus, there are two kinds of queues: control break 734 and non-control break 742. Further, a determination is additionally made whether it is safe to intervene without interrupting anything in operation. Every port on the machine is checked for operation. The output queue 736 is de-queued of any messages which are pending for dispatch and its contents are sent to the write port 740.

In introducing new knowledge into the knowledge base, a check is made to insure that the new knowledge does not conflict with other knowledge already in the knowledge base. Toward this end, a consistency checker, as set forth in Appendix V, isolates any knowledge which is redundant or which weakens the integrity of the knowledge base. Appendix V further shows the rule base 215(2) for the consistency checker. These rules check both redundancy and syntax, which is essentially the format of the information. The syntax of rule base 215(2) is particularly defined in rules 6, 7, and 8. These rules are called to determine precisely what the syntax of the incoming information actually is. The remainder of the rules perform actual logical consistency checking, including both simple and complex redundancy. A simple redundant rule, for example, involves the information that is repeated exactly. However, some forms of redundancy are more difficult to spot.

Figure 12:
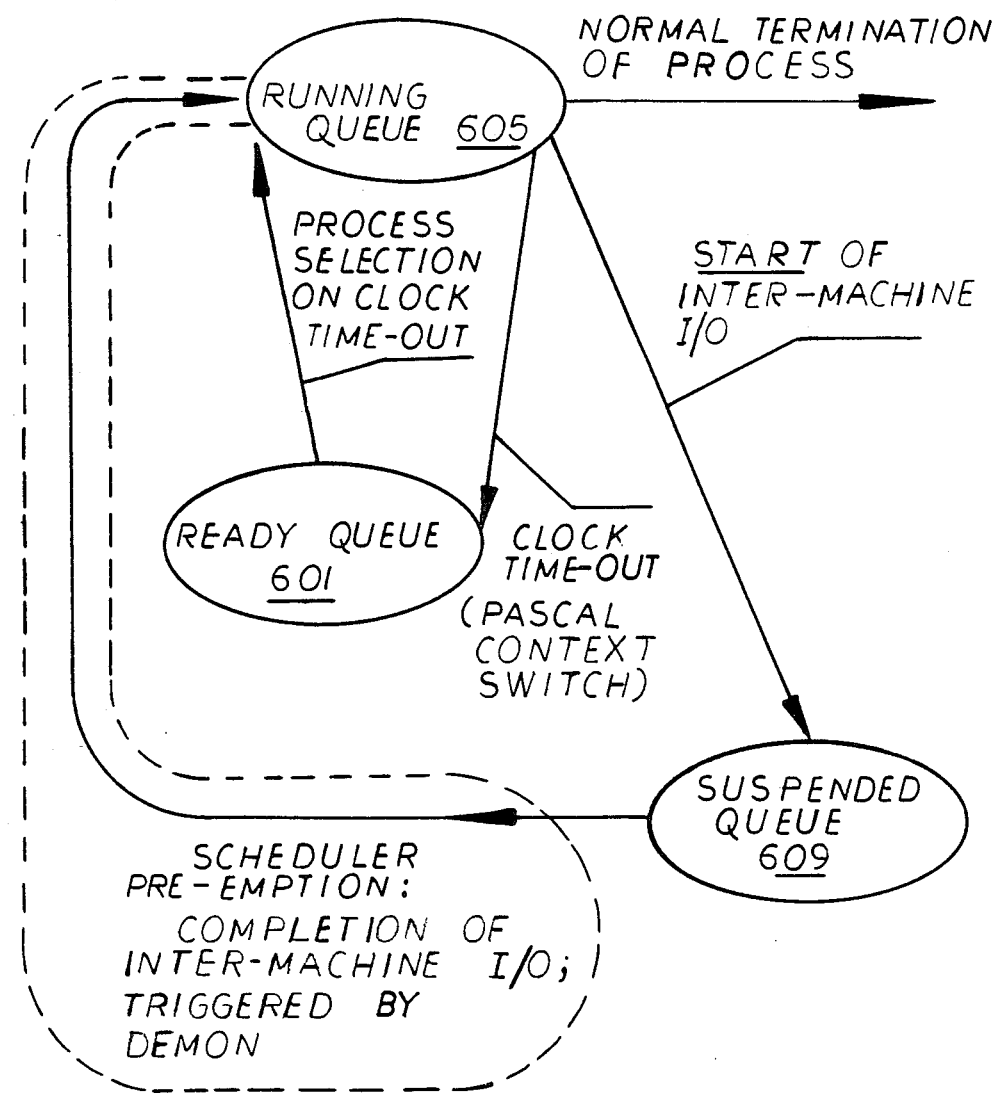
FIG. 12 is a flow chart of operation of the scheduler and arrangement, according to the invention herein.

Processes are placed on the suspended queue 218(3), as suggested in FIG. 12, for example, in order to enable the generation and transmission of a message to another node. The event which returns the suspended process to the ready queue 218(2) is the arrival of an answer to a requested message. This concept of ready, running, and suspended status for inferencing processes is unique as applied to the performance of distributed process control.

According to the communications scheme set forth in FIG. 15, a message is received according to block 940 at a particular port, such as port 115p, for example, and is stored at a low-level in a selected software mechanism, according to block 950, which forwards the information received without modification to the physical layer 153, as indicated at block 960. The physical layer 153 is a low-level message processing device which parses a message into its individual components and makes a preliminary determination as to its context, according to block 508. Establishing context means, as suggested at block 508, determining the type of message being received, the sender, and the origin of the message. It may also include a destination identifier which specifies the specific computer node 115 to receive the particular information.

Based on the context of the message, most information need not interrupt any higher level process. The logical layer 152 of the arrangement herein, in fact, maintains an organizational structure which insures that most processing is maintained at the lowest possible level. This layer 152 has enough context knowledge to understand whether a message received is related to a particular local blackboard 741, to another node, or to machine 115. Such a blackboard-type message simply maintains information locally at a local process blackboard 741 for reference as needed by other local processes. Blackboard messages, according to the invention, include read-type messages which find a particular value on the blackboard 741 answering a request for transmission back out to the originator of the message.

As already noted, the weld process begins with the acquisition of infrared data regarding weld puddle features and geometry. Another type of message is employed, which is interrupt driven and effects significant changes to the process currently in force or operation. Interrupt messages are, for example, employed to start a new process or to delete a scheduled process. Thus, a high level request is performed to implement the interrupt process. As suggested in FIG. 21, once IR information regarding weld puddle features has been attained, selected "C" algorithms 711, preferably written in "C" language, perform low-level processing of the sensory data to extract desired weld features. At the Lisp level, which is high-level and knowledge-based, these features are analyzed as suggested at block 709 to achieve a current model of the weld puddle in terms of a high-level formulation. This enables finding the maximum and minimum axis or width of the puddle.

A software process on one node or machine 115 can acquire information from another node or machine, by translation of a request for the information through the three layers of the communication link. In a frame system, to determine the value of a particular parameter, a predetermined function is performed which searches through the frame database for substantiation of that value. If no value for the particular parameter is found in any slot of the frame searched and the absence of value is recognized, a message indicative of that absence is returned.

The inference multiplexing or scheduler mechanism 218 operates three queues, as represented in FIG. 11.

These queues include first a running queue 218(1) which handles only a single process on the CPU at a particular time. Second, there is also a ready queue 218(2) which handles a plurality of processes ready for execution. Finally, there is a suspended queue 218(3) which holds processes which have been suspended. The ready queue 218(2) holds processes which have all the necessary resources to run immediately but are simply waiting for their slice of time to run. Processes can be transferred between queues by a context or process switcher, which acts as a scheduler 218 to perform transitions between the queues.

According to the invention, the ready queue 218(2) holds a number of processes including, but not limited to, the rule interpreter 218(2,1), the frames mechanism 218(2,2), the semantic network mechanism, and two types of message handlers, respectively 218(2,4) and 218(2,5). These processes are on the ready queue 218(21) at all times so that during successive time slices, successive ones of these processes come into play and portions of these processes are executed until they lose their allocated time slice. According to the invention, when a particular running process suddenly needs additional resources which it does not already have, it becomes suspended or blocked, and is transferred into the suspended queue 218(3). Processes on the suspended queue 218(3) wait for the occurrence of a specific event which enables the process to return to the ready queue 218(2) for multiplexing onto the running queue 218(1) in its regularly allocated turn, as suggested in FIG. 12. As shown in Appendices VII(A) and VII(B), which contains the software for queue handling, a queue is a data structure having a list and a position indicator for the beginning and end of that list. In particular, Appendix VII(A) shows the software establishing the data structure of the ready queue, the running queue, and the suspended queue. An object is a portion of the knowledge base which contains an abstraction of knowledge.

The rule set 215(2) includes, according to a preferred revision of the invention, a statement initially setting certain variables to "nil". This is accomplished by the Lisp expression:

(GLOBALS((DT.NIL)(DELTA-I.NIL)
 (DELTA-S.NIL))).

Simply stated, this establishes that the time change DT is initially zero, that the weld current change DELTA-I is initially zero, and that the speed change DELTA-S is initially zero. Further, certain tasks are defined by the expression:

(TASKS((PUDDLE WIDTH
 CONTROL(STATIC ROBOT)(STATIC
 POWER-SUPPLY)))).

In other words, it is the goal of a specific task or inference process to control puddle width for a selected robot and power supply. The expression, "static robot", is a variable expression which holds the name of the robot device on which the weld process is being performed.

Additionally, to set the "FL" mode of operation, a mode selection expression SELMODE FL is employed. Further, CSET is initialized at nil value. Beyond this, a prerequisite is established according to the statement:

(PREREQUISITE (AND (NULL CONSTANT'
 WELD-ABORTED)))).

Additionally, entry is set in accordance with the statement:

(ENTRY(PROGN; (UPDATE-PARAMETERS
 REMOVED SO DATA DRIVEN
 (:=(GLOBAL DT)(W-TIME-DERIV
 (PARAMETER 'WIDTH'GET'ALL))))).

Finally, inputs are defined as parameters width, current, speed, and shield gas temperature.

As suggested in Appendix IX, a first rule of the rule set 215(2), employed according to a preferred version of the invention, evaluates whether the shield gas temperature is greater than the dew point temperature. More particularly, Appendices III and IX are codes for the expert knowledge representation scheme including the rule interpreter of the expert systems of the invention herein. More particularly, the first rule examines the current value of the shield gas dew point temperature and compares it to a minimum acceptable dew point temperature. In case the shielding gas dew point temperature is greater than this minimum acceptable value, the welding process aborts. More particularly, the inference process interpreting the first rule is aborted, and a new "above dew point" process is initiated. This new process shuts off the welder. The second rule evaluates whether the parameter puddle width is less than the constant WMINP, i.e. minimum puddle width. If this condition is met, the too small puddle routine is called. The second rule, accordingly, compares the current value of the puddle width to minimum and maximum permissible puddle widths. Further, the current is compared to a predetermined minimum and, in case it is too small, the inference process implementing the rule is aborted and a new process called "too small puddle" is initiated. According to the third rule, the current puddle width is compared to a maximum permissible value, and in case the puddle is too wide, a process named "too wide puddle" is invoked. More particularly, the third rule evaluates whether the parameter puddle width is greater than the constant WMAXP, i.e., the minimum puddle width. If so, "too wide puddle" is called. The fourth rule compares the actual value of weld current to a predetermined desired current level and further compares measured puddle width with a predetermined puddle width constant. Further, the trend of the change in puddle width is observed. Simply stated, the previous value and current values of puddle width are compared with a maximum difference value to indicate the rate of change in puddle width. Further, the current value of the weld current is compared to a desired change that we wish to make in the current and, if there is a particular difference level, the weld current is modified by this value "di". According to the fifth rule, the weld current is compared to a predetermined constant current set point Further, the puddle width is compared with a predetermined puddle width constant, indicative of the maximum acceptable puddle width. Finally, the welder speed change is compared to a maximum speed change constant. If the weld current is less than 95% of a predetermined maximum current level, the puddle width is greater than the maximum allowed puddle width within a particular tolerance zone or, if the speed change is greater than a predetermined maximum speed change, then a predetermined inference process is initiated which attempts to change the speed of the robot by a predetermined value "ds" and also to change the weld power supply current by a predetermined value "di". The control system monitors weld speed and current directly in order to maintain a constant puddle width. According to the ninth rule, weld speed is controlled as indicated. The tenth and eleventh rules, respectively, mirror the eighth and ninth. Accordingly, by conducting a suitable trend analysis, an intelligent determination is made as to how much to change the weld speed or current by using knowledge of the trend of the puddle growth. Further, the sixteenth and seventeenth rules perform a comparison of the minimum controllable puddle width trend with respect to the existing puddle width. In particular, the trend of the last value is compared to the trend of the derivative of the puddle width change and the result is compared to an established constant called D-High, which relates to the greatest rate at which the puddle width can change. Based on these comparisons, a change is made in the weld speed. Further rules, as suggested in the Appendix, evaluate whether the weld current is below 0.95 of a constant "IQ" and whether puddle width is below constant WMAXC. If so, the routine "too low current" is invoked. Further, if the weld current is less than 0.95 of "IQ" and width is greater than WMAXC, and global delta-S is defined as delta-S high, then changes in weld speed current are invoked. If the weld current is greater than 1.05 of "IQ", and puddle width is greater than WMINC, then the process "too high current" is invoked.

During inferencing operation the rules indicated above are scanned from beginning to end to determine whether the antecedents of any of the rules are satisfied. If the antecedent of a rule is satisfied, its consequence is triggered and the search for a next rule to trigger continues.

The welder arrangement 13, according to the invention, herein further employs a process controller 16 operating according to an Advisable Process Control Language (APCL), as set forth syntactically in Appendix X, and which is an adaptation of Lisp.

Appendix IX is an extended formal definition of the entire process controller architecture. It shows, recursively, the underlying idea of the process controller 16, including advisors 115ad linked to other advisors 115ad and eventually linked to an expert controller, which in turn is linked to actors 115a which are connected to sensors 116 and/or controllers. Further, the expert controller 115e may be directly connected to sensors 116 and/or to custom interfaces, such as, for example, auxiliary controller 115. "XADVAC" is defined as an expert controller combined with any number of advisors or actors. An expert controller, moreover, is an advisor combined with a physical layer. An advisor 115ad multiple inference expert system has a knowledge layer 124, a logical layer 129, a physical layer 130, and may have actor component custom features, such as an interface to a sensor.

An actor 115a includes an application layer of programs written specifically to interface to a sensor 116, controllable device 117, or actuator. The actuators must also contain knowledge, logical, and physical layers, respectively 124, 129 and 130, so that they can be components of the entire control structure 16. An application layer is a program combined with some application specific knowledge, such as an image processing information, for example. A physical layer 130 is a program with specific knowledge of how to transmit messages according to a particular message protocol. A logical layer 129 is a program which also contains logical destination knowledge. A knowledge layer 124 is a program layer containing a translation scheme between knowledge representation schemes. A program is obviously a connected series of statements to solve a problem. The total of all programming languages in our system is "APCL", "C", "Pascal" or "Fortran" and assembly language.

The process controller 16 can be formally defined in a symbolic fashion in terms of its components. According to this syntax, the process controller 16 for directing welding operation can be defined to include an expert controller and zero or more occurrences of advisor or actor elements, respectively 115ad ad 115a. Further, each expert controller 115e can be defined as the combination of an advisor 115ad and a physical layer. Additionally, the advisor 115ad itself can be defined as a multi-inferencing expert (MIX) system together with a knowledge layer 124, a logical layer 129, a physical layer 130, and zero or more occurrences of an actor 115a. An actor 115a, in turn, is defined as an application layer together with a knowledge layer 129, a logical layer 129, and a physical layer 130. Further, the application layer is defined as a layer together with application specific knowledge. Similarly, the physical layer 130 is defined as a layer together with data transmission specific knowledge. A logical layer 129 is defined as a layer together with a logical destination knowledge. A knowledge layer is defined as a layer together with a knowledge translator. Additionally, a layer is defined as a program together with a programming language. A program, in turn, is defined as a connected series of statements to solve a problem. A programming language, in turn, is defined as either the advisable programming control language (APCL), "C", Pascal, the assembler or the like.

The advisable process control language (APCL) can be defined in terms of a formal grammar. For example, a rule set in the advisable process control language is defined as a rule set label and zero or more occurrences of a static declaration, global declaration, local declaration, task expressions, inputs, mask expressions, prerequisites, or conflict set together with a selection mode and zero or more occurrences of rules. A rule set label is an identifier. A static declaration is the word "static" with zero or more occurrences of variable declarations. A global declaration is the word "global" with zero or more viable declarations. A local declaration is the word "locals" with zero or more instances of a rule label with variable declarations. A selection mode is the word "Selmode" with a key word such as "FL", "FD", or "TARD", for example. A prerequisite is the word "Prerequisite" with a Boolean expression. A task expression is the word "task" with zero or more Lisp expressions. A rule itself is a rule label with an "if" expression with zero or more occurrences of "Then" expressions. A rule label is an identifier. If and Then expressions are Boolean expressions.

A variable declaration is an identifier with zero or more occurrences of an initial value. Additionally, Appendix I is the software code for automatically loading files at power-up in order of loading; Appendix II contains the software code for the utility Lisp functions; Appendix III contains the software code for the frame knowledge representation system, according to the invention herein; Appendix IV is the software code for the semantic net knowledge representation system; Appendix V is the code for the expert knowledge representation scheme including the rule interpreter of the expert systems of the invention herein; Appendix VI shows the software code for consistency checking, as discussed above; Appendix VII(A) is the Lisp/Pascal communication and process scheduler software interface; Appendix VII(B) is the Pascal communication and scheduling interface for serial ports, hardware clock, and Lisp; Appendix VIII is the "C" image processing code including the algorithm for resistance weldbox size, according to the invention herein; Appendix IX shows the example knowledge basis for frames, the expert system, and the consistency checker; Appendix X shows the extended Backus-Naur formal definition of expert advisable adaptive controller, according to the invention herein; and Appendix XI is the index to the Appendices.

Figure 20:
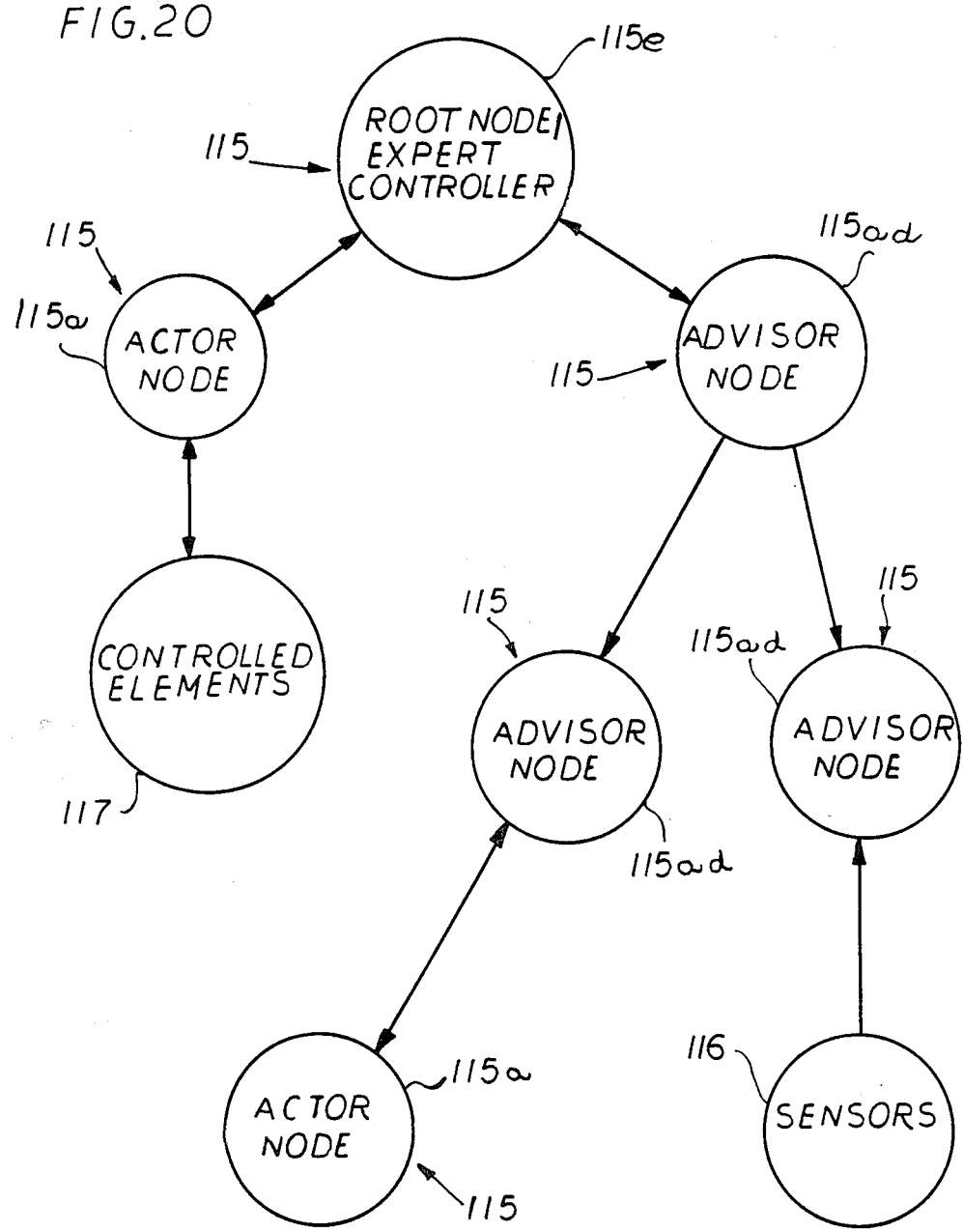
FIG. 20 is a schematic illustration of the control arrangement which emphasizes the multi-node approach, according to the invention herein.

Finally, FIG. 20 shows the multi-nodal controller 16, according to the invention herein. This controller 16 is effectively both data-driven by information received in real time from sensors 116 and/or controlled elements 177, and goal driven by goals entered in the semantic networks 215(4) of the various nodes 115 of the controller 16. Several nodes 115 may reside on a single machine. The knowledge bases 215 including rule 215(2) are transparently distributed throughout the various nodes 115. Thus, inferencing processes conducted by the controller 16 are effectively multi-tasked at many levels. For example, inferencing can be conducted at the level of the root node or expert controller 115e at any of the various levels of particular actor nodes 115a, which are connected either directly to root node 115e or through advisor node 115ad thereto. Further, inferencing can be conducted at any of the advisor nodes 115ad indicated, irrespective of level.

By way of additional detail, the invention herein includes real time welding of adjacent materials with a weld puddle formed between the materials by bringing the welding apparatus into position to form the weld puddle at the interface of the adjacent materials, thermographically scanning the weld puddle and its adjacent heat affected zone, and producing image signals representative of a thermographic image of the weld, transferring the thermographic puddle image signals for comparison with reference puddle images to evaluate variations, and adjusting the welding apparatus to change the weld puddle because of deviations noted between the detected and reference puddle images. The process includes adjusting the electrical power and position of the welding apparatus torch. It further includes determining whether adjustment of torch current will modify puddle the shape to a predetermined range, and adjusting the torch travel speed when adjusting the current is not sufficient. The process includes determining whether a predetermined amperage change, such as ten percent or less, will adjust the width of the puddle to within a predetermined puddle range and, if not, then determining the speed adjustment necessary for the torch to change the width of the puddle sufficiently to cause it to fall within the predetermined range, and then changing the speed of torch travel accordingly. The procedure includes storing process and procedure variables in real time for later analysis of welds made at a later point in time. The process further includes inspecting the weld puddle for defects in real time. The process further includes adjusting voltage or amperage, lateral adjustments of welding torch position, speed of torch travel, and angular adjustment to a track angle. The procedure further includes taking isotherm line scans of the weld puddle and relating the isotherms in real time to weld size measurements. The procedure includes real time analysis of isotherm scans of weld size as a fraction of weld current and tensile shear versus weld current. The procedure further includes real time determination of width and depth of the weld puddle fusion zone. The procedure further includes determining shield gas temperature in the torch and aborting welding operation when the gas temperature is too high. The process further includes analyzing the forward tip of the image of the weld puddle for projections indicating deviation of weld path from seam or interface direction and adjusting the path of the tip to more closely track the weld seam.

The invention herein is further directed toward extracting data indicative of irregularities from the image signals, including the width of the weld puddle as, for example, measured perpendicular to the path of travel through the center of brightness of the puddle to points on the puddle perimeter of lower brightness than the brightness at the center of brightness. The data extracted includes the rate of heat flow out of the puddle as, for example, measured by determining the rate of change in puddle brightness at points on the puddle perimeter, particularly the maximum rate of change. The data further includes the rate of heat flow out of the puddle determined by taking the reciprocal of the distance between two points at predetermined, respective higher and lower brightness levels located on either side of the puddle perimeter. The data extracted further includes the rate of change in puddle brightness at its perimeter at a point defined by the perimeter and a line perpendicular to the direction of travel passing through the center of brightness. The data includes the number of times the actual puddle perimeter crosses over a theoretical smooth puddle perimeter within a given zone, the zone, for example, enclosing the leading edge of the puddle, and specifically, for example, enclosing a portion of the puddle perimeter to the left or right of the puddle center. The data, for example, includes measurements of the area of the puddle within a zone overlapping its perimeter, and, for example, measuring the length of the puddle perimeter. The data may further include measurement of the length of the puddle perimeter within a zone that overlaps its perimeter.

Process Control Example Turning Off The Welder If The Puddle Width is Improper The above description of the invention, taken together with the detailed listings set forth in the appendices, sets forth the structure of the invention. The inventive concepts which underlie the realization of a real time, multitasking, distributed process control system using artificial intelligence techniques, can be illustrated by presenting the following over-simplified example of how the invention can be used to implement one simple process-control function. In actual use, the invention would usually be used to implement far more complex functions than the simple one described below. However, a simple example, howsoever over-simplified, will illustrate how real time control of a process can be realized in practice, and the system design principles illustrated may be readily extended to far more complex systems containing many rule sets that define highly elaborate process control strategies.

Our task is a simple one: start the welding process, and then shut it down if the puddle width becomes too large or too small. The machine configuration is in accordance with FIGS. 8 and 19, both of which reveal a detector 17 and radiometer 15 feeding infrared visual signals into an image analyzer 16(1) programmed in "C" and in Pascal. The "C" programs in the analyzer 16(1) compute the weld puddle width, in the manner explained elsewhere, and present this width on a blackboard 742 from which it may be retrieved by the Pascal physical layer 153 within the image analyzer 16(1) (see these elements within the advisor 115 in FIG. 19). The image analyzer 16(1) is serially connected to an image processing advisor 115i, and the advisor 115 is serially connected to a controller actor 115a (FIG. 19). For simplicity, we leave out of this example the expert controller 115e, since our control action (starting or stopping the welding process) is fairly trivial. The controller actor 115a contains programs written in "C" and callable from Lisp that can start and stop the welding power supply and robot, initialize the image scanning equipment, and in general, run the real time process under the control of Lisp in the controller actor 115a.

First constants and parameters used in the image analysis system must be defined. For this purpose, a frame named GTA1 (for "Gas Tungsten Arc 1") is created. This frame might define, in general, such things as the desired welding current and speed, the optimum puddle width, the maximum and minimus puddle width, and it might also define a "deadband" about the optimum puddle width—if the actual width falls within the "deadband" width, then the width is assumed to be acceptable. For example:

| GTA1 | (frame name) |
|---|---|
| IQ 272 | (desired weld current) |
| SPEED 21.0 | (desired weld speed) |
| PWA 5.2 | (desired puddle width in millimeters) |
| WMINP 4.0 | (minimum allowable puddle width) |
| WMAXP 6.0 | (maximum allowable puddle width) |
| WMINC 5.0 | (deadband minimum width) |
| WMAXC 5.5 | (deadband maximum width) | of these, only the minimum and maximum allowable puddle widths will be used in this simplified example. This frame, stored in the logical layer of any one node 115, would automatically be made available to the adjacent nodes 115 by the physical layer 153, which would route any requests from the logical layer 152 towards the machine that contained this frame in the preferred embodiment, each node 115 is an AT-class processor, and such data can only be retrieved from an adjoining node; but a more general implementation of the invention could have plural nodes share a single processor and could permit a node to retrieve data from a nonadjoining node. The physical layers 153 automatically advise each other of what information they may access, so any given physical layer 153 knows which way (that is, over which of the two possible serial ports) to route any request for information. Accordingly, the logical layer 152 does not have to know where any given piece of information resides. However, a frame containing constant data might be duplicated within the logical layers 152 of several nodes to avoid the necessity of Lisp-to-Lisp communication.

Next, the parameters of the process, such as puddle-width, current, and speed, are defined as system parameters in the semantic network, and also into the consistency checker list of variables, so that their use in newly-entered rules will be permitted by the consistency checking code within the logical layers. These are entered into the blackboard, and their existence is again propagated by the physical layer 153 to adjacent machines.

Next, any software demons that need to reside in frames are created and entered. For example, if the puddle width were a frame value, the frame would contain a software demon (a Lisp procedure) that would fetch the value of the puddle width from the physical layer whenever it is required. But in our example, only static variables are contained in the frames, and puddle width is an entity in the semantic network that is permissable and may or may not be defined.

The forward- and backward-chaining rules now need to be entered into the semantic network. We need a backward-chaining rule to find the puddle width, whenever it is undefined:

```
((puddle-width
    ?X)(Lisp(-routine-for-puddle-width)))
```

Finally, the rule set that governs system initialization is defined:

```
(ruleset #4
    (tasks ((initiate image processor)))
    (rules
        (1 t
            (lisp (call init-image-processor)))))
```

When the inference task name "initiate image processor" arises, this single rule always executes (since it is defined to be "t" or "true"), and it calls upon Lisp to execute the named subroutine or program, which is written in "C".

Next, the image processing advisor needs to be set up. We duplicate the frame GTA-1 here, since the frame contains constant data. Then we create three rule sets:

```
(ruleset #6
    (tasks ((startup)))
    (rules
        (1 t
            (perform initialize image processor)
            (perform initialize equipment)
            (perform start welding process))
        (2 t
            (abort shutdown system))))
```

This rule defines the actions to be taken in response to the "startup" goal. Both rules are executed unconditionally once. The first rule performs the functions indicated, while the second rule un-schedules and terminates the "shutdown system" inference task, if it is active.

```
(ruleset #1
    (tasks ((start welding process)))
    (entry (parameter 'puddle-width))
    (Selmode FL)
    (rules
        (1 ( OR ( (parameter 'puddle-width) (constant 'WMAXP))
              ( (parameter 'puddle-width) (constant 'WMINP)))
            (abort shutdown system))))
```

This rule is executed repeatedly, aborting only when the "abort" command is executed, after which it initiates the "shutdown system" task. This happens when the variable parameter "puddle-width" is above WMAXP, the maximum width, or below WMINP, the parameter minimum width.

```
(ruleset #2
    (tasks ((start welding process))
    (rules
        (1 t
            (net-message
                "shutdown Power supply")
            (net-message shutdown Robot"))))
```

When the system is to be shut down, this ruleset initiates the transmission of messages to shut down the robot and power supply.

Next, demons need to be added to the semantic network of the expert controller 115e:

```
((initialize ?X)(Lisp(net-message ?X))
```

This first forward-chaining demon translates any command to "initialize" something into a Lisp command to send a message "something" over the network.

```
((start ?X)(Lisp(preempt-expert-system ?X)))
```

This forward chaining demon converts a command to "start" something (assumedly an inference process) into a Lisp procedure that causes the named task to be executed immediately, preempting any other scheduled task that may be running.

```
((parameter 'puddle-width)(Lisp(find
    'puddle-width)))
```

This backward-chaining rule in the semantic network initiates a search for the "puddle width" parameter, using the "find" procedure set forth below:

```
(defun find (query)
    (let ((id(make-mss-id)))
        (add (wakeup-demon id))
        (place-msg-list
            '(place-msg (find ,query ,machine-id ,id)))
        (suspend-this-process)
        (retrieve query)))
```

This transforms any "find (query)" request into a message sent onto the physical layer seeking the query value, and then the inference task is suspended ("suspend-this-query") until a reply is received. The message contains a unique id code. The message, itself, is a request that the node receiving the message send back a return message containing the query and the id code. This rule also creates a "wake up demon" having the id code that will unsuspend the inference task when the message returns with the query. When unsuspended, the inference task executes the "retrieve query" function.

To initiate the process control task, one simply provides the goal "start welding process" to the expert controller.

The process controller actor 115a, in general, contains frames defining the process control parameters and demons defining actions to be taken relating to these parameters. A simple frame relating symbols to actions that must be taken when those symbols appear suffices for many control actions. Alternatively, rule bases may be provided to define actions. In this example, two rule bases are provided:

```
(ruleset7
    (tasks ((shutdown system)))
    (rules
        (1 t
            (net-message
                (constant 'Robot-1 'shutdown-command)1)
            (net-message
                (constant 'Power-Supply-1
                    'shutdown-command)2)))))
```

This ruleset defines messages that are translated by a frame into specific commands:

```
Equipment
    Robot-1
        (shutdown-command "halt")
    Power Supply-1
        (shutdown-command "off")
```

So the command sent to port 1 is "halt" and that sent to port 2 is "off". That completes the establishment of the process.

According to the invention, spot welding can be accomplished by shutting-off weld current when the size of the puddle reaches a predetermined limit.

The information above is directed only toward representative ways of carrying out the invention herein, according to the best mode. The invention itself, however, is broader in scope, as suggested in the claims which follow.

Appendix I

```
REM             AUTOEXEC.BAT FILE AUTOMATICALLY EXECUTED BY DOS AT POWERUP....
REM
REM             AUTOLOAD IN PROGRESS.........AUTOLOAD IN PROGRESS.............
PROMPT $P$G

LCOM
REM             LOW LEVEL (BLAISE COMPUTING) PORT HANDLERS ARE NOW LOADED.
REM             HIGHER LEVEL COMMUNICATION ROUTINES LOADED BY LISP BELOW......

CD GCLISP2
REM             CURRENT DIRECTORY IS GCLISP2.

REM
REM             STARTING UP LISP ENVIRONMENT. IT WILL CONTINUE THE LOADING VIA
REM             THE USERINIT.LSP FILE WHICH IS AUTOMATICALLY LOADED BY LISP...
GCLISPLM
```

```
REM         AUTOEXEC.BAT FILE AUTOMATICALLY EXECUTED BY DOS AT POWERUP....
REM
REM         AUTOLOAD IN PROGRESS.........AUTOLOAD IN PROGRESS.............
PROMPT $p$g

LCOM
REM         LOW LEVEL (BLAISE COMPUTING) PORT HANDLERS ARE NOW LOADED.
REM         HIGHER LEVEL COMMUNICATION ROUTINES LOADED BY C PGM BELOW.....

IMAGE
REM         STARTING UP IMAGE PROCESSOR. IT WILL CONTINUE THE LOADING OF
REM         THE PASCAL HIGH LEVEL COMMUNICATIONS ROUTINES VIA DOS CALLS...

;; USERINIT.LSP   Automatically read in by Lisp at startup to:
;;
;;      1. Load Lisp source code
;;      2. Execute external DOS program to load and start low level
;;         clock tick scheduler and communication programs.

(SETQ SYS::*GC-LIGHT-P* T)       ; A couple of environment switches get set...
(sys::8087-fpp :emulate)

(format t "~&Loading Source all source code necessary to process controller.")

(cd "lib\\funs")         ; Utility functions
(load "funs.lod")

(cd "..")
(cd "frames")            ; Frames knowledge representation system
(load "frames.lod")

(cd "..")
(cd "semnet")            ; Semantic net knowledge representation system
(load "semnet.lod")

(cd "..")
(cd "expert")            ; Expert knowledge representation system
(load "expert.lod")

(cd "c:\\gclisp2\\cns")
(load "cns.lod")         ; Knowledge base consistancy checker (cd "c:\\gclisp2\\comm")
(load "comm.lod")        ; Communication and scheduling functions
(cd "c:\\")

(format t "~&Finished loading all source necessary to process controller.
~%~&Starting up Memory Resident Clock Tick Scheduler and Comm. Routines.")

(sys:dos "clksched")     ; Mem. Resident Clock Tick Scheduler and Communicatio (format t "~&Now Online and Ready for Process Control...")

(cd "control")
(format t "~&Current directory is ~A" (directory-namestring (cd)))
```

Appendix II

```
;; FUNS.LOD   LOAD IN MANY USEFUL FUNCTIONS TO SERVE OTHER PACKAGES.

(LOAD "c:\\gclisp2\\lib\\funs\\MAPFUNS")
(LOAD "c:\\gclisp2\\lib\\funs\\FOR")
(LOAD "c:\\gclisp2\\lib\\funs\\PLIST")
(LOAD "c:\\gclisp2\\lib\\funs\\SETS")
(LOAD "c:\\gclisp2\\lib\\funs\\PRINT")
(LOAD "c:\\gclisp2\\lib\\funs\\SORT")
(LOAD "c:\\gclisp2\\lib\\funs\\STEPLOAD")
(LOAD "C:\\GCLISP2\\LIB\\FUNS\\STRINGS")
(LOAD "C:\\GCLISP2\\LIB\\FUNS\\QUEUES")
(LOAD "C:\\GCLISP2\\LIB\\FUNS\\MATCH")
```

```
;; MAPFUNS.LSP     VARIOUS MAPPING FUNCTIONS THAT GCLISP DOES NOT PROVIDE
;;-------------------------------------------------------------------------
;;
;; MAPCAR IN GCLISP IS FINE.
;;(dmclob mapcar (x)
;;   (list 'fapply (cadr x) 'list (caddr x)) )

;;!(mapc fun lis) applies fun to each element of lis and returns nil.
;; MAPC IN GCLISP IS FINE.
;;(dmclob mapc (x)
;;    (list 'fapply (cadr x) nilfn (caddr x)) )

;;!(mapcan FUN LIS)   applies the function  FUN  to each element of the list
;; (where  fun  is assumed to return a list) and returns a new list obtained
;; by nconc'ing the results together.  (CRM, pp.62,306).  (Unlike theirs, this
;; version accepts only one list.

(DEFUN MAPPEND (FUN LIS)
    (APPLY #'APPEND (MAPCAR FUN LIS)) )

; INVENTED TO SATISFY A MAPPING NEED, AND IN GENERAL GIVE GCLISP SOMETHING
; BADLY NEEDED. NOT THE SAME AS COMMONLISP MAP, SO CALLED MAPSTEP.

(DEFUN MAPSTEP (FUNC STEPFUN EXPR)
   (DO (RESTOF)
       ((NULL EXPR) (REVERSE RESTOF))
      (SETQ RESTOF (CONS (FUNCALL FUNC (CAR EXPR)) RESTOF))
      (SETQ EXPR (FUNCALL STEPFUN EXPR))))

(DEFUN PAIR-UP (L)
   (COND ((NULL L) NIL)
         ((NULL (CDR L))
          (PRINT "ERROR: ODD # OF ELTS IN PAIR-UP"))
         (T (CONS (LIST (CAR L)(CADR L))
                  (PAIR-UP (CDDR L))))))

;;!(subset FUN LIS)   applies the function  FUN  to each element of the list
;;  LIS  and returns a list of all the elements of  LIS  for which  FUN
;; returns a non-nil value.  For example:
;;       (subset '(lambda (x) (greaterp x 0)) '(-1 1 0 2))
;; returns   (1 2) .Any duplicate elements in the list wil be retained, if they
;; are in the subset.

(DEFUN SUBSET (FUN LIS)
    (LET (RESULT)
       (DOLIST (ELT LIS RESULT)
           (WHEN (FUNCALL FUN ELT) (SETQ RESULT (CONS ELT RESULT))) ) ) )

;;
;; ****************************************************************************
;;
;;!(some FUN LIS)   applies FUN  to successive elements of  LIS  untilL
;; one of them returns a non-nil value.  If this happens, then some
;; returns the elements of  LIS  from that point on.  Otherwise it
;; returns  nil .
;; COMMON LISP DEFINES SOME TO RETURN JUST THE RESULT OF THE FIRST PREDICATE
;; TEST WHICH RETURNS A NON-NIL VALUE. GCLISP FOLLOWS THAT.
;; CHANGING THIS SOME TO BE: SOME-PLUS WHICH BEHAVES AS ABOVE.

(DEFUN SOME-PLUS (FUN LIS)
    (LOOP (OR LIS (RETURN NIL))
          (AND (FUNCALL FUN (CAR LIS)) (RETURN LIS))
          (POP LIS)) )
```

```
;; *********************************************************************
;;
;;!(every FUN LIS)  applies  FUN  to successive elements of  LIS , returning
;;  nil , as soon as one of these applications returns  nil .  If all
;;  applications returns a non-nil value, then   t  is returned.
;; If  LIS  is null, then   t  is returned.
;; GCLISP HAS EVERY BUILT IN, BUT HERE IS WHAT IT WOULD LOOK LIKE:
;;
;;(DEFUN EVERY (FUN LIS)
;;   (DOLIST (ELT LIS T)              ; T IS RETURNED IFF ALL TRUE, ELSE NIL.
;;      (UNLESS (FUNCALL FUN ELT) (RETURN NIL)) ) )

;; *********************************************************************
;;
;;!(none FUN LIS)  applies  FUN  to successive elements of  LIS , returning
;;  nil , as soon as one of these applications returns a non-nil value.  If
;;  all applications return null values, then   t  is returned.
;; COMMON LISP DEFINES NOTANY = NONE. GCLISP DOES NOT PROVIDE EITHER:
;; NOTE THAT THIS DEFN. DOES NOTE PROVIDE FOR &REST MORE-LISTS.

(DEFUN NOT-ANY (FUN LIS)
    (DOLIST (ELT LIS T)               ; T IS RETURNED IFF ALL FALSE, ELSE T.
         (WHEN (FUNCALL FUN ELT) (RETURN NIL)) ) )

;; *********************************************************************
;;
;;!(for-all (VAR in LIS) -EXPS-) expands to (every '(lambda (VAR) -EXPS- ) LIS)
;; and returns  nil  as soon as one of the lambda expressions evaluates to  nil.
;; If all are non-nil, then   t  is returned.

(DEFMACRO FOR-ALL ( (VAR IN LIS) &REST EXPS)
   `(EVERY '(LAMBDA (,VAR)
              ,@EXPS)
           ,LIS) )

;; *********************************************************************
;;
;;!(there-exists (VAR in LIS) -EXPS-) expands to
;;  (some '(lambda (VAR) -EXPS- ) LIS) , and returns the rest of the list
;;  as soon as one of the lambda expressions evaluates non-null.
;; If all are nil, then nil is returned.

(DEFMACRO THERE-EXISTS ( (VAR IN LIS) &REST EXPS)
   `(SOME '(LAMBDA (,VAR)
             ,@EXPS)
          ,LIS ) )
;; THIS RETURNS REMAINDER OF LIS, AS SOME-PLUS DOES.

(DEFMACRO THERE-EXISTS-PLUS ( (VAR IN LIS) &REST EXPS)
   `(SOME-PLUS '(LAMBDA (,VAR)
                  ,@EXPS)
               ,LIS ) )

;; FOR.LSP       UTILITY MACROS FOR MAPPING ACROSS A LIST.

;; THIS FILE CONTAINS THE DEFINITION OF THE "FOR" MACRO, SIMILAR TO THE
;; FOR  MACRO (CRM PP. 64-65) WITH EXISTS AS IN SCHANK & RIESBECK, PP. 52-54.
;; THE FOR FORM "EXISTS" AND "ALL" ARE NOT SUPPORTED, AS THEY ARE IMPROPER
;; CONCEPTUAL USES OF THIS MAPPING. USE FUNCTION THERE-EXISTS AND EVERY INSTEAD.
;; IMPLEMENTED IN GCLISP. JB. 12/12/86.
;; LAST CHANGE:

;; ORIGINAL BRIEF DESCRIPTION OF FOR CAPABILITIES:
;;! FOR - this macro may be used for virtually any mapping task.
;; (for (x in l) (do (baz x)))              ;; (baz x) is an arbitrary expression
;; (for (x in l) (when (foo x)) (do (baz x)))  ;; (foo x) is an arbitrary test
;;   eval's  (baz x)  for each element x in l and returns  () .
;;  (when (foo x)) means for each x such that (foo x) isn't null.
;; If  do  above is replaced with:
;;
```

```
;; save - applies baz to elements and returns a list of the results.
;;
;; filter - applies baz to elements and saves all the non-null results.
;;
;; splice - assuming baz always returns a list or (), applies baz and nconcs
;; all the results together.  nconc, like append, discards null results;  but
;; it is surgical, so sometimes have to (splice (copy (baz x))) to avoid bugs.
;;
;; exists - if some (baz x) evaluates to non-null, the tail of the list,
;; starting with that x, is returned.  If all (baz x) are null, () is returned.
;; Same effect as functions there-exists & some.
;;
;; all - means that () is returned as soon as one of the (baz x) evaluates to ()
;; and t  is returned if all are non-null.  Same as functions for-all & every.
;; PERFORM IS SYNONYM FOR DO TO ELIMINATE CONFUSION WITH COMMON LISP DO.

(DEFMACRO FOR ( (VAR IN LIS) &REST TEST-BODY)
    (LET* ( (TEST (AND (CDR TEST-BODY) (POP TEST-BODY)))
            (BODY (CAR TEST-BODY))
            (TYPE (ERROR-CK-FOR VAR LIS TEST BODY)))
        `(,(MAKE-FOR-FUN VAR TEST TYPE BODY)
           (FUNCTION ,(MAKE-FOR-LAMBDA VAR TEST TYPE BODY) )
           ,LIS) ) )

(DEFUN MAKE-FOR-LAMBDA (VAR TEST TYPE BODY)
    (COND ((AND TEST BODY)
           (EVAL `(MAKE-LAMBDA ,VAR ,(CONS 'AND           ;Sandwich in AND,
                                    (CONS (CADR TEST)    ;The WHEN body
                                     (LIST (MAKE-FOR-BODY TYPE BODY)) )))))
          (T
           (EVAL `(MAKE-LAMBDA ,VAR ,(MAKE-FOR-BODY TYPE BODY)))) ) )

(DEFUN MAKE-FOR-BODY (TYPE BODY)
    (CASE TYPE
        ((SPLICE DO PERFORM) (CADR BODY))                ;Just return BODY
        (SAVE (CONS 'LIST (CDR BODY)))          ;Must listify,since mapcan.
                                                ;Necessary to see if NIL
                                                ;for purposes of splice.
        (FILTER     `(LET ( (SILLY-FOR-TEMP ,(CADR BODY)) )
                        (AND SILLY-FOR-TEMP (LIST SILLY-FOR-TEMP)))) ) )

(DEFMACRO MAKE-LAMBDA (LAMVAR LAMBODY)
    `(QUOTE (LAMBDA (,LAMVAR) ,LAMBODY)) )

(DEFUN MAKE-FOR-FUN (VAR TEST TYPE BODY)
    (COND ((MEMBER TYPE '(DO PERFORM)) 'MAPC)
          (T                  'MAPCAN)) )

(DEFUN ERROR-CK-FOR (VAR LIS TEST BODY)
    (LET ((FOR-TWORDS '(WHEN)) (FOR-DOWORDS '(SAVE DO PERFORM FILTER SPLICE)))
        (OR BODY      (PRINT "ERROR:NO BODY IN FOR"))
        (AND TEST
             (COND ((AND (CONSP TEST) (MEMBER (CAR TEST) FOR-TWORDS)) NIL)
                   (T (PRINT "ERROR:IMPROPER TEST IN FOR")) ) )
        (COND ((AND (CONSP BODY) (MEMBER (CAR BODY) FOR-DOWORDS)) (CAR BODY))
              (T (PRINT "ERROR:IMPROPER BODY IN FOR")) ) ) )

; PLIST.LSP   NICER PROPERTY LIST FUNCTIONS THAN COMMONLISP PROVIDES.
;---------------------------------------------------------------------
;
; PLIST FUNS FOR COMPATIBILITY WITH INTERLISP STYLE...

(DEFUN PUTPROP (NAME IND VAL)
    (SETF (GET NAME IND) VAL))

(DEFUN GETPROP (NAME IND)
    (GET NAME IND))
```

```
(DEFUN ADDPROP (NAME IND VAL)
   (SETF (GET NAME IND) (ADJOIN VAL (GET NAME IND))))

(DEFUN REMPROP (NAME IND)
   (REMF (SYMBOL-PLIST NAME) IND))

; SETS.LSP    BASIC OPERATIONS ON SETS
;------------------------------------------------------------------
;
; NOT FULLY COMMON LISP COMPATIBLE, IN THAT TEST KEYS NOT SUPPORTED.
; ADDITIONAL LISTS ARE SUPPORTED, SO (UNION L1 L2 L3 ...) WORKS.

(DEFUN INTERSECT (L1 L2 &REST MORE-LISTS)
    (DO ( RESULT-SET ELT)
        ( (OR (NULL L1) (NULL L2))
          (COND (MORE-LISTS (APPLY #'INTERSECT RESULT-SET MORE-LISTS))
                (T RESULT-SET) ) )
        (AND (MEMBER (SETQ ELT (CAR L1)) L2)
             (SETQ RESULT-SET (ADJOIN ELT RESULT-SET)) )
        (SETQ L1 (CDR L1)) ) )

(DEFUN UNION (L1 L2 &REST MORE-LISTS)
    (LET ((L2NODUPES (UNION-AUX L2 NIL)))           ;Removes any dupes in L2.
         (APPLY #'UNION-AUX L1 L2NODUPES MORE-LISTS) ) )

(DEFUN UNION-AUX (L1 L2 &REST MORE-LISTS)
    (DOLIST (ELT L1 (COND (MORE-LISTS
                            (APPLY #'UNION-AUX L2 MORE-LISTS) )
                          (T L2) ))
       (SETQ L2 (ADJOIN ELT L2)) ) )

(DEFUN REMOVEDUPS (L) (UNION-AUX L NIL))          ;For convenience.

(DEFUN SET-DIFFERENCE (L1 L2)
   (LET (RESULT)
      (DOLIST (ELT L1 RESULT)
         (AND (NULL (MEMBER ELT L2))
              (SETQ RESULT (ADJOIN ELT RESULT))))))

; PRINT.LSP   JUST A FEW NICETIES.
;------------------------------------------------------------------
;

(DEFUN PRINTLIST (&REST X)
   (TERPRI)
   (DOLIST (I X NIL) (PRINC I)))

(DEFUN SPACES (&OPTIONAL N)
   (OR N (SETQ N 1))
   (DOTIMES (I N) (WRITE-CHAR 32)))

; SORT.LSP    SIMPLE SORT FUNCTION. NOT YET PROVIDED BY GCLISP
;------------------------------------------------------------------
;

(DEFUN SORT (L &OPTIONAL PRED KEY)
    (COND (KEY (SORT-KEY L PRED KEY))
          (PRED (SORT-PRED L PRED))
          (T (SORT1 L))))

(DEFUN SORT-PRED (L PRED)
   (COND ((NULL L) NIL)
         (T
            (SPLICE-IN (CAR L)
                  (SORT-PRED (CDR L) PRED)
                  PRED))))

(DEFUN SPLICE-IN (ELT L PRED)
   (COND ((NULL L) (LIST ELT))
         ((FUNCALL PRED ELT (CAR L))
```

```
                    (CONS ELT L))
            (T
              (CONS (CAR L)
                 (SPLICE-IN ELT (CDR L) PRED)))))

(DEFUN SORT-TO-ORDER (L1 LNUMS &OPTIONAL UP-DOWN)
   (LET ( (MERGED-LIST
             (FOR (X IN L1)
                (WHEN LNUMS)
                (SAVE (LIST (POP LNUMS) X)))))
      (FOR (X IN (SORT-PRED MERGED-LIST
                    (COND ((MEMBER UP-DOWN '(ASCENDING ASCEND UP))
                              #'(LAMBDA (X Y) (< (CAR X) (CAR Y))))
                          (T #'(LAMBDA (X Y) (> (CAR X) (CAR Y)))))))
         (SAVE (CADR X)))))

; STEPLOAD.LSP    UTILITY FOR PRINTING RESULTS OF LOADING A LISP CODE FILE.
;-------------------------------------------------------------------------
;

(DEFUN STEPLOAD (FILNAM)
    (EVAL '(WITH-OPEN-FILE (STRM ,(MERGE-PATHNAMES FILNAM))
             (DO ((EXPR (READ STRM NIL 'EOF) (READ STRM NIL 'EOF)))
                 ((EQ EXPR 'EOF) FILNAM)
                 (PPRINT (EVAL EXPR))))))

; STRINGS.LSP    LISP OBJECT TO STRING CONVERSION FUNCTIONS
;-------------------------------------------------------------------------
;
; GENERAL PURPOSE COERECION TYPE FUNCTIONS TO GO FROM LISP OBJECTS TO
; STRINGS. NEARLY ALL CASES COVERED BY LIST-TO-STRING.

(DEFUN LIST-TO-STRING (ITEM)
  (LET ((TYPE (TYPE-OF ITEM)))
     (COND ((EQ TYPE 'NULL) "()")
       ((EQ TYPE 'CONS)  (STRING-APPEND "("
                   (LET ( (RESULT " "))
                      (DOLIST (X ITEM RESULT)
                          (SETQ RESULT (STRING-APPEND RESULT
                                                (LIST-TO-STRING X) " "))))
                   ")"))
                       ((EQ TYPE 'SYMBOL) (SYMBOL-NAME ITEM))
          ((MEMBER TYPE '(FIXNUM BIGNUM)) (FIXNUM-TO-STRING ITEM))
          ((MEMBER TYPE '(SINGLE-FLOAT)) (FLOAT-TO-STRING ITEM))
          ((AND (CONSP TYPE) (EQ (CAR TYPE) 'VECTOR))
             (STRING-APPEND "\"" ITEM "\""))
          (T "?"))))

(DEFUN FLOAT-TO-STRING (FL)
   (MULTIPLE-VALUE-BIND (NUM REM) (FLOOR (ABS FL))
     (CASE (SIGNUM FL)
         (1.0 (STRING-APPEND
                (FIXNUM-TO-STRING NUM) (MANTISSA-TO-STRING REM)))
         (-1.0 (STRING-APPEND "-"
                (FIXNUM-TO-STRING NUM) (MANTISSA-TO-STRING REM)))
         (0.0  "0.0"))))

(DEFUN FIXNUM-TO-STRING (INT)
    (COND ((> INT 9)
            (MULTIPLE-VALUE-BIND (NUM REM) (TRUNCATE INT 10)
              (STRING-APPEND
                (FIXNUM-TO-STRING NUM) (FIXNUM-TO-STRING REM))))
          ((< INT 0)
            (MULTIPLE-VALUE-BIND (NUM REM) (TRUNCATE (ABS INT) 10)
              (STRING-APPEND "-"
                 (FIXNUM-TO-STRING NUM) (FIXNUM-TO-STRING REM))))
          (T (NTH INT '( "0" "1" "2" "3" "4" "5" "6" "7" "8" "9")))))

(DEFUN MANTISSA-TO-STRING (MANTISSA)
    (STRING-APPEND "."
         (DO* ((MANT "" (STRING-APPEND MANT
                           (FIXNUM-TO-STRING NUM)))
```

```
              (NUM MANTISSA REM) (REM 1) (CNT 0 (+ 1 CNT)) )
          ((OR (ZEROP REM)(> CNT 6)) MANT)
          (MULTIPLE-VALUE-SETQ (NUM REM)
             (TRUNCATE (* 10.0 NUM))))))

; SIMPLE PARSING FUNCTION FOR STRINGS (DEFUN STRIP-TOKEN (STR &OPTIONAL DELIMITER)
   (LET ( (INDEX (STRING-SEARCH* (STRING (OR DELIMITER " ")) STR)))
      (COND ((NUMBERP INDEX)
             (VALUES (SUBSEQ STR 0 INDEX) (SUBSEQ STR (+ INDEX 1))) )
            (T (VALUES "" STR)) ) ) )

;; QUEUES.LSP    FUNCTIONS FOR HANDLING QUEUES
;;---------------------------------------------------------------
;;
;; ADAPTED FROM CRM Ex.10.3, p.113.

;; (make-queue lis)  returns a data structure in which the list  lis
;;   behaves as a queue.

;; If  qu  is such a data structure, then
;;   (enqueue-l qu l)  modifies  qu  by enqueuing the elements of the list  l
;;       and returns  l .
;;   (enqueue qu x)  modifies  qu  by enqueuing  x  and returns  x .
;;   (dequeue qu l)  modifies  qu  by dequeuing and returning the first member
;;       of the queue.
;;   (budgies qu x)  modifies  qu  by inserting  x  at the head of the q.
;;       It returns  x .
;;   (elements:queue qu)  returns a list of the elements of the queue.
;;   (isemptyq qu)  returns  t  if  qu  is empty, else () .
;;   (front:queue qu)  returns the element at the front of the queue.
;;   (rear:queue qu)  returns the element at the rear of the queue.

;; The data structure is  (last-cell.elements) , where  elements  contains a
;; header  $dummy$ . E.g, the queue  (a b c d) , where  a  is at the front,
;; is represented as  ((d) $dummy$ a b c d) , where  (d)  is the same Lisp cell
;; as the last cell of the structure. The empty queue is represented as
;; (($dummy$) $dummy$) , where again, the car is the same as the last cell.

(defun make-queue (l)
   (let ((x (cons '$dummy$ (append l ()))))
      (cons (last x) x) ) )

(defun enqueue (qu x)
   (enqueue-l qu (list x))
   x )

(defun enqueue-l (qu l)
   (SETF (cdar qu) l)
   (SETF (car qu) (last (car qu)))
   l )

(defun dequeue (qu)           ;; Use  isemptyq  if it might be.
   (prog1
    (caddr qu)
    (and (eq (car qu) (cddr qu))    ;; ((b) $dummy$ a b)    ((b) $dummy$ b)
         (SETF (car qu) (cdr qu)) ) ;;                      (($dummy$ b) $dummy$ b)
    (SETF (cddr qu) (cdddr qu)) ) ) ;; ((b) $dummy$ b)      (($dummy$) $dummy$)

(defun budgies (qu x)
   (if (isemptyq qu) (enqueue qu x)
     else
     (rplacdd qu (cons x (cddr qu)))
     x ) )

(defun isemptyq (qu) (eq (car qu) (cdr qu)) )

(defun elements-queue (qu) (cddr qu))

(defun front-queue (qu) (caddr qu))    ;; Use  isemptyq  if it might be.
```

```
;; MATCH.LSP    A HIGHLY RECURSIVE PATTERN TO DATA MATCHER.
;;---  ------------------------------------------------------------------
;;
;; Taken principally from Winston and Horn, but greatly extended.
;;
;;    EXTENSIONS PROVIDED:
;;       L*   MATCH LONGEST POSSIBLY NULL DATUMS
;;       S*   MATCH SHORTEST POSSIBLY NULL DATUMS
;;       L+   MATCH LONGEST DATUMS OF AT LEAST ONE ELEMENT
;;       S+   MATCH SHORTEST DATUMS OF AT LEAST ONE ELEMENT
;;       THE ABOVE MAY BE USED TO CREATE BINDINGS ALSO, AS:
;;            (L* X), (S* Y), ETC...
;;       NOTE: (MATCH '(A (L* X)) '(A) NIL) RETURNS T, SINCE NO BDGS NEEDED.
;;             (MATCH '(A (S* X)) '(A) NIL)       "                "
;;
;;    (& X) MATCH CORRESPONDING DATUM AND IF TOTAL MATCH SUCCEEDS, THEN
;;             SETQ X TO THE MATCHED ITEM. DANGEROUS IF IMPROPERLY USED.
;;    (&& X) SETQ X TO THE MATCHED ITEM IRREGARDLESS OF WHETHER MATCH FINALLY
;;             SUCCEEDS. DANGEROUS, BUT USEFUL TO FIND OUT WHY A MATCH FAILS.
;;
;;    LIMITATIONS:
;;       AT PRESENT, THE RESTRICT PLACE HOLDER "?" IN (RESTRICT ? PRED PRED..)
;;       CAN ONLY BE A ?. NO BINDINGS OR + OR * FORMS ARE ALLOWED.

(DEFUN MATCH (P D BINDINGS)
  (COND ((AND (NULL P) (NULL D))                          ;Succeed.
         (COND ((NULL BINDINGS) T)
               (T BINDINGS)))
        ((NULL D)
         (COND ((STAR-PATTERN (FIRST P))
                (MATCH (REST P) D BINDINGS))))            ;s* or l*? else Fail.
        ((NULL P) NIL)

((OR (EQUAL (FIRST P) '?)                         ;Match ? pattern.
             (EQUAL (FIRST P) (FIRST D)))                 ;Identical elements.
         (MATCH (REST P) (REST D) BINDINGS))

((EQUAL (FIRST P) 'S+)                            ;Match shortest
         (OR (MATCH (REST P) (REST D) BINDINGS)           ;non-null datums
             (MATCH P (REST D) BINDINGS)))

((EQUAL (FIRST P) 'L+)                            ;Match longest
         (OR (MATCH P (REST D) BINDINGS)                  ;non-null datums
             (MATCH (REST P) (REST D) BINDINGS)))

((EQUAL (FIRST P) 'S*)                            ;Match shortest,
         (COND ((AND (NULL D)                             ;possibly null datums
                     (MATCH (REST P) NIL BINDINGS)))
               ((MATCH (REST P) D BINDINGS))
               ((AND D (MATCH P (REST D) BINDINGS)))
               (T NIL)))

((EQUAL (FIRST P) 'L*)                            ;Match longest,
         (COND ((AND (NULL D)                             ;possibly null datums
                     (MATCH (REST P) NIL BINDINGS)))
               ((AND D (MATCH P (REST D) BINDINGS)))
               ((MATCH (REST P) D BINDINGS))
               (T NIL)))
        ((ATOM (FIRST P)) NIL)                            ;Losing atom.

((EQUAL (PATTERN-INDICATOR (FIRST P)) '>)         ;Match $>$ variable.
         (MATCH (REST P) (REST D)
                (SHOVE-GR (PATTERN-VARIABLE (FIRST P))
                          (FIRST D)
                          BINDINGS)))

((EQUAL (PATTERN-INDICATOR (FIRST P)) '<)         ;Substitute variable.
         (MATCH (CONS (PULL-VALUE (PATTERN-VARIABLE (FIRST P)) BINDINGS)
                      (REST P))
                D
                BINDINGS))
```

```
        ((EQUAL (PATTERN-INDICATOR (FIRST P)) 'S+)    ;Match variables.
         (LET ((NEW-BINDINGS (SHOVE-PL (PATTERN-VARIABLE (FIRST P))
                                       (FIRST D)
                                       BINDINGS)))
           (OR (MATCH (REST P) (REST D) NEW-BINDINGS)
               (MATCH P (REST D) NEW-BINDINGS))))

((EQUAL (PATTERN-INDICATOR (FIRST P)) 'L+)    ;Match variables.
         (LET ((NEW-BINDINGS (SHOVE-PL (PATTERN-VARIABLE (FIRST P))
                                       (FIRST D)
                                       BINDINGS)))
           (OR (MATCH P (REST D) NEW-BINDINGS)             ;non-null datums
               (MATCH (REST P) (REST D) NEW-BINDINGS)) ))

((EQUAL (PATTERN-INDICATOR (FIRST P)) 'S*)    ;Match variables.
         (LET ((NEW-BINDINGS (SHOVE-PL (PATTERN-VARIABLE (FIRST P))
                                       (FIRST D)
                                       BINDINGS)))
           (COND ((AND (NULL D)                             ;possibly null datums
                       (MATCH (REST P) NIL BINDINGS)))   ;MAYBE NOT NEW-ASSIGN
                 ((MATCH (REST P) D BINDINGS))
                 ((AND D (MATCH P (REST D) NEW-BINDINGS)))
                 (T NIL))))

((EQUAL (PATTERN-INDICATOR (FIRST P)) 'L*)    ;Match variables.
         (LET ((NEW-BINDINGS (SHOVE-PL (PATTERN-VARIABLE (FIRST P))
                                       (FIRST D)
                                       BINDINGS)))
           (COND ((AND (NULL D)                             ;possibly null datums
                       (MATCH (REST P) NIL NEW-BINDINGS)))
                 ((AND D (MATCH P (REST D) NEW-BINDINGS)))
                 ((MATCH (REST P) D NEW-BINDINGS))
                 (T NIL)) ))

((EQUAL (PATTERN-INDICATOR (FIRST P)) '&)        ;Setq it iff success.
         (LET ((RESULTS (MATCH (REST P) (REST D) BINDINGS)))
           (COND (RESULTS
                  (SET (SECOND (FIRST P)) (FIRST D))
                  RESULTS))))

((EQUAL (PATTERN-INDICATOR (FIRST P)) '&&)       ;Setq it regardless
         (SET (SECOND (FIRST P)) (FIRST D))
         (MATCH (REST P) (REST D) BINDINGS))

((AND (EQUAL (PATTERN-INDICATOR (FIRST P))        ;Match restriction.
                     'RESTRICT)
              (EQUAL (RESTRICTION-INDICATOR (FIRST P)) '?)
              (TEST (RESTRICTION-PREDICATES (FIRST P)) (FIRST D)))
         (MATCH (REST P) (REST D) BINDINGS))))

;;; This section contains selector procedures.

(DEFUN STAR-PATTERN (P)
  (OR (EQ P 'S*)
      (EQ P 'L*)
      (AND (CONSP P)
           (OR (STAR-PATTERN (FIRST P))
               (STAR-PATTERN (REST P))))))

(DEFUN PATTERN-INDICATOR (L)
  (FIRST L))

(DEFUN PATTERN-VARIABLE (L)
  (SECOND L))

(DEFUN MATCH-VALUE (KEY A-LIST)
  (SECOND (ASSOC KEY A-LIST)))

(DEFUN PULL-VALUE (VARIABLE A-LIST)
  (SECOND (ASSOC VARIABLE A-LIST)))
```

```
;;; This section contains mutator procedures.

(DEFUN SHOVE-GR (VARIABLE ITEM A-LIST)
  (APPEND A-LIST (LIST (LIST VARIABLE ITEM))))

(DEFUN SHOVE-PL (VARIABLE ITEM A-LIST)
  (COND ((NULL A-LIST) (LIST (LIST VARIABLE (LIST ITEM))))
        ((EQUAL VARIABLE (FIRST (FIRST A-LIST)))
          (CONS (LIST VARIABLE (APPEND (SECOND (FIRST A-LIST))
                                       (LIST ITEM)))
                (REST A-LIST)))
        (T (CONS (FIRST A-LIST)
                 (SHOVE-PL VARIABLE ITEM (REST A-LIST))))))

(DEFUN RESTRICTION-INDICATOR (PATTERN-ITEM) (SECOND PATTERN-ITEM))

(DEFUN RESTRICTION-PREDICATES (PATTERN-ITEM) (REST (REST PATTERN-ITEM)))

;;; This is the auxiliary procedure for testing datum elements to
;;; see if they satisfy the given predicates.

(DEFUN TEST (PREDICATES ARGUMENT)
  (COND ((NULL PREDICATES) T)                       ;All tests T?
        ((FUNCALL (FIRST PREDICATES) ARGUMENT)      ;This test T?
         (TEST (REST PREDICATES) ARGUMENT))
        (T NIL)))                                   ;This test NIL?

;;; These are some representative predicates used in restrict clause, as:
;;       (MATCH '(A (RESTRICT ? COLORP (LAMBDA (X) (MEMBER X '(RED YELLOW)))))
;;              '(A RED) NIL)  ==> TO MATCH "HOT" COLORS.

(DEFUN COLORP (WORD) (MEMBER WORD '(RED WHITE BLUE)))

(DEFUN BAD-WORD-P (WORD) (MEMBER WORD '(SHUCKS DARN)))

;; A predicate may also look like: (LAMBDA (X) (NUMBERP X))
```

Appendix III

```
;; EXPERT.LOD    LOADS ALL SOURCE FOR EXPERT SYSTEM
;;---------------------------------------------------------------

(LOAD "C:\\GCLISP2\\LIB\\EXPERT\\EXPOPS")
(LOAD "C:\\GCLISP2\\LIB\\EXPERT\\EXPERT.INT")
(LOAD "C:\\GCLISP2\\LIB\\EXPERT\\PARMS.INT")
(LOAD "C:\\GCLISP2\\LIB\\EXPERT\\WINDOWS.LSP")

;; EXPOPS.LSP    SOURCE CODE FOR EXPERT SYSTEM KNOWLEDGE REPRESENTATION
;;---------------------------------------------------------------

(DEFPARAMETER DEBUGON NIL)
(DEFPARAMETER *LOCALS* NIL)
(DEFPARAMETER *GLOBALS* NIL)

;; TOP LEVEL RULE INTERPRETER (DEFUN EXPERT (&OPTIONAL DEBUGON )
   (PROG (TASKDESC RSNAME RULES SELMODE CSET RULES-FIRED
          GOOD-RULES  BDGPKG)

ONE: (SEND-COMMAND DEBUGON)
          (REQUEST-TASK)
          (AND (EQ *TRACEON* 2) (QSTATUS *RESULT-STREAM*))
     ONE2: (OR (RUNNING-PROCESS)
               (MAKE-RUNNING (CHOOSE-READY-PROCESS) '*READYQ*)
               (GO ONE:) )

(CASE (CAR (SETQ TASKDESC (GET-TASK 'TASK *TASK*)))
             ((MESSAGE NET-MESSAGE)  (MAKE-BLOCKED) (GO ONE:))
             (EVALUATE (EVAL-TASK (CADR TASKDESC)) (POP-TASK) (GO ONE:)) )
```

```
TWO:  (AND DEBUGON (BREAK '"EXPERT LABEL TWO:"))
      (COND ((SETQ RSNAME (GET-TASK 'LABEL)) NIL)
            ((SETQ RSNAME
                   (CAR (SETQ BDGPKG
                              (SELECT-RULESET *TASK* (GET-TASK 'LAST-RULESET))) ))
             (INSTALL-RSE *TASK* RSNAME)
             (:=* (CDR BDGPKG)) )
            (T (GO BOT:)) )

(SETQ *GLOBALS* NIL)
      (SETQ *LOCALS* NIL)
      (SETQ CSET    (GET-TASK 'CSET *TASK*))
      (SETQ SELMODE (GET-TASK 'SELMODE *TASK*))

(AND (EQ CSET 'DONE) (POP-TASK) (GO BOT2:))

(SETQ RULES   (GET-RULESET-ITEM RSNAME 'RULES))

(SETQ *LOCALS*  (BUILD-SYMTAB RSNAME 'LOCALS))
      (SETQ *GLOBALS* (BUILD-SYMTAB RSNAME 'GLOBALS))

(OR (INFERENCE-PRECONDITIONS) (AND (POP-TASK) (GO BOT2:)))

(EVAL (GET-RULESET-ITEM RSNAME 'ENTRY))

(SETQ GOOD-RULES
            (INSTANTIATE-RULES RSNAME
                               RULES
                               CSET SELMODE *LOCALS* *GLOBALS* *TASK*) )

(WINDOW-PRINT 'RULE-WINDOW RSNAME (AND DEBUGON GOOD-RULES))
      (SETQ GOOD-RULES (CRITICIZE-RULES GOOD-RULES SELMODE))
      (AND DEBUGON (WINDOW-PRINT 'RULE-WINDOW
                                 (COND (GOOD-RULES '"RULES CHOSEN")
                                       (T          '"NO RULES CHOSEN") )))
      (AND DEBUGON (BREAK '"BEFORE FIRING RULES IN EXPERT"))
      (AND *TRACEON*
           (PROGN (TERPRI *RESULT-STREAM*)
                  (PRINC '">>>RULES " *RESULT-STREAM*)
                  (PRINC (MAPCAR #'CAR GOOD-RULES) *RESULT-STREAM*)
                  (PRINC '" CHOSEN IN RULESET: " *RESULT-STREAM*)
                  (PRINC RSNAME *RESULT-STREAM*)
                  (TERPRI *RESULT-STREAM*) ) )

(FIRE-RULES GOOD-RULES *LOCALS* *GLOBALS*)

BOT:  (AND DEBUGON (BREAK '"EXPERT BOT: LABEL"))
      (AND *RPCB* (MAKE-READY *RPCB*))
      (MAKE-RUNNING NIL)
      (GO ONE:)

BOT2: (AND DEBUGON (BREAK '"EXPERT BOT-2: LABEL"))
      (AND *RPCB* (MAKE-READY *RPCB*))
      (MAKE-RUNNING NIL)
      (GO ONE2:)
DONE: (RETURN '"Demonstration Completed, Thank You !") ) )

(DEFUN SETUP-EXPERT (RFILE &OPTIONAL TRACEON)
   (SETF *READYQ* NIL *RPCB* NIL *BLOCKED* NIL *TRACEON* TRACEON)
   (SETF *RESULT-FILE* RFILE)
;  (PLACE-MSG (LIST-TO-STRING '(GRAPH)) MACHINE-ID 5)
   (SETF *RESULT-STREAM* (EVAL '(OPEN RFILE :DIRECTION :OUTPUT)))
   (CLEAR-WINDOWS)
   (SETF *COUNT* 0) '"READY TO BEGIN, TYPE (EXPERT)")

(DEFUN FINISH-EXPERT ()
   (PRINT '"RUN COMPLETED" *RESULT-STREAM*)
   (PRINT '"======================================" *RESULT-STREAM*)
   (AND *TRACEON* (OSTATUS *RESULT-STREAM*))
   (CLOSE-ALL-FILES) (GO DONE:) )
```

```
(DEFUN CREATE-PROCESS (TASK PRIORITY)
    (LET* ( (ORIGIN-TASK (CREATE-TASK TASK))
            (NEW-PROCESS (LIST NIL (OR PRIORITY *LOWEST-PRIORITY*)
                                'TIME (LIST 0 0 (GETTIME))
                                'PROCESS (LIST ORIGIN-TASK) )) )
        (RPLACA NEW-PROCESS (GET-TASK 'ID ORIGIN-TASK))
        NEW-PROCESS) )

(DEFUN CREATE-TASK (TASK)
    (LIST 'ID (GENID) 'TASK TASK 'LAST-RULESET NIL 'VALUE NIL 'LABEL NIL) )

(DEFUN GET-PCB (&OPTIONAL KEY PCB)
    (COND (KEY (GETF (OR PCB *RPCB*) KEY))
          (*RPCB*) ) )

(DEFUN PUT-PCB (ITEM NEWVAL &OPTIONAL PCB)
    (CLOBALIST ITEM NEWVAL (OR PCB (GET-PCB))) )

(DEFUN GET-PROCESS (&OPTIONAL KEY PROCESS)
    (COND (KEY (GETF (OR PROCESS (CURRENT-PROCESS)) KEY))
          ((CURRENT-PROCESS)) ) )

(DEFUN GET-TASK (&OPTIONAL KEY TASK)
    (COND (KEY (GETF (OR TASK (CURRENT-TASK)) KEY))
          ((CURRENT-TASK)) ) )

(DEFUN PROCESS-STACK (&OPTIONAL PCB)
    (GET-PCB 'PROCESS-STACK PCB) )

(DEFUN CURRENT-PROCESS ()
    *RP* )

(DEFUN CURRENT-TASK ()
    *TASK* )

(DEFUN PARENT-PROCESS ()
    (CADR (PROCESS-STACK)) )

(DEFUN PARENT-TASK ()
    (CAR (LAST (GETF *RP* 'PROCESS))) )

(DEFUN CURRENT-RULE ()
    *RULENAME* )

(DEFUN CURRENT-PRIORITY ()
    (CADR (CURRENT-PROCESS)) )

(DEFUN LOWER-PRIORITY ()
    (CASE (CURRENT-PRIORITY)
          (1 2) (2 3) (OTHERWISE 3) ) )

(DEFUN UPDATE-PCB ()
    (RPLACA (GET-PCB) (GET-TASK 'ID (PARENT-TASK)))
    (GET-PCB) )

(DEFUN DESTROY-PCB ()
    (MAKE-RUNNING NIL) )

(DEFUN PUSH-PROCESS (PROCESS)
    (CLOBALIST 'PROCESS-STACK
               (CONS PROCESS (GET-PCB 'PROCESS-STACK))
               (GET-PCB) )
    (UPDATE-PCB) )

(DEFUN POP-PROCESS ()
    (LET* ( (PS (GET-PCB 'PROCESS-STACK)) (PROCESS (CAR PS)) )
        (COND ((CDR PS)
               (RPLACB PS (CDR PS))
               (UPDATE-PCB) )
              (T (DESTROY-PCB)) )
        PROCESS ) )
```

```
(DEFUN PUSH-TASK (TASK)
    (LET ( (PROCESS (CURRENT-PROCESS)) (NEWTASK (CREATE-TASK TASK)) )
        (GLOBALIST 'PROCESS
                   (CONS NEWTASK (GETF PROCESS 'PROCESS))
                   PROCESS)
        NIL ) )

(DEFUN POP-TASK ()
    (LET* ( (PROCESS (GETF (CURRENT-PROCESS) 'PROCESS))
            (TASK (CAR PROCESS)) )
        (COND ((CDR PROCESS)
               (RPLACB PROCESS (CDR PROCESS)) )
              ((POP-PROCESS)) )
        TASK ) )

(DEFUN INSTALL-RSE (TASK RSETNAME)
    (LET* ((RS (GET-RULESET RSETNAME))
           (VALSYM (CDR (ASSOC 'VALUE RS))) RSE)
        (SETQ RSE
            (LIST 'LABEL (CAR RS) 'CSET (COPY-TREE (CADR (ASSOC 'CSET RS)))
                  'SELMODE (CADR (ASSOC 'SELMODE RS))
                  'STATICS (COPY-TREE (CADR (ASSOC 'STATICS RS)))
                  'INPUTS  (CADR (ASSOC 'INPUTS RS)) ) )
        (NCONC (GETF RSE 'STATICS)
               (GETF (PARENT-TASK) 'STATICS) )
        (RPLACB (MEMBER 'LABEL TASK) RSE)
        (GLOBALIST 'VALUE
                   (CDR (ASSOC VALSYM (GETF RSE 'STATICS)))
                   TASK) ) )

(DEFUN DESTROY-RSE (TASK)
    (LET ( (RSNAME (GET-TASK 'LABEL TASK)) )
        (GLOBALIST 'LAST-RULESET RSNAME TASK)
        (RPLACB (MEMBER 'LABEL TASK) '(LABEL NIL))
        RSNAME ) )

(DEFUN GENID (&OPTIONAL FLAG)
    (FUNCALL *GENID* FLAG) )

(SETQ *IDSEED* 1)

(SETF *GENID*
      (CLOSURE '(*IDSEED*)
          #'(LAMBDA (FLAG)
              (CASE FLAG (RESET (SETQ *IDSEED* 1))
                         (LAST  (- *IDSEED* 1))
                         (OTHERWISE (INCF *IDSEED*)) ) ) ) )

; GETTIME  GETS THE TIME OF DAY. RETURNS LIST OF MINS, SECS, HUNDRETHS-SEC.
; TIME-DIFFERENCE TAKES IN TWO "GETTIME" VALUES AND RETURNS DIFFERENCE, IN
; THE SAME FORMAT. IE. (MIN SEC HUNDRETHS-OF-SEC)

(DEFUN GETTIME ()
  (LET (START S-HSEC S-SEC S-MIN VALS)
    (MULTIPLE-VALUE-SETQ (NIL NIL NIL S-MIN START)
      (SYS:%SYSINT #X21 #X2C00 0 0 0))
    ;; Unpack time.
    (SETQ S-HSEC (LOGAND START #X0FF)
          S-SEC (LSH START -8)
          S-MIN (LOGAND #X0FF S-MIN)  )
    (LIST S-MIN S-SEC S-HSEC) ) )

(DEFUN TIME-DIFFERENCE (T0 T1)
   (LET ( (S-MIN (FIRST T0)) (S-SEC (SECOND T0)) (S-HSEC (THIRD T0))
          (F-MIN (FIRST T1)) (F-SEC (SECOND T1)) (F-HSEC (THIRD T1)) )

(SETQ F-HSEC (- F-HSEC S-HSEC))              ; calc hundreths
      (IF (MINUSP F-HSEC)
          (SETQ F-HSEC (+ F-HSEC 100)
                F-SEC (1- F-SEC)))
```

```
    (SETQ F-SEC (- F-SEC S-SEC))                          ; calc seconds
    (IF (MINUSP F-SEC)
        (SETQ F-SEC (+ F-SEC 60)
              F-MIN (1- F-MIN)))
    (SETQ F-MIN (- F-MIN S-MIN))                          ; calc minutes
    (IF (MINUSP F-MIN) (INCF F-MIN 60))
    (LIST F-MIN F-SEC F-HSEC) ) )

(DEFUN GET-RULESET (RSNAME)
    (LET (FILNAM)
        (COND ((ASSOC RSNAME *RULEBASE*))
              ((SETQ FILNAM
                  (OR (ASSOC RSNAME
                         (OR *RULESET-FILE-ALIST* ))))
                (CAR (SETQ *RULEBASE*
                      (CONS (READ1-FILE-EXPR (CDR FILNAM) '*RSET-STREAM*)
                            *RULEBASE* ) )) )
              (T (DO-ERROR '"CANT GET RULESET" RSNAME)) ) ) )

(DEFUN SELECT-RULESET (TASK LAST-SET)
   (PROG (RULESETS RSNAME TASKLIST BDGS DESC)
        (SETQ DESC (GET-TASK 'TASK TASK))
        (SETQ RULESETS
           (COND (LAST-SET (CDR (MEMBER LAST-SET *RULESET-NAMES*)))
                 (*RULESET-NAMES*) ) )

UNO: (AND (NULL RULESETS) (RETURN NIL))
        (SETQ RSNAME (POP RULESETS))
        (SETQ TASKLIST (GET-RULESET-ITEM RSNAME 'TASKS))

(LOOP (SETQ BDGS (MATCH-TASKS (POP TASKLIST) DESC))
              (AND (OR BDGS (NULL TASKLIST)) (RETURN NIL)) )

(OR BDGS (GO UNO:))
        (RETURN (CONS RSNAME (CAR BDGS))) ) )

;(DEFUN SELECT-RULES (RULES CSET SELMODE)
;    (CASE CSET
;          (NIL RULES)
;          (OTHERWISE
;              (LOOP (OR RULES (RETURN CSET))
;                    (COND ((EQUAL (CAAR RULES) CSET)
;                              (SETQ CSET (CDR RULES))
;                              (SETQ RULES NIL))
;                          (T (SETQ RULES (CDR RULES))) ) ) ) ) )

;(DEFUN FIRE-RULES (RULES *LOCALS* *GLOBALS*)
;    (LET ( *RULENAME* )
;       (MAPCAR #'(LAMBDA (X)
;                    (SETQ *RULENAME* (CAR X))
;                    (MAPCAR #'(LAMBDA (Y) (EVAL Y))
;                            (REVERSE (CDDR X)) )
;                    (CAR X) )
;               (REVERSE RULES) ) ) )

(DEFUN FIRE-RULES (RULELIST *LOCALS* *GLOBALS*)
   (DO ( (*RULENAME* NIL) (RULES RULELIST (CDR RULES)) )
       ( (NULL RULES) T)
       (DO ( (THENS (REVERSE (CDDR (CAR RULES))) (CDR THENS)) )
           ( (NULL THENS) T)
           (EVAL (CAR THENS)) ) ) )

(DEFUN READ1-FILE-EXPR (PATH &OPTIONAL STREAM)
    (EVAL '(WITH-OPEN-FILE (,(OR STREAM '*DEFAULT-STREAM*) ,PATH)
                   (READ ,(OR STREAM '*DEFAULT-STREAM*)) )) )

(DEFUN INFERENCE-PRECONDITIONS ()
    (EVAL (CONS 'AND
        (MAPCAR #'(LAMBDA (X)
                     (LET ((RSNAME (GETF (CAR (LAST (GETF X 'PROCESS))) 'LABEL)))
                        (COND (RSNAME    ; has ruleset been selected yet?
                                 (OR (GET-RULESET-ITEM RSNAME 'PREREQUISITE) T) )
                              (T T) ) ) )
                 (PROCESS-STACK) ) )) )
```

```
(DEFUN GET-RULESET-ITEM (RSNAME ITEM)
    (CADR (ASSOC ITEM (GET-RULESET RSNAME))) )

(DEFUN EVAL-TASK (EXPR)
    (GLOBALIST 'VALUE (EVALIT EXPR) (CURRENT-TASK)) )

(DEFUN EVALIT (X)
    (EVAL X))

(DEFUN := (SYM VAL)
    (CASE (CAR SYM)
        (STATIC (RPLACD (ASSOC (UNQUIFY (CADR SYM))
                                (GET-TASK 'STATICS (CURRENT-TASK)))
                    VAL))
        (GLOBAL (RPLACD (ASSOC (UNQUIFY (CADR SYM)) *GLOBALS*) VAL))
        (LOCAL  (RPLACD (ASSOC (UNQUIFY (CADR SYM))
                                (CDR (ASSOC *RULENAME* *LOCALS*)) )
                    VAL))
        (PARAMETER (PARAMETER (UNQUIFY (CADR SYM)) 'PUT VAL) )
        (CONSTANT  (CONSTANT  (UNQUIFY (CADR SYM))  VAL) ) )
    VAL )

(DEFUN :=*  (ALIST)
    (LOOP (OR ALIST (RETURN NIL))
        (:= (CAR ALIST) (CADR ALIST))
        (SETQ ALIST (CDDR ALIST)) ) )

(DEFUN STATIC (SYM)
    (OR (CDR (ASSOC SYM (GET-TASK 'STATICS)))
        (CDR (ASSOC SYM (GET-TASK 'STATICS (PARENT-TASK)))) ) )

(DEFUN GLOBAL (SYM)
    (CDR (ASSOC SYM *GLOBALS*)) )

(DEFUN LOCAL (SYM)
    (CDR (ASSOC SYM
            (CDR (ASSOC *RULENAME* *LOCALS*)) )) )

(DEFUN RUN-DEMON (SYM &OPTIONAL KEY)
    (EVALIT
      (GET SYM (OR KEY 'DEMON)) ) )

(DEFUN INSTALL-DEMON (SYM &OPTIONAL KEY EVAL-EXPR)
    (SETF (GET SYM (OR KEY 'DEMON)) EVAL-EXPR) )

(DEFUN DO-ERROR (MSG &OPTIONAL VAL)
    (PRINT "ERROR: ") (PRINC MSG) (AND VAL (PRINC VAL)) VAL)

(DEFUN CREATE-CQ (LEN &OPTIONAL VAL)
    (DO* ( (PTR (CONS VAL NIL)) (CNT 1 (+ 1 CNT)) (BOT PTR))
         ( (= CNT LEN) (RPLACD BOT PTR) PTR )
        (SETQ PTR (CONS VAL PTR)) ) )

(DEFUN INSTALL-PARAMETER (SYM &OPTIONAL INIT-VAL Q-LEN DEMON)
    (LET ( (NEWQ (LIST SYM INIT-VAL (OR Q-LEN 1)))
           (P (ASSOC SYM *PARAMETERS*)) )
        (RPLACD (CDDR NEWQ) (CREATE-CQ (OR Q-LEN 1) INIT-VAL))
        (COND (P (RPLACB P NEWQ))
              ((PUSH NEWQ *PARAMETERS*)) )
        (AND DEMON (INSTALL-DEMON SYM 'PARAMETER DEMON))
        NEWQ ) )

(DEFUN PARAMETER (SYM &OPTIONAL ARG2 *VALUE*)
    (LET ( (PARAM-Q (ASSOC SYM *PARAMETERS*)) )
        (COND
            ((NULL ARG2) (CADR (CDDR PARAM-Q)) )
            ((EQ ARG2 'INITIALIZE)
                    (INITIALIZE-PARAMETER SYM) )
            ((EQ ARG2 'GET)
;                         ALL returns (length-q oldest-val....newest-val)
;                              and the cdr is a circular list !!!
```

```
;                          GET +# gives the # elt in seq from old to new
;                          GET 0 gives current, like (PARAMETER 'which).
;                          GET -# gives the # elt previous to newest.
;                    In other words, -# access like stack, +# like queue.
              (COND ((EQ *VALUE* 'ALL)
                     (CONS (CADDR PARAM-Q) (CDR (CDDDR PARAM-Q))) )
                    ((NTH (+ 1 (CADDR PARAM-Q) *VALUE*)
                          (CDDR PARAM-Q) ) ) )
          ((EQ ARG2 'PUT)  (RPLACD (CDDR PARAM-Q)
                            (CDDR (CDDR PARAM-Q)) )
              (RPLACA (CDDR (CDR  PARAM-Q)) *VALUE*)
              (RUN-DEMON SYM 'PARAMETER) *VALUE*) ) ) )

(DEFUN INSTALL-CONSTANT (SYM &OPTIONAL INIT-VAL DEMON)
    (LET ( (C (ASSOC SYM *CONSTANTS*)) )
        (COND (C (RPLACB C (CONS SYM INIT-VAL)))
              ((PUSH (CONS SYM INIT-VAL) *CONSTANTS*)) )
        (AND DEMON (INSTALL-DEMON SYM 'CONSTANT DEMON)) ) )

(DEFUN CONSTANT (SYM &OPTIONAL VAL)
    (COND (VAL (RPLACD (ASSOC SYM *CONSTANTS*) VAL)
               (RUN-DEMON SYM 'CONSTANT) VAL)
          ((CDR (ASSOC SYM *CONSTANTS*))) ) )

(DEFUN INITIALIZE-PARAMETER (SYM)
    (DO* ( (PARAM-Q (ASSOC SYM *PARAMETERS*))
           (LEN (CADDR PARAM-Q) (- LEN 1))
           (VAL (CADR PARAM-Q)) (PTR (CDDDR PARAM-Q) (CDR PTR)) )
         ( (ZEROP LEN) VAL)
         (RPLACA PTR VAL) ) )

(DEFUN CLOBALIST (ELT REP LIS)
    (LET ((FND (MEMBER ELT LIS)))
        (AND FND (RPLACA (CDR FND) REP) LIS) ) )

(DEFUN REMOVE-LIST (ITEMS LIS)
    (PROG (NEWLIS WORKLIS)
        (AND (OR (NULL ITEMS)(NULL LIS)) (RETURN LIS))
        (SETQ WORKLIS LIS NEWLIS NIL)
      LUP:
        (COND ((NULL WORKLIS) (RETURN (REVERSE NEWLIS)))
              ((MEMBER (CAR WORKLIS) ITEMS) NIL)
              (T (SETQ NEWLIS (CONS (CAR WORKLIS) NEWLIS))) )
        (SETQ WORKLIS (CDR WORKLIS))
        (GO LUP:) ) )

(DEFUN PERFORM (&REST TASK)
    (PUSH-PROCESS (CREATE-PROCESS TASK (CURRENT-PRIORITY))) )

(DEFUN START (&REST TASK)
    (INITIALIZE-PROCESS (CREATE-PROCESS TASK (CURRENT-PRIORITY))) )

(DEFUN ABORT (&REST TASK)
    (POP-TASK)
    (PUSH-PROCESS (CREATE-PROCESS TASK (CURRENT-PRIORITY))) )

(DEFMACRO EXECUTE (&REST CODE)
    '(PUSH-TASK '(EVALUATE ,@CODE)) )

(DEFMACRO ASSIGN ( (STAT SYM) TASK)
    '(LET ((TASKPTR (EVAL TASK)))
        (RPLACD (ASSOC SYM (GET-TASK 'STATICS))
                (GET-TASK 'VALUE TASKPTR) ) ) )

(DEFUN INITIALIZE-PROCESS (PROC)
    (MAKE-READY
        (LIST (CAR PROC) (CADR PROC) 'TIME (CADR (CDDR PROC))
              'PROCESS-STACK (LIST PROC) ) ) )

(DEFUN MAKE-READY (PCB &OPTIONAL CURRENTQ)
    (SETQ *READYQ* (NCONC *READYQ* (LIST PCB)))
    (AND CURRENTQ (EVAL '(SETQ ,CURRENTQ (DELETE PCB ,CURRENTQ))))
    PCB )
```

```
(DEFUN MAKE-RUNNING (PCB &OPTIONAL CURRENTQ)
    (SETQ *RPCB* PCB)
    (SETQ *RP* (CAR (GET-PCB 'PROCESS-STACK *RPCB*)))
    (SETQ *TASK* (CAR (GETF *RP* 'PROCESS)))
    (AND CURRENTQ (EVAL `(SETQ ,CURRENTQ (DELETE PCB ,CURRENTQ))))
    *RPCB* )

(DEFUN RUNNING-PROCESS ()
    *RP*)

(DEFUN MAKE-BLOCKED ()
    (PUSH *RPCB* *BLOCKED*)
    (MAKE-RUNNING NIL)
    (CAR *BLOCKED*) )

(DEFUN WAKEUP (ID)
    (LET ( (PCB (ASSOC ID *BLOCKED*)))
       (COND ((AND PCB (RUNNING-PROCESS))
              (MAKE-READY PCB '*BLOCKED*) )
             (PCB
              (MAKE-RUNNING PCB '*BLOCKED*) ) ) ) )

(DEFUN CHOOSE-READY-PROCESS () (CAR *READYQ*))
;       (DO ( (LASTID (GENID 'LAST))
;             (PROCESSES *READYQ* (CDR PROCESSES))
;             (WT 0) (BESTWT 0) (PCB NIL) )
;           ( (NULL PROCESSES) PCB)
;           (SETQ WT (* (CADR (CAR PROCESSES))
;                    (+ 1 (- (CAAR PROCESSES) LASTID))))
;           (COND ((> WT BESTWT)
;                  (SETQ PCB (CAR PROCESSES))
;                  (SETQ BESTWT WT) )) ) )

(DEFUN CRITICIZE-RULES (RULES SELMODE) RULES )

(DEFUN PHASE-DISPLAY (&OPTIONAL PHASE)
    (WINDOW-PRINT 'PHASE-WINDOW (CONSTANT 'WELD-PHASE)) )

(DEFUN STATUS-REPORT (MSG)
    (WINDOW-PRINT 'MSG-WINDOW '"STATUS REPORT:" MSG) )

(DEFUN TIME-DISPLAY (WHAT TQ)
    (WINDOW-PRINT 'TIME-WINDOW WHAT TQ) )

(DEFUN ABORT-WELD ()
   (WINDOW-PRINT 'PHASE-WINDOW 'ABORTED)
   (WINDOW-PRINT 'MSG-WINDOW '"W E L D I N G    A B O R T E D ! ! !") )

(DEFUN WIDTH-DEMON (W)
    (WINDOW-PRINT 'WIDTH-WINDOW W) )

(DEFUN I-DEMON (I)
    (WINDOW-PRINT 'CURRENT-WINDOW I) )

(DEFUN SPEED-DEMON (S)
    (WINDOW-PRINT 'SPEED-WINDOW S) )

(DEFUN SGT-DEMON (S)
    (WINDOW-PRINT 'SGT-WINDOW S) )

; ONLY SELECTS ONE RULE SO FAR.

;(DEFUN INSTANTIATE-RULES (RSNAME RULELIST SELMODE)
;   (DO ( (*RULENAME* NIL) (ANSWER NIL)
;         (RULES RULELIST (CDR RULES)) )
;       ( (OR ANSWER (NULL RULES)) (AND ANSWER (LIST ANSWER)) )
;       (SETQ *RULENAME* (CAAR RULES))
;       (SETQ ANSWER (SATISFY-RULE (CAR RULES))) ) )
```

```
(DEFUN INSTANTIATE-RULES (RSNAME
                         RULELIST CSET SELMODE *LOCALS* *GLOBALS* *TASK*)

(DO* ( (*RULENAME* NIL) (ANSWER NIL) (FND NIL)
         (RULES (CASE SELMODE
                      ((STFL STFD)
                       (LOOP (COND ((OR FND (NULL RULELIST))
                                    (RETURN RULELIST))
                                   ((EQ (CAAR RULELIST) (CAR CSET))
                                    (SETQ FND T) )
                                   (T (SETQ RULELIST (CDR RULELIST))) ) ) )
                      (OTHERWISE RULELIST) )
                (CDR RULES)) )
        ( (OR ANSWER (NULL RULES))
          (COND (ANSWER
                  (CASE SELMODE
                        ((FD TRY) (CLOBALIST 'CSET 'DONE *TASK*))
                        (STFD (CLOBALIST 'CSET (DELETE *RULENAME* CSET) *TASK*)
                              (OR (GET-TASK 'CSET *TASK*)
                                  (CLOBALIST 'CSET 'DONE *TASK*) ) )
                        (STFL (CLOBALIST 'CSET (DELETE *RULENAME* CSET) *TASK*)
                              (OR (GET-TASK 'CSET *TASK*)
                                  (CLOBALIST 'CSET
                                             (COPY-TREE
                                               (GET-RULESET-ITEM RSNAME 'CSET) )
                                             *TASK*) ) )
                        (OTHERWISE NIL) )
                  (LIST ANSWER) )
                (T (CASE SELMODE
                         (TRY (CLOBALIST 'CSET 'DONE *TASK*)) )
                   (LIST ANSWER) ) ) )
        (SETQ *RULENAME* (CAAR RULES))
        (SETQ ANSWER (SATISFY-RULE (CAR RULES) *LOCALS* *GLOBALS*)) ) )

(DEFUN SATISFY-RULE (RULE *LOCALS* *GLOBALS*)
   (AND (EVAL (CADR RULE)) RULE) )

(DEFUN BUILD-SYMTAB (RSNAME KEY)
   (COPY-TREE (CADR (ASSOC KEY (GET-RULESET RSNAME)))) )

(DEFUN SEND-COMMAND (DEBUGON)
   (LET (MSGOUT)
      (COND (*BLOCKED*
              (MAKE-RUNNING (POP *BLOCKED*) )
              (WINDOW-PRINT 'TIME-WINDOW '"OUT:" (GETTIME))
              (SETQ MSGOUT (GET-TASK 'TASK))
              (CASE (CAR MSGOUT)
                    (NET-MESSAGE
                      (WINDOW-PRINT 'CTRL-WINDOW '"SENDING COMMAND:"
                                    MSGOUT )
                      (PLACE-MSG-LIST MSGOUT MACHINE-ID 5)
                      (PRINT (CONS *COUNT* MSGOUT) *RESULT-STREAM*) )
                    (OTHERWISE (WINDOW-PRINT 'MSG-WINDOW MSGOUT)) )
              (POP-TASK)
              (MAKE-READY *RPCB*)
              (MAKE-RUNNING NIL) T ) ) ) )

(DEFUN UPDATE-PARAMETERS ()
   (LET (DATIN)
      (INCF *COUNT*)
      (WINDOW-PRINT 'TIME-WINDOW '"IN:" (GETTIME))
      (WINDOW-PRINT 'SENSOR-WINDOW '"GETTING DATA POINT: " *COUNT* )
      (SETQ DATIN (READ *SENSOR-STREAM*))
      (EVAL DATIN)
      (AND DEBUGON
           (CONSOLE '"SIMULATE THE RECEPTION OF MORE PARAMETERS?") )
      ))
(DEFMACRO UPDATE-PARAMETER (NAME VAL)
   (INCF *COUNT*)
   (WINDOW-PRINT 'TIME-WINDOW "IN:" (GETTIME))
   (WINDOW-PRINT 'SENSOR-WINDOW "RECEIVED DATA POINT: " *COUNT*)
   (PARAMETER (QUOTE ,NAME) (QUOTE PUT) (QUOTE ,VAL)))
```

```
(DEFUN REQUEST-TASK ()
    (OR *BLOCKED* *RPCB* *READYQ*                   ; anything in system to do?
        (LET ((TASK))
             (TERPRI)
             (PRINC '"WAITING FOR TASK: ")
             (SETQ TASK (READ))
             (PRINT '"STARTING TASK") (EVAL TASK) ) ) )

; ONLY * in the matcher below may have variables. This IS NOT a UNIFIER !!

(DEFUN MATCH-TASKS (X Y)
    (AND (EQ (LENGTH X) (LENGTH Y))
         (DO ( (XITEMS X (CDR XITEMS)) (YITEMS Y (CDR YITEMS))
               (BDGS NIL) (FAILED NIL) )
             ( (OR FAILED (NULL XITEMS)) (AND (NOT FAILED) (LIST BDGS)) )
             (COND ((EQUAL (CAR XITEMS) (CAR YITEMS)) NIL)
                   ((VARIABLEP (CAR XITEMS))
                       (SETQ BDGS (CONS (CAR XITEMS)
                                        (CONS (CAR YITEMS) BDGS)) ) )
                   ((SETQ FAILED T)) ) ) ) )

(DEFUN VARIABLEP (ITEM)
    (AND (NOT (ATOM ITEM))
         (MEMBER (CAR ITEM) '(STATIC GLOBAL LOCAL)) ) )

(DEFUN UNQUIFY (X)
    (COND ((AND (CONSP X)(EQ (CAR X) 'QUOTE)) (EVAL X))
          (T X) ) )

(DEFUN TIME-DERIV (Q)
    (LET* ( (X3 (CAR Q)) (Y1 (CADR Q)) (Y3 (NTH X3 Q)) (X1 1)
            (X2 (TRUNCATE (/ X3 2))) (Y2 (NTH X2 Q)) A B)
        (SETQ A (* (/ 1 (- X1 X3))
                   (- (/ (- Y1 Y2) (- X1 X2)) (/ (- Y2 Y3) (- X2 X3))) ))
        (SETQ B (* (/ (+ X1 X2) (- X1 X3))
                   (- (/ (- Y2 Y3) (- X2 X3))) ))
        (+ B (* 2 A X3)) ) )

(DEFUN W-TIME-DERIV (Q)
    (- (NTH (CAR Q) Q) (NTH (1- (CAR Q)) Q) ) )

(DEFUN NEAR-ZERO (X)
    (AND (NUMBERP X)
         (< (ABS X) *EPSILON*) ) )

(DEFUN QQTATUS (&OPTIONAL STREAM)
    (TERPRI STREAM)
    (PRINC '"=== PROCESS STATUS === " STREAM)
    (PRINC *COUNT* STREAM)
    (PRINC '" TIME:" STREAM)
    (PRINC (GETTIME) STREAM)
    (AND *BLOCKED* (PRINT '*BLOCKED* STREAM)
                   (PPRINT *BLOCKED* STREAM))
    (AND *READYQ*  (PRINT '*READYQ* STREAM)
                   (PPRINT *READYQ* STREAM))
    (AND *RPCB*    (PRINT '*RPCB* STREAM)
                   (PPRINT *RPCB* STREAM)) NIL )

(DEFUN PRINT-ELEMENTS (X)
    (MAPCAR #'PRINT X) NIL)

(DEFUN PRELOAD-RULESETS ()
    (MAPCAR #'(LAMBDA (NAME) (LOAD-RULESET NAME)) *RULESET-NAMES*)
    '"LOADED ALL RULESETS")

(DEFUN LOAD-RULESET (RSNAME)
    (PUSH (READ1-FILE-EXPR (CDR (ASSOC RSNAME *RULESET-FILE-ALIST*))
                            '*RSET-STREAM*)
```

```
         *RULEBASE* ) )

(DEFUN CONSOLE ()
   (BREAK "<<< A C C E P T I N G   C O N S O L E   I N P U T >>>"))

;; EXPERT.INT  INITIALIZES EXPERT SYSTEM. LOAD BEFORE OR DURING RUN.
;;--- ------------------------------------------------------------------

(SETQ *READYQ* NIL *LOWEST-PRIORITY* 1 *RP* NIL *TASK* NIL *RPCB* NIL)
(SETQ *RULEBASE* NIL)

;; ALL KNOWN RULESET NAMES WITH THEIR ASSCOIATED FILENAMES.
(SETQ *RULESET-FILE-ALIST* '( (WP    . "WP.RLS")
                              (PWCRS . "PWCRS.RLS")
                              (ADPRS . "ADPRS.RLS")
                              (TLCRS . "TLCRS.RLS")
                              (THCRS . "THCRS.RLS")
                              (TSPRS . "TSPRS.RLS")
                              (TWPRS . "TWPRS.RLS")
                              (CHCRS . "CHCRS.RLS")
                              (CHSRS . "CHSRS.RLS")

))

(SETQ *RULESET-NAME* NIL)
(SETQ *RULESET-NAMES* '(WP ADPRS PWCRS TLCRS THCRS TSPRS TWPRS CHCRS CHSRS))
(SETQ *BLOCKED* NIL)
(SETQ *PARAMETERS* NIL)
(SETQ *CONSTANTS* NIL)
(SETQ *EPSILON* 0.10)
(PRELOAD-RULESETS)
;; PARMS.INT  INITIALIZES (INSTALLS) PARAMETERS AND CONSTANTS.
;;--- ------------------------------------------------------------------
;;
; CONSTANTS (INSTALL-CONSTANT 'DEWPOINT-TEMP -60)
(INSTALL-CONSTANT 'WMINP 5.065)
(INSTALL-CONSTANT 'WMINC 5.237)
(INSTALL-CONSTANT 'WMAXC 5.580)
(INSTALL-CONSTANT 'WMAXP 5.750)

(INSTALL-CONSTANT 'W0 5.41)
(INSTALL-CONSTANT 'S0 21)
(INSTALL-CONSTANT 'I0 272)

(INSTALL-CONSTANT 'DELTA-I-HIGH 5)
(INSTALL-CONSTANT 'DELTA-I-LOW 2.5)
(INSTALL-CONSTANT 'DELTA-S-HIGH 1)
(INSTALL-CONSTANT 'DELTA-S-LOW 0.5)
(INSTALL-CONSTANT 'D-HIGH 0.25)
(INSTALL-CONSTANT 'D-LOW 0.05)

(INSTALL-CONSTANT 'STIME '(0 0 0))
(INSTALL-CONSTANT 'WELD-ABORTED NIL '(ABORT-WELD) )
(INSTALL-CONSTANT 'WELD-COMPLETED NIL
                  '(STATUS-REPORT 'WELD-COMPLETED))
(INSTALL-CONSTANT 'WELD-PHASE 0  '(PHASE-DISPLAY (CONSTANT 'WELD-PHASE)))

; PARAMETERS (INSTALL-PARAMETER 'WIDTH 0 5 '(WIDTH-DEMON (PARAMETER 'WIDTH)))
(INSTALL-PARAMETER 'I 0 5 '(I-DEMON (PARAMETER 'I)))
(INSTALL-PARAMETER 'SPEED 0 1 '(SPEED-DEMON (PARAMETER 'SPEED)))
(INSTALL-PARAMETER 'SHIELD-GAS-TEMP -65 1
                   '(SGT-DEMON (PARAMETER 'SHIELD-GAS-TEMP)))
```

```
;; WINDOWS.LSP   CODE SPECIFIC TO CREATE EXPERT SYSTEM DISPLAY WINDOWS.
;;----------------------------------------------------------------------
;;
; A DEFINITION OF PPRINT TO PRINT CONVENIENTLY TO THE WINDOW (STREAM)
; SPECIFIED. NEED TO PRE-LOAD SYSTEM PPRINT TO USE IT.

(PPRINT '"LOADING AND STARTING A WINDOW SCREEN")

(DEFUN WINDOW-PRINT (STREAM &REST OBJECT)
   (LET ((*PPRINT-QUOTE* NIL)
         (PPRINT-COLUMN 0)
         (*STANDARD-OUTPUT* (EVAL STREAM)) )
      (PUTPROP STREAM OBJECT 'LASTMSG)
      (CLEAR-WINDOWS (LIST STREAM))
      (EVAL '(SEND ,STREAM :SET-CURSORPOS 0 1))
      (I-PPRINT OBJECT)
      (VALUES NIL) ) )

(DEFUN I-PPRINT (OBJ)
   (EVAL '(PPRINT (QUOTE ,OBJ) *STANDARD-OUTPUT*)))

; DEFINE THE DISPLAY WINDOWS
;   NOTE THAT THE FIRST 5 KEYWORDS ARE COMMON TO ALL WINDOWS.

; MASTER LIST OF WINDOWS, AND WHAT IF ANY PARAMETERS/CONSTANTS GO THERE.

(SETQ *WINDOW-LIST*
   '(BACKGROUND-WINDOW SENSOR-WINDOW CTRL-WINDOW RULE-WINDOW
     CURRENT-WINDOW SPEED-WINDOW PHASE-WINDOW
     WIDTH-WINDOW SGT-WINDOW TIME-WINDOW
     MSG-WINDOW CONSOLE-WINDOW
   ))

(SETQ *WINDOW-ALIST*
   '( (CURRENT-WINDOW   (PARAMETER 'I))
      (SPEED-WINDOW    (PARAMETER 'SPEED))
      (PHASE-WINDOW    (CONSTANT 'WELD-PHASE))
      (WIDTH-WINDOW    (PARAMETER 'WIDTH))
      (SGT-WINDOW      (PARAMETER 'SHIELD-GAS-TEMP))
      (TIME-WINDOW     (CONSTANT 'STIME))
   ))

(SETF BACKGROUND-WINDOW
   (MAKE-WINDOW-STREAM
      :CURSORPOS-X 0
      :CURSORPOS-Y 0
      :ATTRIBUTE 7
      :STATUS 4
      :PAGE 0
      :TOP 0
      :LEFT 0
      :WIDTH 79
      :HEIGHT 24
   ))

(PUTPROP 'BACKGROUND-WINDOW
         '"*** E X P E R T    W E L D I N G    S Y S T E M ***" 'HEADER)

(PUTPROP 'BACKGROUND-WINDOW
         '(PROGN (SEND BACKGROUND-WINDOW :SET-CURSORPOS 24 19)
                 (SEND BACKGROUND-WINDOW :WRITE-STRING
                       '"O P E R A T O R    C O N S O L E") )
         'TEXT )

(SETF SENSOR-WINDOW
   (MAKE-WINDOW-STREAM
      :CURSORPOS-X 0
      :CURSORPOS-Y 0
      :ATTRIBUTE 7
      :STATUS 4
      :PAGE 0
```

```
          :TOP 2
          :LEFT 0
          :WIDTH 30
          :HEIGHT 4
    ))

(PUTPROP 'SENSOR-WINDOW '"SENSOR PORTS:" 'HEADER)

(SETF CTRL-WINDOW
    (MAKE-WINDOW-STREAM
          :CURSORPOS-X 0
          :CURSORPOS-Y 0
          :ATTRIBUTE 7
          :STATUS 4
          :PAGE 0
          :TOP 2
          :LEFT 40
          :WIDTH 29
          :HEIGHT 4
    ))

(PUTPROP 'CTRL-WINDOW '"CONTROL PORTS:" 'HEADER)

(SETF RULE-WINDOW
    (MAKE-WINDOW-STREAM
          :CURSORPOS-X 0
          :CURSORPOS-Y 0
          :ATTRIBUTE 7
          :STATUS 4
          :PAGE 0
          :TOP 7
          :LEFT 0
          :WIDTH 30
          :HEIGHT 7
    ))

(PUTPROP 'RULE-WINDOW '"RULE ACTIVATION STATUS:" 'HEADER)

(SETF CURRENT-WINDOW
    (MAKE-WINDOW-STREAM
          :CURSORPOS-X 0
          :CURSORPOS-Y 0
          :ATTRIBUTE 7
          :STATUS 4
          :PAGE 0
          :TOP 7
          :LEFT 40
          :WIDTH 10
          :HEIGHT 3
(PUTPROP 'CURRENT-WINDOW '"AMPERES" 'HEADER)

(SETF SPEED-WINDOW
    (MAKE-WINDOW-STREAM
          :CURSORPOS-X 0
          :CURSORPOS-Y 0
          :ATTRIBUTE 7
          :STATUS 4
          :PAGE 0
          :TOP 7
          :LEFT 55
          :WIDTH 10
          :HEIGHT 3
    ))

(PUTPROP 'SPEED-WINDOW '"TIP-SPEED" 'HEADER)

(SETF PHASE-WINDOW
    (MAKE-WINDOW-STREAM
          :CURSORPOS-X 0
          :CURSORPOS-Y 0
          :ATTRIBUTE 7
          :STATUS 4
```

```
            :PAGE 0
            :TOP 7
            :LEFT 70
            :WIDTH 10
            :HEIGHT 3
        ))

(PUTPROP 'PHASE-WINDOW '"PHASE" 'HEADER)

(SETF WIDTH-WINDOW
    (MAKE-WINDOW-STREAM
        :CURSORPOS-X 0
        :CURSORPOS-Y 0
        :ATTRIBUTE 7
        :STATUS 4
        :PAGE 0
        :TOP 11
        :LEFT 40
        :WIDTH 10
        :HEIGHT 3
    ))

(PUTPROP 'WIDTH-WINDOW '"WIDTH" 'HEADER)

(SETF SGT-WINDOW
    (MAKE-WINDOW-STREAM
        :CURSORPOS-X 0
        :CURSORPOS-Y 0
        :ATTRIBUTE 7
        :STATUS 4
        :PAGE 0
        :TOP 11
        :LEFT 55
        :WIDTH 10
        :HEIGHT 3
(PUTPROP 'SGT-WINDOW '"S.G.TEMP" 'HEADER)

(SETF TIME-WINDOW
    (MAKE-WINDOW-STREAM
        :CURSORPOS-X 0
        :CURSORPOS-Y 0
        :ATTRIBUTE 7
        :STATUS 4
        :PAGE 0
        :TOP 11
        :LEFT 70
        :WIDTH 10
        :HEIGHT 3
    ))

(PUTPROP 'TIME-WINDOW '"TIME" 'HEADER)

(SETF MSG-WINDOW
    (MAKE-WINDOW-STREAM
        :CURSORPOS-X 0
        :CURSORPOS-Y 0
        :ATTRIBUTE 7
        :STATUS 4
        :PAGE 0
        :TOP 15
        :LEFT 0
        :WIDTH 79
        :HEIGHT 4
    ))

(PUTPROP 'MSG-WINDOW '"EXPERT    SYSTEM    MESSAGES" 'HEADER)

(SETF CONSOLE-WINDOW
    (MAKE-WINDOW-STREAM
        :CURSORPOS-X 0
        :CURSORPOS-Y 0
```

```
      :ATTRIBUTE 7
      :STATUS 4
      :PAGE 0
      :TOP 20
      :LEFT 0
      :WIDTH 79
      :HEIGHT 5
))

; CLEAR ALL WINDOWS CREATED, AND SET STANDARD INPUT TO THE CONSOLE WINDOW.

(DEFUN CLEAR-WINDOWS (&OPTIONAL LIS RESTORE)
    (MAPCAR #'(LAMBDA (X)
                (EVAL '(SEND ,X :CLEAR-SCREEN))
                (WRITE-HEADER X RESTORE) )
            (OR LIS *WINDOW-LIST*) )
    NIL )

(DEFUN WRITE-HEADER (WIND &OPTIONAL RESTORE)
    (LET* ( (STR (GET WIND 'HEADER)) (TEXTEXP (GET WIND 'TEXT))
            (LEN NIL) (MSG (GET WIND 'LASTMSG))
            (WID (EVAL '(SEND ,WIND :SIZE))) )
        (COND (STR
                (SETQ LEN (LENGTH STR))
                (EVAL '(SEND ,WIND :SET-CURSORPOS 0 0))
                (EVAL '(SEND ,WIND :CLEAR-EOL))
                (EVAL '(SEND ,WIND :SET-CURSORPOS
                                    (TRUNCATE (/ (- WID LEN) 2))
                                    0 ))
                (EVAL '(SEND ,WIND :WRITE-STRING ,STR))
                (EVAL TEXTEXP)
                (EVAL '(SEND ,WIND :SET-CURSORPOS 0 1))
                (AND RESTORE MSG
                    (EVAL '(WINDOW-PRINT WIND
                             ,@(QUOTLIS MSG) )) )
               (T NIL) ) ) )

(DEFUN QUOTLIS (LIS)
    (MAPCAR #'(LAMBDA (X) (COND ((OR (STRINGP X) (NUMBERP X)) X)
                                (T (LIST 'QUOTE X)) ))
            LIS ) )

(DEFUN REFRESH-WINDOW-DATA (&OPTIONAL LIS)
    (DO ( (WINDOWS (OR LIS *WINDOW-LIST*) (CDR WINDOWS))
          (VAL NIL) )
        ( (NULL WINDOWS) T)
        (SETQ VAL (EVAL (CADR (ASSOC (CAR WINDOWS) *WINDOW-ALIST*))))
        (AND VAL (WINDOW-PRINT (CAR WINDOWS) VAL)) ) )

; CLEAR ALL WINDOWS CREATED, AND SET STANDARD I/O TO THE CONSOLE WINDOW.

(SETF *STANDARD-INPUT* CONSOLE-WINDOW)
(SETF *STANDARD-OUTPUT* CONSOLE-WINDOW)
(SETF *TERMINAL-IO* CONSOLE-WINDOW)

(CLEAR-WINDOWS)
(REFRESH-WINDOW-DATA)
```

Appendix IV

```
;; SEMNET.LOD    LOADING SOURCE FOR SEMANTIC NETWORK.
;;---------------------------------------------------------------

(LOAD "C:\\GCLISP2\\LIB\\SEMNET\\NETDEF")
(LOAD "C:\\GCLISP2\\LIB\\SEMNET\\DISNET")
(LOAD "C:\\GCLISP2\\LIB\\SEMNET\\RETRIEVE")
(LOAD "C:\\GCLISP2\\LIB\\SEMNET\\CHAIN")
(LOAD "C:\\GCLISP2\\LIB\\SEMNET\\UNINDEX")
(LOAD "C:\\GCLISP2\\LIB\\SEMNET\\VARIANT")
(LOAD "C:\\GCLISP2\\LIB\\SEMNET\\LISTDB")
(LOAD "C:\\GCLISP2\\LIB\\SEMNET\\UNIFY")
(LOAD "C:\\GCLISP2\\LIB\\SEMNET\\INDEX")
(LOAD "C:\\GCLISP2\\LIB\\SEMNET\\ACCESS")
(LOAD "C:\\GCLISP2\\LIB\\SEMNET\\SCHED")
```

```
;; NETDEF.LSP DEFINITIONS OF STRUCTURES USED FOR SEMANTIC NETWORK.
;;---------------------------------------------------------------------

(DEFVAR *DATA-BASE* NIL)                    ; GLOBAL POINTER TO WHOLE NET (DEFVAR *PCVARBDGS* NIL)                    ; FOR CHAIN
(DEFVAR *NOTE* NIL)
(DEFVAR *SUBS* NIL)

(DEFVAR MARKED-NODE NIL)                    ; FOR UNINDEX (DEFVAR *VL1* NIL)                          ; FOR VARIANT
(DEFVAR *VL2* NIL)

;(DEFUN *VAR*-MAKER (STRM CHR)
;   (LIST '*VAR* (READ STRM)))

;;(readmacro "?" (lambda () (list '*VAR* (read))))

;;(SET-MACRO-CHARACTER 63 #'*VAR*-MAKER)    ;PREFER NOT TO DEFINE A READMACRO (DEFMACRO ? (SYM)                           ; THIS WORKS OK...
   `(*VAR* ,SYM))

(DEFMACRO *VAR* (X)
   `(FUNCALL #'PCVAR-VAL ',(MAKE-PCVAR X) *PCVARBDGS*))

;;(record-type linque () (key . a-list))

;;(DEFSTRUCT (LINQUE (:TYPE LIST)) KEY  A-LIST)  ;a branch (DEFUN MAKE-LINQUE (KEY A-LIST)             ;DEFINE STRUCTURE BY HAND.
   (CONS KEY A-LIST))

(DEFUN LINQUE-KEY (LINQUE)
   (CAR LINQUE))

(defun linque-a-list (x) (cdr x))           ;need to redefine since defstruct does
                                            ;not allow dotted pairs.

;;(record-type terminal () (key . item))

;;(DEFSTRUCT (TERMINAL (:TYPE LIST)) KEY ITEM)  ;a leaf (DEFUN MAKE-TERMINAL (KEY ITEM)
   (CONS KEY ITEM))

(DEFUN TERMINAL-KEY (TERMINAL)
   (CAR TERMINAL))

(defun terminal-item (x) (cdr x))           ;see above

;;(record-type pcvar *VAR* (sym))

;;(DEFSTRUCT (PCVAR (:TYPE LIST)) (ID '*VAR*) SYM)   ;pred calc variable=
                                                     ;(*var* variablename)
(DEFUN MAKE-PCVAR (SYM)
   (CONS '*VAR* (NCONS SYM)))
(DEFUN PCVAR-SYM (VAR)
   (SECOND VAR))

(DEFUN PCVAR-P (X)                          ;have to define, cause defstruct doesn
   (AND (CONSP X)(IS*PCVAR X)))

(DEFUN IS*PCVAR (X)
   (EQ (CAR X) '*VAR*))

(defun pcvar-val (pcvar sub)                ;assumes given (*var* x) and assoclis
   (let ((bndg (sym-lookup (pcvar-sym pcvar) sub)))
      (cond (bndg (varsubst (bdg-val bndg) sub))   ;rtn current val
            (t pcvar) )))                   ;or just the var itse
```

```
(defun sym-lookup (sym sub) (assoc sym sub ))

(DEFUN VARSUBST (PAT SUBS)
  (LET ((VAR (CONTAINS-PCVAR PAT)) SUB)
    (COND ((AND VAR
                (SETQ SUB (BDG-VAL (SYM-LOOKUP (PCVAR-SYM VAR) SUBS))))   ;SUBS
REQ?
           (VARSUBST (SUBST SUB VAR PAT) SUBS))
          (T PAT))))

(DEFUN CONTAINS-PCVAR (PAT)
  (COND ((PCVAR-P PAT) PAT)
        ((CONSP PAT)
         (OR (CONTAINS-PCVAR (CAR PAT))
             (CONTAINS-PCVAR (CDR PAT))))))

;; GCLISP SUBST DOES NOT WORK ON LISTS FOR NEW AND OLD. REDEFINED.
(DEFUN SUBST (new old GIVEN)
  (COND ((EQUAL OLD GIVEN) NEW)
        ((NULL GIVEN) NIL)
        ((ATOM GIVEN) GIVEN)
        (T
         (CONS (SUBST new old (CAR GIVEN))
               (SUBST new old (CDR GIVEN))))))

;;(defun is-pcvar (x) (and (not (atom x)) (is*pcvar x)))

;;(record-type bdg () (sym val))

;;(DEFSTRUCT (BDG (:TYPE LIST)) SYM VAL)          ;a (symbol value) pair (DEFUN MAKE-BDG (SYM VAL)
  (CONS SYM (NCONS VAL)))

(DEFUN BDG-SYM (BDG)
  (CAR BDG))

(DEFUN BDG-VAL (BDG)
  (SECOND BDG))

;; (record-type restrn () (vars pred))
(DEFSTRUCT (RESTRN (:TYPE LIST)) VARS PRED)      ;Restriction form for use by
                                                 ;retriever. Makes sure that pcvar bdgs
                                                 ;satisfy some predicate.
;; DISNET.LSP BASIC FUNCTIONS FOR TRAVERSING DISCRIMINATION TREE
;;-------------------------------------------------------------------
;;
;; DISNET --discrimination net-
;; Basic idea from CRM, extended and enhanced toward Common Lisp.

;; Basic accessing functions:

(defun index (formula)
    (cond ((eq (car formula) '<--)         ;backward chaining assertion?
           (index2 (cdr formula) formula (cadr *data-base*)) )
          ((eq (car formula) '-->)         ;forward chaining assertion?
           (index2 (cdr formula) formula (caddr *data-base*)) )
          ((eq (car formula) '@)           ;simple premise is asserted.
           (index2 (cadr formula) (caddr formula) (car *data-base*)) )
          (t
           (index2 formula formula (car *data-base*))) ) )

(defun fetch (pattern)
   (cond ((eq (car pattern) '<--)          ;look for backward chaining
          (fetch2 (cdr pattern) (cadr *data-base*)) )
         ((eq (car pattern) '-->)          ;look for forward chaining
          (fetch2 (cdr pattern) (caddr *data-base*)) )
         (t                                ;look for simple premise
          (fetch2 pattern (car *data-base*))) ) )
```

```
:: The function  retrieve  is in the file   retrieve  and the function
:: add  is in the file  chain .

;;
:: These next two functions are a slight change from the 'index' function
::    from chapter 11, p.127, CRM.
::
(defun index2 (dkey item llink)
    (let ((terminal-link (establish-links dkey llink)))
        (rplacd terminal-link
                (ADJOIN item (terminal-item terminal-link)))))

::
:: These next 2 functions are from chapter 11, p.127, CRM.
::
(defun establish-links (dkey llink)
    (cond  ((or (atom dkey) (is*pcvar dkey))
            (establish-link dkey llink))
           (t
            (establish-links (cdr dkey)          ;recursive
                             (establish-links (car dkey)
                                              (establish-link 'cons
                                                              llink)))
)))

(defun establish-link (key llink)
   (let ((tkey (cond ((PCVAR-P key) '*VAR*)
                     (t key))))
     (cond ((assoc tkey llink))
           (t (let ((new-link (make-linque tkey nil)))
                (rplacd llink (cons new-link (cdr llink)))
                new-link)) )))
::
::
::
(defun fetch2 (pattern llink)
   (for term in  (tlinks pattern llink))
        (splice (copy-tree (cdr term)))))          ;or copy-list??????

::
:: This is the 'traverse-links2' functions renamed.
::
(defun tlinks (pattern llink)
 (cond  ((pcvar-p pattern) (skip-exp llink))
        (t (append
            (cond ((atom pattern) (tlink pattern llink))
                  (t (for
                        (sub-sub in
                                (for (sub-link in (tlink 'cons llink))
                                     (splice (tlinks (car pattern)
                                                     sub-link))))
                        (splice (tlinks (cdr pattern) sub-sub)))))
            (tlink '*VAR* llink)))))

::
::  This is the 'traverse-link' function.
::
(defun tlink (key llink)
         (let ((a-list (assoc key (linque-a-list llink))))
              (cond (a-list (list a-list)))))

(defun skip-exp (llink)
    (for (lower-link in  (linque-a-list  llink))
        (splice
            (cond ((neq (linque-key  lower-link) 'cons)
                   (list lower-link))

:: this is the code added as a result of exercise 14.3.

(t (for (skip-link in (skip-exp lower-link))
                        (splice (skip-exp skip-link))))  ))))
```

```
;; RETRIEVE.LSP    SOURCE FOR RETRIEVING DATA FROM SEMANTIC NET
;;-------------------------------------------------------------
;;
;; RETRIEVE -- retrieval with restrictions
;; Retrieval without restrictions is as in CRM -- (retrieve pat)
;; i.e., the basic form looks like   (retrieve '(human Socrates))
;; and you don't need to read any further, except to note that
;; (retrieve '(human ?x)) returns a list of substitutions (substitution
;; = list of bindings), whereas  (answers '(human ?X)) returns
;; ((human Socrates) (human Fred) ... ), and to learn about initializing a data
;; base with create-db, use-dbr, and the functions make-data, save-data, and
;; restore-data in $reset-db.

;; For restrictions, use (retrieve pat restrictions) as discussed below.

;; DEDUCTIVE RETRIEVER -- CRM P.150          7/27/81
;; Enhanced by Peter Greene.

;; The assertions are kept in a data-base called *DATA-BASE*.
;; This data-base is manipulated by the functions in DOSNET.
;; Therefore, you should first  (setq *data-base* your-current-database) .

;; Given a request pattern, RETRIEVE returns a list of substitutions.
;; They include useless intermediate substitutions, and you can't always
;; directly see the value of the variable in your request, because
;; if this value is the result of a chain of bindings, RETRIEVE will return
;; the chain of bindings, in no particular order, leaving it up to you to
;; link your variable with the constant at the end of the chain.
;; The function (varsubst pat substitution) returns a new version of  pat  with
;; all its variables replaced by their values as determined from  substitution .
;; Using this, I have defined a function  (answers request) that returns a list
;; whose elements are versions of  request  with its variables evaluated
;; according to each substitution found by (retrieve request).  One way to
;; print this legibly is to apply the function  print-elements  to it.
;; (print-elements lis) prints each element of  lis  on a new line.
;; Thus, you may want to  (print-elements (answers request)) .

;; ****We should also define a function that returns an a-list of request
;; variables and their bindings, according to each substitution, without
;; the intermediate results.

;; The internal representation of a predicate-calculus variable is  (*VAR* x) .

;; The functions  index  and  fetch  are in the file  $index .  Different
;; versions will be appropriate for different purposes.

;; The data-base should first be initialized by  (create-db 'name) and
;; (use-dbr 'name) , or (reset-db).

;; RETRIEVAL WITH RESTRICTIONS:
;; A request consists of a pattern and a list of restrictions (i.e., the
;; restrictions are packaged into a list.
;; A restriction consists of a predicate and a collection of variables
;; that must satisfy the restriction in any substitution that is returned.
;; It is questionable whether a restriction should look like
;;     ((x y z) (foo x))    --note that the function uses the 1st var in the list
;; or
;;     ((foo x) x y z)
;; That is why I used a record-type below.  The record-types for the two forms
;; are, respectively:
;;       (record-type restrn () (vars pred))
;; and   (record-type restrn () (pred . vars))
;; If we choose the former, a retrieval might look like
;;    (retrieve '(?x gave ?y to ?z because ?w)
;;              '( ((x z) isperson)    -- could have used (isperson x)
;;                 ((y) (and (is-book y) (> (pages y) 500)))
;;                 ((w v) (and (is-reason w) (good w))) ) )

;; If we choose the latter, the same retrieval would look like
;;    (retrieve '(?x gave ?y to ?z because ?w)
;;              '( (isperson x z)
```

```
::                    ((and (is-book y) (> (pages y) 500)) y)
::                    ((and (is-reason w) (good w)) w v) ) )

:: I'll arbitrarily choose the first format.  If you don't like it, just
:: change the record-type definition.

::   In either form above, the restriction is intended to apply to the variable
:: x, y, and z, i.e., all the variables in the variable list.  THE VARIABLE
:: USED IN THE FUNCTIONAL TEST SHOULD BE THE SAME AS THE FIRST VARIABLE IN
:: THE VARIABLE LIST.
::   Clearly, it would be nice to handle functions of more than one variable
:: -- e.g. to retrieve '(and (man ?x) (woman ?y), subject to (loves x y),
:: or to retrieve '(loves ?x ?y) subject to (and (man x) (woman y)) --
:: but this will require too much code and too much searching to do
:: routinely.  If you wish to do this, then put the screening in your
:: own program.

(defun retrieve (pat &optional restrs)
    (cond (restrs
            (for (substn in (retrieve-aux pat))
                (when (sat-restrs substn restrs)) (save substn) ) )
          (t (retrieve-aux pat)) ) )

(defun sat-restrs (substn restrs)
    (for-all (restr in restrs)
        (let ((varlist  (restrn-vars restr))
              (pred     (restrn-pred restr)))
          (let ((resfun  (cond ((atom pred) pred)
                               (t (make-lambda (list (car varlist)) pred)) )))
            (for-all (bdg in substn)
                (or (not (member (car bdg) varlist))
                    (resfun (cadr (varsubst bdg substn))) ) ) ) ) ) )

(defun retrieve-aux (request)
   (cond ((and (symbolp (car request))
               (getprop (car request) 'retrieve-program) )
          (funcall (getprop (car request) 'retrieve-program) (cdr request)) )
         (t
          (nconc (for (a in (fetch request))
                    (splice (unify request (vars-rename a))) )
                 (let ((implpat '(<-- ,request #.(? subreq))))
                    (for (a in (fetch implpat))
                        (splice (chain implpat a)) )))) ))

:: If assertion A unifies with IMPLPAT = (<-- original-request ?SUBREQ),
:: try subrequest.
:: (defun chain (implpat a)
::    (for (sub in (unify implpat (vars-rename a)))
::        (splice
::           (for (answ in (retrieve-aux (pcvar-val '?subreq sub)))
::                (save (append answ sub)) )) ))

:: (defprop and retrieve-program (lambda (x) (conj-retrieve x ())))
:: (defprop or retrieve-program disj-retrieve)

(PUTPROP 'AND 'RETRIEVE-PROGRAM '(LAMBDA (X) (CONJ-RETRIEVE X NIL)))
(PUTPROP 'OR  'RETRIEVE-PROGRAM '(LAMBDA (X) (DISJ-RETRIEVE X )))

:: Conjunctive requests are handled by generating answers to the first conjunc
:: and substituting them into the remaining conjuncts for further processing.

(defun conj-retrieve (conjuncts answ-so-far)
     (cond ((null conjuncts)
            (list answ-so-far))
           (t
            (for (answ in (retrieve-aux (varsubst (car conjuncts)
                                                  answ-so-far )))
                (splice
                  (conj-retrieve
                    (cdr conjuncts)
                    (append answ answ-so-far))) )) ))
```

```
(defun disj-retrieve (disjuncts)
    (cond ((null disjuncts) (list (list)))
          (t (for (disj in disjuncts)
             (splice (retrieve-aux disj)) )) ) )
;; CHAIN.LSP    SOURCE FOR CHAINING RULES IN SEMANTIC NET PLUS DEMONS
;;-- -----------------------------------------------------------------
;;
;; $DEMONS -- IF-NEEDED and IF-ADDED DEMONS
;; NOTE: The function  answers  can have an optional restrictions argument.
;; This feature is not yet implemented in for-each-answer (defun chain (implpat a)
    (setf a (vars-rename a))
    (for (sub in (unify implpat a))
       (splice
          (for (answer in
                  (let ((subreq (pcvar-val '#.(? subreq) sub)))        ;OK ?
                    (cond ((eq (car subreq) 'lisp)
                      ;; in doing LISP calls we must use *pcvarbdgs*
                      ;; as variable bindings rather than using PCVAR-VAL
                          (setf *pcvarbdgs* sub)
                          (setf *note* ())
                          (eval (cadr (caddr a)) ))
                         (t (retrieve (pcvar-val '#.(? subreq) sub) NIL))))
               (save (append answer sub)) )) ))

;;
;; success means the *pcvarbdgs* work, so return them
(defun succeed () (list *pcvarbdgs*) )

;;
;; this version of answers does not work with for-each-answer. The bindings
;; in this case are returned in a special list called *note*.
(defun answers (request &optional restrs)
    (for (ans in
           (for (substitution in (retrieve request restrs))
               (save (varsubst request substitution)) ) )
        (when (NOT-ANY #'PCVAR-P ans))          ;OK? DOUBT IT.
        (save ans) ) )
;;
;; NEED A DEFMACRO FOR THIS ! watch *subs*
;(dmclob for-each-answer (xbod)
;    (backquote
;       (for (subx in (retrieve (varsubst '(unquote (cadr xbod))
;                                *pcvarbdgs*) ))
;          (filter (cond (subx (:= *subs* subx)))
;             (eval (varsubst '(unquote (caddr xbod))
;                    (append *pcvarbdgs* subx)))))))
;;
;;
(defun note () (setf *note* (cons *subs* *note*)))

;;
;;
;; if added demons are given by a change in the function add to look for
;; the 'lisp flag.

(defun add (pat)
  (index pat)
  (let ((addpat '(--> ,pat #.(? right))))          ;?right ???
      (for (a in (fetch addpat))
         (do (for (sub in (unify addpat a))
             (do (let ((subadd (pcvar-val '#.(? right) sub)));?right ?
                    (cond ((eq (car subadd) 'lisp)
                           (setf *pcvarbdgs* sub)
                           (eval (cadr (caddr a))))
                          (t (add subadd)) )) )) ) ) )
```

```
;; UNINDEX.LSP   SOURCE TO REMOVE ITEMS FROM DATA BASE
;;---------------------------------------------------------------------
;;
;; UNINDEX -- UNINDEXING FUNCTIONS
;;
;; There are still conceptual difficulties with unindexing (not bugs) -- there
;; doesn't seem to be a single policy for handling variables that would be
;; good for all applications.

;; The UNINDEX function performed by marking.
;;
;; 'unindex2' is the more general function that uses 'tlmark' to traverse
;; links of the discrimination net, and mark appropriate nodes in the tree
;; where pruning can occur.
;; Given a pattern to unindex and a link, the method is thus:
;;
;; 1.   Set the pointer ('marked-node') to the link.
;; 2.   Traverse links of the net, marking the nodes where branches lead
;;         out of that node.  'Marking' occurs by cons'ing the link onto a
;;         pointer to that node.
;; 3.   For each descent down into the net, move the pointer only if
;;         a lower node is found that has more than one branch.
;; 4.   When the final terminal node is found, use the 'marked-node' to
;;         form the basis of pruning.
;;

(defun unindex2 (pat2 llink2)
    (setq marked-node llink2)
    (tlmark pat2 llink2)
    (cond ((eq marked-node llink2)
           (rplacd llink2 nil))
          (T
           (rplacd (cdr marked-node)
                   (delete (assoc (car marked-node)
                                  (cddr marked-node))
                           (cddr marked-node))))))

;;
(defun tlmark (pattern llink)
    (cond ((and (atom pattern) (cddr llink))
           (setq marked-node (cons pattern llink)))
          ((and (pcvar-p pattern) (cddr llink))
           (setq marked-node (cons '*VAR* llink))))
    (append (cond ((atom pattern)
                   (tlink pattern llink))
                  ((pcvar-p pattern)
                   (cond ((tlink '*VAR* llink))
                         (t (skip-exp llink)) ))
                  (t (for  (sub-sub in
                            (for  (sub-link in (tlink 'cons llink))
                                  (splice (tlmark (car pattern) sub-link))))
                           (splice (tlmark (cdr pattern) sub-sub)))))
            (cond ((null (pcvar-p pattern)) (tlink '*VAR* llink)))))
;;
;;
(defun unindex1 (pat llink)
   (cond ((eq (car pat) '<--)
          (unindex2 (cdr pat) (cadr *data-base*)))
         ((eq (car pat) '-->)
          (unindex2 (cdr pat) (caddr *data-base*)))
         (t (unindex2 pat (car *data-base*)))))
;;
;;
(defun unindex (pat)
   (for (candidate in (fetch pat))
        (perform (cond ((unify pat candidate)
                        (unindex1 candidate))))))

;; VARIANT.LSP   VARIABLE RENAMING AND VARIANT PATTERN MATCHING
;;---------------------------------------------------------------------
;; VARS-RENAME   using NEWSYM
;; It turns  (? foo)  into  (? foo-VRNn) , where n is an integer.
```

```lisp
(DEFUN NEWSYM (&optional PREFIX)
   (INTERN                                   ;NEED TO INTERN FOR EQL COMPARISONS...
      (SYMBOL-NAME                           ;TURNS THE UNINTERNED SYM TO PRINTNAME
         (COND (PREFIX
                 (MAKE-SYMBOL
                    (STRING-APPEND  (SYMBOL-NAME PREFIX)
                                (FIXNUM-TO-STRING (INCF (GET 'VRN 'SYM-COUNT))))))
               (T (GENSYM))))))

(defun vars-rename (pat)
    (vars-rename-aux pat (newsym 'VRN)) )

(defun vars-rename-aux (pat goofy)
    (cond ((atom pat) pat)
          ((is*pcvar pat)  ;; We've already tested for atom,
                           ;; so can use is*pcvar rather than is-pcvar
            (MAKE-pcvar    ;(implode (list (pcvar-SYM pat) '- goofy))
              (INTERN
                (SYMBOL-NAME
                  (MAKE-SYMBOL (STRING-APPEND (SYMBOL-NAME (PCVAR-SYM PAT))
                                        "-"  GOOFY))))))  ;MAYBE ?
          (t (cons (vars-rename-aux (car pat) goofy)
                   (vars-rename-aux (cdr pat) goofy) )) ) )

(defun vars-rename-reset ()
    (putprop 'VRN 'sym-count 0) )

(VARS-RENAME-RESET)
;;-----------------------------------------------------------------
;;
;; $FETCH-VARIANTS  -- finds items at least as general as request
;; (fetch-variants pat)  fetches all matching items in the tree-structured
;; base of Chap.14 of CRM having a variable wherever  pat  has any
;; variable, and possibly in places where  pat  has a constant. I.e., it will
;; find any item at least as general as the request, but no item in any way
;; less general.
;; (As in the intended application, we are assuming that the pattern stored
;; at a leaf of the tree is the same as the pattern that determined the path
;; through the tree to the leaf.)

;; (variants pat1 pat2)  returns  t  if its arguments are equal, except for
;; renaming of variables, else () . Thus,  variants  may be used to find the
;; true variants of  pat1  among the items returned by  (fetch-variants pat1)
;; caused by the inability of  fetch-variants  to distinguish among variables.

;; The idea of these functions is to see whether a given pattern (up to
;; renaming) is already in the data base. To see where to look, consider the
;; example  pat = (a ?this ?that ?this). The following items are all at the
;; same leaf:
;; (a ?x ?y ?x), (a ?z ?w ?z), and (a ?z ?w ?w). Of these, the first two are
;; variants, up to renaming, but the third is not. (?u ?z ?w ?z) is at a
;; different leaf, a variant. (a b c d) is also at a different leaf and is
;; not a variant. All of these patterns would be returned by
;; (fetch '(a ?this ?that ?this)), which is thus
;; much too unselective. The purpose of (fetch-variants (?this ?that ?this))
;; is to return only the first four patterns, which is the best it can do.
;; Then (for (x in (fetch-variants pat)) (when (variants pat x)) (save x))
;; will return all variants of  pat , and
;;   (car (some '(lambda (x) (variants pat x)) (fetch-variants pat)))
;; (or various equivalent rewritings using macros) will return the first
;; variant noticed.

(defun fetch-variants (pat)
    (fetch (force-variables pat)) )

(defun force-variables (pat)
   (cond ((atom pat) pat)
         ((is*pcvar pat) '*%VAR&*)   ;; Atom assumed never present in any data
         (t (cons (force-variables (car pat))
                  (force-variables (cdr pat)) )) ) )

;NOTE: *VL1* AND *VL2* ARE GLOBALS DEFINED IN NETDEF.LSP
;THERE IS A BETTER WAY THAN THIS, BUT OK FOR NOW.
```

```
(defun variants (p1 p2)
    (SETF *vl1* NIL  *vl2* NIL)
      (variants-aux p1 p2) )

(defun variants-aux (p1 p2)
    (cond ((atom p1) (eq p1 p2))
          ((atom p2) NIL)
          ((and (is*pcvar p1) (is*pcvar p2))
            (setq *vl1* (ADJOIN (pcvar-sym p1) *vl1*))
            (setq *vl2* (ADJOIN (pcvar-sym p2) *vl2*))
            (eq (from-endq (pcvar-sym p1) *vl1*)
                (from-endq (pcvar-sym p2) *vl2*) ) )
          ((or (is*pcvar p1) (is*pcvar p2)) NIL)
          ((variants-aux (car p1) (car p2))
           (variants-aux (cdr p1) (cdr p2)) ) ) )

:: (from-endq item lis)  returns the position (1,2,3,...)  from the end of the
:: list  lis  (last element returns 1) of the earliest element of the list  eq
:: to  item .  It is assumed that this element is present.  If this element
:: is not assumed present, add a  cond  clause  ((null lis) ()) .
:: (The "q" means that  eq  rather than  equal  is used to find the element.)

(defun from-endq (item lis)
    (cond ((null lis) nil)
          ((eq (car lis) item) (length lis))
          ((from-endq item (cdr lis))) ) )
:: LISTDB.LSP   SOURCE TO LIST A SEMANTIC NET DATA BASE
::----------------------------------------------------------------
::
:: LIST-DB  lists elements of discrimination tree data base
:: To list the elements of a data base.  We don't want to use retrieve, which
:: would list all derivable consequences!
:: (list-db) works on whatever is the current data base.
:: (list-dbr 'myb) changes the current data base name to  myb  and lists it.
:: lists-db, listb-db, and listf-db, list the ordinary statements, the backward
::  inferences, and the forward inferences.
:: These functions return a list of the items in the data-base.  To print
:: the items on separate lines, use (print-db).

(defun list-dbr (dbname)
    (use-dbr dbname)
    (list-db) )

(defun list-db ()
    (append (lists-db)
            (append (listb-db) (listf-db)) ) )

(defun lists-db ()
    (fetch '#.(? x)) )

(defun listb-db ()
    (fetch '(<-- . #.(? x))) )

(defun listf-db ()
    (fetch '(--> . #.(? x))) )

(defun print-db ()
    (print-elements (list-db)) )
:: UNIFY.LSP  UNIFICATION ALGORITHM
::----------------------------------------------------------------
::
:: This unifier include an "occurs in" check which is slower but more
:: robust.

:: The internal representation of predicate-calculus variable ?x is (*VAR* x).
:: The corresponding record-type  pcvar  is defined in  vlisp>disnet>$dosnet.
:: Note that  (PCVAR-P x)  is defined as  (and (not (atom x)) (is*pcvar x)) .
:: Variables are written as ?x, defined to expand
:: to ((*VAR* x)  as in the book.

:: A substitution is implemented as a list of bindings.
```

```
(defun unify (pat1 pat2) (unify1 pat1 pat2 nil))

(defun unify1 (pat1 pat2 subst-so-far)
   (cond ((pcvar-p pat1)
            (var-unify pat1 pat2 subst-so-far))
          ((pcvar-p pat2)
            (var-unify pat2 pat1 subst-so-far))
          ((atom pat1) (and (eq pat1 pat2) (list subst-so-far)))
          ((atom pat2) nil)
          (t (for (subst-from-car in
                     (unify1 (car pat1) (car pat2) subst-so-far))
                (splice (unify1 (cdr pat1) (cdr pat2) subst-from-car)) )) ) )

(defun var-unify (v% p% sub)
    (let ((bndg (sym-lookup (pcvar-sym v%) sub)))
         (cond (bndg (unify1 (bdg-val bndg) p% sub))
                                 ;; if already bound
                        ;; Don't bother to bind V to itself--
               ((eql v% p%) (list sub))

;; Don't bind V to anything containing V--
               ((not (occurs-in v% p% sub))
                (list (CONS
                          (make-bdg (pcvar-sym v%) p%) sub))) )))
                        ;; No binding--CONS to SUB (defun occurs-in (v% p% sub)
    (cond ((atom p%) nil)
          ((pcvar-p p%)
            (or (eql v% p%)
                (let ((b (sym-lookup (pcvar-sym p%) sub)))
                   (and b (occurs-in v% (bdg-val b) sub)) )))
          (t (some-plus #'(lambda (y) (occurs-in v% y sub))        ;may use some ?
                p%)) ))
;; INDX.LSP    TOP LEVEL SEMANTIC DATA BASE CREATORS AND INDEXERS.
;;----------------------------------------------------------------
;; INDEX -- .DATA-BASE CREATION AND TOP-LEVEL INDEXING ;; All the functions here and in $RETRIEVE work with the global value of
;;   *data-base* , which must be  setq  to the data base you wish to
;; access.

;;    The most basic version stores the whole pattern at a node determined by
;; discriminating upon the whole pattern (except for the arrows themselves, which
;; are unnecessary.  In applications, it may be preferable to discriminate upon
;; part of the pattern only -- e.g., in plan retrieval, such as the "talk-plan"
;; and "think-plan" of pp.162-4, the plan part only of a goal-plan pair is
;; stored at a node determined by the goal part only.  This is provided for
;; by starting a pattern with the symbol  # .  Thus, the pattern '(# fie foe)
;; will cause  foe  to be stored at a node determined by  fie .  Almost certainly,
;; other applications will call for other strategies, at which point, the
;; functions should probably be made data-driven.

;; To create a data base called  my-base , one writes  (create-db 'mybase) .
;; The basic accessing functions are   index  and  fetch .  Built upon these
;; are  retrieve  and  add , which use chaining.  All these functions will
;; affect the data base that has last been chosen for accessing.  Thus one can
;; simply write  (index '(mortal man))  to enter this information into the
;; current data base.

;; Data base accessing functions ending in  d-br  reset  *data-base*  to the
;; data base whose name is the value of their second argument, and then
;; perform the appropriate accessing function.  Thus, one writes
;;   (index-dbr '(mortal man) 'facts-of-life)  to index the fact in the
;; data base whose name is  facts-of-life .  Although quoting the name requires
;; an extra  eval , it has the (sometimes) advantage that both arguments are
;; quoted, and the certain advantage that the contents of the data base won't
;; get printed out when tracing the function.  Of course, until you wish to
;; access another data base, you can use the ordinary accessing functions
;; (without the  -dbr ).
```

```
;; Note that in the example, facts-of-life is actually changed when items
;; are indexed in *data-base* after setq-ing *data-base* to facts-of-life
;; In fact, until the next time *data-base* is reset, the two data bases
;; coincide. This is how the accessing functions can index into *data-base*
;; and have the results appear in the data base of your choice. This means
;; that we needn't pass the value of the data base to each accessing function,
;; which would make tracing unbearable (or pass the name and use an extra eva
).

;; (create-db 'mybase) causes the value of mybase to become
;; ((TOP>>>) (TOPB>>>) (TOPF>>>)) . (Using list throughout prevents the
;; definition from being clobbered by list surgery in the indexing functions.

;; The following functions are used to create, save, and reset a data base
;; conveniently when experimenting.

;; (make-data 'joe) -- creates data base named joe and makes it the active
;;     data base
;; (save-data 'joe) -- binds *save-data-joe* to (copy joe)
;; (restore-data 'joe) -- binds joe to (copy *save-data-joe*) and makes joe
;;     the active data base ;; Since copying a list does a lot of work, save-data and restore-data
;; are mainly intended for experiments with very small data-bases.

(defun create-db (dbx)
    (set dbx (list (list 'TOP>>>) (list 'TOPB>>>) (list 'TOPF>>>))) )

;; Data base resetting functions end in  -dbr :

(defun use-dbr (db-name)
    (setq *data-base* (eval db-name)) )

(defun index-dbr (formula db-name)
    (setq *data-base* (eval db-name))
    (index formula) )

(defun add-dbr (formula db-name)
    (setq *data-base* (eval db-name))
    (add formula) )

(defun fetch-dbr (formula db-name)
    (setq *data-base* (eval db-name))
    (fetch formula) )

(defun retrieve-dbr (formula db-name)
    (setq *data-base* (eval db-name))
    (retrieve formula) )

(defun make-data (dbname)
    (create-db dbname)
    (use-dbr dbname) )

(defun save-data (dbname)
    (set (implode (list '*save-data- dbname '*))
         (copy-tree (eval dbname)) )
    (list dbname 'saved) )

(defun restore-data (dbname)
    (setq *data-base*
          (set dbname
               (copy-tree (eval (implode (list '*save-data- dbname '*)))) ) )
    (list dbname 'restored) )
;; ACCESS.LSP    SOURCE TO HELP ACCESS THE SEMANTIC NET FLEXIBLY
;;----------------------------------------------------------------
;;

(DEFMACRO INSTANTIATE ( PCVARS QUERY &OPTIONAL RESTRICTIONS)
    (LET ((ANS (RETRIEVE QUERY RESTRICTIONS)) SUBS)
        (AND ANS
```

```
            (DOLIST (PCV PCVARS `(VALUES-LIST ',(REVERSE SUBS)))
              (SETQ SUBS
                    (CONS (VARSUBST PCV (CAR ANS)) SUBS))))))

(DEFUN ADDX (PAT)
  (LET ((OLDPAT PAT) NEWPAT ELT)
    (LOOP (AND (NULL OLDPAT) (RETURN (OR (ADD (REVERSE NEWPAT)) NEWPAT)))
          (SETQ ELT (POP OLDPAT))
          (COND ((EQ ELT :EVAL)
                 (PUSH (EVAL (POP OLDPAT)) NEWPAT))
                (T
                 (PUSH ELT NEWPAT))))))

(DEFUN CHANGE-PARAMETER (PARM VAL)
  (UNINDEX `(,PARM #.(? V)))
  (ADD     `(,CONS PARM (NCONS VAL))) VAL)
;; SCHED.LSP   SOURCE TO MIMIC MULTITASKING IN LISP
;;--------------------------------------------------------------------
;;
;; THESE FUNCTIONS ENABLE MULTI-INFERENCING IN LISP.
;; Uses Stack-Groups and process queues to schedule the inferencing upon a
;; goal. Accesses the semantic net directly to handle queries.
;; Calling function QUERY allocates a query process then begins to ANSWER the
;; query by searching the semantic net (which may result in generating more
;; queries of course).

(SETQ *RUNNINGQ* (MAKE-QUEUE (LIST *INITIAL-STACK-GROUP*)))

(SETQ *READYQ* (MAKE-QUEUE NIL))

(SETQ *SUSPENDEDQ* (MAKE-QUEUE NIL))

(DEFVAR *QUERY-STACK-GROUPS* NIL)

(DEFVAR *ANSWERS* NIL)

(DEFUN MAKE-QUERY-STACK-GROUP ()
  (LET* ((NAME (INTERN-GENSYM 'S))
         (SG (MAKE-STACK-GROUP NAME) ))
    (PUSH SG *QUERY-STACK-GROUPS*)
    SG))

(DEFUN INTERN-GENSYM (X)
  (INTERN (SYMBOL-NAME (GENSYM X))))

(DEFUN QUERY (REQUEST &OPTIONAL RESTRN)
  (LET (ANSWER (SG (ALLOCATE-SG)))
    (STACK-GROUP-PRESET SG
                        #'QUERY-AUX REQUEST RESTRN)
    (SETQ ANSWER (PREEMPT SG))
    (DE-ALLOCATE-SG SG)
    ANSWER))

(DEFUN QUERY-AUX (REQ RESTRN)
  (SETQ *ANSWERS* (ANSWERS REQ RESTRN))
  (STACK-GROUP-RETURN *ANSWERS*))

(DEFUN ALLOCATE-SG ()
  (COND ((POP *QUERY-STACK-GROUPS*))
        (T
         (MAKE-QUERY-STACK-GROUP)
         (POP *QUERY-STACK-GROUPS*))))

(DEFUN DE-ALLOCATE-SG (SG)
  (PUSH SG *QUERY-STACK-GROUPS*))

(DEFUN PREEMPT (SG)
  (MAKE-READY (DEQUEUE *RUNNINGQ*))
  (MAKE-RUNNING SG))

(DEFUN MAKE-RUNNING (SG)
  (ENQUEUE *RUNNINGQ* SG)
  (FUNCALL SG NIL))
```

```
(DEFUN MAKE-READY (SG)
   (ENQUEUE *READYQ* SG))
```

Appendix V

```
;; CNS.LOD    LOAD SOURCE CODE FOR CONSISTANCY CHECKER
;;----------------------------------------------------------------------
;;

(LOAD "C:\\GCLISP2\\CNS\\NET")
(LOAD "C:\\GCLISP2\\CNS\\CNSFUNS")
(LOAD "C:\\GCLISP2\\CNS\\SYNSUB")
(LOAD "C:\\GCLISP2\\CNS\\META.RLS")

;; NET.LSP    SOURCE FOR CONSISTANCY DEFINITIONS AND INITIALIZATIONS
;;----------------------------------------------------------------------
;;

;; ****************************************************************
;;              STRUCTURE DEFINITIONS AND INITIALIZATIONS
;; ****************************************************************
(DEFSTRUCT RULEBASE
             RULEGROUPS
             RULES)

(DEFSTRUCT PAT RULES)
(DEFSTRUCT DIS RULES)
(DEFSTRUCT DRG-1 RULES)
(DEFSTRUCT DRG-2 RULES)
(DEFSTRUCT DRG-3 RULES)

(DEFSTRUCT RULE
             P-CLAUSE-CNT        ;NUMBER OF PREMISE CLAUSES
             P-CLAUSES           ;LIST OF PREMISE CLAUSES
             C-CLAUSE-CNT        ;NUMBER OF CONCLUSION CLAUSES
             C-CLAUSES           ;LIST OF CONCLUSION CLAUSES
             SELF-REF            ; IS IT SELF-REFERENCING ? (T OR F)
             NUM)

(defstruct defs
   numeric-valued-parms
   single-valued-parms
   multi-valued-parms
   patient-parms
   disease-parms
   drug-parms )

(DEFPARAMETER RULEBASE-FIRST (MAKE-RULEBASE :RULEGROUPS NIL :RULES NIL))

;THE RULEGROUP DEFINES WHAT CONTEXT THE CONCLUSION PARAMETER BELONGS TO
(SETF (RULEBASE-RULEGROUPS RULEBASE-FIRST) '(PATIENT
                                             DISEASE
                                             DRUG-1
                                             DRUG-2
                                             DRUG-3 ))

(DEFCONSTANT PATIENT (MAKE-PAT :RULES NIL))
(DEFCONSTANT DISEASE (MAKE-DIS :RULES NIL))
(DEFCONSTANT DRUG-1 (MAKE-DRG-1 :RULES NIL))
(DEFCONSTANT DRUG-2 (MAKE-DRG-2 :RULES NIL))
(DEFCONSTANT DRUG-3 (MAKE-DRG-3 :RULES NIL))

(defconstant known-sets (make-defs))
;;----------------------------------------------------------------------
;;                    Variable Declarations
;;----------------------------------------------------------------------

(DEFVAR NUM-META-RULES 9)
(DEFVAR NUM-MED-RULES 1)
(defvar num-dom-rules 20)
```

```
(DEFVAR PATIENT-PARMS '(AGE WEIGHT SEX))
(DEFVAR DISEASE-PARMS '(DURATION DEGREE TRIALS LENGTH))
(DEFVAR DRUG-PARMS '(DOSAGE RISK PREVIOUS REACTION))

(defconstant iq 272)
(defconstant wminp 5.065)
(defconstant wmaxp 5.750)
(defcontant wminc 5.237)
(defconstant wmaxc 5.580)
(defconstant w0 5.41)
(defconstant e0 21)
(defconstant delta-i-high 5)
(defconstant delta-i-low 2.5)
(defconstant delta-s-high 1)
(defconstant delta-s-low 0.5)
(defconstant d-high 0.25)
(defconstant d-low 0.05)
(defconstant stime (0 0 0))
(defparameter weld-aborted nil)
(defparameter weld-completed nil)
(defparameter weld-phase 0)
(defparameter i 0)
(defparameter speed 0)
(defparameter width 0)
(defparameter shield-gas-temp 0)
(defvar wpc-parms '(i speed width shield-gas-temp))

(DEFVAR NUMERIC-PARM-LIST '(AGE WEIGHT HEIGHT current speed width))
(DEFVAR SINGLE-VALUED-PARM-LIST '(SEX RATE RISK))
(DEFVAR MULTI-VALUED-PARM-LIST '(QUALITY HEALTH))
(DEFVAR AVAILABLE-FUNCTIONS '(> < = SAME NOTSAME LESSP GREATERP EQUAL))
(DEFVAR known-parms '(AGE WEIGHT SEX HEALTH HEIGHT HISTORY RISK RATE))
(DEFVAR ASK-FIRST-PARMS '(SEX AGE HEIGHT WEIGHT))
(DEFVAR NUMERIC-FUNCTIONS '(> < = RANGE))
(DEFVAR FUZZY-SETS NIL)

(defvar defs (list numeric-parm-list single-valued-parm-list
                   multi-valued-parm-list
                   patient-parms disease-parms drug-parms))

;;------------------------------------------------------------------
;;                          Functions
;;------------------------------------------------------------------
(DEFUN CREATE-LISTS ()
;drive list-rules for both rule cases
  (SETQ META-RULES (REVERSE (CAR (LIST-RULES 'META))))
  (SETQ MEDICAL-RULES (car (LIST-RULES 'MED)))
  'LISTS-MADE)

;;------------------------------------------------------------------
(DEFUN SAVE-RULES (RULELIST)
;write the given list of medical rules to the medical rules file (LET* ((STRM (OPEN "MEDICAL.RLS" :DIRECTION :IO))
         (RESULT
           (DOLIST (RULE RULELIST 'DONE)
             (PRINT (EVAL RULE) STRM) ) ) )
     (CLOSE-ALL-FILES) ))
;;------------------------------------------------------------------
(DEFUN LIST-RULES (TYPE)
; Read the file containing the given rules, and create a list of them (LET* (RULES RULE-LIST RULE-LIST2 RULE-LIST3 S
              (META-STRM (OPEN "META.RLS" :DIRECTION :IO))
              (MED-STRM (OPEN "MEDICAL.RLS" :DIRECTION :IO))
              (NUM-META NUM-META-RULES)
              (NUM-MED NUM-MED-RULES)
              (RULES   (COND ((EQ TYPE 'META)
                              (LIST
                                (DOTIMES (I NUM-META RULE-LIST)
                                  (PUSH (READ META-STRM) RULE-LIST))))
                             ((EQ TYPE 'MED)
```

```
                            (DOTIMES (I NUM-MED RULE-LIST)
                              (PUSH (READ MED-STRM) RULE-LIST))) ) ) )
    (CLOSE-ALL-FILES)
    (REVERSE RULES)) )

;;---------------------------------------------------------------
;;(defun det-rule ()
;; Generate a rule interactively with the user.
;;
;; Test for : 1. Whether or not the parameters used in the rule are known;
;;               Learn about those which are not known.
;;
;;            2. Is the rule Satisfiable ?       (maintain a Complete rulebase)
;;
;;            3. Is the rule Syntactically correct ?
;;
;; If Errors are found in the generated rule in steps 2 and 3, the rule is
;; Erased.
;;
;; If no errors found, return a rule structure (no global structure defined)
;;
;(let* (rulename problems error)
;    (setq rulename (make-rule))
;
;; Enter the rule Premise clauses
;
;    (Format t "~% ~S ~% "
;            "Enter Premise Clauses: Enter as a List of lists ((a b c)(d e f))")
;    (LET* (RESULT
;           (PREMISE-CLAUSES (READ)) )
;       (if (not (listp (car premise-clauses)) )
;           (setq error 1) )
;       (and (not error)
;            (prog2
;              (SETF (RULE-P-CLAUSES  RULENAME) PREMISE-CLAUSES )
;              (SETF (RULE-P-CLAUSE-CNT  RULENAME)
;                    (LENGTH (RULE-P-CLAUSES RULENAME)) ) ) ) )
;
;; Enter the rule Conclusion clauses
;
;    (Format t "~% ~S ~% "
;            "Enter Conclusion Clauses:  Enter as a List of lists  ((n m l))")
;    (LET* (RESULT
;           (CONCLUSION-CLAUSES (READ)) )
;       (if (not (eq (length conclusion-clauses) 1))
;           (setq error 2))
;       (and (not error)
;            (prog2
;              (SETF (RULE-C-CLAUSES RULENAME) CONCLUSION-CLAUSES )
;              (SETF (RULE-C-CLAUSE-CNT RULENAME)
;                    (LENGTH (RULE-C-CLAUSES RULENAME)) ) ) ) )
;
;; Determine if the Rule is Self Referencing; indicate result in rule structure
;
;       (and (not error)
;            (progn
;              (IF (SELF-REF RULENAME)
;                  (SETF (RULE-SELF-REF RULENAME) T)
;                  (SETF (RULE-SELF-REF RULENAME) NIL) ) ) )
;
;; Do I already know of all the parameter types mentioned in this rule ?
;
;       (and (not error)
;            (progn
;              (dolist (clause (rule-p-clauses rulename))
;                 (cond ((not (member (cadr clause) known-parms))
;                        (learn-parm-type (cadr clause))
;                        (learn-subtype (cadr clause)) )
;                       (t nil)) )
```

```
              (cond ((not (member
                            (cadar (rule-c-clauses
                                      rulename)) known-parms))
                   (learn-parm-type (cadar (rule-c-clauses rulename)))
                   (learn-subtype (cadar (rule-c-clauses rulename))))
                   (t nil)) ) )

;; Perform Syntax verification and reporting of any syntax errors to the User (and (not error)
          (progn
             (cond ((setq problems (syntax rulename))
                   (format t "~& ~& ~a ~& ~a"
                      "***** >> Syntax errors have caused the removal of "
                         rulename)
                   (dolist (prob problems ) (format t "~& ~& ~a ~a ~& ~& ~a"
                                             "Syntax Error in Clause : "
                                 (car prob)  (caadr prob) ) )
                   (setf error 3 rulename nil) )
                   (t nil)) ) )

;; Determine if the rule is Satisfiable: for each parameter mentioned in
;; the premise, does there exist a rule which concludes on that parm ?
;; disregard this for ask-first types of parameters (defined above)

(and (not error)
         (cond ((setq probs (un-satisfiable  rulename))
               (dolist (clause probs)
                 (if (not (member (cadr clause) ask-first-parms :test 'equal)
                    (format t "~& ~& ~a ~& ~& ~a ~a ~& ~a ~& "
                          "SATISFIABILITY WARNING : "
    "This rule mentions in its premise the parameter" (cadr clause)
    "upon which no current rule concludes.")))))
               (t nil) ) )

(if  error
        (format t "~& ~& ~a ~& ~a ~a"
              "Rule was Invalid: Try Entering the rule again ..."
              "Error Code =" error)

;; done.

RULENAME ) ))
;;.CNSRUNS.LSP    SOURCE FOR CONSISTANCY CHECKING ROUTINES
;;----------------------------------------------------------------
;;

;; Highest level logical consistancy verification routine
;;
;; Checks for cases of:
;;                    1. Redundancy    (simple and complex)
;;                    2. Negation      (simple and complex)
;;                    3. Subsumption   (simple (?) )
;;
;; Returns a listing of:
;;                    1. How many inconsistancy (s) were identified
;;                    2. What type each inconsistancy was (see above)
;;                    3. Which rule in the existing set conflicted
;;                    4. Which clauses were at fault and why
;;
;;;*********************************************************************
;;;                      The New Stuff
;;;*********************************************************************
(defun concludes-on (parm)

;; locate any and all other rules in the set of current domain
;; rules which conclude on the given parameter.
;; Returns nil, or a list of rulenumbers corresponding to rules which
;; conclude on the given parameter
  (let* (result res
         (result-2
```

```
              (dolist (rule-2 medical-rules result)
                 (if (setq res (match '(? ,parm ?)
                                      (car (conclusions rule-2)) nil) )
                     (push (rle-num rule-2) result) ) ) ) )
   (reverse result-2) ))

;;;------------------------------------------------------------------
(defun all-concls ()
;; list the conclusions of all rules, rules denoted by rule number
   (let* (result-1
          (result
           (dolist (rule medical-rules result-1)
              (push (list (rule-num rule) (car (conclusions rule)))
                    result-1)) )) result))

;;;------------------------------------------------------------------
(defun rules ()
; prints out the existing domain rules (format t "~& ~a ~& ~&" (length medical-rules) "domain rules ")
   (dotimes (i (length medical-rules))
     (cond ((eq (mod (1+ i) 5) 0)
            (format t "~& ~a ~&" "Press Any Key to Continue")
            (read-char)
            (format t "~& ~a ~a ~& ~&" (premises (nth i medical-rules))
                    '--> (car (conclusions (nth i medical-rules))) ) )
           (t (format t "~& ~a ~a ~a ~& ~&" (premises (nth i medical-rules))
                    '--> (car (conclusions (nth i medical-rules))) )) ) ) )

;;;------------------------------------------------------------------
;; Top Level Function.
;; Generate a new rule, then test it for logical consistancy.
;;
(defun gen-test ()
   (let* ((rule (gef-rule)) )
     (and (eq *syntax-errors* 0)
          (progn
             (format t "~& ~a" "Press Any Key to Continue ...")
             (read-char)
             (format t "~& ~& ~a" "Part Two: VERIFICATION")
             (report (c-check rule))
             (format t "~& ~& ~a ~& ~a ~a"
                     "----------------------------------------"
                     *logical-errors*
                     "Logical Error (s) Detected")
             (format t "~& ~a ~a" *warnings* "Satisfiability Warnings Issued")
             (dump) )
       (and (zerop *logical-errors*) *new-rule*)))

;;;------------------------------------------------------------------
(defun parms-common (parm-list rule)
   (let* (res-1
          (res-2
           (dolist (parm parm-list res-1)
              (if (not (has-elt parm rule))
                  (setq res-1 t)))) )
     (if res-2 nil t)))

;;;------------------------------------------------------------------
(defun c-check (new-rule)
  (let* (results findings-2 results-2 results-1
         (new-parms (parm-set new-rule)) )
    (dolist (appl-rule medical-rules)
       (cond ((eq (parm-set *new-rule*)(parm-set appl-rule))
              (let* ((difference (set-difference (rle-rulelist appl-rule)
                                                 (rle-rulelist new-rule))) )
                (cond ((not difference)              ; 0 clauses different
                       (push (list (rle-num appl-rule)
                                   "redundant") results) )
                      ((eq (length difference) 1)    ; 1 clause different
                       (push (list (rle-num appl-rule) "negation" difference)
                             results) )) ) ) )
    (setq *logical-errors* (length results))
    results))
```

```
;;----------------------------------------------------------------
;; Report the results of logical inconsistancy checks in a nice formatted
;; manner.
;;
(defun report (result-list)
  (let* ()
    (format t "~& ~& ~a ~a  ~& ~&" (length result-list)
            "Inconsistancy (s) has been Identified")
    (dolist (err-elt result-list)
      (format t "~a ~&"
              "----------------------------------------------------")
      (format t "~& ~a ~a ~&" "Inconsistancy Number"
              (length (member err-elt (reverse result-list) :test 'equal)))
      (format t "~& ~a ~& ~a ~& ~&" "Newly Generated Rule :"
              (rle-rulelist *new-rule*))
      (format t "~& ~a ~& ~a ~& ~&" "Conflicting Existing Rule:"
              (rle-rulelist (nth (car err-elt) medical-rules) ) )
      (format t "~& ~& ~a ~a ~a ~& ~a ~a ~a ~&" "The New Rule conflicts with"
              "domain rule Number" (car err-elt)
              "Due to" (second err-elt) "type Inconsistancy")
      (if (= (length err-elt) 2) ;this has a faulty clause included
          (format t "~& ~a ~a ~a ~a ~& " "The Conflicting clause in Rule"
                  (car err-elt) "is"
                  (car (third err-elt)) ) )
      (format t "~& ~a"
              "----------------------------------------------------") )
    'done ) )

(defstruct (rle :type list)
  rulelist
  self-ref
  (num 0) )

;;;-------------------------------------------------------------
(defun premises (rule)
  (reverse (cdr (member '--> (reverse (rle-rulelist rule)) :test 'eql)) ) )

;;;-------------------------------------------------------------
(defun conclusions (rule)
  (cdr (member '--> (rle-rulelist rule) :test 'equal)))

;;;-------------------------------------------------------------
(defun has-elt (elt lis)
  ;; returns t if the given list contains the supplied atom
  ;; works with nested lists
  (cond ((null lis) nil)
        ((eql elt lis) t)
        ((consp lis)
         (or (has-elt elt (car lis))
             (has-elt elt (cdr lis))))))

;;;-------------------------------------------------------------
(defun parm-set (rule)
  (let* (results-1 results-2
         (final
          (append
           (dolist (clause (premises rule) results-1)
             (push (second clause) results-1) )
           (dolist (clause (conclusions rule) results-2)
             (push (second clause) results-2)) ) ) ) final))

;;;-------------------------------------------------------------
(defun all-sim (rule)
;; retrieves all rules from the domain rulebase which contain the same set
;; of parameter types as the given rule, but no more or less.
```

```
(let* (results
       (new-parms (parm-set rule))
       (final
         (dolist (ex-rule medical-rules results)
           (let* ((results-2 t)
                  (if
                    (dolist (parm new-parms results-2)
                      (if (not (has-elt parm ex-rule))
                          (setq results-2 nil))) ;    ; t = good rule match
                    (push ex-rule results))) results) ) ) ) final))

;--------------------------------------------------------------------------------
(defun self-ref (rule)
;; new version- uses list type structures 5/27/87
;; determine if the given rule mentions any one of its premise parameters
;; in one of its conclusion clauses
  (let* (result
         (concls (conclusions rule)) )
    (dolist (clause (premises rule) result)
      (if (has-elt (second clause) concls)
          (setq result t))) result))

(defparameter *warnings* 0)
(defparameter *logical-errors* 0)
(defparameter *new-rule* nil)            ;if rule is OK, it is returned in here ;;------------------------------------------------------------------------------
;; Allow the entry of a rule by individual clause.
;; Learn all unknown parameter types
;; Perform syntax checking on the rule.
;;
(defun enter ()
  (let* (clause-list str syntax-error)
    (loop (format t "~& ~a" "Enter a Clause ... ")
          (setq str (string-append "(" (read-line) ")") )
          (cond ((equal str "()") (return) )
                (t  (learn-parm-type (second (read-from-string str)))
                    (learn-subtype (second (read-from-string str))
                                   (third (read-from-string str)))
                    (if (incorrect-elt-order (read-from-string str))
                        (setq syntax-error t))
                    (if (invalid-parm-function (first (read-from-string str))
                                               (second (read-from-string str)))
                        (setq syntax-error t))
                    (if (invalid-parm-value (second (read-from-string str))
                                            (third (read-from-string str)))
                        (setq syntax-error t))
                    (if (not syntax-error)
                        (push (read-from-string str) clause-list)
                        (setq syntax-error nil) ))))
    clause-list))

;;------------------------------------------------------------------------------
;; Generate a rule interactively with the user,
;; following these constraints along the way :
;;
;; Test for : 1. Whether or not the parameters used in the rule are known;
;;               'Learn' about those which are not known.
;;
;;                      a. Context type of the parm (patient, drug,...)
;;                      b. Value type of parm (numeric, single-valued..)
;;
;;            2. Is the rule Satisfiable ?      (maintain a Complete rulebase)
;;
;;            3. Is the rule Syntactically correct ?
;;
;;                      a. Notify that a syntax error (s) was found
;;                      b. Indicate that the rule has been deleted
;;                      c. Identify the type of error in natural lang
;;                      d. Identify the clause which was faulty
```

```
;;
;; If Errors are found in the generated rule in steps 2 and 3, the rule is
;; Erased.
;;
;; If no errors found, return a rule structure (no global structure defined)
;; ( List type of structure version 5/27/87 )
(defun def-rule ()
  (let* (rulename problems error r-1 r-2 results )
       (setq rulename (make-rle))
       (setq *syntax-errors* 0)

(format t "~& ~a ~& ~a ~& ~a ~&"
               "---------------------------------------------"
               "* InterActive Rule Generation and Verification *"
               "---------------------------------------------")
       (format t "~& ~& ~a" "Part One: GENERATION")

;; Enter the rule Premise clauses (Format t "~& ~& ~a ~& ~a ~& ~&"
              "Enter Premise By Clause: i.e., Function Parameter Value "
              " ** Type a Return at the prompt when finished")
       (setq premise-clauses (enter))

;; Enter the rule Conclusion clauses (Format t "~& ~& ~a ~&  ~a ~& ~&"
              "Enter Conclusion By Clause: i.e., Function Parameter Value "
              " ** Type a Return at the prompt when finished")
       (setq conclusion-clauses (enter))

;; This point in the code cannot be entered without having generated a valid
;; rule - no syntax errors, or unlearned parameter types beyond this point.
;;
;; build the actual list structure with these clauses (push '--> premise-clauses)
       (setf (rle-rulelist rulename)
             (reverse (push (car conclusion-clauses) premise-clauses)))

;; Determine if the Rule is Self Referencing; indicate result in rule structure (IF (SELF-REF RULENAME)
           (SETF (RLE-SELF-REF RULENAME) T)
           (SETF (RLE-SELF-REF RULENAME) NIL) )

;; Determine if the rule is Satisfiable; for each parameter mentioned in
;; the premise, does there exist a rule which concludes on that parm ?
;; disregard this for ask-first types of parameters (defined above)

(setq *warnings* 0)
       (cond ((setq probs (un-satisfiable rulename))
              (setq *warnings* (length probs))
              (dolist (prob probs)
                (format t "~& ~& ~a ~& ~& ~a ~a ~& ~a ~& "
                        "SATISFIABILITY WARNING : "
                        "This rule mentions in its premise the parameter" prob
                        "upon which no current rule concludes.")))
             (t nil) )

;; done.
       (format t "~& ~& ~a ~a ~&" *warnings* "Satisfiability Warnings Generated")
       (setq *new-rule* RULENAME) ) )

;-------------------------------------------------------------------
(DEFUN LEARN-PARM-TYPE (PARM)
  ;; determine if the given parameter type is known. If so, return. Else,
  ;; ask the user to supply the needed info.
```

```
(LET* (ANS)
  (COND ((and (not (MEMBER PARM PATIENT-PARMS :TEST 'EQUAL))
              (not (MEMBER PARM DISEASE-PARMS :TEST 'EQUAL))
              (not (MEMBER PARM DRUG-PARMS :TEST 'EQUAL)) )
         (FORMAT T "~& ~& ~A ~& ~& ~S ~% ~S ~& ~% ~S"
                 PARM
                 "This Parameter Type is Not yet Recognized ...." -
                  Which of the Following Types Best Matches PARM ?"
                 "P = Patient    D = Drug    R = Disease")
         (SETQ ANS (READ-CHAR))
         (COND ((or (eq ans 112)(EQ ANS 80))
                (PUSH PARM PATIENT-PARMS)
                (PUSH PARM known-parms) )
               ((or (eq ans 100)(EQ ANS 68))
                (PUSH PARM DISEASE-PARMS)
                (PUSH PARM known-parms) )
               ((or (eq ans 114)(EQ ANS 82))
                (PUSH PARM DRUG-PARMS)
                (PUSH  PARM known-parms) )
               (T (PRINT "INVALID ANSWER")) ) )
        (t nil)) Parm) )

;;---------------------------------------------------------------------------
(DEFUN LEARN-SUBTYPE (PARM &optional val)
;; Determine if the Sub-type of the given parm is known. If so, return.
;; Else, ask the user to supply the needed info.

(COND ((and (not (MEMBER PARM NUMERIC-PARM-LIST :TEST 'EQUAL))
              (not (MEMBER PARM SINGLE-VALUED-PARM-LIST :TEST 'EQUAL))
              (not (MEMBER PARM MULTI-VALUED-PARM-LIST :TEST 'EQUAL)) )
         (Format T "~& ~& ~a ~& ~a ~& ~& ~s ~& ~s "
                 parm "is not yet fully defined..."
                 "...What is the Functional Type of Parm ?"
                 "N = Numeric   M = Multi-Valued    S = Single-Valued")
         (setq Ans (read-char))
         (cond ((or (eq ans 83)(eq ans 115))
                (PUSH PARM SINGLE-VALUED-PARM-LIST) )
               ((or (eq ans 77)(eq ans 109))
                (PUSH PARM MULTI-VALUED-PARM-LIST)
                (add-val parm val) )
               ((or (eq ans 78)(eq ans 110))
                (PUSH PARM NUMERIC-PARM-LIST) )
               (t (format t "~& ~a" "Invalid Entry")) ) )
        ((member parm multi-valued-parm-list :test 'equal)
         (add-val parm val) ) ) )

;;---------------------------------------------------------------------------
(defun un-satisfiable (rule)
;; Determines if the current rulebase contains rules which conclude on all
;; parameters mentioned in the rules premise. Of this list, all ask-first
;; type of parameters are deleted, and those remaining are returned.

(let* (res res-parms
         (new-parms (dolist (clause (premises rule) res)
                      (push (second clause) res) ) )
         (leftovers
           (dolist (old-rule medical-rules res-parms)
             (dolist (parm new-parms res-parms)
               (if (match '(? parm ?) (car (conclusions old-rule)) nil)
                   (setq res-parms (delete parm new-parms)) )) ) )
         (real-leftovers
           (dolist (parm leftovers leftovers)
             (if (member parm ask-first-parms :test 'equal)
                 (setq leftovers (delete parm leftovers)))))  )
    real-leftovers))

;; SYNSUB.LSP     SOURCE FOR SYNTAX AND SUBSUMPTION CHECKING ROUTINES
;;---------------------------------------------------------------------------
;;
```

```
;************************************************************************
;                  SYNTAX AND SUBSUMPTION CHECKING ROUTINES
;************************************************************************

(DEFUN INCORRECT-ELT-ORDER (CLAUSE)
;Determine that the first element of the clause is a Parameter
; and that the second is a function
  (if
    (IF (OR (NOT (MEMBER (second CLAUSE) known-parms :TEST 'EQUAL))
            (NOT (MEMBER (first CLAUSE) AVAILABLE-FUNCTIONS :TEST 'EQUAL)) )
        T )
    (prog2
     (format t "~& ~a "
             "*> Syntax Error: Invalid Ordering of Clause Elements")
     t)))

(DEFUN INVALID-PARM-FUNCTION (FUNCTION parm)
; Determine that the function used with the Parameter is one that is of
; the correct Type : numeric, single-valued or multi-valued
  (if
    (COND ((MEMBER PARM NUMERIC-PARM-LIST :TEST 'EQUAL)
           (IF (NOT (MEMBER FUNCTION NUMERIC-FUNCTIONS :TEST 'EQUAL))
               T ))
          ((OR (MEMBER PARM SINGLE-VALUED-PARM-LIST :TEST 'EQUAL)
               (MEMBER PARM MULTI-VALUED-PARM-LIST :TEST 'EQUAL))
           (IF (NOT (OR (EQUAL FUNCTION 'SAME)
                        (EQUAL FUNCTION 'NOTSAME)))
               T ) ) )
    (prog2
     (format t "~& ~a ~a ~a ~a "
             "*> Syntax Error: Invalid Function" function "Applied to Parameter" parm)
     t)))

(DEFUN INVALID-PARM-VALUE (PARM VALUE)
;Determine that the value assigned to the Parameter in the clause given
; is of the same Type as the Parameter : numeric, single-valued or multi-
  (if
    (COND ((MEMBER PARM NUMERIC-PARM-LIST :TEST 'EQUAL)
           (IF (NOT (NUMBERP VALUE)) T))
          ((OR (MEMBER PARM SINGLE-VALUED-PARM-LIST :TEST 'EQUAL)
               (MEMBER PARM MULTI-VALUED-PARM-LIST :TEST 'EQUAL) )
           (IF (NUMBERP VALUE) T)) )
    (prog2 (format t "~& ~a ~a ~a ~a "
                   "*> Syntax Error: Invalid Value" value "Assigned to Parameter" parm)
           t)))

(defun syntax (rule)
;; perform a syntax check on the given rule
;; 4 types of checks are performed:
;;
;;      1. valid number of atoms in the clauses
;;      2. valid function applied to the given parameter
;;      3. valid value assigned to the parameter
;;      4. valid ordering of atoms in the clause
;;
;; ( all syntax rules are held in the Meta-rulebase )

(let* ((syn-rules (nthcdr 5 meta-rules))
         result
         (res-1
           (dolist (s-rule syn-rules result)
             (dolist (clause (premises rule) result)
               (if (eval (car s-rule))
                   (push (list clause (cadr s-rule)) result)))
             (dolist (clause (conclusions rule) result)
               (if (eval (car s-rule))
                   (push (list clause (cadr s-rule)) result))) )))
    res-1))
```

```
;************************************************************************
;                  The Fuzzy Relation Manipulating Routines
;************************************************************************
; Working : Interactive Routines to Modify or View the Fuzzy Sets
;           as desired by the Expert
;
;    - VIEW the fuzzy relations for a given Parameter type
;    - ADD a value to the fuzzy relations of a given Parameter type
;    - DELETE a value from the fuzzy relations of a given Parameter type
;************************************************************************

(DEFUN SHOW-FSET (PARM)
; show the existing fuzzy relations for a given parameter type
   (CDR (ASSOC PARM FUZZY-SETS)) )

(DEFUN REM-VAL (PARM VALUE)
;Remove a value from the set of fuzzy relations for a given parameter type
;includes error checking for wrong entry values (LET* ((INNER (INDEX 0)
           (RESULT1
             (ASSOC PARM FUZZY-SETS))
           (RESULT
             (DOLIST (SUB (CDR (ASSOC PARM FUZZY-SETS)) INNER)
                (SETF INDEX (1+ INDEX))
                (IF (MEMBER VALUE SUB :TEST 'EQUAL) (RETURN (LIST SUB INDEX) ))))
           (INDEX
             (IF RESULT (1- (CADR RESULT)) NIL) )
           (SUBLIST
             (IF RESULT (CAR RESULT) NIL) ) )
     (IF (NOT RESULT1)(FORMAT T "~& ~S" "NO SUCH PARAMETER YET")
         (PROGN
           (COND ((NOT SUBLIST)
                  (FORMAT T "~& ~& ~S" "PARAMETER NOT DEFINED YET")
                  (FORMAT T "~& ~S ~&" "THE SETS FOR THIS PARAMETER ARE:"))
                 (T (COND ((NOT (EQUAL (CAR SUBLIST) VALUE))
                           (SETF (NTH INDEX (CDR (ASSOC PARM FUZZY-SETS)))
                                 (REMOVE VALUE
                                         (NTH INDEX (CDR (ASSOC PARM FUZZY-SETS))))))
                          ((AND (EQUAL (CAR SUBLIST) VALUE)(< 1 (LENGTH SUBLIST)))
                           (SETF (NTH INDEX (CDR (ASSOC PARM FUZZY-SETS)))
                                 (CDR (NTH INDEX (CDR (ASSOC PARM FUZZY-SETS))))))
                          ((AND (EQ 1 (LENGTH SUBLIST))
                                (< 2 (LENGTH (ASSOC PARM FUZZY-SETS))))
                           (SETF (CDR (ASSOC PARM FUZZY-SETS))
                                 (APPEND
                                   (SUBSEQ (CDR (ASSOC PARM FUZZY-SETS)) 0
                                           (IF (EQ INDEX 0) 0 INDEX))
                                   (NTHCDR (1+ INDEX) (CDR (ASSOC PARM FUZZY-SETS))))))
                          ((AND (EQ 2 (LENGTH (ASSOC PARM FUZZY-SETS)))
                                (EQ 1 (LENGTH SUBLIST)))
                           (COND ((NOT (EQUAL (CAAR FUZZY-SETS) PARM))
                                  (SETF FUZZY-SETS (REMOVE (ASSOC PARM FUZZY-SETS)
                                                           FUZZY-SETS)))
                                 (T
                                  (SETF FUZZY-SETS (CDR FUZZY-SETS))) ) ) ) ) )
           (CDR (ASSOC PARM FUZZY-SETS)) ) ) ) )

(DEFUN ADD-VAL (PARM VALUE)
;add a value to the fuzzy relations which exist for a given parameter
;interactive, Asks the user to determine where the new value best fits within
;the existing relations (PROG (PLACE SET POS RESULT)
    (COND ((ASSOC PARM FUZZY-SETS)
           (COND ((DOLIST (SUBLIST (CDR (ASSOC PARM FUZZY-SETS)) )
                    (IF (MEMBER VALUE SUBLIST :TEST 'EQUAL) (RETURN T)) )
                  (FORMAT T "~& ~& ~S" "That Parameter Value Exists Already") )
                 (T (FORMAT T "~& ~S ~&" PARM)
                    (FORMAT T "~& ~S ~& ~& ~X ~&"
```

```
                    " The Existing Fuzzy Sets for this parameter are "
                    (CDR (ASSOC PARM FUZZY-SETS)) )
                (FORMAT T "~& ~& ~S ~& ~S ~& ~S ~& ~S ~& "
                    "The sub-lists given describe separate classes of values which"
                    "the parameter may hold.  Each Class List is ordered in"
                    "a progression of these values, which values range from"
                    "very *** GENERAL *** to very *** SPECIFIC ***")
                (FORMAT T "~& ~& ~S ~& ~S ~&"
                    "Into which Class (list) does the current value
                    best fit? (1,2,3..)"
                    " (Enter a Non-Numeric Key if No
                    Sub-set presently exists)" )
                (SETQ PLACE (- (READ-CHAR) 48))
                (SETQ SET (NTH (1- PLACE)(CDR (ASSOC PARM FUZZY-SETS))))
                (COND (((< PLACE 10)
                        (FORMAT T "~& ~& ~X ~& ~S ~& ~S ~& ~S ~&"
                            SET
                            "And of this Class, into which position"
                            "within the class does the new"
                            "value best fit? (1,2,3,..)")
                        (SETQ POS (- (READ-CHAR) 48))
                        (SETF (NTH (1- PLACE)
                                (CDR (ASSOC PARM FUZZY-SETS)))
                            (APPEND
                                (APPEND
                                    (SUBSEQ (NTH (1- PLACE)(CDR
                                                (ASSOC PARM FUZZY-SETS)))
                                        0 (1- POS))
                                    (LIST VALUE) )
                                (NTHCDR (1- POS) (NTH (1- PLACE)
                                    (CDR (ASSOC PARM FUZZY-SETS)) )) )) )
                    (T (SETF (CDR (ASSOC PARM FUZZY-SETS))
                            (APPEND (LIST (LIST VALUE))
                                (CDR (ASSOC PARM FUZZY-SETS)))))))))
        (T (FORMAT T "~& ~& ~S ~& ~S ~& ~X"
                "New Parameter Type to the Fuzzy Relations ..."
                "New Set Being Created ...." (PUSH (LIST PARM
                                                        (LIST VALUE))
                                                    FUZZY-SETS) ) )
    (FORMAT T "~& ~S ~& ~S"
        PARM (CDR (ASSOC PARM FUZZY-SETS)) ) ) )

(defun get-sub (clause-1 clause-2)
;; determine which of the two given clauses describes a more general situation
;; over the given parameter. Determine which clause describes a tighter, more
;; rigorous constraint over the given parameter. Use the Expert-defined set
;; of 'fuzzy' relations (a-list) to make comparison.
;; 1. retrieve the assoc for the given parameter
;; 2. the more general case is the clause whose value is found to be closer
;;    to the (front) of the returned list from step 1.
)

(defun modify ()
; allow the modification (addition to, deletion from, viewing of) any of
; the existing environment parameters. e.g., provide the user the
; capability to clearly see, and possibly change, the
; system's definitions of its world.

(let* ((msg
            (format t "~& ~a ~& ~a ~& ~& ~a ~a ~& ~a ~a ~& ~a ~a ~& ~&"

"The known sets are :"
                "Parameter Value Type Sets and Their Memberships:"
                "1.  Numeric" numeric-parm-list
                "2.  Single-valued" single-valued-parm-list
                "3.  Multi-valued" multi-valued-parm-list  ) )
            (msg1
            (format t "~a ~& ~& ~a ~a ~& ~a ~a ~& ~a ~a"
                "Parameter Context Types and Their Memberships:"
```

```
                    "4. Patient" patient-parms
                    "5. Disease" disease-parms
                    "6. Drug " drug-parms ) )
              (msg2
               (format t "~& ~a" "Which Set to Consider ? ( 1,2,3,... )" ) )
              (ans1 (- (read-char) 49))
              (msg3
                (format t "~& ~a" "Operation ? (Add, Delete : A,D)"))
              (ans2 (read-char)) )
       (cond ((or (eq ans2 65)(eq ans2 97))
              (add-value (nth ans1 defs) ) )
             ((or (eq ans2 68)(eq ans2 100))
              (del-value (nth ans1 defs) ) )
             (t (format t "~& ~a" "Invalid entry: exiting")) ) ) )

(defun add-value (listname)
  (prog (new-val)
    (format t "~& ~a " "What to Add to the Set?")
    (setq new-val (read))
    (push new-val listname) ) listname)
(defun del-value (listname)
  (let* ((msg1 (format t "~& ~a"
                       "Which Value to Delete ? (1,2,3,...)"))
         (ans1 (- (read-char) 49)) )
    (cond ((> ans1 0)
           (delete (nth ans1 listname) listname))
          (t (pop listname)) ) listname))
```

```
(defun simple-check (rule)
;; perform a check on the rule against the entire domain rulebase for the
;; cases of simple negation and simple redundancy
;;
;; Redundacy == same premise & same conclusion
;; Negation  == same premise & diff conclusion
;;
;; *** exception to negation case : if parameter in conclusions is multi-valued
;;     and the values assigned in the two cases are subsets of one another,
;;     then a case of simple Subsumption has been found.
;;
;; the conflicting clauses are not returned here because of the nature of
;; these 'simple' conflicting cases where the conflict is quickly spotted.
;; results are like: ((rulenumber "conflict type")(rulenumber "conflict type"))
;;
  (let* (results
         (domain-rules medical-rules)
         (new-rule rule)
         (new-rule-premise (premises new-rule))
         (new-rule-concl (car (conclusions new-rule)))
         (new-c-parm (second new-rule-concl))
         (similar-conc-rules (concludes-on (cadar (conclusions rule))))
         (findings
          (dolist (old-rule-num similar-conc-rules results)
            (let* ((old-rule (nth old-rule-num domain-rules))
                   (old-rule-premise (premises old-rule))
                   (old-rule-concl (car (conclusions old-rule))) )
              (cond ((equal new-rule old-rule)
                     (push (list (rle-num old-rule) "simple redundancy")
                           results))
                    ((and (not (equal old-rule-concl new-rule-concl))
                          (equal old-rule-premise new-rule-premise))
                     (cond ((not (member (cadr new-rule-concl)
                                         multi-valued-parm-list))
                            (push (list (rle-num old-rule)
                                        "simple negation")
```

```
                                   results))
                                   (t (push (list (rle-num old-rule)
                                                  "conclusion subsumption") results)))))
                    results)) ) ) (reverse findings) ))

(
;;;------------------------------------------------------------------------
;; Top Level routine to search out logical inconsistancy
;; Search for cases of negation, redundancy, subsumption.
;;
;; (and (a = n)(b = m)) --> (c = t) )         New Rule
;; Existing Rules which 'apply
;;
;; CASE ONE: same parm mention-order as the pattern (new rule)
;;
;; (and (a = ?x2)(b = ?x3)) --> (c = ?x1) )
;;
;; a. diff prem vals, same concl val = ok rule
;; b. same prem val, diff concl val = covered in simple-check
;; c. same prem val, same concl val = covered in simple-check
;; d. diff prem vals, diff concl val = ok rule
;;
;; CASE TWO: Orig. rule's concl parm shows up in premise of other rule
;;
;; (and (c = ?x1)(a = ?x2)) --> (b = ?x3) )
;;
;;*a. same c val. = 0 orig. prem val diff = redundacy  <----
;;*b. same c val. = 1 orig. prem val diff = negation   <-----
;; c. same c val. > 1 ONE orig. prem val diff = ok rule
;; d. diff c val. = 0 orig. prem val diff = POSSIBLE negation, subsumption
;; e. diff c val. = >= 1 orig. prem val diff = ok rule
;;
;; returns : (rulenum error-type &optional error-clause)
```

Appendix VI

```
;; FRAMES.LOD  LOAD IN ALL SOURCE CODE FOR FRAMES KNOWLEDGE REPRESENTATION.
;;------------------------------------------------------------------------

(LOAD "c:\\gclisp2\\lib\\frames\\frames")
;; FRAMES.LSP    SOURCE CODE FOR FRAMES SYSTEM.
;;------------------------------------------------------------------------
;;
;; Frames idea from Minsky, contributions to the idea from CRM, greatly
;; extended and written toward Common Lisp style.
;;
;; The global flag *indexing-mode* determines whether indexing is to be
;; always done automatically, never done, or done selectively.
;; (For explanation of indexing, see book and files mentioned above.)
;; This flag is set to () as the default, so that the user must change it
;; to 'all  or  'some to set the indexing mode accordingly.

(DEFPARAMETER *INDEXING-MODE* NIL)

;;;!FORM : create a form.
;;    it will initialize all slots to nil but retain the old 'instances'.
;;    it will also update the 'instances' of its 'isa' (i.e. add its name
;;    to new 'isa' and delete its name from old 'isa'.
;;;   non-slot properties will remain as they were.
;;    usage:      (form GTA-1 prototype a GTA-process
;;                   with (CURRENTq = 200)
;;                        (SPEEDq = 20.0) )
;;       or:      (form-e 'GTA-1 'prototype '(GTA-process)
;;                        '( (CURRENTq = 200)  (SPEEDq = 20.0) ) )

(DEFMACRO FORM (NAME CLASSIF A ISAS &REST SLOTS)
    (LET ((SLOTS (CDR SLOTS)))      ;(with (color = red)...) IGNORE "WITH"
    `(APPLY #'FORM-E (QUOTE ,(LIST NAME CLASSIF (COND ((CONSP ISAS) ISAS)
                                    (T (LIST ISAS))) SLOTS)))))
```

```
(DEFUN FORM-E (NAME CLASSIF ISAS SLOTS)
                                                 ;;   INDICATE CLASSIFICATION
        (PUTPROP NAME 'TYPE 'FORM)
        (PUTPROP NAME 'CLASSIFIED-AS CLASSIF)
                                                 ;UPDATE LINKS IN ISA HIERARCHY
                                  ;(REMEMBER, THIS MAY BE AN EXISTING FORM)
        (FOR (I IN (GET-ISA NAME))               ;;   REMOVE NAME FROM OLD ISAS
             (PERFORM (PUTPROP I 'INSTANCES
                            (DELETE NAME (GETPROP I 'INSTANCES)) )) )
        (FOR (I IN ISAS)                         ;;   NOW PUT NAME IN NEW ISAS
             (PERFORM (ADDPROP I 'INSTANCES NAME)) )
        (PUTPROP NAME 'ISAS ISAS)
                                              ;; UPDATE SLOTS. AGAIN, FIRST
                                              ; WE MUST DELETE OLD VALUES.
        (FOR (A-SLOT IN (GETPROP NAME 'SLOT-NAMES))
             (PERFORM (WIPE-SLOT NAME A-SLOT)) )
        (FOR (SLOT IN SLOTS)
             (PERFORM (DO ((SLOT-NAME (CAR SLOT))
                           (ASPECTS   (CDR SLOT) (CDDR ASPECTS)) )
                          ((NULL ASPECTS) NIL)
                        (ADDSPEC-E NAME SLOT-NAME
                                   (CAR ASPECTS) (CADR ASPECTS) )) ) )
                                              ;; RE-DO INDEXES FOR ALL INSTANCES,
                                              ;SINCE VALUES MAY BE DIFFERENT NOW
        (RE-INDEX NAME)

;; FINALLY, RUN ANY "IF-FORMED" DEMONS
        (RUN-DEMON 'IF-FORMED NAME NIL NIL)

NAME )
;; 'DELETE-SLOT : deletes a slot.  The regular version unindexes the slot for
;;    its old value, then re-indexes it if it still has a default value.
;;    It also does this for instances of this form.
;;    Function wipe-slot is used by delete-form and form-e, since in those
;;    situations we don't want to re-index the slot.
;;    If the slot value is an embedded form, it is deleted.
;;    usage:     (delete-slot GTA-1 SPEEDq)
;;      or:     (delete-slot-e 'GTA-1 'SPEEDq)

(DEFMACRO DELETE-SLOT (&REST NAMESLOT)
   '(APPLY #'DELETE-SLOT-E (QUOTE ,NAMESLOT)) )

(DEFUN DELETE-SLOT-E (NAME SLOT)
    (WIPE-SLOT NAME SLOT)
    (RE-INDEX NAME (LIST SLOT)) )

(DEFUN WIPE-SLOT (NAME SLOT)
    (UNINDEX-E NAME SLOT)    ;; MUST DO EVEN IF SLOT NOT FILLED
    (AND (MEMBER SLOT (GETPROP NAME 'SLOT-NAMES))
         (LET ((VAL (GET-VAL NAME SLOT)))
            (AND (GET-ASPECT NAME SLOT 'EMBEDDED-FORM)
                 (DELETE-FORM-E VAL) )
            (PUTPROP NAME 'SLOT-NAMES
                  (DELETE SLOT (GETPROP NAME 'SLOT-NAMES)) )
            (PUTPROP NAME SLOT NIL)
            (RUN-DEMON 'IF-DELETED NAME SLOT VAL) ) ) )

;; 'DELETE-FORM : deletes all slots from form and its instances,
;;    but leaves all non-form properties intact.
;;    usage:     (delete-form GTA-1)
;;      or:     (delete-form-e 'GTA-1)

(DEFMACRO DELETE-FORM  (NAME)
  '(FUNCALL #'DELETE-FORM-E (QUOTE ,NAME)) )

(DEFUN DELETE-FORM-E (NAME)
    (COND ((NOT (FORM-P NAME))
           (PRINTLIST "*** " NAME " IS NOT A FORM ***")
           NIL )
          (T (FOR (ISA IN (GET-ISA NAME))
                (PERFORM (PUTPROP ISA 'INSTANCES
                        (DELETE NAME (GETPROP ISA 'INSTANCES)) )) )
```

```
                (FOR (A-FORM IN (GETPROP NAME 'INSTANCES))
                     (PERFORM  (LET ((I (DELETE NAME (GETPROP A-FORM 'ISAS))))
                                (PUTPROP A-FORM 'ISAS I)
                                (OR I (DELETE-FORM-E A-FORM)) )) )
                (FOR (A-SLOT IN (ALL-SLOTS NAME))
                     (PERFORM (WIPE-SLOT NAME A-SLOT)) )
                (REMPROP NAME 'INSTANCES)
                (REMPROP NAME 'TYPE)
                (REMPROP NAME 'ISAS)
                (REMPROP NAME 'SLOT-NAMES)
                (REMPROP NAME 'CLASSIFIED-AS) ).) )

;;!ADD-ISA : add an isa to isas list for a form
;;          usage:    (add-isa GTA-1 ContinuousProcess)
;;             or:    (add-isa-e 'GTA-1 'ContinuousProcess)
(DEFMACRO ADD-ISA (&REST FORMISA)
  '(APPLY #'ADD-ISA-E (QUOTE ,FORMISA)) )

(DEFUN ADD-ISA-E (NAME ISA)
  (LET ((ISA-LIST (GET-ISA NAME)))
    (AND (NOT (MEMBER ISA ISA-LIST))
         (PUTPROP NAME 'ISAS (APPEND ISA-LIST (LIST ISA)))
         (ADDPROP ISA 'INSTANCES NAME)
         (RE-INDEX NAME) ) ) )   ;; re-do indexes, since values may be diff.

;;!DELETE-ISA : delete an isa from isa list for a form
;;             usage:   (delete-isa GTA-1 ContinuousProcess)
;;                or:   (delete-isa-e 'GTA-1 'ContinuousProcess)

(DEFMACRO DELETE-ISA (&REST NAMEISA)
  '(APPLY #'DELETE-ISA-E (QUOTE ,NAMEISA)) )

(DEFUN DELETE-ISA-E (NAME ISA)
  (LET ((ISA-LIST (GET-ISA NAME)))
    (AND (MEMBER ISA ISA-LIST)
         (PUTPROP NAME 'ISAS (DELETE ISA ISA-LIST))
         (PUTPROP ISA 'INSTANCES
                  (DELETE NAME (GETPROP ISA 'INSTANCES)) )
         (RE-INDEX NAME) ) ) )   ;; re-do indexes ;;'ADDSPEC : add an aspect to a slot, check 'always conflict, and
;;   execute the 'if-added field.  also can add embedded forms.
;;   usage:     (addspec GTA-1 SGTemp = -60)
;;      or:    (addspec-e 'GTA-1 'SGTemp '= '-60)

(DEFMACRO ADDSPEC (&REST EXPFORM)
  '(APPLY #'ADDSPEC-E (QUOTE ,EXPFORM)) )

(DEFUN ADDSPEC-E (NAME SLOT ASPECT VAL)
  (CASE ASPECT
    ((= ALWAYS)
     (COND
       ((SLOT-ALWAYS NAME SLOT)
        (PRINT "*** CONFLICT TO UPPER LEVEL'S ALWAYS ASPECT !!")
        NIL )
       ((AND (NOT (ATOM VAL)) (EQ (CAR VAL) '*FORM))
        (LET ((NAME1 (GENSYM (CAR (CDDDR VAL)))))
          (EVAL (CONS 'FORM (CONS NAME1 (CDR VAL))))
          (INSERT-ASPECT NAME SLOT 'EMBEDDED-FORM T)
          (ADDSPEC-E NAME SLOT ASPECT NAME1) ) )
       (T                                       ;Usual case...
        (INSERT-ASPECT NAME SLOT ASPECT VAL)
        (RE-INDEX NAME (LIST SLOT))
        (RUN-DEMON 'IF-ADDED NAME SLOT VAL)
        SLOT ) ) )
    (INCLUDE
     (COND ((ATOM VAL) (PRINT "INCLUDE VALUE MUST BE A LIST"))
           ((EQ (CAR VAL) '*NOT*)
            (INSERT-ASPECT NAME SLOT 'INCLUDE
                           (SET-DIFFERENCE
                             (GET-ASPECT NAME SLOT 'INCLUDE)
                             (CDR VAL)) )
            (RUN-DEMON 'IF-UNINCLUDED NAME SLOT (CDR VAL)) )
           (T
```

```
              (INSERT-ASPECT NAME SLOT 'INCLUDE
                                    (UNION VAL
                                           (GET-ASPECT NAME SLOT 'INCLUDE)) )
              (RUN-DEMON 'IF-INCLUDED NAME SLOT VAL) ) ) )
        (OTHERWISE
           (INSERT-ASPECT NAME SLOT ASPECT VAL) SLOT) ) )

;; INSERT-ASPECT : add an aspect to a slot, avoiding '= 'always conflicts (DEFUN INSERT-ASPECT (NAME SLOT ASPECT VAL)
    (ADDPROP NAME 'SLOT-NAMES SLOT)
    (CASE ASPECT
       (=       (DELETE-ASPECT NAME SLOT 'ALWAYS))   ;; REMOVE "=" AND
       (ALWAYS (DELETE-ASPECT NAME SLOT '=))         ;; "ALWAYS" CONFLICT
       (OTHERWISE NIL) )
    (LET ((ASPECT-VAL (ASSOC ASPECT (GETPROP NAME SLOT))))
         (COND
;; BEWARE OF RPLACD HERE. DEPENDS ON IMPLEMENTATION OF FORMS PERHAPS...

(ASPECT-VAL (RPLACD ASPECT-VAL VAL))
            (T (ADDPROP NAME SLOT (CONS ASPECT VAL))) ) ) )

;; RUN-DEMON : execute any "demon" functions of given type (DEFUN RUN-DEMON (TYPE NAME SLOT VAL)
    (FOR (A-FORM IN (ALL-ISAS NAME))
         (FILTER                                 ;Save results? for IF-NEEDED.
            (LET ((DEMON-FUN
                    (CASE TYPE                   ;Decide where demon stored.
                       ((IF-FORMED) (GET-VAL A-FORM TYPE)) ; Also IF-KILLED?
                       (OTHERWISE   (GET-ASPECT A-FORM SLOT TYPE))) )
               (AND DEMON-FUN (FUNCALL DEMON-FUN NAME SLOT VAL)) ) ) ))

;;!DELETE-ASPECT : delete an aspect for a slot
;;      usage:    (delete-aspect 'GTA-1 'SGTemp '=)

(DEFUN DELETE-ASPECT (NAME SLOT ASPECT)
    (LET ((PLIST (GETPROP NAME SLOT))
          (AVAL  (ASSOC ASPECT (GETPROP NAME SLOT))) )
       (AND AVAL (PUTPROP NAME SLOT (DELETE AVAL PLIST)) NIL) ) )

;;!ALL-SLOTS : make a list of all slots, including defaults, for a form
;;      usage:    (all-slots 'GTA-1)

(DEFUN ALL-SLOTS (NAME)
    (REMOVEDUPS
       (FOR (A-FORM IN (ALL-ISAS NAME))              ;MUST do append (like COPY).
            (SPLICE (APPEND (GETPROP A-FORM 'SLOT-NAMES) NIL)) ) ) )

;;!FORM-P : determine if name is a form
;;      usage:    (form-p 'GTA-1)

(DEFUN FORM-P (NAME)
    (AND (SYMBOLP NAME) (EQ (GETPROP NAME 'TYPE) 'FORM)) )

;;!SLOT-VAL : find value of a slot, using defaults or 'if-needed if necessary
;;    checking value and 'if-needed at each level before moving up
;;    (Winston-Horn's "fget-z")
;;    usage:    (slot-val GTA-1 SGTemp)
;;       or:    (slot-val-e 'GTA-1 'SGTemp)

(DEFMACRO SLOT-VAL (&REST NAMESLOT)
   `(APPLY #'SLOT-VAL-E (QUOTE ,NAMESLOT)) )

(DEFUN SLOT-VAL-E (NAME SLOT)
   (ISA-SEARCH NAME SLOT 'IF-NEEDED))

;;!SLOT-VAL-N : find value of given slot, first searching for any default
;;    values, then searching for any if-needed's (Winston-Horn's "fget-n")
;;    usage:    (slot-val-n GTA-1 SGTemp)
;;       or:    (slot-val-n 'GTA-1 'SGTemp)
```

```
(DEFMACRO SLOT-VAL-N (&REST NAMESLOT)
   `(APPLY #'SLOT-VAL-N-E (QUOTE ,NAMESLOT)) )

(DEFUN SLOT-VAL-N-E (NAME SLOT)
   (OR (ISA-SEARCH NAME SLOT 'VALUE-ONLY)
       (ISA-SEARCH NAME SLOT 'IF-NEEDED)))

;; ISA-SEARCH : does breadth first search of isas of a name, until given
;;   function is satisfied for a slot and one of the isas (DEFUN ISA-SEARCH (NAME SLOT METHOD)
   (DO* ((NEW-ISAS NIL  (SET-DIFFERENCE (GET-ISA AN-ISA) ISAS-SEEN) )
         (ISA-LIST (LIST NAME)  (APPEND (CDR ISA-LIST) NEW-ISAS) )
         (ISAS-SEEN (LIST NAME) (APPEND ISAS-SEEN NEW-ISAS) )
         (AN-ISA NAME (AND ISA-LIST (CAR ISA-LIST))) ANSWER )
        ((OR (NULL ISA-LIST) ANSWER) ANSWER)
;        (SETQ ANSWER (EVAL FUNC))
      (SETQ ANSWER
            (CASE METHOD                             ;Can use other methods also!
              (INDEX-NEEDED (GET-ASPECT AN-ISA SLOT 'INDEX-NEEDED))
              (ALWAYS   (GET-ASPECT AN-ISA SLOT 'ALWAYS))
              (VALUE-ONLY (GET-VAL AN-ISA SLOT))  ;No IF-NEEDED's.
              (OTHERWISE (OR (GET-VAL AN-ISA SLOT)
                             (CAR (RUN-DEMON 'IF-NEEDED AN-ISA SLOT NIL)) )) ))
))

;; GET-ASPECT : find value of a specific aspect of a slot
(DEFUN GET-ASPECT (NAME SLOT ASPECT)
       (LET ((VAL (ASSOC ASPECT (GETPROP NAME SLOT))))
            (COND (VAL (CDR VAL))) ) )

;; GET-VAL : find value of a slot, NOT using defaults or 'if-neededs
(DEFUN GET-VAL (NAME SLOT) (OR (GET-ASPECT NAME SLOT 'ALWAYS)
                               (GET-ASPECT NAME SLOT '=)))

;;!GET-INCLUDES : get included values for a slot, including defaults
;;     usage:    (get-includes GTA-1 ProcessVariables)
;;        or:    (get-includes 'GTA-1 'ProcessVariables)

(DEFMACRO GET-INCLUDES (&REST NAMESLOT)
   `(APPLY #'GET-INCLUDES-E (QUOTE ,NAMESLOT)) )

(DEFUN GET-INCLUDES-E (NAME SLOT)
   (DO* ((INCL-LIST NIL  (UNION (GET-ASPECT (CAR ISA-LIST) SLOT 'INCLUDE)
                                INCL-LIST ) )
         (ISA-LIST (ALL-ISAS NAME) (CDR ISA-LIST) ))
        ((NULL ISA-LIST) INCL-LIST)))

;;!GET-ISA : find the 'isa list of a form
;;     usage:    (get-isa 'GTA-1)

(DEFUN GET-ISA (NAME) (GETPROP NAME 'ISAS))

;;!PRINT-FORM : Show the description about a form.  The internal structures
;;              (e.g. type, instances, slot-names) will not be print.
;;              usage:    (print-form GTA-1)

(DEFMACRO VALUE-FORM (NAME)
    `(FUNCALL #'VALUE-FORM-E (QUOTE ,NAME)))

(DEFUN VALUE-FORM-E (NAME)
    (SYMBOL-PLIST NAME))

(DEFMACRO PRINT-FORM (NAME)
   `(FUNCALL #'PRINT-FORM-E (QUOTE ,NAME)))

(DEFUN PRINT-FORM-E (NAME)
     (COND ((FORM-P NAME)
```

```
              (PRINTLIST NAME " HAS :")
              (TERPRI)
              (FOR (ITEM IN (PAIR-UP (SYMBOL-PLIST NAME)))
                  (WHEN (NULL (MEMBER (CAR ITEM)
                                    '(INSTANCES TYPE SLOT-NAMES) ) ) )
                  (PERFORM (PRINT-SLOT ITEM)) ) NIL )
          (T (PRINTLIST "*** " NAME " IS NOT A FORM ***")) ) )

;; PRINT-SLOT : Print a slot in a pretty format (DEFUN PRINT-SLOT ( A-SLOT)
  (LET* ((NAME (CAR A-SLOT)) (NAME-TAB 3)
         (VAL-TAB (+ NAME-TAB (FLATSIZE NAME)))
         (VAL (CADR A-SLOT)))

(TERPRI)
    (SPACES NAME-TAB)
    (COND ((AND (CONSP VAL)
                (CONSP (CAR VAL)))
           (PRINC NAME)
           (DOLIST (SLOT VAL NIL)
             (PRINC " ")
             (PRINC (CAR SLOT))
             (PRINC " ")
             (PRINC (CDR SLOT))
             (TERPRI)
             (SPACES VAL-TAB)))
          (T (PRINC NAME)
             (SPACES 4)
             (PRINC VAL)
             (TERPRI)))))
;; SLOT-ALWAYS : return always aspect (if any) of a slot, using defaults (DEFUN SLOT-ALWAYS (NAME SLOT)
    (ISA-SEARCH NAME SLOT 'ALWAYS))

;;;ALL-ISAS : return list of all isas of a form, including itself
;;      usage:   (all-isas 'GTA-1)

;; copy-list was necessary in below, else plists accidently spliced and
;; infinite loops resulted.
(DEFUN ALL-ISAS (NAME)
   (DO* ((ANSWER NIL  (APPEND ANSWER ISA-LIST))
         (ISA-LIST (LIST NAME) (FOR (AN-ISA IN ISA-LIST)
                                   (SPLICE (COPY-LIST (GET-ISA AN-ISA))) )))
        ((NULL ISA-LIST) (REMOVEDUPS ANSWER))))  ; do we want redund. unions?

;;;'ALL-INSTANCES : list all instances of a given form
;;       usage:   (all-instances 'GTA-1)

; NOT TOO SURE IF THE UNION AND RECURSION DONE RIGHT--WHO USES IT ?
; UNION BLEW UP. USING REMOVEDUPS INSTEAD...AS SHOULD HAVE BEEN DONE.

(DEFUN ALL-INSTANCES (NAME)
   (FUNCALL #'REMOVEDUPS (FOR (X IN (GETPROP NAME 'INSTANCES))
                     (SPLICE (APPEND (ALL-INSTANCES X) (LIST X)  )) ))  )

;; RE-INDEX : unindex and re-index all slots which may have been changed
;;      in value for instances of a given form, including itself
;;      if "slots" argument is present, just do given slots (DEFUN RE-INDEX (NAME &OPTIONAL SLOTS)
 (AND *INDEXING-MODE*
  (FOR (A-FORM IN (APPEND (ALL-INSTANCES NAME) (LIST NAME)))
     (PERFORM (FOR (SLOT IN (OR SLOTS
                              (SET-DIFFERENCE (ALL-SLOTS A-FORM)
                                              (GETPROP A-FORM 'SLOT-NAMES) ))
              (PERFORM (COND ((OR (EQ *INDEXING-MODE* 'ALL)
                                 (ISA-SEARCH A-FORM SLOT
```

```
                                          'INDEX-NEEDED ) )
                                 (UNINDEX-E A-FORM SLOT)
                                 (INDEX-E A-FORM SLOT) ))) )) ) ) )

;;!INDEX-FORM : place a form on index list according to a slot value
;;     usage:    (index-form GTA-process SGTemp)
;;        or:    (index-e 'GTA-process 'SGTemp)

(DEFMACRO INDEX-FORM (&REST NAMESLOT)
   '(APPLY #'INDEX-E (QUOTE ,NAMESLOT)) )

(DEFUN INDEX-E (NAME SLOT)
     (COND ((NOT (MEMBER (GETPROP NAME 'CLASSIFIED-AS)
                         '(CLASS PATTERN) ) )
           (LET ((THE-VAL (SLOT-VAL-E NAME SLOT)))
               (COND (THE-VAL (ADDPROP SLOT THE-VAL NAME))) ) )) )

;;'GET-INDEX : retrieve list of forms having given value for given slot
;;     usage:    (get-index SGTemp -55)
;;        or:
(DEFMACRO GET-INDEX (&REST SLOTVAL)
   '(APPLY #'GET-INDEX-E (QUOTE ,SLOTVAL)) )

(DEFUN GET-INDEX-E (SLOT VAL)
   (GETPROP SLOT VAL) )

;;'UNINDEX-FORM : remove a form from index list for given slot
;;     usage:    (unindex-form GTA-1 SGTemp)
;;        or:    (unindex-e 'GTA-1 'SGTemp)

(DEFMACRO UNINDEX-FORM (&REST NAMESLOT)
   '(APPLY #'UNINDEX-E (QUOTE ,NAMESLOT)) )

; USES MAPSTEP INVENTED TO SATISFY GENERAL NEED NOT OFFERED IN COMMONLISP
; OR GCLISP. NOT SAME AS MAP IN COMMONLISP.

(DEFUN UNINDEX-E (NAME SLOT)
  (AND *INDEXING-MODE*
     (FOR (PROP IN (MAPSTEP '(LAMBDA (X) X) #'CDDR (SYMBOL-PLIST SLOT) ))
         (PERFORM (PUTPROP SLOT PROP (DELETE NAME (GETPROP SLOT PROP)))) ) ) )

;;!INDEX-PROPERTY : index the instances of a form w.r.t a given slot
;;       and mark the "index-needed" aspect of the slot to be indexed
;;       therefore all of the new instances (i.e. those forms entered
;;       the system after "index-property" was called) will be indexed also.
;;       usage:   (index-property GTA-process SGTemp)
;;          or:   (index-property 'GTA-process 'SGTemp)

(DEFMACRO INDEX-PROPERTY (&REST NAMESLOT)
   '(APPLY #'INDEX-PROPERTY-E (QUOTE ,NAMESLOT)) )

(DEFUN INDEX-PROPERTY-E (NAME SLOT)
    (FOR (A-FORM IN (ALL-INSTANCES NAME))
        (PERFORM (INDEX-E A-FORM SLOT)) )
    (ADDSPEC-E NAME SLOT 'INDEX-NEEDED T) )

;;'MATCH-FORM : check if 2 forms match, using given matching mode
;;    if no matching mode is supplied, 'always-compat is the default
;;    usage:   (match animal-x GTA-1 slot-compat)
;;       or:   (match-form-e 'SomeGTA 'GTA-1 'always-compat)

(DEFMACRO MATCH-FORM (&REST X)
   '(APPLY #'MATCH-FORM-E (QUOTE ,X)) )

; ASSUMES THAT MATCH-MODE IS THE NAME OF A FUNCTION TO USE IN APPLY BELOW.

(DEFUN MATCH-FORM-E (INST PAT &OPTIONAL MATCH-MODE)
    (COND ((EQUAL INST PAT) 100)
          ((MATCH-FUNC-P INST) (MATCH-FUNC-EVAL INST PAT))
          ((MATCH-FUNC-P PAT)  (MATCH-FUNC-EVAL PAT INST))
          ((NOT (AND (FORM-P INST) (FORM-P PAT))) NIL)
          ((SLOT-BY-SLOT-MATCH INST PAT (OR MATCH-MODE 'ALWAYS-COMPAT))) ) )
```

```
;; SLOT-BY-SLOT-MATCH : check whether 2 forms match on all slots
;;   return percentage of exact matches, or nil if no match using match mode (DEFUN SLOT-BY-SLOT-MATCH (INST PAT MATCH-MODE)
   (DO ((SLOTS (UNION (ALL-SLOTS PAT) (ALL-SLOTS INST)) (CDR SLOTS) )
        (COUNT (LENGTH SLOTS))
        (TOTAL 0 ) VAL )
       ((NULL SLOTS) (COND ((ZEROP COUNT) 100)
                           (T (/ TOTAL COUNT))))
       (SETQ VAL (FUNCALL (SYMBOL-FUNCTION MATCH-MODE) ;NOT #'...
                          INST PAT (CAR SLOTS)))
       (AND VAL (SETQ TOTAL (+ TOTAL VAL)))))

;; MATCH-FUNC-P : check if a value to be matched is a matching function
; GOOFY USE OF ATOM. MATCH-FUNC SHOULD BE SIMPLE FUN---

(DEFUN MATCH-FUNC-P (VAL)
    (AND (NOT (ATOM VAL))
         (EQ (CAR VAL) '*MATCH-FUNC) ) )

;; MATCH-FUNC-EVAL : apply matching function to value to be matched (DEFUN MATCH-FUNC-EVAL (FUNC VAL)
    (AND (EVAL (SUBST VAL '*VALUE* (CADR FUNC)))
         100 ) )

;; ALWAYS-COMPAT : do slot matching for always-compatible mode (CRM type match)
(DEFUN ALWAYS-COMPAT (INST PAT SLOT)
    (LET ((INST-VAL   (SLOT-VAL-E INST SLOT))
          (PAT-VAL    (SLOT-VAL-E PAT SLOT))
          (PAT-ALWAYS (SLOT-ALWAYS PAT SLOT)) )
        (COND ((NULL INST-VAL) 0)     ;; MATCHES, BUT LOW "QUALITY"
              ((NULL PAT-ALWAYS)
                  (COND ((MATCH-FORM-E INST-VAL PAT-VAL 'ALWAYS-COMPAT))
                        (T 0) ) )     ;; IF '= MATCH, ASSIGN "QUALITY" OF MATCH
              ((MATCH-FORM-E INST-VAL PAT-ALWAYS 'ALWAYS-COMPAT)) ) ) )

;; EXACT-COMPAT : do slot matching where every slot must match exactly (DEFUN EXACT-COMPAT (INST PAT SLOT)
    (MATCH-FORM-E (SLOT-VAL-E INST SLOT) (SLOT-VAL-E PAT SLOT) 'EXACT-COMPAT) )

;; SLOT-COMPAT : do slot matching where all common slots must match exactly (DEFUN SLOT-COMPAT (INST PAT SLOT)
    (LET ((INST-VAL (SLOT-VAL-E INST SLOT))
          (PAT-VAL  (SLOT-VAL-E PAT SLOT)) )
        (COND ((AND INST-VAL PAT-VAL)
                (MATCH-FORM-E INST-VAL PAT-VAL 'SLOT-COMPAT) )
              (T 0) ) ) )

;;;FIND-FORM : find all forms matching given one and which have given isa,
;;   using given matching mode. list is by decreasing quality of match.
;;   if no mode is given, 'always-compat is assumed.  If no isa is given,
;;   the same one as the first isa of the given form is used.
;;   usage:   (find-form SomeProcess-x)
;;      or:   (find-form-e 'SomeProcess-x 'always-compat 'SomeProcess)

(DEFMACRO FIND-FORM (&REST PMI)
   `(APPLY #'FIND-FORM-E (QUOTE ,PMI)) )

(DEFUN FIND-FORM-E (PAT MATCH-MODE ISA-TYPE)
    (LET (FORM-LIST
          QUAL-LIST
          (MATCH-MODE (OR MATCH-MODE 'ALWAYS-COMPAT))
          (ISA-TYPE (OR ISA-TYPE (CAR (GET-ISA PAT)))) )
        (FOR (A-FORM IN (GETPROP ISA-TYPE 'INSTANCES))
            (WHEN (NOT (EQ (GETPROP A-FORM 'CLASSIFIED-AS) 'PATTERN))
                (PERFORM (LET ((QUAL (MATCH-FORM-E A-FORM PAT MATCH-MODE)))
                    (COND (QUAL
                            (SETQ FORM-LIST (CONS A-FORM FORM-LIST))
                            (SETQ QUAL-LIST (CONS QUAL QUAL-LIST)) )) )) )
        (SORT-TO-ORDER FORM-LIST QUAL-LIST) ) )
```

```
;;!WHAT-IS-IT : searches a hierarchy of forms for best non-individual match
;;      usage:    (what-is-it mystery)

(DEFMACRO WHAT-IS-IT (PAT)
    `(WHICH-OF-ISA-ISIT (QUOTE ,PAT) (QUOTE ,(CAR (GET-ISA PAT)))) )

;; WHICH-OF-ISA-ISIT : used by what-is-it to do recursive tree descent (DEFUN WHICH-OF-ISA-ISIT (PAT ISA-TYPE)
    (LET ((FORM-LIST (FIND-FORM-E PAT 'ALWAYS-COMPAT ISA-TYPE)))
        (COND  ((OR (NULL FORM-LIST)
                    (EQ (GETPROP (CAR FORM-LIST) 'CLASSIFIED-AS) 'INDIVIDUAL) )
                ISA-TYPE )  ;; IF NO MATCHES ON THIS LEVEL, JUST RETURN ISA
               ((WHICH-OF-ISA-ISIT PAT (CAR FORM-LIST))) ) ) )
```

Appendix VII(A)

```
;; COMM.LOD   SOURCE FILES FOR LISP / PASCAL COMMUNICATION
;;--------------------------------------------------------------------

(FORMAT T "~%~S" "LOADING COMPUTER-COMPUTER LISP COMMUNICATION ROUTINES:")
(UNLESS (FUNCTIONP 'ENQUEUE)
   (LOAD "C:\\GCLISP2\\LIB\\FUNS\\QUEUES"))
(UNLESS (FUNCTIONP 'LIST-TO-STRING)
   (LOAD "C:\\GCLISP2\\LIB\\FUNS\\STRINGS"))
(LOAD "C:\\GCLISP2\\COMM\\COMMDEF")
(LOAD "C:\\GCLISP2\\COMM\\BUFFER")
(LOAD "C:\\GCLISP2\\COMM\\COMMFUN")
(LOAD "C:\\GCLISP2\\COMM\\MESSAGE")
(LOAD "C:\\GCLISP2\\COMM\\COMINIT")
;; COMMDEF.LSP     SOURCE TO DEFINE COMMUNICATION BUFFERS
;;--------------------------------------------------------------------
;;
;; DEFINITION OF DATA STRUCTURES FOR THE PASSING OF MESSAGES BETWEEN LISP
; AND PASCAL LOWER LEVEL COMM ROUTINES.

(DEFCONSTANT MACHINE-ID "COMPUTER")

(DEFCONSTANT INCOMING-MSG (MAKE-ARRAY 1000 :ELEMENT-TYPE 'STRING-CHAR
                                        :INITIAL-ELEMENT 32))

(DEFCONSTANT OUTGOING-MSG  (MAKE-ARRAY 1000 :ELEMENT-TYPE 'STRING-CHAR
                                        :INITIAL-ELEMENT 32))

(DEFVAR *CBMSGINQ* (MAKE-QUEUE NIL))

(DEFVAR *MSGINQ* (MAKE-QUEUE NIL))

(DEFVAR *CBMSGOUTQ* (MAKE-QUEUE NIL))

(DEFVAR *MSGOUTQ* (MAKE-QUEUE NIL))

(DEFVAR *MSGINS* NIL)                           ;STACK OF ALREADY READ MSGS (DEFVAR *MSGOUTS* NIL)                          ;STACK OF ALREADY PLACED MSGS (DEFSTRUCT ICA
    SEL
    SEG
    OFF
    END
    SEGOBUF
    (OFFOBUF 0)
    SEGIBUF
    (OFFIBUF 0)
    SELINB
    SELOUTB
    )

(DEFCONSTANT ICA1 (MAKE-ICA :SEL #X40 :SEG 0 :OFF 240 :END 255))
```

```
;; The buffer addresses are specified here. As more ports are added, include
;; more minp and maxp offsets. Assumes the seg and selector will remain same.

(DEFSTRUCT MSGBUF SEL SEG OFF NEXT-OFFSET PORT-OFFSETS
           ARY-NAME ARY-BASE ARY-OFF SIZE)

;NOTE: Pascal Inbuffers have length of 950, but start at offset 0 and 1000.

(DEFCONSTANT MSGINBUF (MAKE-MSGBUF :PORT-OFFSETS        ;port# , start, end
                                  '((1 0 949)
                                    (2 1000 1949))
                                  :SIZE 2000    ;used during allocation only.
                                  :ARY-NAME 'INCOMING-MSG))

(MULTIPLE-VALUE-BIND (ARY-OFF ARY-BASE)
    (SYS:%POINTER INCOMING-MSG)
  (SETF (MSGBUF-ARY-BASE MSGINBUF) ARY-BASE
        (MSGBUF-ARY-OFF  MSGINBUF) (+ 11 ARY-OFF)))

;NOTE: Pascal Outbuffer goes from 0 to 999 (length 1000).Used by both ports.
;      Initial value of next-offset must aggree with start of port-offset,
;      whether it is 0 or whatever. It will take on values between the start
;      and end of the buffer inclusive.
(DEFCONSTANT MSGOUTBUF (MAKE-MSGBUF :PORT-OFFSETS '((1 0 1999)
                                                   (2 0 1999))
                                   :SIZE 2000   ;used during allocation only.
                                   :NEXT-OFFSET 0   ;maintained by send-msg
                                   :ARY-NAME 'OUTGOING-MSG))

(MULTIPLE-VALUE-BIND (ARY-OFF ARY-BASE)
    (SYS:%POINTER OUTGOING-MSG)
  (SETF (MSGBUF-ARY-BASE MSGOUTBUF) ARY-BASE
        (MSGBUF-ARY-OFF  MSGOUTBUF) (+ 11 ARY-OFF)))

(DEFVAR ALLOCATED-BUFFERS NIL)

(DEFCONSTANT SOT #X2)

(DEFCONSTANT PREFIX-BYTE-LENGTH 2)

(DEFCONSTANT HEADER-ID-LENGTH 3)

(DEFCONSTANT HEADER-LENGTH 5)

(DEFCONSTANT TEXT-PREFIX-LENGTH (+ 1 PREFIX-BYTE-LENGTH HEADER-ID-LENGTH))

(DEFCONSTANT *CREAM-STREAM* (MAKE-WINDOW-STREAM
        :LEFT 40 :TOP 21 :WIDTH 39 :HEIGHT 3))
;; BUFFER.LSP   SOURCE TO ALLOCATE DOS MEMORY FOR COMMUNICATIONS
;;--------------------------------------------------------------
;;
;; BUFFER ALLOCATION
;; Currently allocates and initializes two msgbufs
;; (msginbuf and msgoutbuf) only. Should be more flexible.

(DEFUN INITCOM ()
  (LET ((SEL-ICA (ICA-SEL ICA1)) (OFF-ICA (ICA-OFF ICA1))
        IN-SEG (IN-OFF 0) IN-SEL
        OUT-SEG (OUT-OFF 0) OUT-SEL)

(MULTIPLE-VALUE-SETQ (IN-SEG IN-SEL)        ;INCOMING MESSAGE BUFFER
        (ALLOCATE-MSGBUF 'MSGINBUF))            ;ALLOCATE MEM FROM DOS.
    (FORMAT T "~% ~A ~A ~A ~X ~% ~A ~X"
            "INCOMING MESSAGE AREA CALLED:" 'MSGINBUF
            "CREATED AT (HEX)SEG"
            IN-SEG " ASSIGNED TO (HEX)SELECTOR" IN-SEL)
                                                ;Store buffer addr in ICA
    (SYS:%CONTENTS-STORE SEL-ICA OFF-ICA       IN-SEG T)
    (SYS:%CONTENTS-STORE SEL-ICA (+ 2 OFF-ICA) IN-OFF T)
    (CLEAR-MSGBUF 'MSGINBUF)                    ;Initialize the mem-block
```

```lisp
      (MULTIPLE-VALUE-SETQ (OUT-SEG OUT-SEL)    ;OUTGOING MESSAGE BUFFER
        (ALLOCATE-MSGBUF 'MSGOUTBUF))           ;ALLOCATE MEM FROM DOS.
      (FORMAT T "~% ~A ~A ~A ~X ~% ~A ~X"
              "OUTGOING MESSAGE AREA CALLED:" 'MSGOUTBUF
              "CREATED AT (HEX)SEG "
              OUT-SEG " ASSIGNED TO (HEX)SELECTOR " OUT-SEL)
                                                ;Store buffer addr in ICA
      (SYS:%CONTENTS-STORE SEL-ICA (+ 4 OFF-ICA) OUT-SEG T)
      (SYS:%CONTENTS-STORE SEL-ICA (+ 6 OFF-ICA) OUT-OFF T)
      (CLEAR-MSGBUF 'MSGOUTBUF)

(SETF (ICA-SEGIBUF ICA1) IN-SEG)          ;REMEMBER THE SEGS
      (SETF (ICA-SEGOBUF ICA1) OUT-SEG)
      (SETF (ICA-SELINB ICA1)  IN-SEL)          ;REMEMBER THE SELECTORS.
      (SETF (ICA-SELOUTB ICA1) OUT-SEL)

(PRINT "COMMUNICATIONS AREA INITIALIZED AND ZEROED OUT.")
      ICA1 ) )

;; Allocates DOS memory as specified in the previously created structure
;; definition which is passed in as a name. Updates global variable to hold
;; names of allocated buffers for de-allocation--for example on exit from Lisp.

(DEFUN ALLOCATE-MSGBUF (STRUCTURE-NAME)
   (OR (TYPEP (EVAL STRUCTURE-NAME) 'MSGBUF)
       (ERROR "~A ~A" "CANNOT ALLOCATE-BUFFER:" STRUCTURE-NAME))
   (MULTIPLE-VALUE-BIND (SEG SEL)
       (LMALLOC '(MSGBUF-SIZE ,STRUCTURE-NAME))
     (EVAL '(SETF (MSGBUF-SEL ,STRUCTURE-NAME) SEL
                  (MSGBUF-SEG ,STRUCTURE-NAME) SEG))
     (PUSH STRUCTURE-NAME
           ALLOCATED-BUFFERS)
     (VALUES SEG SEL)))

(DEFUN DE-ALLOCATE-MSGBUF (STRUCTURE-NAME)
   (OR (TYPEP (EVAL STRUCTURE-NAME) 'MSGBUF)
       (ERROR "~A ~A" "CANNOT DE-ALLOCATE-BUFFER:" STRUCTURE-NAME))
   (EVAL '(SYS:%SYSINT #X21 #X#U9200
              (MSGBUF-SEG ,STRUCTURE-NAME) 0
              (MSGBUF-SEL ,STRUCTURE-NAME)))
   (SET STRUCTURE-NAME NIL)
   (SETF ALLOCATED-BUFFERS (REMOVE STRUCTURE-NAME ALLOCATED-BUFFERS)))

;; Primitive to allocate a block of DOS memory.

(DEFUN LMALLOC (SIZE)
   (MULTIPLE-VALUE-BIND (FLAGS RMODE-SEG IGNORE IGNORE PMODE-SEL)
       (SYS:%SYSINT #X21 #X#U9100 0 SIZE 0)     ;DO LMALLOC
     (IF (LOGBITP 0 FLAGS)
         (ERROR "LMALLOC FAILED -- INSUFFICIENT LOW MEMORY!")
         (VALUES RMODE-SEG PMODE-SEL))))

(DEFUN CLEAR-MSGBUF (STRUCTURE-NAME)
   (OR (TYPEP (EVAL STRUCTURE-NAME) 'MSGBUF)
       (ERROR "~% ~A ~A" "CANNOT CLEAR-BUFFER. NOT A BUFFER:" STRUCTURE-NAME))
   (EVAL '(CLEAR-MEM-BLOCK (MSGBUF-SEL ,STRUCTURE-NAME)
                           (MSGBUF-OFF ,STRUCTURE-NAME)
                           (MSGBUF-SIZE ,STRUCTURE-NAME) 0)))

(DEFUN CLEAR-MEM-BLOCK (SEL OFF LEN &OPTIONAL INIT)
   (DOTIMES (I LEN)
      (SYS:%CONTENTS-STORE SEL (+ I OFF) (OR INIT 0) NIL)))

(DEFUN COMM-EXIT-HOOK ()
   (MAPCAR # DE-ALLOCATE-MSGBUF ALLOCATED-BUFFERS))
;; COMMFUNS.LSP   SOURCE FOR THE COMMUNICATION INTERFACE
;;---------------------------------------------------------------------
;;
;; LISP FUNCTIONS WHICH INTERFACE TO LOWER LEVEL PASCAL COMM ROUTINES.
;; NECESSARY DATA STRUCTURES DEFINED ELSEWHERE.
;;---------------------------------------------------------------------
;Change History:
```

```
;Transmit a list object.
(DEFUN PLACE-MSG-LIST (LIS MID1 MID2 MID3 PORT)
   (PLACE-MSG (STRING-APPEND MID1 MID2 MID3 (LIST-TO-STRING LIS))  PORT) )

;Transmit a string object.
(DEFUN PLACE-MSG (MSGTEXT MID1 MID2 MID3 PORT)
   (LET* ((LEN (LENGTH MSGTEXT))
          (BUF-NAME 'MSGOUTBUF)
          (ARY (EVAL (MSGBUF-ARY-NAME (EVAL BUF-NAME)))))

(DOTIMES (I LEN )
        (SETF (AREF ARY (+ I 6)) (SCHAR MSGTEXT I)) )
     (SETF (AREF ARY 0) 2
           (AREF ARY 1) (LOGAND LEN #XFF00)
           (AREF ARY 2) (LOGAND LEN #X00FF)
           (AREF ARY 3) MID1
           (AREF ARY 4) MID2
           (AREF ARY 5) MID3
           (AREF ARY (+ LEN 7))
              (EVAL (CONS 'LOGXOR       ;calc checksum
                    (COERCE (SUBSEQ ARY 0 (+ LEN 6)) 'LIST))))
     (SEND-MSG BUF-NAME LEN PORT)))

;; Need to define a PUT-MSG here for top level access (via Lisp Queues) to the
;; SEND-MSG lowest level. Should be counterpart to the GET-MSG defined below.

;; Lowest level function to transfer msg data from Lisp array to external msg
;; buffer for asynchronous transmission.

;Read location 0:04f4,4f5 to get offset of next available strg addr.
;Read location 0:04f6,4f7 to get the offset.
;Store the array at this address
;Places new address in ica "next-msg-to-go" which is read by software int.
;Then, invokes the interrupt to actually send the interrupt.
;---> assume msgtext is an array, length is the length of the message+head (DEFUN SEND-MSG (BUF-NAME LENGTH PORT)
   (LET* ((BUF (EVAL BUF-NAME))
          FLAGS
          (ERRCODE 0)
          (TOTAL-LENGTH (+ LENGTH 7))
          (ARY-BASE (MSGBUF-ARY-BASE BUF))
          (ARY-OFF  (MSGBUF-ARY-OFF  BUF))
          (SEL (MSGBUF-SEL BUF))
          (OFF (MSGBUF-OFF BUF))
          (NEXT-OFFSET (MSGBUF-NEXT-OFFSET BUF)) ;NOT relative to OFF
          (MINBUFOFF (SECOND (ASSOC PORT (MSGBUF-PORT-OFFSETS BUF))))
          (MAXBUFOFF (THIRD (ASSOC PORT (MSGBUF-PORT-OFFSETS BUF))))
          (ROOM-LEFT ( 1+ (- MAXBUFOFF NEXT-OFFSET)))
          (NO-CODE #X200)(CX (+ (LSH PORT 13) LENGTH))
          (DISPLAY-STRM (CAR (GET 'RECEIVE-MSG 'STREAM))) ;NOT USED YET
;         (DISPLAY-FUN  (CAR (GET 'RECEIVE-MSG 'FUN)))    ;NOT USED YET
          )

;Move the msg into array
     (COND
           ((> TOTAL-LENGTH ROOM-LEFT)
             (SYS:%MOVE-MEM  ARY-BASE  ARY-OFF SEL  (+ OFF NEXT-OFFSET)
                             ROOM-LEFT )            ;GO TILL END OF BUFFER
             (SYS:%MOVE-MEM  ARY-BASE (+ ARY-OFF ROOM-LEFT) SEL
                             (+ OFF MINBUFOFF)
                             (- TOTAL-LENGTH ROOM-LEFT) )
             (SETF  (MSGBUF-NEXT-OFFSET BUF)
                    (+ MINBUFOFF (- TOTAL-LENGTH ROOM-LEFT))))
           (T
             (SYS:%MOVE-MEM
                ARY-BASE ARY-OFF SEL (+ OFF NEXT-OFFSET)  TOTAL-LENGTH)
             (SETF (MSGBUF-NEXT-OFFSET BUF)
                   (+ MINBUFOFF
                      (MOD (+ NEXT-OFFSET TOTAL-LENGTH) MAXBUFOFF)))))
```

```
   (LOOP (MULTIPLE-VALUE-SETQ (FLAGS IGNORE IGNORE IGNORE ERRCODE)
           (SYS:%SYSINT #X63 DO-CODE NEXT-OFFSET CX 0))  ;Loop till not busy
         (AND (NOT (ZEROP ERRCODE)) (RETURN ERRCODE)))
   ) )

;; Top level function to get a msg from a queue of "received msgs".
;; If QUEUE is non-nil, the Control Break Queue is referenced, else the
;; normal Queue.

(DEFUN GET-MSG (&OPTIONAL QUEUE)
   (LET ((MSG (COND ((ISEMPTYQ (COND (QUEUE *CBMSGINQ*)
                                     (T *MSGINQ*)))  'DUMMY)
                    (T (DEQUEUE (COND (QUEUE *CBMSGINQ*)
                                      (T *MSGINQ*)) )))))

(COND ((EQ MSG 'DUMMY) NIL)      ;Iff msg was dequeued, return it.
            (T  MSG))))

;; Intermediate level function to receive a msg and store on Lisp Queue.
;; If QUEUE argument is non-nil, the Control Break Queue is referenced, else
;; the normal Queue.

(DEFUN READ-MSG (&OPTIONAL QUEUE)
   (LET ( (MSG (RECEIVE-MSG QUEUE)) HEADER TEXT)
      (COND (MSG                                 ;Was a msg actually read? Yes.
             (MULTIPLE-VALUE-SETQ (HEADER TEXT)
               (STRIP-TOKEN MSG " "))            ;Strip off header until blank.
             (ENQUEUE (COND (QUEUE *CBMSGINQ*)
                            (T *MSGINQ*)) MSG)   ;Store whole msg (hdr + text).
             (VALUES HEADER TEXT)))))            ;Return parsed msg.

;; Lowest level function to transfer msg data from outside Lisp to a Lisp
;; array for further processing.
;; If CBREAK argument is non-nil, the Control Break Queue is referenced, else
;; the normal Queue.

(DEFUN RECEIVE-MSG (&OPTIONAL CBREAK)
   (LET* (FLAGS BYTE-CNT B-OFF CX msg      ;Data returned by msgq manager
          (BUF (EVAL 'MSGINBUF))           ;Lisp array loc. and dos mem alloc'd
          (ERRCODE 0) PORT                 ;Port# of incoming msg (relates to buf)
          MINBUFOFF MAXBUFOFF              ;Which portion of the buf holds msg?
          (ARY-BASE (MSGBUF-ARY-BASE BUF))
          (ARY-OFF  (MSGBUF-ARY-OFF  BUF))
          (BUF-LIST (MSGBUF-PORT-OFFSETS BUF))
          (SEL (MSGBUF-SEL BUF))
          ROOM-LEFT
          (DO-CODE (COND (CBREAK #X01) (T #X101)))
          (DISPLAY-STRM (CAR (GET 'RECEIVE-MSG 'receive-msg-STREAM)))
          (DISPLAY-FUN  (CAR (GET 'RECEIVE-MSG 'receive-msg-FUN)))
          )

(LOOP (MULTIPLE-VALUE-SETQ (FLAGS BYTE-CNT B-OFF CX ERRCODE)
              (SYS:%SYSINT #X63 DO-CODE 0 0 0))      ;Loop till not busy
            (AND (NOT (ZEROP ERRCODE)) (RETURN ERRCODE)))

(COND ((= ERRCODE 1)                                 ;SUCCESSFUL DEQUEUE
             (SETF PORT (LSH CX -13))                      ;Determine Port# &
             (SETF MINBUFOFF
                   (SECOND (ASSOC PORT BUF-LIST))          ;which part of
                   MAXBUFOFF
                   (THIRD  (ASSOC PORT BUF-LIST)))         ;buf to use?
             (SETQ ROOM-LEFT (1+ (- MAXBUFOFF B-OFF)))
                                                           ;Move the msg into array
             (COND ((> BYTE-CNT ROOM-LEFT)     ;Did msg buf wrap? no.
                    (SYS:%MOVE-MEM SEL  B-OFF ARY-BASE  ARY-OFF
                                   ROOM-LEFT )            ;GO TILL END OF BUFFER
                    (SYS:%MOVE-MEM SEL MINBUFOFF ARY-BASE (+ ARY-OFF ROOM-LEFT)
                                   (- BYTE-CNT ROOM-LEFT) ))
                   (T
                    (SYS:%MOVE-MEM SEL B-OFF ARY-BASE  ARY-OFF
                                   BYTE-CNT) ) )
```

```
              (setq msg
                (COERCE (SUBSEQ INCOMING-MSG 0 BYTE-CNT) 'STRING))
              (and (functionp display-fun)
                   (funcall display-fun display-strm msg) ) ) )
      msg) )

;;----------------------------------------------------------------
;; ACCESSING FLAGS AND MESSAGE QUEUES
;;----------------------------------------------------------------
;; Allocate selector for Lisp access to DOS memory. No longer needed?
;(DEFUN GET-S (SEG OFF LEN)
;  (LET ((ADDR (+ (LSH SEG 4) OFF)))
;       (MULTIPLE-VALUE-BIND (FLAGS AX)
;           (SYS:%SYSINT #X21
;                        #X#U8800
;                        (LOGAND ADDR #X#UFFFF)
;                        LEN
;                        (LSH ADDR -16))
;         (IF (= (LOGAND FLAGS 1) 1)
;             (ERROR "NO MORE SELECTORS AVAILABLE"))
;         AX)))

(DEFUN LISPBUSY ()
  (LET ((RESP (SET-LISPBUSY)))
       (COND ((EQ RESP 'OK)
              (CLEAR-LISPBUSY)
              NIL)
             ((EQ RESP 'PRESET)
              T) ) ) )

(DEFUN CLEAR-LISPBUSY ()
  (LOOP (MULTIPLE-VALUE-BIND (IGNORE IGNORE IGNORE IGNORE DX)
          (SYS:%SYSINT #X64 5 2 0 0)
          (AND (/= DX 0) (RETURN T) ))) )

(DEFUN SET-LISPBUSY ()
  (MULTIPLE-VALUE-BIND (IGNORE IGNORE IGNORE IGNORE DX)
      (SYS:%SYSINT #X64 5 1 0 0)
    (COND ((EQ DX 0)
           'PRESET)
          ((EQ DX 1)
           'OK))))

;; Checks to see the current "caller" of the Control Break Interrupt.
;; Pascal will set the caller flag to 1 just before invoking the C-Break.
;; If the returned value is 1, then Pascal invoked the C-Break handler.
;; If NEW-FLAG argument is non-nil, then set the caller flag to 0.
;; Rtns 1 if Pascal invoked, else 0.

(DEFUN PASCAL-CBREAK (&OPTIONAL CLEARIT)
  (LOOP (MULTIPLE-VALUE-BIND (IGNORE IGNORE IGNORE CX DX)
          (SYS:%SYSINT #X64 #X06
                       (COND (CLEARIT 1)(T 0))    ;Test =0, set =1
                       0 0)                       ;Always 0 from Lisp side.
          (AND (NULL (ZEROP DX))(RETURN CX)))))

;; Prints Queue status of the Control Break Queue.

(DEFUN READ-CQ ()
  (SYS:%SYSINT #X63 4 0 0 0)
  (PRINT " ")
  (PRINT " ")
  'DONE)

(DEFUN READ-NQ ()
  (SYS:%SYSINT #X63 #X104 0 0 0))

;; Check the Queue sizes for Normal and Control Break Queues.
```

```
(DEFUN CQ-SIZE ()
  (LOOP (MULTIPLE-VALUE-BIND (IGNORE IGNORE IGNORE CX DX)
              (SYS:%SYSINT #X63 2 0 0 0)
           (AND (NULL (ZEROP DX)) (RETURN CX)))))

(DEFUN NQ-SIZE ()
  (LOOP (MULTIPLE-VALUE-BIND (IGNORE IGNORE IGNORE CX DX)
              (SYS:%SYSINT #X63 #X102 0 0 0)
           (AND (NULL (ZEROP DX)) (RETURN CX)))))

(DEFUN OQ-SIZE ()
  (LOOP (MULTIPLE-VALUE-BIND (IGNORE IGNORE IGNORE CX DX)
              (SYS:%SYSINT #X63 #X202 0 0 0)
           (AND (NULL (ZEROP DX)) (RETURN CX)))))

(defun test-ports (n &OPTIONAL DELAY)
   (dotimes (i n)
      (place-msg "port one cbrk"  1 0 1 1)
      (place-msg "port two cbrk"  1 0 1 2)
      (place-msg "port one Ncbrk" 1 2 1 1)
      (place-msg "port two Ncbrk" 1 2 1 2)
      (COND ((NUMBERP DELAY)
             (DELAY-MS DELAY))
            (DELAY (READ-CHAR)))))

(defun show-stats ()
   (sys:%sysint #x63 7 0 0 0)
   (read-char))

(DEFUN DELAY-MS (N)                         ;IF COMPILED, NEED TO CHG THIS.
   (DOTIMES (I (/ N 1.9))))

;;---------------------------------------------------------------------
;; MECHANISMS TO ALLOW MESSAGES TO INTERRUPT LISP AND CAUSE EVALUATIONS.
;;---------------------------------------------------------------------
;; FUnction which is nominated to handle Control Breaks whether generated by
;; the user's keyboard, or by software interrupt from communications layer.
;; The caller flag identifies if Pascal invoked the routine.
;; Assumptions: Befor invokation by comm layer, a LispBusy flag is set to
;; prevent recursive invokations of this routine before processing a message
;; to completion. Otherwise, a stream of control break messages can be eval'd
;; in reverse order--do to the possibility of recursion induced by C-Breaking
;; a C-Break...The Comm layer does NOT invoke this function if Lisp is still
;; busy processing a C-Break msg. The msg is simply Q'd up, and it is up to
;; this routine to D'Q the msgs and process them sequentially until EmptyQ.

(DEFUN REMOTE-INTERRUPT-HANDLER ()
   (LET (HEADER EVAL-FORM MSG )
      (COND ((= (pascal-cbreak) 1)          ;Did Pascal cause this evaluation?
             (PASCAL-CBREAK T)              ;Reset caller flag so keyboard Cbreak
             (UNWIND-PROTECT
                (progn                      ;NOW will force execution of (break).
                   (READ-MSG T)
                   (SETQ MSG (GET-MSG T))
:                  (MULTIPLE-VALUE-SETQ (HEADER EVAL-FORM)(STRIP-TOKEN MSG " "))
:                  (IGNORE-ERRORS (EVAL (READ-FROM-STRING EVAL-FORM))))
                   (IGNORE-ERRORS (EVAL (READ-FROM-STRING MSG))))
                (CLEAR-LISPBUSY) )          ;Will ALWAYS be executed!
            (T (BREAK)) ) ) )

(DEFUN REMOTE-INTERRUPT (&OPTIONAL FLAG)
   (COND ((EQ FLAG T)
          (SETQ SYS:*BREAK-EVENT* 'REMOTE-INTERRUPT-HANDLER)
          (SETF (GET 'REMOTE-INTERRUPT-HANDLER 'DEBUG NIL)))
         ((EQ FLAG 'DEBUG)
          (SETQ SYS:*BREAK-EVENT* 'REMOTE-INTERRUPT-HANDLER)
          (SETF (GET 'REMOTE-INTERRUPT-HANDLER 'DEBUG) T))
         (T (SETQ SYS:*BREAK-EVENT* 'BREAK))))
```

```
(DEFUN REMOTE-REP-LOOP ()
    (LET ( HEADER EVAL-FORM )
      (PRINT "UNDER REMOTE CONTROL....")
      (LOOP (MULTIPLE-VALUE-SETQ (HEADER EVAL-FORM) (READ-MSG))
       (COND ((AND (STRINGP EVAL-FORM)
                   (STRING-EQUAL EVAL-FORM "REMOTE-QUIT"))
              (RETURN ))
             ((STRINGP EVAL-FORM)
              (PRINT EVAL-FORM) (PRINC " = ")
              (PRINC (EVAL (READ-FROM-STRING EVAL-FORM)))))))
(PRINT "BACK TO LOCAL CONTROL...")))
;; MESSAGE.LSP      SOURCE TO ALLOW SIMPLE COMPUTER - COMPUTER "TALKING"
;;------------------------------------------------------------------------
;;
; MULTI-COMPUTER COMMUNICATION UTILITIES.
; "REM-Q" CAUSES A REMOTE COMPUTER TO EVAL A
; DESIRED EXPRESSION (INTERRUPT DRIVEN) AND PRINT THE RETURNED VALUE BACK
; ON THE LOCAL MACHINE.
; "MESSAGE" SETS UP 2 WINDOWS WHEREBY TWO USERS ON DIFFERENT COMPUTERS MAY
; 'TALK' FREELY USING THE KEYBOARD.
; USES  WINDOWS,  ARRAYS AND MULTIPLEXES INCOMING MESSAGES AND OUTGOING
; MESSAGES. USES READ-MSG AND PLACE-MSG DEFINED ELSEWHERE.
; THE "OPTION-LIST"  DEFINES THE PERMISSIBLE REMOTE EVALUATION FORMS.
; EXAMPLE IS GIVEN BELOW FOR FRAMES PACKAGE:

(DEFCONSTANT FRAMES '((SLOT-VAL ("FORM NAME  ?" "SLOT NAME  ?")
                         "GET THE VALUE OF A SLOT")
                       (VALUE-FORM ("FORM NAME  ?") "PRINT A FORM")
                       (GET-INCLUDES ("FORM NAME ?" "SLOT NAME ?")
                          "GET THE INCLUDED VALUES OF A SLOT")
                       (ADDSPEC ("FORM NAME ?" "SLOT NAME ?"
                           "ASPECT TYPE (= or ALWAYS) ?" "SLOT VALUE ?")
                             "ADD AN ASPECT TO A SLOT")
                       (DELETE-FORM ("FORM NAME ?") "DELETE A FORM")
                       ))

(DEFCONSTANT OUTGOING-MESSAGE (MAKE-ARRAY 1000 :ELEMENT-TYPE 'STRING-CHAR
                                    :INITIAL-ELEMENT 0))

(DEFCONSTANT INCOMING-MESSAGE (MAKE-ARRAY 1000 :ELEMENT-TYPE 'STRING-CHAR
                                    :INITIAL-ELEMENT 0))

(DEFUN CLEAR-ARRAY (ARY INIT)
    (DOTIMES (I (ARRAY-LENGTH ARY))
       (SETF (AREF ARY I) INIT)))

(DEFUN DRAWBORDER (STRM CHAR)
    (DOTIMES (ROW 24)
       (SEND STRM :SET-CURSORPOS 0 ROW)
       (DOTIMES (COL 79)
          (SEND STRM :WRITE-CHAR CHAR))))

;------------------------------------------------------------------------
; REM-Q "REMOTE QUERY" PROCESSOR.

(DEFUN REM-Q (OPTION-LIST)
    (SETF (GET 'RECEIVE-MSG 'RECEIVE-MSG-STREAM)     ;PUSH STREAM NAME
          (CONS 'responses (GET 'RECEIVE-MSG 'RECEIVE-MSG-STREAM)))
    (SETF (GET 'RECEIVE-MSG 'RECEIVE-MSG-FUN)        ;PUSH FUN NAME
          (CONS 'remq-DISPLAY-FUN
                (GET 'RECEIVE-MSG 'RECEIVE-MSG-FUN)))
    (SEND *TERMINAL-IO* :CLEAR-SCREEN)
    (DRAWBORDER BcKGROUND 42)
    (SEND USER-INPUT :CLEAR-SCREEN)
    (SEND OUTER-KEY :CLEAR-SCREEN)
    (SEND OPTIONS :CLEAR-SCREEN)
    (SEND OPTIONS :SET-CURSORPOS 1 0)
```

```
        (SEND OPTIONS :WRITE-STRING "Place the Cursor On an Option")
        (SEND OPTIONS :SET-CURSORPOS 1 1)
        (SEND OPTIONS :WRITE-STRING "and Hit Return")
        (SEND USER-RESPONSES :CLEAR-SCREEN)
        (SEND RESPONSES :CLEAR-SCREEN)
        (SEND LABEL-OPTIONS :CLEAR-SCREEN)
        (SEND LABEL-OPTIONS :FRESH-LINE)
        (SEND LABEL-OPTIONS :WRITE-STRING "              OPTIONS")
        (SEND LABEL-RESPONSES :CLEAR-SCREEN)
        (SEND LABEL-RESPONSES :FRESH-LINE)
        (SEND LABEL-RESPONSES :WRITE-STRING "              RESPONSES")
        (SEND LABEL-USER :FRESH-LINE)
        (SEND LABEL-USER :CLEAR-SCREEN)
        (SEND LABEL-USER :WRITE-STRING "                         USER INPUT")
        (LET ((Y 1))
          (DOLIST (OP OPTION-LIST)
            (SEND OPTIONS :SET-CURSORPOS 2 (SETQ Y (+ Y 2)))
            (SEND OPTIONS :WRITE-STRING (THIRD OP))))
        (SEND USER-INPUT :SET-CURSORPOS 5 22)
        (SEND INPUT-KEY :CLEAR-SCREEN)
        (SEND INPUT-KEY :SET-CURSORPOS 2 6)

(DO (XPOS (YPOS T) PROMPT-LIST FUN-NAME-STRING OPTION-ELT)
       ((NULL YPOS) (RETURN 'DONE))
       (MULTIPLE-VALUE-SETQ (XPOS YPOS)
         (DO (BYTE (UPARROW 24)(DOWNARROW 25))
             ((OR (EQ BYTE 10)(EQ BYTE 81))
              (COND ((EQ BYTE 10)
                     (SEND INPUT-KEY :CURSORPOS))))
             (SETQ BYTE (SEND INPUT-KEY :READ-CHAR))
             (COND ((EQ BYTE UPARROW)   (BUMP-CURSOR INPUT-KEY 'UP 2))
                   ((EQ BYTE DOWNARROW)
                    (BUMP-CURSOR INPUT-KEY 'DOWN 2)) ) )
       (COND ((NUMBERP YPOS)

(SETQ OPTION-ELT (NTH (TRUNCATE (/ YPOS 2)) OPTION-LIST))
              (SETQ FUN-NAME-STRING (CAR OPTION-ELT))
              (SETQ PROMPT-LIST (CADR OPTION-ELT)) ) )

(PLACE-MSG
       (LIST-TO-STRING
         (ECHO-FUN  (,FUN-NAME-STRING ,@
                     (LET ((USER-PARMS NIL))
                       (DOLIST (PROMPT PROMPT-LIST USER-PARMS)
                         (SEND USER-INPUT :SET-CURSORPOS 5 21)
                         (SEND USER-INPUT :CLEAR-EOL)
                         (SEND USER-INPUT :WRITE-STRING PROMPT)
                         (SETQ USER-PARMS (APPEND USER-PARMS
                           (LIST (READ USER-INPUT)) ) ) ) ) )
              "RESPONSES )) 1 0 1 1) ) )

(DEFUN ECHO-FUN (REMOTE-EVAL-FORM LOCAL-STRM)
   `(LET ((REMOTE-RESULT ,REMOTE-EVAL-FORM))
      (PLACE-MSG
        (list-to-string REMOTE-RESULT) 1 0 1 1) ))

;------------------------------------------------------------------------
; DEFINE THE WINDOWS FOR THE MESSAGE PROGRAM BELOW.

(DEFUN GET-WINDOW-MSG (STRM ARY TERM-CHAR)
   (LET ( (CNT (+ 1 (AREF ARY 0))) (BACKSPACE 127)
          (ACHAR (SEND STRM :READ-CHAR-NO-HANG))    MSG)
     (COND ((EQ ACHAR BACKSPACE)
            (WINDOW-BACKSPACE STRM)
            (SETF (AREF ARY 0) (- CNT 2)))
           ((OR (EQ ACHAR TERM-CHAR) (> CNT (ARRAY-LENGTH ARY))).
            (SETQ MSG (COERCE (SUBSEQ ARY 1 CNT) 'STRING))
            (SETF (AREF ARY 0) 0)
            (SEND STRM :WRITE-CHAR ACHAR))
           (ACHAR
```

```
             (SETF (AREF ARY CNT) ACHAR)
             (SETF (AREF ARY 0) CNT)
             (SEND STRM :WRITE-CHAR ACHAR)))
     MSG) )

(DEFCONSTANT ME (MAKE-WINDOW-STREAM
           :LEFT 1
           :TOP 11
           :HEIGHT 8
           :WIDTH 77
           :STATUS 4
           :ATTRIBUTE 7 ))

(defconstant bckground (make-window-stream
                         :left 0
                         :top 0
                         :height 24
                         :width 80
                         :status 4
                         :attribute 7 ))

(DEFCONSTANT THEM (MAKE-WINDOW-STREAM
           :LEFT 1
           :TOP 1
           :HEIGHT 9
           :WIDTH 77
           :STATUS 4
           :ATTRIBUTE 7 ))

(SETF (GET 'THEM 'HEADER-LOC) '(8 23))

(DEFCONSTANT INFO-AREA (MAKE-WINDOW-STREAM
           :LEFT 1
           :TOP 20
           :HEIGHT 2
           :WIDTH 77
           :STATUS 4
           :ATTRIBUTE 7 ) )
;-----------------------------------------------------------------------
; A MESSAGE UTILITY SIMILAR TO OTHER "TALK TO" PROGRAMS.

(defun message (dest-str)
    (SETF (GET 'RECEIVE-MSG 'RECEIVE-MSG-STREAM)    ;PUSH STREAM NAME
          (CONS 'THEM (GET 'RECEIVE-MSG 'RECEIVE-MSG-STREAM)))
    (SETF (GET 'RECEIVE-MSG 'RECEIVE-MSG-FUN)       ;PUSH FUN NAME
          (CONS  MESSAGE-DISPLAY-FUN
                (GET 'RECEIVE-MSG 'RECEIVE-MSG-FUN)))
    (CLEAR-ARRAY OUTGOING-MESSAGE 0)
    (CLEAR-ARRAY INCOMING-MESSAGE 0)
    (SEND *TERMINAL-IO* :CLEAR-SCREEN)
    (DRAWBORDER BCKGROUND 61)
    (SEND INFO-AREA :CLEAR-SCREEN)
    (SEND ME :CLEAR-SCREEN)
    (SEND THEM :CLEAR-SCREEN)
    (SEND INFO-AREA :WRITE-STRING "                    M E S S A G E")
    (SEND INFO-AREA :FRESH-LINE)
    (DO* (
          (ESCAPE-SOT #X05)
          (QUIT-STR "QUIT")
          (TERM-CHAR 10)
          (MSG-OUT (read-line me)
                   (read-line me)) )
              (GET-WINDOW-MSG ME OUTGOING-MESSAGE TERM-CHAR)
              (GET-WINDOW-MSG ME OUTGOING-MESSAGE TERM-CHAR)))
         ((COND ((AND MSG-OUT (STRING-EQUAL MSG-OUT QUIT-STR))
                 (SEND INFO-AREA :CLEAR-SCREEN)
                 (SEND INFO-AREA :WRITE-STRING  " YOU HAVE QUIT.")))
              (PROGN (SETF (GET 'RECEIVE-MSG 'RECEIVE-MSG-STREAM)
                     (CDR (GET 'RECEIVE-MSG 'RECEIVE-MSG-STREAM)))
                 (SETF (GET 'RECEIVE-MSG 'RECEIVE-MSG-FUN)
                     (CDR (GET 'RECEIVE-MSG 'RECEIVE-MSG-FUN)))))
```

```
        (COND ((AND MSG-OUT (NULL (STRING-EQUAL MSG-OUT "")))
               (place-msg (string-append dest-str " " msg-out) 1 0 1 1))) )

(defun remd-display-fun (stream-name msg)
      (let* ((strm (eval stream-name)) )
        (send strm :fresh-line)
        (send strm :write-string msg)
        (send strm :clear-eol)) )

(DEFUN MESSAGE-DISPLAY-FUN (STREAM-NAME msg)
      (LET* ( MSG-HEAD MSG-TEXT
              (STRM (EVAL STREAM-NAME)) )
        (send info-area :set-cursorpos 0 0)
        (SEND info-area :WRITE-STRING "FROM: ")
        (MULTIPLE-VALUE-SETQ (MSG-HEAD MSG-TEXT)
          (STRIP-TOKEN MSG " "))
        (SEND info-area :WRITE-STRING MSG-HEAD)
        (SEND STRM :fresh-line)
        (SEND STRM :WRITE-STRING MSG-TEXT)
        (SEND STRM :CLEAR-EOL)))
;; COMINIT.LSP   INITIALIZES COMMUNICATION ROUTINES AND BUFFERS
;;--*------------------------------------------------------------
;;

(FORMAT T "~% ~S ~%" "INITIALIZATION ROUTINE BEING PERFORMED:")

(OR (MEMBER 'COMM-EXIT-HOOK (GET 'EXIT 'EXIT))    ;done only once
    (SETF (GET 'EXIT 'EXIT) (CONS 'COMM-EXIT-HOOK (GET 'EXIT 'EXIT))))

(INITCOM)

(REMOTE-INTERRUPT T)
(FORMAT T "~% ~A" "REMOTE INTERRUPTS ENABLED")
```

Appendix VII(B)

```
(* CLKSCHED.PAS   PASCAL SOURCE TO IMPLEMENT LOW LEVEL SCHEDULING AND
                  COMMUNICATION BETWEEN LISP / PASCAL AND BETWEEN
                  PASCAL / RS232 SERIAL PORTS
   -------------------------------------------------------------------
*)

($C-)

program Clock;
                                  (BLAISE COMPUTING UTILITY CODE)
  ($I tools.inc)
  ($I asynch1.inc)
  ($I CallIsr.inc)
  ($I IOSizeA1.inc)
  ($I RdChA1.inc)
  ($I RdStA1.inc)
  ($I WrtStA1.inc)
  ($I WrtChA1.inc)
  ($I CtrlMem.inc)
  ($I ToHexStr.inc)
  ($I InitA1.inc)
  ($I OpenA1.inc)
  ($I cflaga1.inc)
  ($I SetVIsr.inc)
  ($I RetVIsr.inc)
  ($I InsIsr.inc)
  ($I Cflagout1.inc)
  ($I IsInsIsr.inc)
  ($I sizemem.inc)
  ($I ExitRPgm.inc)

($I commdef.inc)              ( OUR DATA TYPE DEFINITIONS )

( Global variables and data types ..................................)
```

```
procedure CBreakHandler;
  begin
    Registers._AX := 5;
    Registers._BX := 1;        {check/set the LispBusy Flag}
    Intr($64,Registers);
    if (Registers._DX = 2) then {LispBusy was idle, now Busy}
      begin
        Caller_Flag := $0001; {For Lisp to know Pascal invoked}
        Intr($1B,Registers);    {invoke control break}
      end;
  end;

procedure sysint(intnumber,ax,bx,cx,dx : integer;
                 oneshot : Boolean);
  begin
    Registers._DX := dx; ExElt := FALSE;
    while (Registers._DX = dx) do
      begin
        Registers._AX := ax;
        Registers._BX := bx;
        Registers._CX := cx;
        Case intnumber of
        63:
          Intr($63,Registers);
        62:
          Intr($62,Registers);
        end;
        if oneshot then exit;
      end;
    if (Registers._DX = 1) then ExElt := TRUE;
  end;

procedure ReadPort( P : Integer);

var
      InQSize,PStatus,NumRead: integer;
      j,TextToGet, ErCode : integer;
      Byte : char;

begin {ReadPort1}
      inline($FA);                      {interrupts OFF}
      if (not ComBusy[P]) then
        begin
          ComBusy[P] := TRUE;
          inline($FB);                  {interrupts ON}
          if HeaderinProgress[P] then
            begin                                   {Ck for hdr availbility}
              ErCode := __IQSizeA1(P,InQSize,PStatus);
              if (InQSize > Header_Length) then
                begin                   {SOT + full header is available}
                  ErCode := __RdChA1(P,Byte,InQSize,PStatus);
                  if (Byte = Chr(SOT)) then {iff SOT, then...}
                    begin                       {capture header}
                      ErCode := __RdStA1(P,Header_Length,
                        Ptr(Seg(ComBuf[P,0]),Ofs(ComBuf[P,0])),
                        NumRead,InQSize,PStatus);
                      TextLength[P] := (Integer(ComBuf[P,0]) shl 8) +
                        Integer(ComBuf[P,1]);
                      MsgID1[P] := Integer(ComBuf[P,2]);   {parsing header...}
                      MsgID2[P] := Integer(ComBuf[P,3]);
                      MsgID3[P] := Integer(ComBuf[P,4]);
                      HeaderinProgress[P] := FALSE;     {Change state of routine}
                      TextInProgress[P] := TRUE;
                      TextToGo[P] := TextLength[P] + 1;   {+1 to catch CS at end}.

COMIndex[P] := 0;             {Start filling buf at frnt}
                      Start_offset[P] := Next_Offset[P]; {save for enqueue}
                    end
                  else
                    writeln('invalid SOT ',Byte);
                end; { No else. Exit if full header not available}
            end;     { end of capturing header. No else. }
```

```
             if TextInProgress[P] then
                begin
                  if (TextToGo[P] > Text_Increment) then   {how much to grab?}
                     TextToGet := Text_Increment          {max block permitted or..
                  else
                     TextToGet := TextToGo[P];            {..rest of msg}
                  ErCode := __IQSizeA1(P,InQSize,PStatus); {how much avail?} if (InQSize >= TextToGet) then       {capture SOME text}
                     begin ErCode := __RdStA1(P,TextToGet,Ptr(Seg(ComBuf[P,0]),
                         Ofs(ComBuf[P,0]) + COMIndex[P]),NumRead,InQSize,PStatus);
                       if (TextToGo[P] = NumRead) then {If last portion then..}
                          begin
                             MsgComplete[P] := TRUE;    {indicate completeness and.

Numread := NumRead - 1;   {prevent storing CS byte}
                          end;

for i := 0 to NumRead - 1  do  {store this portion of msg}
                           begin
                              Mem[InBuff_Seg:Next_Offset[P]] :=
                                 Integer(ComBuf[P,i + COMIndex[P]]); {chsum on msg o CheckSum[P] := CheckSum[P] xor Integer(ComBuf[P,i+Com If (Next_Offset[P] = Buffer_End[P]) then
                                 Next_Offset[P] := Buffer_Begin[P]         {wrap arou else
                                 Next_Offset[P] := Next_Offset[P] + 1;
                           end;                 {end storage of this msg portion} if MsgComplete[P] then
                        begin
                         Case MsgID2[P] of
                         0:
                             SysInt(63,0,Start_Offset[P],
                                ((P shl 13) or TextLength[P]),0,FALSE);

1:          black board read   }
                         2:         { black board write }

SysInt(63,$100,Start_Offset[P],
                                ((P shl 13) or TextLength[P]),0,FALSE);
                         else
                              writeln('invalid processing level on COM ', P,' ',
                                   MsgID2[P]);
                         end;                           { end of the CASE }
                         TextInProgress[P] := FALSE;
                         HeaderInProgress[P] := TRUE;
                         MsgComplete[P] := FALSE;
                         end
                       else                             {msg is NOT complete}
                         begin                         {capture more text next time}
                            TextToGo[P] := TextToGo[P] - Numread;
                            COMIndex[P] := COMIndex[P] + Numread;

end; {end of if msgcomplete processing} end;  {end of capture some text. No else.}
                          { Exit if enough text not available}
                  end;      {if TextinProgress}
               inline($FA);                   {Interrupts OFF}
               ComBusy[P] := False;
               inline($FB);                   {Interrupts ON}
            end {if not ComBusy}
            else
               writeln('busy Read ',P);
            inline($FB);                      {Interrupts ON}
```

```
end; {ReadPort} procedure RitePort;

var
  PortNum,Offset,Length,RoomLeft : integer;

begin {RitePort}
  Registers._AX := 513;                          {attempt a dequeue}
  Registers._DX := 0;
  Intr($60,Registers);
  PortNum := Registers._CX shr 13;
  Offset  := Registers._BX;
  Length  := Registers._AX + 7;
  RoomLeft := OutBuffer_end - Offset + 1;        {# of bytes till end of buf} if (Length > RoomLeft) then                    {wrap needed ?}
    begin
      ErCode := _WrtStA1(PortNum,RoomLeft,Ptr(OutBuff_Seg,Offset),NumWrit);
      ErCode := _WrtStA1(PortNum,Length-RoomLeft,
                         Ptr(OutBuff_Seg,OutBuffer_Begin),NumWrit);
    end
  else         {deal with the buffer reading wrap}
    ErCode := _WrtStA1(PortNum,Length,Ptr(OutBuff_Seg,Offset),NumWrit);

end; {RitePort} procedure ManageU(var Reg: _RegPack);

(* ---------------------------------------------------------------
     Non-Reentrant Software Interrupt Service Routine Performs
     Queue Management
   ---------------------------------------------------------------
                        To Perform
Upon Input:

_AH = $00   Direct Processing to CBrk Queue
_AH = $01   Direct Processing to Non CBrk Queue
_AH = $02   Direct processing to Output Queue ENQUEUE:
                    Option Select:    _AL = 0
                      Data Input:     _BX = Buffer Offset to be Enqueued
                                      (bits 13-15) _CX = Port Msg Received On
                                      (bits 0-12)  _CX = Message Length (bytes)
                      Data Output:    _AX = Input Msg Length
                                      _CL = # msgs in Q
                 Error Code Output:   _DX = $0000  = Busy
                                      -DX = $0001  = Success
                                      _DX = $0002  = Failed DEQUEUE:
                    Option Select:    _AL = 1
                      Data Input:     nothing
                      Data Output:    _AX = Msg Length
                                      _BX = Dequeued Element (offset)
                                      (bits 13-15) _CX = Port Msg Received On
                                      (bits 0-12)  _CX = # msgs remaining in Q
                 Error Code Output:   _DX = $0000  = Busy
                                      _DX = $0001  = valid Element
                                      _DX = $0002  = Empty-Q error EMPTY-CHECK:
                    Option Select:    _AL = 2
                      Data Input:     nothing
                      Data Output:    _CX = # msgs in Q
                 Error Code Output:   _DX = $0000  = Busy
                                      _DX = $0001  = Q is Empty (true)
                                      _DX = $0002  = Q is not empty
```

```
      CLEAR_Q:     Option Select:  _AL = 3
                   Data Input:     nothing
                   Data Output:    _CX = # msgs in Q
              Error Code Output:   _DX = $0000 = Busy
                                   _DX = $0001 = Successful initialization
                                   _DX = Error (not implemented)

Q_STATS:     Option Select:  _AL = 4
                   Data Input:     nothing
                   Data Output:    nothing (display generated)
              Error Code Output:   _DX = $0000 = Busy
                                   _DX = $0001 = Successful ---------------------------------------------------------------------
---------------------------------------------------------------- *)
label busyexit;

var
  Datum,Num_Elts, QCase : integer;
  QUEUE : Q;
  Qptr  : cellpointer;
  Funx  : integer;

begin (ManageQ)

inline($FA);                        {turn OFF interrupts, check flags}

Funx := Reg._AX;
   QCase := -1;
   Case Funx of                        {Determine which Q to manipulate }
   $000..$004:
       begin
         if CbreakBusy then goto busyexit;
         CbreakBusy := TRUE;
         inline($FB);                            {interrupts ON}
         QCase := 0;
         QUEUE := CBreakQ;                       {point to CBreakQ}
         Num_Elts := CBreakQ_Elts;
       end;
   $100..$104:
       begin
         if NormalBusy then goto busyexit;
         NormalBusy := TRUE;

inline($FB);                            {interrupts ON}
         QCase := 1;
         QUEUE := NormalQ;                       {point to NormalQ}
         Num_Elts := NormalQ_Elts;
         Funx := Funx - $100;                    {remap Funx to 0-6}
       end;
   $200..$204:
       begin
         if OutputBusy then goto busyexit;
         OutputBusy := TRUE;
         inline($FB);                            {interrupts ON}
         QCase := 2;
         QUEUE := OutputQ;
         Num_Elts := OutputQ_Elts;
         Funx := Funx - $200;                    {remap funx to 0-6}
       end;
   end;                                          {end of type screening case}

Case Funx of                                  {perform specific function case}
    0:                 {EnQueue}
     begin
       QUEUE.tail^.element := Reg._BX;           { store offset data }
       QUEUE.tail^.length  := Reg._CX and $1FFF; { store length data }
       QUEUE.tail^.port    := Reg._CX shr 13;    {store port recvd on}
       new(QUEUE.tail^.next);
       QUEUE.tail := QUEUE.tail^.next;
```

```
      Num_Elts := Num_Elts + 1;
      Reg._AX := Reg._CX and $00FF;         { update to new length }
      Reg._CX := Num_Elts;                  (return in AX the length of msg)
      Reg._DX := $0001;                     (return in CX the new Q length )
    end;                                    (success)
1:                          (DeQueue)
  begin
    if (QUEUE.head = QUEUE.tail) then
      begin
        Reg._DX := $0002;                   {Empty Q}
        Reg._CX := Num_Elts;                { should be 0 at this point! }
      end
    else
      begin
        Reg._BX := QUEUE.head^.element;     { msg offset }
        Reg._AX := QUEUE.head^.length;      {msg length}
        Reg._CX := QUEUE.head^.port shl 13; (store in hi 3 bits)
        QUEUE.head := QUEUE.head^.next;     { point to next elt }
        Num_Elts := Num_Elts - 1;           { update to new length }
        Reg._CX := Reg._CX or Num_Elts;     { remaining elements after DQ }
        Reg._DX := $0001;                   (success)
      end;
  end;
2:                          (Empty-Check)
  begin
    if (QUEUE.head = QUEUE.tail) then
      begin
        Reg._DX := $0001                    (yes, it is empty)
      end
    else
      begin
        Reg._DX := $0002;                   (no, it is not empty)
        Reg._CX := Num_Elts;
      end;
  end;
3:                          (Initialize the Q)
  begin
    new(QUEUE.head);
    QUEUE.head^.next := nil;
    QUEUE.tail := QUEUE.head;
    Num_Elts := 0;
    Reg._DX := $0001;                       (success)
  end;
4:                          (Print stats and contents of Q. (debugging))
  begin
    Qptr := QUEUE.head;                     ( point to first elt of Q )
    writeln;
    writeln;
    writeln('Q stats:         Elements = ', Num_Elts);
    writeln('Contents of Q:');
    while (Qptr <> nil) do
      begin
        writeln( Qptr^.element,'   ',Qptr^.length,'   ',Qptr^.port);
        Qptr := Qptr^.next;
      end;
    Reg._DX := $0001;                       (success)
  end;

end;                        (end of ManageQ cases)

Case QCase of                               (Cleanup: Which Q was manipulated?)
  -1: ;                                     { Case -1 means no manipulations }
  0:
    Begin                                   ( Save variables changed )
      CBreakQ := QUEUE;
      CBreakQ_Elts := Num_Elts;
      inline($FA);
      CBreakBusy := FALSE;
      inline($FB);
    end;
  1:
```

```
            Begin
              NormalQ := QUEUE;
              NormalQ_Elts := Num_Elts;
              inline($FA);
              NormalBusy := FALSE;
              inline($FB);
            end;
          2:
            Begin
              OutputQ := QUEUE;
              OutputQ_Elts := Num_Elts;
              inline($FA);
              OutputBusy := FALSE;
              inline($FB);
            end;
      end;                                    {end of QCase Cleanup}

{Finishing up for exit}
      exit:                                   {finished up now leave} busyexit:
     Reg._DX := $0000;         {busy}
     inline($FB);              {interrupts ON}
     writeln('flagbusy');

end;                           {END of MANAGEQ} procedure ManageFlags(var Reg : _RegPack);

(* Non-reentrant routine to handle flags (semaphores) used by both Pascal
   and Lisp.

PROCESS LISPBUSY FLAG:
                   Option Select:    _AX = 5
                   Data Input:       _BX = 1 Check/set the Flag (Results in DX)
                                     _BX = 2 Clear the Flag (DX irrelevant)
                   Error Code Output: _DX = $0000 = No Set; Already Busy
                                      _DX = $0001 = Good Set; Now Busy PROCESS CBRK-CALLER FLAG:
                   Option Select:    _AX = 6
                   Data Input:       _BX = 0 Read the Flag Value
                                     _BX = 1 Set the Flag as Defined in CX
                                     _CX = 1,2  Value to which the Flag is
                                             to be set (1 = pascal set it)
                                                     (2 = Lisp set it)
                   Data Output:      _CX = New (current) value of the Flag
                   Error Code Output: _DX = $0000 = Manager Busy
                                      _DX = $0001 = Good operation DEBUG -  Return Comm Variables  :  _AX = 7
*)

label
  busyexit;

begin
  inline($FA);
  If FlagsBusy then goto busyexit;
  FlagsBusy := TRUE;
  inline($FB);

case Reg._AX of

5:                         {LispBusy Flag}
      begin
        Case Reg._BX of
          1:                                    {try to set the flag}
            begin
              if (LispBusy = $1111) then
                Reg._DX := $0001              {already busy. No set}
```

```
          else
            begin
              Reg._DX := $0002;              (good set. Now busy)
              LispBusy := $1111;
            end;
         end;
       2:                                    (clear the flag).
         begin
           LispBusy := $0000;
           Reg._DX := $0002;
         end;
       end;                                  (end of BX case)
     end;                                    (end of case 5)
   6:                 (Caller_Flag)
     begin
       Case Reg._BX of
         0:                                  (read the flag. return in CX)
           begin
             Reg._CX := Caller_Flag;
             Reg._DX := 1;                   (ok operation)
           end;
         1:                                  (set the caller flag)
           begin
             Caller_Flag := Reg._CX;
             Reg._DX := 1;
           end;
       end;                                  (end of BX case)
     end;
   7:
     begin
       writeln('COM STATISTICS');
       writeln('NormalQ_Elts = ',NormalQ_Elts,' CbreakQ_Elts = ',CbreakQ_Elts,
 ' OutputQ_Elts = ',OutputQ_Elts);
       writeln;
       For p := 1 to Total_Ports do
         begin
           writeln(' PORT: ',p);
           Writeln(' ComBusy = ',ComBusy[p],' HeaderInProgress = ',HeaderInProgre
ss[p]);
           Writeln(' TextInProgress = ',TextInProgress[p],' MsgComplete = ',MsgCo
mplete[p]);
           Writeln(' TExtLength = ',textlength[p],' texttogo = ',texttogo[p]);
           writeln(' Comindex = ',comindex[p],' Start_offset = ',start_offset[p]
,' Next_offset = ',next_offset[p]);
           writeln;
         end;
       Reg._DX := $0001;
     end;                                    (end of case 7)
 end;                                        (end of case)

inline($FA);                                (finishup for exit)
 FlagsBusy := FALSE;
 inline($FB);
 exit;

busyexit:                                   (EXIT QUICK!)
   Reg._DX := $0000;                         (signals busy. nothing processed)
   inline($FB);                              (interrupts ON)
end;                                         (end of manageflags)

(* ...................................................................
                  The CLOCK TICK SCHEDULER
         A Non-Reentrant Time-of-Day interrupt based Scheduler/Executor
   ...................................................................
*)

procedure ClockService(var Registers : _RegPack);
```

```
begin  (ClockService)
  __Calller(ComBlock._IsrPrevVector,Registers);    (filter the old clock tick)

inline($FA);                   (interrupts OFF)

ClockCount := (ClockCount + 1) mod ClockInterval;
  if (ClockCount <> 0) then
  begin
    inline($FB);                 (interrupts ON)
    exit;
  end;

if (not ClockBusy) then
   begin

ClockBusy := TRUE;
    inline($FB);                 (interrupts ON)

AsynchIsBusy := 0;
    for i := 1 to TOTAL_PORTS do
      AsynchIsBusy := AsynchIsBusy or __CritFlag[i]^;

if (AsynchIsBusy <> 0) then
      begin
        inline($FA);             (interrupts OFF)
        ClockBusy := FALSE;      (restore ClockBusy; code is now accessible)
        inline($FB);             (interrupts ON)
        exit;
      end
    else
      for i := 1 to TOTAL_PORTS  do ReadPort(i);

if (OutputQ.head <> OutputQ.tail) then       (check for empty OutputQ)
      RitePort;        ( no else )

if (CbreakQ.head <> CbreakQ.tail) then       (check for empty CBrk Q)
     CBreakHandler;    ( no else )

inline($FA);                 (interrupts OFF)
    ClockBusy := FALSE;
    inline($FB);                 (interrupts ON)
   end
  else
    inline($FB);                 (interrupts ON)
end;

{ Mainline INSTALLATION and INITIALIZATION PROCEDURE } begin if (Paramcount > 0) then
    begin
      Val(Paramstr(1),Result,Code);
      Case Result of
        110: Baud_Rate := 0;
        250: Baud_Rate := 1;
        300: Baud_Rate := 2;
        600: Baud_Rate := 3;
       1200: Baud_Rate := 4;
       2400: Baud_Rate := 5;
       4800: Baud_Rate := 6;
       9600: Baud_Rate := 7;
      end;
    end
  else
    begin
      Baud_Rate := 4;            ( 1200 seems reasonable for now )
      Result := 1200;
    end;
```

```
    if (Paramcount > 1) then
      begin
        Val(Paramstr(2),Result,Code);
        ClockInterval := Result;
      end
    else
      ClockInterval := 5;           ( every 5 / 18 ths of a second? )

Writeln('     ... Accessing The Knowledge Based Communication Protocol ...');
    Writeln;
    writeln('              OPERATING  PARAMETERS:');
    Writeln('              Total Number of Ports is ',Total_Ports);
    Writeln('              Baud Rate is ',Result);
    writeln('              Clock Tick Interval is ', (ClockInterval / 18.2), ' second
s.');
    Writeln;

if ( __IsInsIsr($63,'MANQ',PSPPtr3,EnvPtr3,Prevector3)) then
       Writeln('* Queue Managing Interrupt Routines are Already installed at ',
               __ToHexStr(Seg(PSPPtr3^)),':',__ToHexStr(Ofs(ManageQ)))
    else
      begin
        CBreakBusy  := FALSE;
        NormalBusy  := FALSE;
        OutputBusy  := FALSE;
        NormalQ_Elts := 0;
        CbreakQ_Elts := 0;
        OutputQ_Elts := 0;

__InsIsr(ComBlock3,$63,_IsrPrevVector,1024,4096,ofs(ManageQ),'MANQ');
        Writeln('INSTALLING: Queue Managing Routines');
      end;

if ( __IsInsIsr($64,'FLAGS',PSPPtr4,EnvPtr4,Prevector4)) then
       Writeln('* Flags Managing Interrupt Routines are Already installed at ',
               __ToHexStr(Seg(PSPPtr4^)),':',__ToHexStr(Ofs(ManageFlags)))
    else
      begin
        FlagsBusy   := FALSE;
        LispBusy    := $0000;
        Caller_Flag := $0000;

__InsIsr(ComBlock4,$64,_IsrPrevVector,512,6144,ofs(ManageFlags),'FLAGS');
        Writeln('INSTALLING: Flag Managing Routines');
      end;

SysInt(63,$003,0,0,0,TRUE);        (CBrk Queue Initialization)
      SysInt(63,$103,0,0,0,TRUE);        (Normal Queue Init )
      SysInt(63,$203,0,0,0,TRUE);        (Output Queue Init )

if( __IsInsIsr($08,'CLKTIK',PSPPtr,EnvPtr,Prevector)) then
      begin
        Writeln('* The Clock-Tic Based Communication Port Service Routines are');
        Writeln('  Already installed at ',__ToHexStr(Seg(PSPPtr^)),':',__ToHexStr(O
fs(PortService))));
      end
    else
      begin
        for i := 1 to TOTAL_PORTS do
          begin
            Status := __InitAl(i,Baud_Rate,2,0,2,LStat,Mstat); (4800,e,7,1)
            ErCode := _OpenAl(i,1000,1000,0,0,
                Ptr(Seg(AsynchBuf[i,0]),Ofs(AsynchBuf[i,0])));
            case ErCode of
               _OK:               Writeln('      Port ',i,' is successfull
y opened.');
               _PORT_OPEN_ALREADY: Writeln('      Port ',i,' is already ope
n');
               _INV_PORT:         Writeln('      INVALID PORT NUMBER: ',i);
               _NO_PORT_FOUND:    Writeln('      CAN NOT LOCATE PORT: ',i);
            end;
```

{ Boolean variable, offset and flag address initialization }

```
            ComBusy[i] := FALSE;
            TestInProgress[i] := FALSE;
            HeaderInProgress[i] := TRUE;
            MsgComplete[i] := FALSE;
            Buffer_Begin[i] := (i - 1) * 1000;
            Next_Offset[i] := Buffer_Begin[i];
            Buffer_End[i] := Buffer_Begin[i] + Buffer_Length;
            ErCode := __CflagA1(i,Flag);
         end;

ClockBusy := False;
      ClockCount := 0;         {Execute the Clock Handlers modulo-n } writeln('INSTALLING: Clock-Tic Based Communication Port Service Routines'
);
      Writeln;
      Writeln('Finished Loading RAM Resident Interrupt Service Routines and Scheduler ');

__InsIsr(ComBlock,$08,_IsrPrevVector,1024,8192,Ofs(ClockService),'CLKTIK'
);
   end;
      __ExitRPgm(0,0);

end.

(* COMMDEF.INC   INCLUDE FILE FOR CLKSCHED.PAS
   -------------------------------------------------------------
*)

{ Global variables and data types for knowledge based communications } const
      TOTAL_PORTS = 2;
      SOI   = 2;
      CS    = $09;            (dummy value for now)
      Header_Length = 5;
      Text_Increment = 200;   (How many textchars can be read from Asynch..)
                              (buffer into readport's buffer at each invocation
)

Buffer_Length = 950;
      OutBuffer_Begin = 0;
      OutBuffer_End   = 1999;

type
 cellpointer = ^celltype;
 celltype = record
   element : integer;
   length : integer;
   Port : integer;
   next : cellpointer;
   end;

Q = record
   head,tail : cellpointer;
        end;

var

ExElt,Flag : Boolean;
   counter,AsynchIsBusy, ErCode,Baud_Rate : Integer;
   AllocSize, Status, Lstat, Mstat, i,Result,Code, NumWrit : integer;
   ClockCount, ClockInterval : integer;

AsynchBuf : array[0..TOTAL_PORTS] of array[0..2003] of char; {1com buffers}
   ComBlock,Com2Block : _IsrCtrl;
   ComBlock4,ComBlock3 : _IsrCtrl;
   CtrlBlock : _MemCtrl;
```

```
Parameter : _Lstring;

NormalQ_Elts,CBreakQ_Elts,OutputQ_Elts,p : integer;
NormalQ, CBreakQ, OutputQ : Q;

ICAPtr,DosPtr,PSPPtr,EnvPtr,Prevector,_IsrPrevVector      : _BytePtr;
PSPPtr4,EnvPtr4,Prevector4,_IsrPrevVector4,_Isr2PrevVector : _BytePtr;
PSPPtr3,EnvPtr3,Prevector3,_IsrPrevVector3 : _BytePtr;
Reg,Registers,Reg2,RegM : _RegPack;

TextLength, TextToGo, ComIndex,
    MsgID1, MsgID2, MsgID3,
    SentCSum,CheckSum,
    Next_Offset, Start_Offset,
    Buffer_Begin, Buffer_End  : array[1..TOTAL_PORTS] of Integer;
ComBuf : array[1..TOTAL_PORTS] of array[0..999] of char;

HeaderInProgress, TextInProgress,
    MsgComplete,ComBusy : array[1..TOTAL_PORTS] of Boolean;

CBreakBusy, NormalBusy, OutputBusy, FlagsBusy, ClockBusy : Boolean;

Vectors    : array[1..5] of _BytePtr;
Vector64   : _BytePtr;
RunParm    : SizeReg;

Caller_Flag : integer absolute $0000:$04FA;
LispBusy    : integer absolute $0000:$04FB;
InBuff_Seg  : integer absolute $0000:$04F0;
InBuff_Off  : integer absolute $0000:$04F2;
OutBuff_Seg : integer absolute $0000:$04F4;
OutBuff_Off : integer absolute $0000:$04F6;
```

Appendix VIII

```c
/* IMAGE.C    SOURCE FOR PROCESSING OF INFRA-RED SPOT AND FUSION WELDING IMAGES
              AND FOR SOME GENERALIZED IMAGE PROCESSING.
*/ include <stdio.h>
include <conio.h>
include <dos.h> include <stdtyp.h>      /* Type definitions provided by Imaging Technology */
include <itex100.h>

/* Our type definitions for image processing applications. */
#ifndef TRUE
#define TRUE 1
#endif
#ifndef FALSE
#define FALSE 0
endif ifndef MAXIMUM
define MAXIMUM(a,b)         ((a)<=(b)?(a):(b))
endif define MAX_EDGE_POINTS 100

/* within the lists of pointers to structures, the index == id# for reference*/

/* indices into semaphore array : */
#define ACQUIRE  0       /* Are frames being read into board? */
#define STEP     1       /* Is the processing sequence engaged? */

/* keywords for semaphores */
#define GO   TRUE
#define STOP FALSE
#define CONTINUOUS -1
```

```
/* indices into parameter array are: */
#define AVINT    0       /*How many frames are analysed before values updated.*/
#define CX0      1       /*Center zone min x*/
#define CY0      2       /*""           min y*/
#define CX1      3       /*""           max x*/
#define CY1      4       /*""           max y*/
#define EDGEVAL  5       /*Thresh value indicating pool edge*/
#define EDGEDX   6       /*Thresh value indicating center to edge pool diff.*/
#define PW       7       /*Current value of Puddle Width*/
#define PWMIN    8       /*Min width in pixels of possible pool. Screens blobs.*/
#define PWDX     9       /*Max width a Pool's width may change in 1 frame. */
#define SCANINC  10      /*Increment in x/y during various scanning algos.*/

/* indices into point_list are: */
#define CA       0       /* Center of Area */
#define CM       1       /* Center of Mass */
#define PWL      2       /* Point of left edge of puddle */
#define PWR      3       /* ""       right edge "" */

/* indices into line_list are: */
#define PY       0       /* Center horizontal line between PWL and PWR */
typedef unsigned ID, METHOD, SHADE, COORD;

struct POINT
{
        COORD x;
        COORD y;
        SHADE color;
} Point_List[10] ;
define PT struct POINT struct LINE
{
        PT *start;
        PT *end;
        SHADE color;
} Line_List[10];

/*
define CV struct curve typedef struct
{       point coord;
        CV  *next;
} curve;
*/ struct EDGE
{
        PT *coords;
        int length;
        SHADE color;
} Edge_List[10] ;
define ED struct EDGE struct ZONE
{
        PT *ul;
        PT *lr;
        SHADE color;
} Zone_List[10];
define ZN struct ZONE struct PARAMETER
{
        char *name;
        int value;
} Parameter_List[11];
```

```
struct   SEMAPHORE
{
        char *name;
        int value;
} Semaphore_List[10];
/* global variables */ static int pixline[512];
static int outline_coords[500][2];
static int outline_coords_left[MAX_EDGE_POINTS][2];
static int outline_coords_right[MAX_EDGE_POINTS][2];
static int outline_coords_top[MAX_EDGE_POINTS][2];
static int outline_coords_bottom[MAX_EDGE_POINTS][2];

/* function declarations */ void Define_Point(COORD, COORD, SHADE, ID);

void Define_Line( PT *, PT *, SHADE, ID);

void Define_Zone( PT *, PT *, SHADE, ID);

void Define_Edge(int *, SHADE, ID);

void Draw_Point( PT *);

void Draw_Line( LN * );

void Draw_Zone( ZN *);

void Draw_Edge( ED *);

void Print_Edge( ED *);

float seval (int, float *,float *,float *,float *,float *);

Define_Point(x,y,color,name)
int x,y,color,name;
{ Point_List[name].x = x;
  Point_List[name].y = y;
  Point_List[name].color = color;
}

Define_Line(pt1,pt2,color,name)
struct POINT *pt1,*pt2;
int color,name;
{ Line_List[name].start = pt1;
  Line_List[name].end   = pt2;
  Line_List[name].color = color;
}

Define_Edge(coord_array,color,name)
int color,name,coord_array[][2];
{ int i, coord,max_off,start = 2;
  Edge_List[name].coords = (int *)coord_array;
  Edge_List[name].length = coord_array[0][0];   /* number of pt PAIRS */
}

Define_Zone(pt1,pt2,color,name)
struct POINT *pt1,*pt2;
int color,name;
{ Zone_List[name].ul = pt1;
  Zone_List[name].lr = pt2;
  Zone_List[name].color = color;
}
Draw_Point(p)
PT *p;
{ woixel(p->x, p->y, p->color);
}

Draw_Line(l)
LN *l;
{ line(l->start.x,l->start.y,l->end.x,l->end.y,l->color);
}
```

```c
Print_Edge(ed)
struct EDGE *ed;
{ int i, *coord,max_off,start = 2;
  coord = ed->coords;
  max_off = ed->length * 2 + start;
  for ( i = start ; i < max_off ; i = i + 2)
    {
        printf("\ncoords :  %i %i", *(coord + i),
                                   *(coord + i + 1) );
    };
}

/* USER QUERY FUNCTIONS */ geti(name, iptr)
char *name;
int *iptr;
{ printf("%s: ", name);
        scanf("%d%c", iptr);
} getu(name, uptr)
char *name;
unsigned int *uptr;
{ printf("%s (hex): ", name);
        scanf("%x%c", uptr);
} getl(name, lptr)
char *name;
long *lptr;
{ printf("%s (hex): ", name);
        scanf("%X%c", lptr);                              /* was %lx   */
} getpoint(name, iptrx, iptry)
char *name;
int * iptrx,*iptry;
{
printf("%s ",name);
scanf("%d %d%c",iptrx,iptry);
} wait_()
{ printf("\nPress return to continue ");
        while (getchar() != '\n')
/* Skip pending CR */
                ;
        while (getchar() != '\n')
/*   and wait for an explicit one */
                ;
} y_no_q(name)              /* rtns 1 = y, 0 = n. Nothing else accepted */
char *name;

{
char reply;

printf("%s", name);
printf(" (y/n) ? ");
while(reply = getchar(), getchar(), (reply != 'y' && reply != 'n'))
    printf("\n...(y/n) ? ");
```

```c
  if (reply == 'y') return(1);
  else return(0);
} kill_buf()                    /* dump any chars in buffer */
{
while (kbhit())
    getchar();
}

/* INITIALIZATION FUNCTIONS */ initialize_hardware()

{
        unsigned base = 0x300;
        long     mem  = 0xA0000L;
        int flag = 0, block = 1;

printf("\nHardware initialization being performed...");
printf("\nMemory...");
sethdw(base, mem, flag, block);
printf("mapping...");
setdim(512,512,12);
printf("table initialization...");
initialize();
clear_image();
printf("DONE.\nReady!\n");
} clear_image()
{
printf("screen clearing...");
stop_acquire(WAIT);
sclear(0,WAIT);
}
/* SEMAPHORE FUNCTIONS */ wait_event(n,val)       /* always returns true */
int n,val;
{
while (get_semaphore(n) != val);
return(TRUE);
} get_semaphore(n)
int n;
{ return Semaphore_list[n]->value;
} set_semaphore(n,val)
int n,val;
{ int i;
  i = Semaphore_list[n]->value;
  Semaphore_list[n]->value = val;
  return(i);                 /* return previous value */
}

/* IMAGE ACQUIRE FUNCTIONS */ stop_acquire(flag)
int flag;
{ if (set_semaphore(ACQUIRE,STOP) == GO);
    stopgrab(flag);
} start_acquire(n,flag)   /* n = 0 snap, n=1 grab with wait flag */
int n,flag;
{ set_semaphore(ACQUIRE,GO);
  if (n)
    grab(flag);
  else snap(flag);
}
```

```
/* CUBIC SPLINE INTERPOLATION AND EVALUATION FUNCTIONS */ static int interval = 1;

spline(n,x,y,b,c,d)

int n;
float x[],y[],b[],c[],d[];

{       int nm1,ib,i;
        float t;

nm1 = n - 1;

if (n < 2)
    return;

else
    if ( n < 3 )
        { b[i] = ( y[2] - y[1] ) / ( x[2] - x[1] );
          c[1] = 0.0;
          d[1] = 0.0;
          b[2] = b[1];
          c[2] = 0.0;
          d[2] = 0.0;
          return;
        };

d[1] = x[2] - x[1];
c[2] = ( y[2] - y[1] ) / d[1];
for ( i = 2 ; i < n ; i++ )
        { d[i] =   x[i+1] - x[i];
          b[i] =   2.0 * ( d[i-1] + d[i] );
          c[i+1] = ( y[i+1] - y[i]) / d[i];
          c[i] =   c[i+1] - c[i];
        };

b[1] = - d[1];
b[n] = - d[n-1];
c[1] = 0.0;
c[n] = 0.0;

if (n != 3)
        { c[1] = c[3] /   (x[4] - x[2]) -   c[2] /   (x[3] - x[1]);
          c[n] = c[n-1] / (x[n] - x[n-2]) - c[n-2] / (x[n-1] - x[n-3]);
          c[1] = c[1]   * (d[1] * d[1])   /   (x[4] - x[1]);
          c[n] = - c[n] * (d[n-1] * d[n-1]) / (x[n] - x[n-3]);
        };

for ( i = 2 ; i < n+1 ; i++ )
        { t = d[i-1] / b[i-1];
          b[i] = b[i] - t * d[i-1];
          c[i] = c[i] - t * c[i-1];
        };

c[n] = c[n] / b[n];

for ( ib = 1 ; ib < n ; ib++ )
        { i = n - ib;
          c[i] = ( c[i] - d[i] * c[i+1] ) / b[i];
        };

b[n] = ( y[n] - y[nm1] ) / d[nm1] + d[nm1] * ( c[nm1] + 2.0 * c[n] );

for ( i = 1 ; i < n ; i++ )
        { b[i] = ( y[i+1] - y[i] ) / d[i] - d[i] * ( c[i+1] + 2.0 * c[i] );
          d[i] = ( c[i+1] - c[i] ) / d[i];
          c[i] = 3.0 * c[i];
        };
c[n] = 3.0 * c[n];
d[n] = d[n-1];
return;
```

```
float seval(n,u,x,y,b,c,d)

int n;
float u,x[],y[],b[],c[],d[];

{       int j,k;
        float dx;

if ( interval >= n ) interval = 1;
if ( (u < x[interval]) || ( u > x[interval+1]) )
        { interval = 1;                    /* binary search for interval */
          j = n + 1;
          do
                { k = (interval+j) / 2;
                  if ( u < x[k] )          j = k;
                  else                     interval = k;
                }
          while ( j > (interval+1) );
        };

dx = u - x[interval];
return( y[interval] + dx *
        ( b[interval] + dx * ( c[interval] + dx * d[interval])) );
}

/* INTERACTIVELY PLOT DATA POINTS, FIND A SPLINE THROUGH THEM AND PLOT IT.*/ spline_interactive()

{ int i,n,startx,starty,xinc,maxx,spline_count,ytemp;
float x[51],y[51],b[51],c[51],d[51];
float e,u;

clear_image();

printf("\nNumber of data points 2..20 ?");
scanf("%i",&n);

printf("\nStarting X,Y coords :");
scanf("%i %i",&startx,&starty);

printf("\nHorizontal space between data points: ");
scanf("%i",&xinc);

maxx = startx + ((n - 1) * xinc);
spline_count = maxx - startx;

printf("\nInput relative Y offsets from these coords : [%i,%i]\n",startx,starty);

for ( i = 1 ; i < n+1 ; i++ )
        { printf("\nPoint %i :",i);
          scanf("%i",&ytemp);
          y[i] = (float)ytemp;
          x[i] = (float)((i - 1) * xinc);
          circle(startx + (int)x[i], starty + (int)y[i], 10, 5, 6, 255);
          b[i] = 0.0;
          c[i] = 0.0;
          d[i] = 0.0;
        };

spline(n,x,y,b,c,d);
```

```c
/*
printf("\n2 Barray     Carray      Darrary");
for (i = 1 ; i < n+1 ; i++)
        printf("\n %f     %f     %f",b[i],c[i],d[i]);
*/ for (i = 1 ; i < spline_count ; i++)
        { s = seval(n,(float)i,x,y,b,c,d);
          wpixel(startx + i,starty + (int)s, 255);
        };

}

/* PLOT THE SPLINE OF AN EXISTING ARRAY OF DATA POINTS */ spline_outline_array(outline)
int outline[][2];

{ int i,n,startx,starty,xinc,maxx,maxy;
float x[51],y[51],b[51],c[51],d[51];
float s,u;

n = outline[0][0];
printf("\nNumber of data points is %i",n);

startx = outline[1][0];
starty = outline[1][1];
printf("\nStarting X,Y coords are : [%i,%i]",startx,starty);

maxx = outline[n][0];
maxy = outline[n][1];
printf("\nEnding X,Y coords are   : [%i,%i]",maxx,maxy);

xinc =  outline[2][0] - outline[1][0];
printf("\nHorizontal space between data points is : %i",xinc);

for ( i = 1 ; i < n+1 ; i++ )
        { printf("\nPoint %i is [%i,%i]",i,outline[i][0],outline[i][1]);
          y[i] = (float)outline[i][1];
          x[i] = (float)outline[i][0];
          circle(outline[i][0],outline[i][1], 5, 5, 6, 0);
          b[i] = 0.0;
          c[i] = 0.0;
          d[i] = 0.0;
        };

spline(n,x,y,b,c,d);

for (i = startx ; i < maxx + 1 ; i++)
        { s = seval(n,(float)i,x,y,b,c,d);
          wpixel(i, (int)s, 255);
        };

}
/* USES HORIZONTAL SCANNING LINES. */ find_all_object_outlines_h(startx,starty,endx,endy,interval,thresh)

int startx,starty,endx,endy,interval,thresh;

{
int index = 0, found,found_this_line,offset,y,maxlen;

maxlen = endx - startx;
    y = starty;

next_row:

offset = 0;
```

```
        rbline(startx,y,maxlen+1,pixline);
        found_this_line = FALSE;
        found = TRUE;
        while ((startx + offset < endx) && found)
            { found = find_all_edges(&offset,maxlen,thresh,pixline,1);
              found_this_line = found_this_line || found;
              if (found)
                { index++;
                  outline_coords[index][0] = offset + startx;
                  outline_coords[index][1] = y;
                  offset++;
                  if (!find_all_edges(&offset,maxlen,thresh,pixline,0)) break;
                  index++;
                  outline_coords[index][0] = offset + startx;
                  outline_coords[index][1] = y;
                };
            };

y = y + interval;                              /* Next row */ if ( (y > endy) ||
             (!found_this_line && (index > 0)))    /* Limits of window reached */
            { outline_coords[0][0] = index;
              return(index);                           /* or below the blob now ?
*/
            }
        else
            goto next_row;                             /* try to find more coords */
}

/* USES VERTICAL SCANNING LINES */ find_all_object_outlines_v(startx,starty,endx,endy,interval,thresh)

int startx,starty,endx,endy,interval,thresh;

{
int index = 0, found,found_this_line,offset,y,maxlen;

maxlen = endy - starty;
    y = starty;

next_row:

offset = 0;
    rvline(startx,y,maxlen+1,pixline);
    found_this_line = FALSE;
    found = TRUE;
    while ((startx + offset < endx) && found)
        { found = find_all_edges(&offset,maxlen,thresh,pixline,1);
          found_this_line = found_this_line || found;
          if (found)
            { index++;
              outline_coords[index][0] = offset + startx;
              outline_coords[index][1] = y;
              offset++;
              if (!find_all_edges(&offset,maxlen,thresh,pixline,0)) break;
              index++;
              outline_coords[index][0] = offset + startx;
              outline_coords[index][1] = y;
            };
        };

y = y + interval;                              /* Next row */
    if ( (y > endy) ||
         (!found_this_line && (index > 0)))    /* Limits of window reached */
        { outline_coords[0][0] = index;
          return(index);                           /* or below the blob now ? */
```

```
        }
    else
        goto next_row;                              /* try to find more coords

}

/* USES HORIZONTAL SCANNING LINES. */ find_1_object_outline_h(startx,starty,endx,endy,interval,thresh)

int startx,starty,endx,endy,interval,thresh;

{
int index, found,offset,y,maxlen,x_from_left,x_from_right;

index = 0;
maxlen = endx - startx;
y = starty;

while ( !((y > endy) ||
          (!found && (index > 0))) )              /* Limits of window reached *
    {
      offset = 0;
      rhline(startx,y,maxlen+1,pixline);
      found = find_1_edge(&offset,maxlen,thresh,pixline,1);  /* lft to rt */
      if (found)
         { x_from_left = startx + offset;
           index++;
           outline_coords_left[index][0] = x_from_left;
           outline_coords_left[index][1] = y;
           offset = maxlen;
           find_1_edge(&offset,0,thresh,pixline,0);     /* rt to lft */
           x_from_right = startx + offset;
           if (x_from_left != x_from_right) /* same pt? */
             { outline_coords_right[index][0] = x_from_right;
               outline_coords_right[index][1] = y;
             };
         };

y = y + interval;                             /* Next row */
    };

if (index > 0)
   { outline_coords_left[0][0] = index;
     outline_coords_right[0][0] = index;
   };

return(index + index);                              /* total # of point lft + rt */

}

/* USES VERTICAL SCANNING LINES. */ find_1_object_outline_v(startx,starty,endx,endy,interval,thresh)

int startx,starty,endx,endy,interval,thresh;

{
int index, found,offset,x,maxlen,y_from_top,y_from_bottom;

index = 0;
maxlen = endy - starty;
x = startx;

while ( !((x > endx) ||
          (!found && (index > 0))) )              /* Limits of window reached *
    {
      offset = 0;
      rvline(x,starty,maxlen+1,pixline);
```

```
            found = find_1_edge(&offset,maxlen,thresh,pixline,1); /* lft to rt */
            if (found)
              { y_from_top = starty + offset;
                index++;
                outline_coords_top[index][0] = x;
                outline_coords_top[index][1] = y_from_top;
                offset = maxlen;
                find_1_edge(&offset,0,thresh,pixline,0);     /* rt to lft */
                y_from_bottom = starty + offset;
                if (y_from_top != y_from_bottom) /* same pt? */
                   { outline_coords_bottom[index][0] = x;
                     outline_coords_bottom[index][1] = y_from_bottom;
                   };
              };

y = x + interval;                             /* Next row */
       };

if (index > 0)
          outline_coords_top[0][0] = index;
          outline_coords_bottom[0][0] = index;
        };
     return(index + index);

/* SCANS LINEARLY ACROSS PIXEL LINE LOOKING FOR ALL THRESHHOLDS. */ find_all_edges(offset,maxlen,thresh,pixarray,dir)
int *offset,maxlen,thresh,pixarray[],dir;

{       int i;

i = *offset;
if (dir)                   /* dir = 1 if going in--Looking for leading edge. */
    while ((pixarray[i] < thresh) && (i < maxlen)) i++;
else
    while ((pixarray[i] >= thresh) && (i < maxlen)) i++;

if ( i == maxlen )
      return(FALSE);
else {
      *offset = i;
      return(TRUE);
     };
}

/* SCANS THROUGH PIXEL LINE FORWARD OR BACKWARD LOOKING FOR A THRESHHOLD */ find_1_edge(offset,ending,thresh,pixarray,dir)
int *offset,ending,thresh,pixarray[],dir;

{       int i;

i = *offset;
if (dir)                   /* dir = 1 if going in--Looking for leading edge. */
    while ((pixarray[i] < thresh) && (i < ending)) i++;
else
    while ((pixarray[i] < thresh) && (i > ending)) i--;

if (i == ending)
      return(FALSE);
else {
      *offset = i;
      return(TRUE);
     };
}

/* USING BOTTOM EDGE OF PUDDLE, FIND ARRAY INDICES INDICATING PUDDLE
   WIDTH MAXIMUM RELIABLE CO-ORDINATES
*/
```

```c
determine_puddle(bottom_left_index,bottom_right_index)
int *bottom_left_index, *bottom_right_index;

{ int n,elt,lindex,rindex;

n = outline_coords_bottom[0][0];   /* length of array data */
lindex = 1;

while (search_array_column(1,outline_coords_top[0][0],&elt,
                           outline_coords_bottom[lindex][1],
                           outline_coords_top,1) )
    if (lindex == n)
       return(FALSE);
    else lindex++;

rindex = n;

while (search_array_column(1,outline_coords_top[0][0],&elt,
                           outline_coords_bottom[rindex][1],
                           outline_coords_top,1) )
    if (rindex == 1)
       return(FALSE);
    else rindex--;

*bottom_left_index = lindex;
*bottom_right_index = rindex;
return(TRUE);
}

/* SEARCHES THE ROWS OF A CO-ORDINATE ARRAY FOR A COLUMN # >= SOME VALUE. */ search_array_column(min,max,index,thresh,array,colnumber)
int min,max,*index,thresh,array[][2],colnumber;

{ int i;

for (i = min ; i <= max ; i++)
     if (array[i][colnumber] >= thresh)
        { *index = i;
          return(TRUE);
        };
  return(FALSE);
}

/* --------------------------------------------------------------------- */
/* --------- USER INTERACTION ROUTINES FOR IMAGE ANALYSIS -------------- */
/* --------------------------------------------------------------------- */ user()

{ int x,y,color,option,index1,index2,Pwidth,Px0,Px1,Py0,Py1,Py;
        pi *pt;

for (;;)
        { printf("\nEnter Option:");
          printf("\n0: Clear image");
          printf("\n1: Interactive spline display");
          printf("\n2: Display a spline of boundary points");
          printf("\n3: Get boundary points");
          printf("\n4: Snap a frame");
          printf("\n5: Determine Puddle Width");
          printf("\n6: Define a point");
          printf("\n7: Draw a point");
          printf("\n8: Define a line");
          printf("\n9: Draw a line");
```

```
            printf("\n10: Threshhold Window Detection");
            printf("\n11: Find objects");
            geti("\nChoice: ",&option);
            switch (option)
              { case 0 : clear_image(); break;
                case 1 : spline_interactive(); break;
                case 2 :
                    printf("\n0 = left, 1 = right, 2 = top, 3 = bottom");
                    geti("\nWhich ? ",&option);
                    switch (option)
                      { case 0 : spline_outline_array(outline_coords_left);
                                  break;
                        case 1 : spline_outline_array(outline_coords_right);
                                  break;
                        case 2 : spline_outline_array(outline_coords_top);
                                  break;
                        case 3 : spline_outline_array(outline_coords_bottom);
                                  break;
                      };
                    break;
                case 3 : get_object_boundary(); break;
                case 4 : snap(WAIT); break;
                case 5 : if (determine_puddle(&index1,&index2))
                           { Px0 = outline_coords_bottom[index1][0];
                             Py0 = outline_coords_bottom[index1][1];
                             Px1 = outline_coords_bottom[index2][0];
                             Py1 = outline_coords_bottom[index2][1];
                             Py  = (Py0 + Py1) / 2;
                             Pwidth = Px1 - Px0;
                             printf("\nPuddle edges at: [%i,%i] -- [%i,%i] giving w
idth of %i",
                                  Px0,Py0,Px1,Py1,Pwidth);
                             printf("n...Horizontal center line at y = %i",Py);
                             circle(outline_coords_bottom[index1][0],
                                    outline_coords_bottom[index1][1],5,5,6,255);
                             circle(outline_coords_bottom[index2][0],
                                    outline_coords_bottom[index2][1],5,5,6,255);
                             line(Px0,Py,Px1,Py,0);
                           }
                         else printf("\nCould not determine it.");
                         break;
                case 6 : Point_Count++;
                         getpoint("\nEnter coords: ",&x,&y);
                         geti("\nColor : ",&color);
                         Define_Point(x,y,color,Point_Count);
                         break;
                case 7 : printf("\nPoint # 1..%i ",Point_Count);
                         geti(" ? ",&x);
                         Draw_Point(Point_List[x]);
                         break;
                case 8 : Line_Count++;
                         printf("\nWhich Point #'s 1..%i ",Point_Count);
                         getpoint("\nWhich 2 ? ",&x,&y);
                         Define_Line(Point_List[x], Point_List[y],Line_Count);
                         break;
                case 9 : printf("\nLine # 1..%i ",Line_Count);
                         geti(" ? ",&x);
                         Draw_Line(Line_List[x]);
                         break;
                case 10 : Threshhold_Window_Detection();
                          break;
                case 11 : get_object_boundary();
                          break;
              };
          };
    } define EDGECUTOFF  100   /* if pix < cutoff it is not part of pool */
define EDGECHANGE  30    /* define brightness change indicating puddle edge */
#define DIAM        10
#define CMinterval  30    /* how many frames between recalculating CM */
```

```
static int x,y,dx,dy;
static int menu_saved_flag;

static int Zone_Count=0, Edge_Count=0, Line_Count=0, Point_Count =0;

get_object_boundary()
{ int i,x0,y0,x1,y1,space,thresh,color,point_count,algocase;

thresh = Parameter_List[EDGEVAL]->value;        /* by default, unless changed */
getpoint("\nCoords of upper left of  region: ",&x0,&y0);
getpoint("\nCoords of lower right of region: ",&x1,&y1);
geti("\nSpacing between scan lines (rows)  : ",&space);
printf("\nEdge threshold currently %i  ",thresh);
if (y_or_n("...change it"))
    geti("\nNew threshhold value for edges     : ",&thresh);
geti("\nShade to plot boundary points       : ",&color);
printf("\nAlgo to use: 0 = horiz (all), 1 = horiz converging");
printf("\n             2 = vert  (all), 3 = vert  converging");
geti("\nWhich ? ",&algocase);

switch (algocase)
 {
  case 0 : point_count = find_all_object_outlines_h(x0,y0,x1,y1,space,
                                                    thresh);
           if (point_count)
              for (i = 1 ; i <= point_count ; i++)
                 wpixel(outline_coords[i][0],
                        outline_coords[i][1],color);
           else
              printf("\nNo object found.");
           break;

case 1 : point_count =
              find_1_object_outline_h(x0,y0,x1,y1,space,thresh) / 2;
           if (point_count)
              for (i = 1 ; i <= point_count ; i++)
                 { wpixel(outline_coords_left[i][0],
                          outline_coords_left[i][1],color);
                   wpixel(outline_coords_right[i][0],
                          outline_coords_right[i][1],color);
                 };
           break;
  case 2 : printf("\nNot implemented yet !");
           break;
  case 3 : point_count =
              find_1_object_outline_v(x0,y0,x1,y1,space,thresh) / 2;
           if (point_count)
              for (i = 1 ; i <= point_count ; i++)
                 { wpixel(outline_coords_top[i][0],
                          outline_coords_top[i][1],color);
                   wpixel(outline_coords_bottom[i][0],
                          outline_coords_bottom[i][1],color);
                 };
           break;

}

}

/* DETERMINE PUDDLE WIDTH BY SCANNING IMAGE HORIZONTALLY STARTING FROM AN
   X,Y LOCATION OUTWARDS UNTIL A THRESHHOLD PIXEL VALUE IS FOUND.
*/

Puddle_Width(col,row,min,max,thresh)
unsigned col, row, *min, *max,thresh;
```

```
{
int x;
static int pixline[512];

rhline(0,row,512,pixline);

x = col+2;
while ((pixline[x] > thresh)   &&
       (pixline[x-1] > thresh) &&
       (x < 512)) x++;
*max = x;

x = col-2;
while ((pixline[x] > thresh)   &&         /* ck 2 pixels to screen noise */
       (pixline[x+1] > thresh) &&
       (x > 0)) x--;
*min = x;

}

/* USEFUL FOR PRINTING ARRAYS OF DATA POINTS. */ print_array_tab(aryptr,mincol,minrow,maxcol,maxrow)

int *aryptr,minrow,maxrow,mincol,maxcol;

{       int row,col,colength,*ptr;

colength = maxcol - mincol + 1;
printf("\n The Array from left to rt, top to bot. x= horiz, y= vert");
for (row = minrow ; row <= maxrow ; row++)
    for (col = mincol ; col <= maxcol ; col++)
        { ptr = aryptr + (row * colength + col);
          printf("\n Array[x=%i,y=%i]= %i   ",col,row,*ptr);

};
}

/* ---------------------------------------------------------------- */
/* ------------------------- THRESHHOLD WINDOW DETECTION CODE ------------ */
/* ---------------------------------------------------------------- */

Threshhold_window_Detection()

{ define DUMMY 1000
define LINE_ON 1
#define LINE_OFF 0
define ITER 10 int option;
int thresh, xlower,xupper, ylower,yupper;
int hfoundtop,hfoundbot,vfoundleft,vfoundright;
int showline, hlinelength, vlinelength, linevalue, i, action;

menu1_saved_flag = -1;    /* used by draw_box */ grab(-1);      /* Grab while setting up and until moment of scanning */

/* Get threshhold value to detect in the array. The occurence of a value >
   than the treshhold triggers function DETECTED.
*/
thresh = 200;
xupper = 100;
yupper = 300;
xlower = 400;
ylower = 400;
```

```
hlinelength = xlower - xupper;
vlinelength = ylower - yupper;
showline = LINE_ON;
linevalue = 255;

for (;;) {
        printf("\n***** WINDOW THRESHHOLD DETECTION *****\n");
        printf("\n 0:return to main menu");
        printf("\n 1:Change threshhold value from: %i", thresh);
        printf("\n 2:Change coords of threshhold window from: (%i,%i) (%i,%i)",
                       xupper,yupper,xlower,ylower);
        printf("\n 3:Change size of threshhold window with keyboard");
        printf("\n 4:Change window display features");
        printf("\n 5:Threshhold detection");
        printf("\n 6:Center of Mass Determination");
        kill_buf();
        geti("\nFunction ", &option);
        getchar();
        switch (option)  {
        case 0: getchar(); return;
        case 6:
            DisplayCenterOfMass(xupper + 1,yupper + 1,
                             hlinelength - 1,vlinelength - 1,255);
          break;
        case 1:
            printf("\n %s ", "Input threshhold value: ");
            scanf("%i", &thresh);
            getchar();
            break;
        case 2:
/* Ask for coordinates of upper left and lower right of box that will act as
   a rectangular border threshhold. Calculate the 4 component lines, to use in
   calls to vdetect and hdetect.
*/
            printf("\n %s", "Coordinates of upper left of box: ");
            scanf("%i %i", &xupper, &yupper);
            getchar();
            printf("\n %s", "Coordinates of lower right of box: ");
            scanf("%i %i", &xlower, &ylower);
            getchar();
            hlinelength = xlower - xupper;
            vlinelength = ylower - yupper;
            draw_box(xupper,yupper,hlinelength,vlinelength,linevalue);
            break;
        case 3:
            position_box(&xupper,&yupper,&xlower,&ylower,255);
            getchar();
            hlinelength = xlower - xupper;
            vlinelength = ylower - yupper;
            break;
        case 4:

/* Ask if the chosen line needs to be displayed on screen as the snapping
   occurs. If then SHOWLINE is displayed just prior to a SNAP.
*/
            if (showline == LINE_ON)
               printf("\nWindow display is ON with brightness of %i",linevalue);
               if (y_no_p("Do you want your box displayed during detection?") == 1)
                 { showline = LINE_ON;
                   printf("\n %s", "Brightness value of box border from 0 to 255: ");
                   scanf("%i", &linevalue);
                   getchar();
                   draw_box(xupper,yupper,hlinelength,vlinelength,linevalue);
                 }
               else
                  showline = LINE_OFF;
            break;
        case 5:

/* Perform sequential frame snapping, and partial pixel array examination
``` using ITEK brhline, and brvline functions to read
portions of frame memory. The threshhold detection is coded as subroutines
called HDETECT and VDETECT, which return X,Y coords or dummy X,Y coords.
*/

```c
            hfoundtop = DUMMY;
            hfoundbot = DUMMY;
            vfoundleft = DUMMY;
            vfoundright = DUMMY;

printf("\n %s ","Press return when ready to begin scanning...");
            getchar();
            printf("\nPress any key to stop scanning...");

stopgrab(NO_WAIT);

do { if (showline == LINE_ON)
                    rectangle(xupper,yupper,hlinelength,vlinelength,linevalue);
                 snap(WAIT);
                 hfoundtop = hdetect(xupper,yupper,hlinelength,thresh);
                 hfoundbot = hdetect(xupper,ylower,hlinelength,thresh);
                 vfoundleft = vdetect(xupper,yupper,vlinelength,thresh);
                 vfoundright = vdetect(xlower,yupper,vlinelength,thresh);
                 }
            while (kbhit() == 0          &&          /* Key pressed ? */
                   hfoundtop ==    DUMMY &&
                   hfoundbot ==    DUMMY &&
                   vfoundleft ==   DUMMY &&
                   vfoundright ==  DUMMY      );

if (kbhit() == 0) {
                printf("\nDETECTED:");
                if (hfoundtop != DUMMY)
                    { printf("\nOn top at (%i,%i)",xupper + hfoundtop,yupper);
                      circle(xupper + hfoundtop,yupper,DIAM,5,6,linevalue);
                    };
                if (hfoundbot != DUMMY)
                    { printf("\nOn bot at (%i,%i)",xupper + hfoundbot,ylower);
                      circle(xupper + hfoundbot,ylower,DIAM,5,6,linevalue);
                    };
                if (vfoundleft != DUMMY)
                    { printf("\nOn left at (%i,%i)",xupper,yupper + vfoundleft);
                      circle(xupper,yupper + vfoundleft,DIAM,5,6,linevalue);
                    };
                if (vfoundright != DUMMY)
                    { printf("\nOn right at (%i,%i)",xlower,yupper + vfoundright);
                      circle(xlower,yupper + vfoundright,DIAM,5,6,linevalue);
                    };

};
            if (showline == LINE_ON)
                rectangle(xupper,yupper,hlinelength,vlinelength,linevalue);
            kill_buf();
            break;
                            }   /* end of switch */
        }   /* end of for */

}   /* END OF WINDOW THRESHHOLD DETECTION */

DisplayCenterOfMass(xi,yi,xlen,ylen,color)
int xi,yi,xlen,ylen,color;

{
        int row,col,ptr,pixval,area;
        int rowcent,colcent;
        long mass;
```

```
if ( 0 !=
      center_of_mass(x1,y1,xlen,ylen,&colcent,&rowcent,EDGECUTOFF,1,&mass) )
   { printf("\n Mass of: %li has center at: (x=%i,y=%i)",
              mass,colcent + x1,rowcent + y1);
     circle( colcent + x1, rowcent + y1,DIAM .5,6,color);
   }
else
   printf("\n No object found.");

}

/* ------------------------------------------------------------------ */
/* -------- UTILITIES FOR DISPLAYING VALUES IN A PIXEL ARRAY -------- */
/* ------------------------------------------------------------------ */ print_array_screen(aryptr,mincol,minrow,maxcol,maxrow)

int minrow,maxrow,mincol,maxcol,*aryptr;

{       int row,col,colength,*ptr;

colength = maxcol - mincol + 1;
printf("\n The Array from left to rt, top to bot. x= horiz, y= vert\n     ");
for (col = mincol ; col <= maxcol ; col++)
   printf("%4i ",col);

for (row = minrow ; row <= maxrow ; row++)
   { printf("\n%4i: ",row);
     for (col = mincol ; col <= maxcol ; col++)
        { ptr = aryptr + (row * colength + col);
          printf("%4i ",*ptr);
        }
   }
}

/* ------------------------------------------------------------------ */
/* CALCULATE CENTER OF MASS OF A BOUNDED RECTANLE.
   PASS BACK COORDS AND MASS OF RECTANGLE.
*/
/* ------------------------------------------------------------------ */ center_of_mass(mincol,minrow,numcol,numrow,c0,r0,thresh,increment,mass)

int minrow,mincol,numrow,numcol,thresh,increment;
long *mass;
int *r0,*c0;

{       static BYTE pixline[512];
        int row,col;
        BYTE *pixptr;
        long sum_r = 0,sum_c = 0,sum = 0;

row = 0;
while ( row < numrow )
     {                                          /* read a row from memory */
        brdline(mincol,minrow + row,numcol,pixline);
        col = 0;
        while (col < numcol)                    /* Examine each column elt. */
            { pixptr = pixline + col;
              if ( *pixptr > thresh)
                 { sum = sum + *pixptr;
                   sum_r = sum_r + (*pixptr * row);
                   sum_c = sum_c + (*pixptr * col);
                 }
              col = col + increment;
            }
        row = row + increment;
     }
```

```
*mass = sum * increment * increment;   /* mass happens to be sum... */
                                       /* times assumed mass of plate */
if ( sum == 0)
    return(0);                         /* No object found */
else
    { sum = (float)sum;
    *r0 = (int)((float)sum_r / sum);   /* row of center */
    *c0 = (int)((float)sum_c / sum);   /* col of center */
    return(1);                         /* Object found */
    }
}

/* ---------------------------------------------------------------- */
/* INTERACTIVELY POSITION A RECTANGLE ON THE IMAGE USING KEYBOARD.
        (U)p, (D)own, (L)eft, (R)ight,
        (X)dimension increase-expand it horizontally,
        (x)dimension decrease-shrink it horizontally,
        (Y)dimension increase-expand it vertically,
        (y)dimension decrease-shrink it vertically,
        (anything else) quit, leaving rectangle positioned as is.
*/
/* ---------------------------------------------------------------- */ position_box(x1,y1,x2,y2,pixval)

int *x1,*y1,*x2,*y2, pixval;
{
int key;

/* stopgrab(NO_WAIT); */
printf("\nUse U,D,L,R keys to move box location, x/X and y/Y to change size");
printf("\nAny other key to quit...");

kill_buf();           /* dump awaiting input */ for (;;) {
    printf("\n upper left=( %i , %i ) lower right=( %i , %i )",
        *x1,*y1,*x2,*y2);

draw_box(*x1,*y1, *x2 - *x1, *y2 - *y1,pixval);
    key = getch();

switch (key) {
    case 117:
    case 85: *y1 = *y1 - 1; *y2 = *y2 - 1; break;    /* (U)p */
    case 100:
    case 68: *y1 = *y1 + 1; *y2 = *y2 + 1; break;    /* (D)own */
    case 108:
    case 76: *x1 = *x1 - 1; *x2 = *x2 - 1; break;    /* (L)eft */
    case 114:
    case 82: *x1 = *x1 + 1; *x2 = *x2 + 1; break;    /* (R)ight */
    case 120: *x2 = *x2 - 1;       break;    /* x shrink horizontal */
    case 88:  *x2 = *x2 + 1;       break;    /* X expand horizontal */
    case 121: *y2 = *y2 - 1;       break;    /* y shrink vertical */
    case 89:  *y2 = *y2 + 1;       break;    /* Y expand vertical */
    default:                return;          /* done */
    }
    }
}

/* ---------------------------------------------------------------- */
/* DRAW A RECTANGLE OVER IMAGE AND SAVE THE PIXELS UNDER THE RECTANGLE THAT
    WERE CLOBBERED, SO THEY CAN BE RESTORED IF DESIRED.
*/
/* ---------------------------------------------------------------- */ draw_box(x1,y1,xlen,ylen,color)
int x1,y1,xlen,ylen,color;

{
```

```
    static BYTE save_top[512],save_bot[512],save_left[512],save_right[512];
    static int top[3], bot[3], left[3], right[3];

if (menu1_saved_flag == -1)            /* true first time used when */
                                       /* called by menu1 only.     */
   { top[0]   = x1;        top[1]  = y1;         top[2]   = xlen;
     bot[0]   = x1;        bot[1]  = y1 + ylen;  bot[2]   = xlen;
     left[0]  = x1;        left[1] = y1;         left[2]  = ylen;
     right[0] = x1 + xlen; right[1]= y1;         right[2] = ylen;

store_line(top,save_top,0,0);
     store_line(bot,save_bot,0,0);
     store_line(left,save_left,0,1);
     store_line(right,save_right,0,1);
     menu1_saved_flag = 1;
   }

/* Restore the previous box of image pixels to the screen */
store_line(top,save_top,1,0);
store_line(bot,save_bot,1,0);
store_line(left,save_left,1,1);
store_line(right,save_right,1,1);

/* store the current pixels where a box will be written over them. */
top[0]   = x1;        top[1]  = y1;         top[2]   = xlen;
bot[0]   = x1;        bot[1]  = y1 + ylen;  bot[2]   = xlen;
left[0]  = x1;        left[1] = y1;         left[2]  = ylen;
right[0] = x1 + xlen; right[1]= y1;         right[2] = ylen;

store_line(top,save_top,0,0);
store_line(bot,save_bot,0,0);
store_line(left,save_left,0,1);
store_line(right,save_right,0,1);

/* draw the box over the desired pixels finally, or just return.
   This allows for simply erasing a box, without writing a new one.
*/ if (color != -1) rectangle(x1,y1,xlen,ylen,color);
} store_line(tuple,ary,rd_write,direction)
int *tuple,*ary,rd_write,direction;

{
if (direction == 0)              /* horizontal */
   if (rd_write == 0)            /* array <-- screen */
      brhline(*tuple, *(tuple +1), *(tuple + 2),ary);
   else                          /* array --> screen */
      bwhline(*tuple, *(tuple + 1), *(tuple + 2), ary);
else                             /* vertical */
   if (rd_write == 0)
      brvline(*tuple, *(tuple + 1), *(tuple + 2), ary);
   else
      bwvline(*tuple, *(tuple + 1), *(tuple + 2), ary);
}

/* -------------------------------------------------------------------- */
/* CHECK A HORIZONTAL LINE FOR THE EXISTENCE OF A PIXEL VALUE > THRESHHOLD
   RETURNING THAT x COORDINATE IF FOUND, ELSE A DUMMY VALUE
*/
/* -------------------------------------------------------------------- */ hdetect(x,y,len,thresh)

int x,y,len, thresh;

{
int i, val;
static BYTE pixline[512];
```

```
brhline(x,y,len,pixeline);
i = 0;
do
   { val = pixeline[j];
      j++;
   }
   while (i < len && thresh >= val);

if (val > thresh)
   return(i);
else
   return(DUMMY);

}

/* ------------------------------------------------------------------ */
/* CHECK A VERTICAL LINE FOR THE EXISTENCE OF A PIXEL VALUE > THRESHHOLD
   RETURNING THAT Y COORDINATE IF FOUND, ELSE A DUMMY VALUE
*/
/* ------------------------------------------------------------------ */ vdetect(x,y,len,thresh)
int x,y,len, thresh;

{
int i, val;
static BYTE pixeline[512];

brvline(x,y,len,pixeline);
i = 0;
do
   { val = pixeline[j];
      j++;
   }
   while (i < len && thresh >= val);

if (val > thresh)
   return(i);
else
   return(DUMMY);

}

/* TELL USER WHERE A WINDOW CROSSING WAS FOUND */ detected(dir,x,y,where)               /* where is relative to either x or y */
                                      /* depending on direction */
int dir,x,y,where;

{
if (dir == 0)
   printf("\n %s %i %i", "Horizontal detection at: ", where, y);
else
   printf("\n %s %i %i", "Vertical detection at: ", x, where);
}

/* ------------------------------------------------------------------ */
/* ---------------- END OF USER INTERACTION CODE ------------------- */
/* ------------------------------------------------------------------ */

/*                  MAINLINE ROUTINE (THE CONTROL LOOP).
          IMAGE PROCESSING CONTROL LOOP TO PERFORM IR WELDING ANAYSIS.

BASIC STEPS:
          1. Initialization of hardware parameters.
          2. Reception of software parameters specific to the process via
                message from other node(s).
          3. Acquire single image from video source (IR camera). Increment
                a counter.
          4. If The # of images acquired is = to a received parameter then
                calculate the Center of Area of existing weld pool. Then
                reset this counter.
```

```
        5. If there is an incoming goal message, then read and assert it.
        7. Calculate maximum pool width (for puddle or nugget).
        8. Calculate partial pixel zones relative to the center of area, and
               optionally display them over acquired image.
        9. Calculate the features present in the zones, (which means process t!
               goals, i.e. feature set) and perform weighted averaging with
               the last set of calculated features.
       10. If a counter has reached the averaging interval received during
               (2), then transmit the averaged feature set as the answer to
               the goals received at (5).
       11. Go to 3.

*/ main(argc,argv)
int argc;
char *argv[];

{ int debug;
unsigned        base = 0x300;
long            mem = 0xA0000L;
int                     flag = 0, block = 1;
int Fcount;
unsigned PBright;
static BYTE pixline[512];
unsigned CMradius,CMshade;
unsigned rowcent,colcent,PminX,PmaxX,r1,c1,r2,c2;
unsigned CMx0,CMy0;
unsigned Cx0,Cy0,CZsizex,CZsizey;
unsigned Wx0,Wx1,Wy1,PWidth;
unsigned Lx0,Ly0,LZsizex,LZsizey;
unsigned Rx0,Ry0,RZsizex,RZsizey;
unsigned Fx0,Fy0,FZsizex,FZsizey;

int increment = 10,cutoff = EDGECUTOFF;
long mass;

/*      Fzone minx,miny,sizex,sizey     defining box on Front of puddle.
        Rzone and Lzone same            " " Right and Left " "
        Center x,y,diameter and color of circle to draw.
        Width left x and y, right x and y of line passing thru center and
                terminating at puddle edges.
*/ printf("\nImage Processing Computer Online:");

if (argc > 1)
   { debug = TRUE;
     printf(">>> DEBUG MODE <<<");
   }
  else debug = FALSE;

initialize_hardware();  /* Sets up tables, clears screen, sets addresses */
system("clksched");     /* Start Pascal communications and scheduler */ geti("\nCM Increment (1-20) ?",&increment);
geti("\nEdge cutoff (0-255) ?",&cutoff);

while ( !InOsize() )       /* Is there a message waiting to be read? */
        if (kbhit())
           User();          /* Go to user interactive mode */

ProcessMsg();              /* Process the received message */
```

```
CMradius = DIAM;
CMshade = 0;                              /* black circle for center */
Cx0 = 100;
Cy0 = 100;
CZsizex = 300;
CZsizey = 300;

c1 = Cx0;
c2 = Cx0 + CZsizex;
r1 = Cy0;
r2 = Cy0 + CZsizey;

Fcount = CMinterval -1;

/*
sinpass(1,1,3);
static_luts();
setlut(0,1);
*/ get_image:                                /* acquire new image */ start_acquire(0,WAIT);

Fcount = Fcount + 1;
printf("\nFrame # %i of %i",Fcount,CMinterval);

if ( Fcount >= CMinterval)
    { Fcount = 0;
        if ( debug == TRUE )
           { manul_saved_flag = -1;
             rectangle(Cx0-1,Cy0-1,
                       CZsizex+1,CZsizey+1,255);
             start_acquire(1,-1);
             c1 = Cx0;
             c2 = Cx0 + CZsizex;
             r1 = Cy0;
             r2 = Cy0 + CZsizey;
             position_box(&c1,&r1,&c2,&r2,255);
             stop_acquire(WAIT);
           };
        Cx0 = c1;
        Cy0 = r1;
        CZsizex = c2 - c1;
        CZsizey = r2 - r1;

center_of_mass(Cx0,Cy0,CZsizex,CZsizey,
                    &colcent, &rowcent,cutoff,increment,&mass);
        if (mass == 0)
           { printf("\nNo Puddle Present...");
             goto get_image;
           };
        CMx0 = colcent + Cx0;
        CMy0 = rowcent + Cy0;

/* Determine Maximum Pool Width */
        PBright = rpixel(CMx0,CMy0);
        printf("\nCenter  [%u,%u] has mass of %li with center brightness %u",
               CMx0,CMy0,mass,PBright);

};

if (mass == 0) goto get_image;

Puddle_Width(CMx0,CMy0,
             &PminX, &PmaxX, PBright - EDGECHANGE);
Wx0 = PminX;
Wx1 = PmaxX;

circle( CMx0 , CMy0 , CMradius ,5,6,CMshade);
```

```
printf("\nPw coords: [%u,%u] --- [%u,%u]",
        Wx0,CMy0,Wx1,CMy0);

PWidth = Wx1 - Wx0;    /* Pool width is dist between endpoints */
Wy1    = CMy0 + PWidth / 2.0;

LZsizex = PWidth / 3.0;         /* Zones are 1/3 PWidth in size */
LZsizey = LZsizex;

RZsizex = PWidth / 3.0;
RZsizey = RZsizex;

FZsizex = PWidth / 2.0;
FZsizey = FZsizex;

printf("\nPool Width = %u giving (horiz) L,R,F zone sizes of %u %u %u",
        PWidth,LZsizex,RZsizex,FZsizex);

/* Coords of upperleft corner of zones */
Rx0 = Wx1 - RZsizex / 2;        /* the right zone */
Ry0 = CMy0 - RZsizey / 2;

Lx0 = Wx0 - LZsizex / 2;        /* the left zone.. */
Ly0 = CMy0- LZsizey / 2;

Fx0 = CMx0 - FZsizex / 2;       /* and the front zone. */
Fy0 = Wy1  - FZsizey / 2;

/* Draw the zones over the image */ rectangle(Fx0,Fy0,FZsizex,FZsizey,255);
rectangle(Rx0,Ry0,RZsizex,RZsizey,255);
rectangle(Lx0,Ly0,LZsizex,LZsizey,255);

/* Draw line ended by circles showing the */
                                /* pool width */ line(Wx0,CMy0,Wx1,CMy0,0);

circle(Wx0,CMy0,5,5,6,0);
circle(Wx1,CMy0,5,5,6,0);

/* Go to top of loop */
goto get_image;

}          /* END OF MAIN ROUTINE */
```

Appendix IX

```
;; WP_DFMS.LSP   EXAMPLE FRAMES CREATED FOR THE HIERARCHY OF WELD PROCESSES.
;;----------------------------------------------------------------------------
;;
;; These establish a static knowledge base referenced by various inference
;; processes. The slots typically include metalurgical and design info.
;; This knowledge base would be developed in interaction with the engineers,
;; ideally using a graphical interface.
;; This hierarchy looks like:
;;
;;                     WeldProcess
;;                   /     :      \
;;                  /      :       \
;;           FusionWeld  SpotWeld  LaserWeld  ...
;;            /  :   \
;;           /   :    \
;;          /    :     \
;;        GTA   GMA    ...     ...     ...     ...     ...
;;        / \
;;     GTA-1 GTA-2 ...
;;
```

```
(form weldprocess prototype a thing with
      (prerequisites include ((powersupply on)
                              (personel not-present)))
      (materials-list = (stainless aluminum xyz))
      (critical-variables include (current)))

(form fusionweld prototype a weldprocess with
      (prerequisites include ((robot on)
                              (torch on)
                              (shieldgas on)))
      (critical-variables include (speed puddle-width SGTemp))
      (engineers include (Smith Jones)))

(form spotweld prototype a weldprocess with
      (prerequisites include ((station on)
                              (gun on)))
      (critical-variables include (cycles nugget-size)))

(form GTA prototype a fusionweld with
      (electrode = Tungsten)
      (HeatInputFunction = (lisp (weldmodel )))
      (engineers include (Bangs))
      (dewpoint-temp = -60))

(form GTA-1 individual a GTA with
      (engineers include (Joe))
      (last-change = 1-21-87)
      (max-error-rate = .01)
      (Iq = 272)
      (S0     = 21.0)
      (wminp  = 5.065)
      (wminc  = 5.237)
      (W0     = 5.41)
      (wmaxc  = 5.580)
      (wmaxp  = 5.750)
      (DELTA-I-HIGH = 5)
      (DELTA-I-LOW  = 2.5)
      (DELTA-S-HIGH = 1)
      (DELTA-S-LOW  = 0.5)
      (D-HIGH       = 0.25)
      (D-LOW        = 0.05))

;; WELPROD.LSP    ROUGH MODEL OF FUSION WELDING PUDDLE.
;;-----------------------------------------------------------------
;;
;; USED AS FRONT END SIMULATOR AS INPUT TO WELDING EXPERT SYSTEM.

(DEFUN CALC-WIDTH (I S)                        ;SLOPE AND OFFSET TO GET W0
  (LET ( (K1 0.26) (B 2.05))                   ;FROM I AND SPEED, AS PER
     (+ B (* K1 (/ I S)))))                    ;EMPIRICAL DATA SET.

(DEFUN PUDDLE-MODEL (PARM VAL)                 ;GIVEN CURRENT OR SPEED.
  (LET (WIDTH)                                 ;UPDATE WIDTH..AS PER MODEL.
     (UPDATE STATS-WINDOW PARM VAL)
     (SETQ WIDTH (CALC-WIDTH (GETF PVS 'I) (GETF PVS 'SPEED)))
     (UPDATE STATS-WINDOW 'WIDTH WIDTH)))

(DEFMACRO NET-MESSAGE (&REST MSG)
  (LET ( (MSG-STRING (SECOND MSG)) (VAL (THIRD MSG)))
     (EVAL '(PPRINT ',MSG MESSAGE-WINDOW))
     (COND ((STRINGP MSG-STRING)
            (COND ((STRING-SEARCH* "CURRENT" MSG-STRING)
                   (PUDDLE-MODEL 'I VAL))
                  ((STRING-SEARCH* "SPEED" MSG-STRING)
                   (PUDDLE-MODEL 'SPEED VAL)))))
     NIL))
(DEFCONSTANT WELDING '((UPDATE-PARAMETER
    ("WHICH PARAMETER ? (WIDTH, I, SPEED, SHIELD-GAS-TEMP)"
     "VALUE ?") "MODIFY A PARAMETER")
```

```
           (PARAMETER ("WHICH PARAMETER ? (WIDTH, I, SPEED, SHIELD-GAS-TEMP)" )
           "VIEW A PARAMETER")
           (CONSTANT ("WHICH CONSTANT ? (WELD-ABORTED)" "VALUE ?")
           "MODIFY/VIEW A CONSTANT") ) )

(DEFCONSTANT BACKGROUND (MAKE-WINDOW-STREAM
            :LEFT 0
            :TOP 0
            :HEIGHT 24
            :WIDTH 79
            :STATUS 4
            :ATTRIBUTE 7 ))

(defconstant puddle-window (make-window-stream
                            :top 2
                            :left 1
                            :height 5
                            :width 77
                            :status 4
                            :attribute 7))

(defconstant stats-window (make-window-stream
                           :top 16
                           :left 2
                           :height 7
                           :width 32
                           :status 4
                           :attribute 7))

(DEFCONSTANT OPTIONS (MAKE-WINDOW-STREAM
            :LEFT 3
            :TOP 3
            :HEIGHT 15
            :WIDTH 38
            :STATUS 4
            :ATTRIBUTE 7 ))

(DEFCONSTANT INPUT-KEY (MAKE-WINDOW-STREAM
            :LEFT 1
            :TOP 6
            :HEIGHT 9
            :WIDTH 4
            :STATUS 4
            :ATTRIBUTE 7 ))

(DEFCONSTANT OUTER-KEY (MAKE-WINDOW-STREAM
            :LEFT 1
            :TOP 3
            :HEIGHT 15
            :WIDTH 4
            :STATUS 4
            :ATTRIBUTE 7 ))

(DEFCONSTANT LABEL-OPTIONS (MAKE-WINDOW-STREAM
            :LEFT 1
            :TOP 1
            :HEIGHT 1
            :WIDTH 40
            :STATUS 4
            :ATTRIBUTE 7 ))

(DEFCONSTANT RESPONSES (MAKE-WINDOW-STREAM
            :LEFT 45
            :TOP 3
            :HEIGHT 15
            :WIDTH 33
            :STATUS 4
            :ATTRIBUTE 7 ))
```

```
(DEFCONSTANT OUTER-RESPONSES (MAKE-WINDOW-STREAM
         :LEFT 42
         :TOP 3
         :HEIGHT 15
         :WIDTH 34
         :STATUS 4
         :ATTRIBUTE 7 ))

(DEFCONSTANT LABEL-RESPONSES (MAKE-WINDOW-STREAM
         :LEFT 42
         :TOP 1
         :HEIGHT 1
         :WIDTH 36
         :STATUS 4
         :ATTRIBUTE 7 ))

(DEFCONSTANT USER-INPUT (MAKE-WINDOW-STREAM
         :LEFT 1
         :TOP 20
         :HEIGHT 2
         :WIDTH 77
         :STATUS 4
         :ATTRIBUTE 7 ))

(DEFCONSTANT LABEL-USER (MAKE-WINDOW-STREAM
         :LEFT 1
         :TOP 19
         :HEIGHT 1
         :WIDTH 77
         :STATUS 4
         :ATTRIBUTE 7 ))

(DEFCONSTANT BKGROUND (MAKE-WINDOW-STREAM
         :TOP 0
         :LEFT 0
         :HEIGHT 24
         :WIDTH 80
         :STATUS 4
         :ATTRIBUTE 7 ))

(DEFCONSTANT LABEL-WINDOW (MAKE-WINDOW-STREAM
         :TOP 9
         :LEFT 2
         :HEIGHT 5
         :WIDTH 76
         :STATUS 4
         :ATTRIBUTE 7 ))

(DEFCONSTANT MESSAGE-WINDOW (MAKE-WINDOW-STREAM
         :TOP 16
         :LEFT 36
         :HEIGHT 7
         :WIDTH 40
         :STATUS 4
         :ATTRIBUTE 7 ))

(DEFUN GRAPH ()
    (DRAWBORDER BKGROUND 45)
    (SEND PUDDLE-WINDOW :CLEAR-SCREEN)
    (SEND STATS-WINDOW :CLEAR-SCREEN)
    (SEND LABEL-WINDOW :CLEAR-SCREEN)
    (SEND MESSAGE-WINDOW :CLEAR-SCREEN)
    (SEND LABEL-WINDOW :SET-CURSORPOS 8 4)
    (SEND LABEL-WINDOW :WRITE-STRING "SYSTEM PARAMETERS")
    (SEND LABEL-WINDOW :SET-CURSORPOS 45 4)
    (SEND LABEL-WINDOW :WRITE-STRING "EXPERT'S MESSAGES")
    (SEND LABEL-WINDOW :SET-CURSORPOS 25 1)
    (SEND LABEL-WINDOW :WRITE-STRING "PUDDLE WIDTH")
    (SEND LABEL-WINDOW :SET-CURSORPOS 31 0)
    (SEND LABEL-WINDOW :WRITE-STRING "MIN")
```

```
(SEND BKGROUND :SET-CURSORPOS 34 7)
(SEND BKGROUND :WRITE-CHAR 124)
(SEND LABEL-WINDOW :SET-CURSORPOS 39 0)
(SEND LABEL-WINDOW :WRITE-STRING "NOM")
(SEND BKGROUND :SET-CURSORPOS 42 7)
(SEND BKGROUND :WRITE-CHAR 124)
(SEND LABEL-WINDOW :SET-CURSORPOS 50 0)
(SEND LABEL-WINDOW :WRITE-STRING "MAX")
(SEND BKGROUND :SET-CURSORPOS 52 7)
(SEND BKGROUND :WRITE-CHAR 124)
(SEND STATS-WINDOW :SET-CURSORPOS 1 2)
(SEND STATS-WINDOW :WRITE-STRING " SPEED:")
(SEND STATS-WINDOW :SET-CURSORPOS 1 4)
(SEND STATS-WINDOW :WRITE-STRING "CURRENT:")
(SEND STATS-WINDOW :SET-CURSORPOS 1 6)
(SEND STATS-WINDOW :WRITE-STRING " WIDTH:")
(UPDATE STATS-WINDOW 'SPEED (GETF PVS 'SPEED))
(dotimes (i 1000))
(UPDATE STATS-WINDOW 'I   (GETF PVS 'I))
(dotimes (i 1000))
(UPDATE STATS-WINDOW 'WIDTH (GETF PVS 'WIDTH))
(SETQ *STANDARD-OUTPUT* message-window)

(DO* ((CHR (SEND STATS-WINDOW :READ-CHAR)
           (SEND STATS-WINDOW :READ-CHAR))(QUIT 113)
      (INC-S 0.5)(INC-I 2)(INC-W 0.05))
     ((EQ CHR QUIT))
     (CASE CHR (115 (UPDATE STATS-WINDOW 'SPEED
                    (- (GETF PVS 'SPEED) INC-S)))
               (83 (UPDATE STATS-WINDOW 'SPEED
                    (+ (GETF PVS 'SPEED) INC-S)))
               (105 (UPDATE STATS-WINDOW 'I
                    (- (GETF PVS 'I) INC-I)))
               (73 (UPDATE STATS-WINDOW 'I
                    (+ (GETF PVS 'I) INC-I)))
               (119 (UPDATE STATS-WINDOW 'WIDTH
                    (- (GETF PVS 'WIDTH) INC-W)))
               (87 (UPDATE STATS-WINDOW 'WIDTH
                    (+ (GETF PVS 'WIDTH) INC-W))) )))

(DEFUN UPDATE-PUDDLE-DISPLAY (VAL)
    (SEND PUDDLE-WINDOW :SET-CURSORPOS 22 3)
    (SEND PUDDLE-WINDOW :CLEAR-EOL)
    (DOTIMES (I (- (* VAL 30) 144))
      (SEND PUDDLE-WINDOW :WRITE-CHAR 42)) )

(DEFUN CALC-WIDTH (I S)
    (LET ( (K1 0.26) (B 2.05))                    ;SLOPE AND OFFSET TO GET W0
      (+ B (* K1 (/ I S)))))

(DEFUN PUDDLE-MODEL (PARM VAL)                    ;GIVEN CURRENT OR SPEED,
    (LET (WIDTH)                                  ;UPDATE WIDTH..AS PER MODEL.
      (UPDATE STATS-WINDOW PARM VAL)
      (SETQ WIDTH (CALC-WIDTH (GETF PVS 'I) (GETF PVS 'SPEED)))
      (UPDATE STATS-WINDOW 'WIDTH WIDTH)))

(DEFUN BUMP-CURSOR (STRM-NAME DIRECTION COUNT)
    (LET (XPOS YPOS)
      (MULTIPLE-VALUE-SETQ (XPOS YPOS)
        (SEND STRM-NAME :CURSORPOS))
      (CASE DIRECTION
        (UP (SEND STRM-NAME :SET-CURSORPOS XPOS (- YPOS COUNT)))
        (DOWN (SEND STRM-NAME :SET-CURSORPOS XPOS (+ YPOS COUNT)))
        (RIGHT (SEND STRM-NAME :SET-CURSORPOS (+ XPOS COUNT) YPOS))
        (LEFT (SEND STRM-NAME :SET-CURSORPOS (- XPOS COUNT) YPOS)) ) ) )

(DEFUN WINDOW-BACKSPACE (STRM)
    (LET ( X-POS Y-POS )
      (MULTIPLE-VALUE-SETQ (X-POS Y-POS)
```

```
                           (SEND STRM :CURSORPOS))
              (SEND STRM :SET-CURSORPOS (- X-POS 1) Y-POS)))

(DEFUN UPDATE (STRM PARM VAL)
    (SETF (GETF PVS PARM) VAL)
    (CASE PARM (SPEED (SEND STRM :SET-CURSORPOS 12 2)
                      (SEND STRM :CLEAR-EOL)
                      (SEND STRM :WRITE-STRING (LIST-TO-STRING VAL)))
               (I     (SEND STRM :SET-CURSORPOS 12 4)
                      (SEND STRM :CLEAR-EOL)
                      (SEND STRM :WRITE-STRING (LIST-TO-STRING VAL)))
               (WIDTH (SEND STRM :SET-CURSORPOS 12 6)
                      (SEND STRM :CLEAR-EOL)
                      (SEND STRM :WRITE-STRING (LIST-TO-STRING VAL))
                      (UPDATE-PUDDLE-DISPLAY VAL)) )
    (PLACE-MSG
        (LIST-TO-STRING
            (ECHO-FUN '(UPDATE-PARAMETER  ,PARM  ,VAL)
                   'MESSAGE-WINDOW)) 1 0 1 1) )

(DEFPARAMETER PVS
    '((I 27) (SPEED 21) (WIDTH 5.4)))

;; WP.RLS    WELD PROCESS RULESET                                    VERSION 1.0
;;-----------------------------------------------------------------------------
;; A top level ruleset to perform a welding process.
;; This one simply invokes puddle width based control and displays timing.

( WP
        (STATICS   ( (ROBOT . NIL) (ETIME . NIL)
                     (STIME . NIL) (POWER-SUPPLY . NIL) ) )
        (LOCALS    ( (2 (ETIME . NIL)) ) )
        (TASKS     ( (WELDPROCESS (STATIC ROBOT) (STATIC POWER-SUPPLY))) )
        (SELMODE   STED)
        (CSET      (1 2))                       ; Try to fire these 2 in sequence.
        (INPUTS    NIL)
        (MASK      NIL)
        (PREREQUISITE NIL)
        (RULES    (
                                                ; Remember starting time.
        (1 T
            (WINDOW-PRINT 'TIME-WINDOW 'START (:= '(STATIC STIME) (GETTIME)))
                                                ; Invoke another ruleset...
            (PERFORM 'PUDDLE 'WIDTH 'CONTROL (STATIC 'ROBOT) (STATIC 'POWER-SUPPLY)) )

; Notify user of total duration.
        (2 T
            (WINDOW-PRINT 'TIME-WINDOW 'DURATION (TIME-DIFFERENCE
                                        (STATIC 'STIME) (GETTIME))) )

) )
)

;; PWCRS.RLS   PUDDLE WIDTH CONTROL RULESET                          VERSION 1.1
;;-----------------------------------------------------------------------------
;; How to monitor and regulate current and speed based on puddle width trends.

(PWCRS                                  ; Internal name of this ruleset.

; Variable declarations (symbol . init-value)
        (STATICS ((ROBOT . NIL) (POWER-SUPPLY . NIL)))
        (GLOBALS ((DT . NIL) (DELTA-I . NIL) (DELTA-S . NIL)))

; Which are the applicable tasks?
        (TASKS ((PUDDLE WIDTH CONTROL (STATIC ROBOT)
                                     (STATIC POWER-SUPPLY))))

; How are the rules to be scanned/selected?
```

```
(SELMODE FL)

(CSET NIL)                        ; No pre-determined firings.

; Can this ruleset be used at this moment?
(PREREQUISITE (AND (NULL (CONSTANT 'WELD-ABORTED))))

; Initialization before using scanning rules.
(ENTRY (:= '(GLOBAL DT) (W-TIME-DERIV (PARAMETER 'WIDTH 'GET 'ALL))))

; Relevant process variables
(INPUTS ((PARAMETER 'WIDTH) (PARAMETER 'I)
         (PARAMETER 'SPEED) (PARAMETER 'SHIELD-GAS-TEMP)) )

; The rules themselves...
(RULES  (

; A quick check on shielding gas dewpt temp.
 (1 (> (PARAMETER 'SHIELD-GAS-TEMP)
       (CONSTANT 'DEWPOINT-TEMP))
    (ABORT 'ABOVE 'DEWPOINT (STATIC 'ROBOT)))

; Check if puddle has exceeded controllable
                                  ; limits, i.e. too big or small to correct?
 (2 (< (PARAMETER 'WIDTH)
       (CONSTANT 'WMINP))
    (ABORT 'TOO 'SMALL 'PUDDLE (STATIC 'ROBOT)))

(3 (> (PARAMETER 'WIDTH)
       (CONSTANT 'WMAXP))
    (ABORT 'TOO 'WIDE 'PUDDLE (STATIC 'ROBOT)))

; Assuming now that the puddle is within
                                  ; controllable limits.
                                  ; These rules decide how to change current,
                                  ; or speed to maintain desired heat input.

; Puddle small. Adjust current only?
 (4 (AND (< (PARAMETER 'I)
            (* 0.95 (CONSTANT 'IQ)))
         (< (PARAMETER 'WIDTH)
            (CONSTANT 'WMAXC)))
    (PERFORM 'TOO 'LOW 'CURRENT (STATIC 'POWER-SUPPLY)))
                                  ; Puddle small. Adjust speed and current?
 (5 (AND (< (PARAMETER 'I)
            (* 0.95 (CONSTANT 'IQ)))
         (> (PARAMETER 'WIDTH)
            (CONSTANT 'WMAXC))
         (:= '(GLOBAL 'DELTA-S)
             (CONSTANT 'DELTA-S-HIGH)))
    (PERFORM 'CHANGE 'SPEED (STATIC 'ROBOT)
                            (GLOBAL 'DELTA-S))
    (PERFORM 'TOO 'LOW 'CURRENT (STATIC 'POWER-SUPPLY)) )

; Puddle large. Adjust current only?
 (6 (AND (> (PARAMETER 'I)
            (* 1.05 (CONSTANT 'IQ)))
         (> (PARAMETER 'WIDTH)
            (CONSTANT 'WMINC)))
    (PERFORM 'TOO 'HIGH 'CURRENT (STATIC 'POWER-SUPPLY)))

; Current too high but puddle too small?
 (7 (AND (> (PARAMETER 'I)
            (* 1.05 (CONSTANT 'IQ)))
         (< (PARAMETER 'WIDTH)
            (CONSTANT 'WMINC))
         (:= '(GLOBAL 'DELTA-S)
             (- (CONSTANT 'DELTA-S-HIGH))))
    (PERFORM 'CHANGE 'SPEED (STATIC 'ROBOT)
                            (GLOBAL 'DELTA-S))
    (PERFORM 'TOO 'HIGH 'CURRENT (STATIC 'POWER-SUPPLY)) )
```

```
                                  ; Last puddle width ok, but new one too big
                                  ; and the rate of increase not too great?
                                  ; Then if current can be decreased, do it.
(8 (AND (:= '(GLOBAL 'DELTA-I)(- (CONSTANT 'DELTA-I-HIGH)))
        (> (PARAMETER 'WIDTH)
           (CONSTANT 'WMAXC))
        (<= (PARAMETER 'WIDTH 'GET -1)
            (CONSTANT 'WMAXC))
        (>= (GLOBAL 'DT)
            (CONSTANT 'D-HIGH))
        (> ( + (PARAMETER 'I)
               (GLOBAL 'DELTA-I))
           ( * 0.95 (CONSTANT 'IQ))))
   (PERFORM 'CHANGE 'CURRENT (STATIC 'POWER-SUPPLY)
                            (GLOBAL 'DELTA-I)))

; Same as (8) but change speed instead.
(9 (AND (> (PARAMETER 'WIDTH)
           (CONSTANT 'WMAXC))
        (<= (PARAMETER 'WIDTH 'GET -1)
            (CONSTANT 'WMAXC))
        (>= (GLOBAL 'DT)
            (CONSTANT 'D-HIGH))
        (<= ( + (PARAMETER 'I)
                (GLOBAL 'DELTA-I))
            ( * 0.95 (CONSTANT 'IQ)))
        (:= '(GLOBAL 'DELTA-S)
            (CONSTANT 'DELTA-S-HIGH)))
   (PERFORM 'CHANGE 'SPEED (STATIC 'ROBOT)
                          (GLOBAL 'DELTA-S)))
                                  ; Rules (10) to (15) similar to (8) and (9) but
                                  ; decide how much to change speed or current
                                  ; based on rate of puddle width change.

(10 (AND (:= '(GLOBAL 'DELTA-I)
             (- (CONSTANT 'DELTA-I-LOW)))
         (> (PARAMETER 'WIDTH)
            (CONSTANT 'WMAXC))
         (<= (PARAMETER 'WIDTH 'GET -1)
             (CONSTANT 'WMAXC))
         (< (GLOBAL 'DT)
            (CONSTANT 'D-HIGH))
         (> ( + (PARAMETER 'I)
                (GLOBAL 'DELTA-I))
            ( * 0.95 (CONSTANT 'IQ))))
   (PERFORM 'CHANGE 'CURRENT (STATIC 'POWER-SUPPLY)
                            (GLOBAL 'DELTA-I)))

; Similar to (9).
(11 (AND (> (PARAMETER 'WIDTH)
            (CONSTANT 'WMAXC))
         (<= (PARAMETER 'WIDTH 'GET -1)
             (CONSTANT 'WMAXC))
         (< (GLOBAL 'DT)
            (CONSTANT 'D-HIGH))
         (<= ( + (PARAMETER 'I)
                 (GLOBAL 'DELTA-I))
             ( * 0.95 (CONSTANT 'IQ)))
         (:= '(GLOBAL 'DELTA-S)
             (CONSTANT 'DELTA-S-LOW)))
   (PERFORM 'CHANGE 'SPEED (STATIC 'ROBOT)
                          (GLOBAL 'DELTA-S)))

(12 (AND (> (PARAMETER 'WIDTH)
            (CONSTANT 'WMAXC))
         (> (PARAMETER 'WIDTH 'GET -1)
            (CONSTANT 'WMAXC))
         (>= (GLOBAL 'DT)
             (CONSTANT 'D-LOW))
         (> (+ (PARAMETER 'I)
               (GLOBAL 'DELTA-I))
            (* 0.95 (CONSTANT 'IQ))))
```

```
              (PERFORM 'CHANGE 'CURRENT (STATIC 'POWER-SUPPLY)
                               (GLOBAL 'DELTA-I)))

(13 (AND (> (PARAMETER 'WIDTH)
            (CONSTANT 'WMAXC))
         (> (PARAMETER 'WIDTH 'GET -1)
            (CONSTANT 'WMAXC))
         (>= (GLOBAL 'DT)
             (CONSTANT 'D-LOW))
         (<= (+ (PARAMETER 'I)
                (GLOBAL 'DELTA-I))
             (* 0.95 (CONSTANT 'IQ)))
         (:= '(GLOBAL DELTA-S)
             (CONSTANT 'DELTA-S-HIGH)))
    (PERFORM 'CHANGE 'SPEED (STATIC 'ROBOT)
                            (GLOBAL 'DELTA-S)))

(14 (AND (:= '(GLOBAL 'DELTA-I)
             (- (CONSTANT 'DELTA-I-LOW)))
         (> (PARAMETER 'WIDTH)
            (CONSTANT 'WMAXC))
         (> (PARAMETER 'WIDTH 'GET -1)
            (CONSTANT 'WMAXC))
         (< (ABS (GLOBAL 'DT))
            (CONSTANT 'D-LOW))
         (> (+ (PARAMETER 'I) (GLOBAL 'DELTA-I))
            (* 0.95 (CONSTANT 'IQ)) ) )
    (PERFORM 'CHANGE 'CURRENT (STATIC 'POWER-SUPPLY)
                              (GLOBAL 'DELTA-I)))

(15 (AND (> (PARAMETER 'WIDTH)
            (CONSTANT 'WMAXC))
         (> (PARAMETER 'WIDTH 'GET -1)
            (CONSTANT 'WMAXC))
         (< (ABS (GLOBAL 'DT))
            (CONSTANT 'D-LOW))
         (<= (+ (PARAMETER 'I)
                (GLOBAL 'DELTA-I))
             (* 0.95 (CONSTANT 'IQ)))
         (:= '(GLOBAL 'DELTA-S)
             (CONSTANT 'DELTA-S-LOW)))
    (PERFORM 'CHANGE 'SPEED (STATIC 'ROBOT)
                            (GLOBAL 'DELTA-S)))

; Like (9) but for shrinking puddle.
(16 (AND (< (PARAMETER 'WIDTH)
            (CONSTANT 'WMINC))
         (>= (PARAMETER 'WIDTH 'GET -1)
             (CONSTANT 'WMINC))
         (<= (GLOBAL 'DT)
             (- (CONSTANT 'D-HIGH)))
         (:= '(GLOBAL 'DELTA-S)
             (- (CONSTANT 'DELTA-S-HIGH))))
    (PERFORM 'CHANGE 'SPEED (STATIC 'ROBOT)
                            (GLOBAL 'DELTA-S)))

; Similar to (16).
(17 (AND (< (PARAMETER 'WIDTH)
            (CONSTANT 'WMINC))
         (>= (PARAMETER 'WIDTH 'GET -1)
             (CONSTANT 'WMINC))
         (> (GLOBAL 'DT)
            (- (CONSTANT 'D-HIGH)))
         (:= '(GLOBAL 'DELTA-S)
             (- (CONSTANT 'DELTA-S-LOW))))
    (PERFORM 'CHANGE 'SPEED (STATIC 'ROBOT)
                            (GLOBAL 'DELTA-S)))

; Last puddle too small as well as this one?
(18 (AND (< (PARAMETER 'WIDTH)
            (CONSTANT 'WMINC))
```

```
            (< (PARAMETER 'WIDTH 'GET -1)
               (CONSTANT 'WMINC))
            (< (ABS (GLOBAL 'DT))
               (CONSTANT 'D-LOW))
            (:= '(GLOBAL 'DELTA-S)
                (- (CONSTANT 'DELTA-S-LOW))))
         (PERFORM 'CHANGE 'SPEED (STATIC 'ROBOT)
                                 (GLOBAL 'DELTA-S)))

; Similar to (18).
      (19 (AND (< (PARAMETER 'WIDTH)
                  (CONSTANT 'WMINC))
               (< (PARAMETER 'WIDTH 'GET -1)
                  (CONSTANT 'WMINC))
               (<= (GLOBAL 'DT)
                   (- (CONSTANT 'D-LOW)))
               (:= '(GLOBAL 'DELTA-S)
                   (- (CONSTANT 'DELTA-S-HIGH))))
         (PERFORM 'CHANGE 'SPEED (STATIC 'ROBOT)(GLOBAL 'DELTA-S)) )
))
)

:: ADPRS.RLS    ABOVE DEWPOINT RULESET                          VERSION 1.0
::-- ----------------------------------------------------------------------
:: What to do if shielding gas dewpoint temperature exceeds limits.

( ADPRS
        (STATICS        ((ROBOT . NIL)))
        (TASKS          ((ABOVE DEWPOINT (STATIC ROBOT))))
        (SELMODE FD)
        (CSET NIL)

(RULES (

; Simply shut down robot.
      (1  T
         (WINDOW-PRINT 'MSG-WINDOW
                       '"Shield Gas Temp > Dewpoint. ABORTING !!!")
         (PERFORM 'NET-MESSAGE (STATIC 'ROBOT)
                       '"HALT ROBOT IMMEDIATELY" ) )
))
)

:: TSPRS.RLS    TOO SMALL PUDDLE RULESET                        VERSION 1.0
::-- ----------------------------------------------------------------------
:: What to do if the puddle ever gets too small.

( TSPRS
        (STATICS        ( (ROBOT . NIL) ))
        (TASKS          ( (TOO SMALL PUDDLE (STATIC ROBOT)) ))
        (SELMODE FD)
        (CSET NIL)
        (RULES (

; Simply halt robot.
      (1  T
         (WINDOW-PRINT 'MSG-WINDOW
                       '"Puddle Too Small. ABORTING !!!" )
         (PERFORM 'NET-MESSAGE (STATIC 'ROBOT)
                       '"HALT ROBOT IMMEDIATELY" ) )
))
)

:: TWPRS.RLS    TOO WIDE PUDDLE RULESET                         VERSION 1.0
::-- ----------------------------------------------------------------------
:: What to do if the puddle ever grows too wide.

( TWPRS
        (STATICS        ( (ROBOT . NIL) ))
        (TASKS          ( (TOO WIDE PUDDLE (STATIC ROBOT)) ))
```

```
            (SELMODE FD)
            (CSET NIL)
            (RULES (

; Simply halt robot.
  (1  T
      (WINDOW-PRINT 'MSG-WINDOW
                    '"Puddle Too Wide. ABORTING !!!" )
      (PERFORM 'NET-MESSAGE (STATIC 'ROBOT)
                            '"HALT ROBOT IMMEDIATELY" ) )
  ))
  )

:: THCRS.RLS   TOO HIGH CURRENT RULESET.                            VERSION 1.0
::-- ------------------------------------------------------------------------
:: What to do if the current gets too high.

( THCRS
        (STATICS       ( (POWER-SUPPLY . NIL) ))
        (TASKS ( (TOO HIGH CURRENT (STATIC 'POWER-SUPPLY)) ) )
        (SELMODE FD)
        (CSET NIL)
        (RULES (

; Simply lower current to best value.
  (1  T
      (WINDOW-PRINT 'MSG-WINDOW
                    '"I is > 105% OF Iq...Deciding To Lower Current !!!")
      (PERFORM 'NET-MESSAGE (STATIC 'POWER-SUPPLY)
                            '"LOWER CURRENT TO" (CONSTANT 'IQ)) )
  ))
  )

:: TLCRS.RLS   TOO LOW CURRENT RULESET.                             VERSION 1.0
::-- ------------------------------------------------------------------------
:: What to do if the current is too low.

( TLCRS
        (STATICS       ( (POWER-SUPPLY . NIL) ))
        (TASKS ( (TOO LOW CURRENT (STATIC 'POWER-SUPPLY)) ) )
        (SELMODE FD)
        (CSET NIL)
        (RULES (

; simply raise current to best value.
  (1  T
      (WINDOW-PRINT 'MSG-WINDOW
                    '"I is < 95% OF Iq...Deciding To Raise Current !!!")
      (PERFORM 'NET-MESSAGE (STATIC 'POWER-SUPPLY)
                            '"RAISE CURRENT TO" (CONSTANT 'IQ)) )
  ))
  )

:: CHSRS.RLS   CHANGE SPEED RULESET                                 VERSION 1.0
::-- ------------------------------------------------------------------------
:: What to do if the travel speed needs to be changed.

( CHSRS
        (STATICS       ( (ROBOT . NIL) (DELTA-S . NIL) ))
        (TASKS         ( (CHANGE SPEED (STATIC ROBOT)
                                       (STATIC DELTA-S) )))
        (SELMODE FD)
        (CSET NIL)
        (RULES (

; Snew = Sold + Sdelta
  (1  T
      (WINDOW-PRINT 'MSG-WINDOW
                    '"Speed needs to be changed by:" (STATIC 'DELTA-S) )
```

```
(PERFORM 'NET-MESSAGE (STATIC 'ROBOT)
         "CHANGE SPEED TO:" (+ (PARAMETER 'SPEED) (STATIC 'DELTA-S)) ) )
 ) )
)

:: CHCRS.RLS    CHANGE CURRENT RULESET                                  VERSION 1.0
::--------------------------------------------------------------------------------
:: What to do if the current needs changing.

( CHCRS
        (STATICS       ( (POWER-SUPPLY . NIL) (DELTA-I . NIL) ))
        (TASKS         ( (CHANGE CURRENT (STATIC POWER-SUPPLY)
                                         (STATIC DELTA-I) )))
        (SELMODE FD)
        (CSET NIL)
        (RULES  (

; Inew = Iold + Idelta.
 (  T
    (WINDOW-PRINT 'MSG-WINDOW
         "Current needs to be changed by:" (STATIC 'DELTA-I) )
    (PERFORM 'NET-MESSAGE (STATIC 'POWER-SUPPLY)
             "CHANGE CURRENT TO:" (+ (PARAMETER 'I) (STATIC 'DELTA-I)) ) )
 ))
)

:: META.RLS   EXAMPLE META RULES FOR USE BY THE CONSISTENCY CHECKER
::--------------------------------------------------------------------------------
::

( (AND (PARTS-EQUAL? 'PREMISES RULE-CURRENT NEW-RULE)
       (PARTS-EQUAL? 'CONCLUSIONS RULE-CURRENT NEW-RULE) )
   (LIST 'SIMPLE-REDUNDANCY) )

( (AND (PARTS-EQUAL? 'PREMISES RULE-CURRENT NEW-RULE)
       (NOT (PARTS-EQUAL? 'CONCLUSIONS RULE-CURRENT NEW-RULE) ) )
  (LIST 'SIMPLE-NEGATION) )

( (AND (CANDIDATES RULE-CURRENT NEW-RULE)
       (COMMON-PARM-VALUES-CONFLICT RULE-CURRENT NEW-RULE)
       (OR (SINGLE-VALUED-PARM (CONFLICTING-COMMON-PARM
                                   RULE-CURRENT NEW-RULE))
           (NUMERIC-VALUED-PARM (CONFLICTING-COMMON-PARM
                                   RULE-CURRENT NEW-RULE)) ) )

(LIST 'COMPLEX-NEGATION (CONFLICTING-COMMON-PARM RULE-CURRENT NEW-RULE)) )

( (AND (CANDIDATES RULE-CURRENT NEW-RULE)
       (COMMON-PARMS-HAVE-SAME-VALUES RULE-CURRENT NEW-RULE) )

(LIST 'COMPLEX-REDUNDANCY (COMMON-PARMS-SAME (COMMON-PARMS
                                           RULE-CURRENT NEW-RULE))) )

( (AND (CANDIDATES RULE-CURRENT NEW-RULE)
       (COMMON-PARM-VALUES-CONFLICT RULE-CURRENT NEW-RULE)
       (MULTI-VALUED-PARM (CONFLICTING-COMMON-PARM RULE-CURRENT NEW-RULE)) )

(LIST 'COMPLEX-SUBSUMPTION (CONFLICTING-COMMON-PARM RULE-CURRENT NEW-RULE)) )

(  (and (not (incorrect-elt-number clause))
        (INCORRECT-ELT-ORDER CLAUSE) )

("Invalid ordering of elements in the clause") )
```

```
( (and (not (incorrect-elt-number clause))
      (INVALID-PARM-FUNCTION (FIRST CLAUSE)(SECOND CLAUSE)) )

("Attempt to apply an invalid function to the given parameter") )

( (and (not (incorrect-elt-number clause))
      (INVALID-PARM-VALUE (second CLAUSE)(THIRD CLAUSE)) )

("Attempt to apply an invalid value to the given parameter") )

( (INCORRECT-ELT-NUMBER CLAUSE)

("Attempt to create a clause with an invalid number of elements ( <> 3) ") )
```

APPENDIX X

EXTENDED BACKUS-NAUR FORMAL DEFINITION OF EXPERT ADVISABLE ADAPTIVE CONTROLLER

| | | |
|---|---|---|
| XADVAC | ::= | Expert Controller \|\| {Advisor \| Actor} |
| Expert Controller | ::= | Advisor \|\| {Custom Physical Layer} |
| Advisor | ::= | MIX \|\| Knowledge Layer \|\| Logical Layer \|\| Physical Layer \|\| {Actor} |
| Actor | ::= | Application Layer \|\| Knowledge Layer \|\| Logical Layer \|\| Physical Layer |
| MIX | ::= | "Multi-Inferencing Expert System" \|\| APCL |
| Application Layer | ::= | Layer \|\| "Application Specific Knowledge" |
| Physical Layer | ::= | Layer \|\| "Data Transmission Specific Knowledge" |
| Logical Layer | ::= | Layer \|\| "Logical Destination Knowledge" |
| Knowledge Layer | ::= | Layer \|\| "Knowledge Translator" |
| Layer | ::= | Program \|\| Programming Language |
| Program | ::= | "Connected series of statements to solve a problem" |
| Programming Language | ::= | APCL \|"C" \| "Pascal" \| "assembler" \| etc... |
| APCL | ::= | Advisable Process Control Language |

SYMBOL KEY:
- ::=  "is defined to be"
- |    "or" alternative
- ||   "together with"
- { }  0 or more occurences
- [ ]  0 or 1 occurence
- " "  defined elsewhere

| | | |
|---|---|---|
| Ruleset | ::= | RulesetLabel {StaticDecl \| GlobalDecl \| LocalDecl \| TaskExp \| Inputs \| MaskExp \| Prerequisites \| ConflictSet}\|\| SelectionMode \|\| {Rules} |

```
RulesetLabel       ::= Identifier
StaticDcl          ::= "Statics" || { Var Decl }
GlobalDecl         ::= "Globals" || { Var Decl }
LocalDecl          ::= "Locals" || { Rule Label || Var Decl }
TaskExp            ::= "Tasks" || { lisp expressions }
Inputs             ::= "Inputs" || { Parameter Names }
MaskExp            ::= Boolean Expr.
Prerequisites      ::= "Prerequisites" || Boolean Expr
ConflictSet        ::= "Cset" || { Rule Labels }
Selection Mode     ::= "Selmode" || "FL" | "FD" | "TARD" |
                       other key words
Rule               ::= Rule Label || If Expr || { Then Expr }
RuleLabel          ::= Identifier
IfExpr             ::= Boolean Expr.
ThenExpr           ::= Lisp Expr.
VarDecl            ::= Identifier || Initial Value
```

APPENDIX XI

INDEX TO APPENDICES

I. Files Automatically Loaded at Power-Up
    a. Bootstrap File for Any Lisp Node
    b. Bootstrap File for Image Processor Node
    c. Additional Bootstrap File for Lisp Nodes II. Utility Lisp Functions III. Expert Knowledge Representation System IV. Semantic Net Knowledge Representation System V. Consistency Checker System VI. Frames Knowledge Representation System VII(A). Lisp/Pascal Communication and Process Scheduler Software Interface VII(B). Pascal Communication and Scheduling Interface for Serial Ports, Hardware Clock and Lisp VIII. "C" Image Processing Code IX. Example Knowledge Basis for Frames, Expert System and Consistency Checker X. Backus-Naur Formal Definition of Expert Advisable Adaptive Controller XI. Index to Appendices

What is claimed is:

1. A real time welding process for welding adjacent materials with a weld puddle formed between the materials, said method comprising the steps of bringing a welding apparatus and consumable and the materials together to form a weld puddle at the interface of the adjacent materials, producing relative motion between the welding apparatus and the materials thereby defining a front edge of the weld puddle, thermographically scanning the weld puddle and its adjacent heat affected zone from the front and producing image signals representative of a thermographic image of the weld, analyzing said puddle image signals to extract therefrom data indicative of irregularities in the welding procedure, and adjusting the welding procedure to reduce said irregularities.

2. A welding process in accordance with claim 1 wherein the step of adjusting the welding procedure includes the steps of adjusting the electrical power provided and adjusting the position of the welding apparatus torch.

3. A welding process in accordance with claim 1 in which the data extracted defines the size of the weld puddle, and in which the step of adjusting the welding procedure includes the steps of determining whether adjustment of the electrical power provided to the torch will modify the puddle shape to within a predetermined range, and adjusting the travel speed of the torch when adjustment of the current is not sufficient.

4. A welding process in accordance with claim 3 including the step of determining whether a predetermined amperage change will adjust the width of the puddle to within a predetermined puddle range and, if not, then determining the speed adjustment necessary for the torch to change the width of the puddle sufficiently to cause it to fall within said predetermined range, and then changing the speed of torch travel accordingly.

5. A welding process in accordance with claim 1 including the step of storing procedure variables in real time for later analysis.

6. A welding process in accordance with claim 1 including the step of inspecting the weld puddle for defects in real time during the welding of the materials.

7. A welding process in accordance with claim 1 in which the adjusting step includes adjustment of the following:
   (a) voltage or amperage,
   (b) lateral and/or angular setting of the welding torch,
   (c) speed of torch travel, and
   (d) angular adjustment to a track angle.

8. A welding process in accordance with claim 1 including the steps of taking isotherm line scans of the weld puddle and relating the isotherms in real time to weld size measurements.

9. A welding process in accordance with claim 1 including the analysis in real time of the isotherm scans of weld size as a function of weld current.

10. A welding process in accordance with claim 1 in which the width and depth of the weld puddle is determined in real time.

11. A welding process in accordance with claim 1 wherein the welding apparatus employs gas shielding to form and protect the weld puddle, and including the steps of determining the dew point of the shield gas employed during welding, and aborting the welding operation when selected irregularities appear and the dew point of the gas indicates the shielding gas is too humid.

12. A welding process in accordance with claim 1 in which the forward tip of the image of the weld puddle is analyzed for projections indicating deviation of the weld path from the seam direction, and in which the welding procedure is adjusted to more closely track the weld seam.

13. A welding process in accordance with claim 1 in which the data indicative of irregularities extracted from the image signals include the width of the weld puddle.

14. A welding process in accordance with claim 1 in which the data indicative of irregularities extracted from the image signals include the width of the weld puddle measured perpendicular to the path of travel.

15. A welding process in accordance with claim 1 in which the data indicative of irregularities extracted from the image signals include the rate of heat flow out of the puddle.

16. A welding process in accordance with claim 1 in which the data indicative of irregularities extracted from the image signals include a determination of the difference in puddle brightness at points on the puddle perimeter.

17. A welding process in accordance with claim 1 in which the data indicative of irregularities extracted from the image signals include the rate of heat flow out of the puddle determined by taking the reciprocal of the distance between two points at predetermined respective higher and lower brightness levels located on either side of the puddle perimeter.

18. A welding process in accordance with claim 1 in which the data indicative of irregularities extracted from the image signals include the change in puddle geometry at its perimeter at a point defined by the perimeter and a line perpendicular to the direction of travel passing through the puddle center.

19. A welding process in accordance with claim 1 in which the data indicative of irregularities extracted from the image signals include the number of times the actual puddle perimeter crosses over a theoretical smooth puddle perimeter within a given zone.

20. A welding process in accordance with claim 1 wherein the zone encloses the leading edge of the puddle.

21. A welding process in accordance with claim 1 wherein the zone encloses a portion of the puddle perimeter to the left or right of the puddle center.

22. A welding process in accordance with claim 1 in which the data indicative of irregularities extracted from the image signals include measurements of the area of the puddle within a zone that overlaps its perimeter.

23. A welding process in accordance with claim 1 in which the data indicative of irregularities extracted from the image signals include a measurement of the length of the puddle perimeter.

24. A welding process in accordance with claim 1 in which the data indicative of irregularities extracted from the image signals include measuring the length of the puddle perimeter within a zone that overlaps its perimeter.

25. A welding process in accordance with claim 1 in which the data indicative of irregularities extracted from the image signals includes measuring the area of the puddle within a zone that overlaps the perimeter.

26. A welding arrangement for controlling the welding of selected adjacent materials, said welding arrangement comprising infra-red detection means for observing radiation from the vicinity of the weld, said detection means effective for producing weld signals indicative of conditions detected with regard to welding operations, analysis means for receiving weld signals produced by said detection means, said analysis means effective for analyzing said weld signals to establish an analytical representation thereof, controller means for receiving the results of analysis from said analysis means, said controller means comprising memory means for holding a plurality of knowledge bases including a semantic network effective for defining the interrelationship of predetermined goals and subgoals descriptive of the accomplishment of welding operations, said memory means further including a rule base including predetermined rules enabling the development of inferences with respect to said analysis of said weld signals, knowledge mechanism means distributed over a plurality of nodes for implementing directions provided by said respective knowledge bases, and scheduling means for determining the performance of inferencing operations according to the rules in said rule base.

27. A welding arrangement according to claim 26 wherein said knowledge means is distributed over a plurality of hardware nodes.

28. A welding arrangement according to claim 26, said controller means further comprising knowledge layer means for ascertaining the node location of particular knowledge bases.

29. A welding arrangement according to claim 26, said controller means comprising means for communicating knowledge between nodes in response to an inference process.

30. A welding arrangement according to claim 26 wherein said scheduling means controls the transfer of inference processes between running, ready and suspended queues.

31. A welding arrangement according to claim 26 comprising running, ready and suspended queues to enable inference processing.

32. A welding arrangement according to claim 26 wherein said detection means is effective for infrared detection of said weld puddle.

33. A welding arrangement according to claim 26 wherein said analysis means provides an indication of weld puddle width.

34. A welding arrangement according to claim 26 wherein said analysis means provides an indication of weld puddle position.

35. A welding arrangement according to claim 26 wherein said rule base halts the operation of welding if said welding arrangement detects irregularities and if the shield gas dew point indicates the shield gas is drier than a predetermined limit.

36. A method for welding selected adjacent materials with a weld puddle along the edges at which the materials abut and including a consumable, by producing relative motion between the materials and welding apparatus and observing radiation of heat from the leading edge of said weld puddle, by analyzing the pattern of said radiation, and by adjusting weld speed and current in view of the results of said analysis.

37. The method according to claim 36, wherein said analysis determines the width of said weld puddle.

38. The method according to claim 36, wherein said analysis determines whether the dimensions of the weld puddle fall within a predetermined range of values.

39. The method according to claim 36, wherein weld speed is decreased, if said weld puddle is too small.

40. The method according to claim 36, wherein the weld current is increased, if said weld puddle is too small.

41. The method according to claim 36, wherein said weld current is modified in response to the cooling rate of said weld puddle.

42. The method according to claim 36, wherein said weld speed is modified in response to the cooling rate of said weld puddle.

43. The method of claim 36, wherein analysis of the pattern of said radiation includes observation of protrusions in the leading edge of said weld puddle.

44. The method according to claim 43, including making a determination of whether said protrusions are indicative of mismatch, misalignment and root opening defects.

45. The method of claim 36, wherein the analysis determines the cooling rate of said weld puddle by by a predetermined average of pixel values across the edge of the weld puddle.

46. The method according to claim 45, wherein determining said cooling rate includes subtracting pixel values separated by a predetermined length across the edge of the weld.

47. The method according to claim 45, wherein the average is established by subtracting selected separated pixel values straddling the edge of the weld puddle and dividing by the amount of separation.

48. The welding method according to claim 1 or 36 wherein the welding is halted when said weld puddle reaches a predetermined size.

49. The invention according to claims 1 or 36, wherein the track of welding is adjusted in response to establishment of an angle of deviation from the weld seam.

50. The invention according to claim 49, wherein said angle of deviation is established in response to misalignment of said welding apparatus.

51. The invention according to claim 50, wherein said misalignment is indicated by the direction of a protrusion along the leading edge of said weld puddle.

52. The invention according to claims 1 or 36, wherein the angle of said welder from a perpendicular to said welded surfaces is adjusted in response to the appearance of a mismatch condition.

53. The invention according to claim 52, wherein said mismatch is indicated by the shape of a protrusion in the leading edge of said weld puddle.

54. A welding apparatus for controlling the welding of selected materials and including an automated welding apparatus, said welding apparatus comprising:

image capturing means for capturing a heat image of at least a single selected zone of the weld region and producing a digital representation of said image;

first high-speed information processing means connecting to said image capturing means to receive said digital representation for extracting from said representation at high speed a much smaller amount of data indicative of irregularities in the welding process, or the lack thereof;

second artificial intelligence information processing means connecting to said first high-speed information processing means to receive said data indicative of irregularities in the welding process, or the lack thereof, for analyzing said data using the principles of artificial intelligence programming and for generating process control data; and third high-speed information processing means connecting to said second artificial intelligence information processing means to receive said process control data and connecting to said welding apparatus for operating said welding apparatus under the control of said process control data;

whereby real time control of welding under artificial intelligence programming control is achieved.

55. A welding apparatus in accordance with claim 54 wherein the means for operating said welding apparatus includes means for adjusting the electrical power provided and adjusting the position of the welding apparatus torch.

56. A welding apparatus in accordance with claim 54 in which the data extracted define the size of the weld puddle, and in which the means for analyzing said data includes means for determining whether adjustment of the electrical power provided to the torch will modify the puddle shape to within a predetermined range, and means for adjusting the travel speed of the torch when adjustment of the current is not sufficient.

57. A welding apparatus in accordance with claim 54 including means for determining whether a predetermined amperage change will adjust the width of the puddle to within a predetermined puddle range, and means for determining the speed adjustment necessary for the torch to change the width of the puddle sufficiently to cause it to fall within said predetermined range, and means for changing the speed of torch travel accordingly.

58. A welding apparatus in accordance with claim 54 including means for storing data indicative of irregularities in the welding process, or the lack thereof, in real time during the welding of the materials for later analysis.

59. A welding apparatus in accordance with claim 54 including means for inspecting the weld puddle for defects in real time during the welding of the materials.

60. A welding apparatus in accordance with claim 54 in which the means for operating said welding apparatus includes means for adjusting voltage or amperage; means for adjusting lateral and/or angular adjustments of the welding torch position; means for adjusting the speed of torch travel; and means for adjusting angular adjustment to a track angle.

61. A welding apparatus in accordance with claim 54 including means for taking isotherm line scans of the weld puddle and means for relating the isotherms in real time to weld size measurements.

62. A welding apparatus in accordance with claim 61 including means for analysis in real time of the isotherm scans of weld size as a function of weld current.

63. A welding apparatus in accordance with claim 54 in which the width and depth of the weld puddle is determined in real time.

64. A welding apparatus in accordance with claim 54 including means for monitoring shield gas dew point during welding, and which further includes means for aborting welding operations when the dew point indicates the shielding gas is too humid.

65. A welding apparatus in accordance with claim 54 in which the forward tip of the image of the weld puddle is analyzed for projections indicating deviation of weld path from seam direction and adjusted to more closely track the weld seam.

66. A welding apparatus in accordance with claim 54 in which the data indicative of irregularities extracted from the image signals include the width of the weld puddle.

67. A welding apparatus in accordance with claim 54 in which the data indicative of irregularities extracted from the image signals include the width of the weld puddle measured perpendicular to the path of travel through the center of brightness of the puddle to points on the puddle perimeter of lower brightness than the brightness at the center of brightness.

68. A welding apparatus in accordance with claim 54 in which the data indicative of irregularities extracted from the image signals include the rate of heat flow out of the puddle.

69. A welding apparatus in accordance with claim 54 in which the data indicative of irregularities extracted from the image signals include a measurement of the change in puddle brightness at points adjacent to the puddle perimeter.

70. A welding apparatus in accordance with claim 54 in which the data indicative of irregularities extracted from the image signals include the rate of heat flow out of the puddle determined by taking the reciprocal of the distance between two points at predetermined respective higher and lower brightness levels located on either side of the puddle perimeter.

71. A welding apparatus in accordance with claim 54 in which the data indicative of irregularities extracted from the image signals include the rate of change in puddle brightness at its perimeter at a point defined by the perimeter and a line perpendicular to the direction of travel passing through the puddle center of brightness.

72. A welding apparatus in accordance with claim 54 in which the data indicative of irregularities extracted from the image signals include the number of times the actual puddle perimeter crosses over a theoretical smooth puddle perimeter within a given zone.

73. A welding apparatus in accordance with claim 54 wherein at least one of said zones contains the leading edge of the puddle.

74. A welding apparatus in accordance with claim 54 wherein at least one of said zones encloses a portion of the puddle perimeter to the left or right of the puddle center.

75. A welding apparatus in accordance with claim 54 in which the data indicative of irregularities extracted from the image signals include measurements of the area of the puddle within a zone that overlaps its perimeter.

76. A welding apparatus in accordance with claim 54 in which the data indicative of irregularities extracted from the image signals include measuring the length of the puddle perimeter.

77. A welding apparatus in accordance with claim 54 in which the data indicative of irregularities extracted from the image signals include measuring the length of the puddle perimeter within a zone that overlaps its perimeter.

78. A welding apparatus in accordance with claim 54 in which the data indicative of irregularities extracted from the image signals include measuring the area of the puddle within a zone that overlaps the perimeter.

79. A welding apparatus for controlling the welding of selected adjacent materials with a weld puddle along their interface formed from adjacent materials and a consumable comprising:
- infrared detection means sensitive to thermal radiation in the vicinity of 10 to 11 microns where the puddle leading edge defects are visible attached to said automatic welder for observing infrared radiation from the leading edge of said weld puddle and generating data representing an image of said puddle; and
- information processing means connected to said infrared detection means for analyzing said data, and effective for establishing control strategies therefrom, and for operating said automatic welder in accordance with said control strategies.

80. A welding apparatus for welding with a weld puddle using a controllable welder device, said apparatus comprising:
- image detection means for observing radiation emitted from said weld puddle and for generating data representing an image of said puddle;
- image data reduction means connected to said image detection means to receive said data representing an image, for analyzing said data to derive therefrom a reduced amount of data characterizing said image;
- image analysis means connecting to said image data reduction means to receive said reduced amount of data for analyzing said reduced amount of data to derive therefrom data characterizing the welding process and any irregularities therein;
- control strategy determination means connecting to said image analysis means to receive said data characterizing the welding process and any irregularities therein, for analyzing said data characterizing the welding process to derive therefrom data characterizing control strategies to govern the welding process;
- control implementation means connecting to said control strategy determination means to receive said data characterizing control strategies and also connecting to said controllable welder device for operating said welder, in accordance with said control strategies; and
- wherein said image data reduction means, image analysis means, control strategy determination means, and control implementation means are implemented as separate nodes, at least some of which nodes reside on independent data processors.

81. An apparatus in accordance with claim 80 wherein said image analysis means and control strategy determination means are implemented using artificial intelligence programming techniques so that a knowledge engineer working with experts in welding may design the process control strategies that control the welding process.

82. A welding method for welding materials along a seam established therebetween by the progress of a weld puddle including a consumable, said method comprising the steps of beginning welding operation, inspecting the geometry of said weld puddle in terms of protrusions along its leading edge, determining whether said inspection discloses any of a number of predetermined weld defects, and modifying weld process parameters in response to said determination.

83. The method according to claim 82, wherein the angle of the track of said weld puddle is adjusted if a misalignment angle defect is determined.

84. The method according to claim 82, wherein the angle of said welder is modified if a mismatch defect is determined.

85. The method according to claim 82, wherein the weld speed is reduced if an excessive root opening is determined between the materials being welded.

86. The method according to claim 82, wherein said weld puddle geometry is interpreted in terms of isotherms indicative of weld puddle protrusions at selected temperature levels.

87. The method according to claim 82, wherein welding is terminated if the temperature of said weld puddle gets too hot.

88. The method according to claim 87, wherein weld puddle temperature is determined by evaluating the levels of predetermined isotherms in said weld puddle.

89. The method according to claim 82, wherein welding is terminated if the weld puddle gets too wide.

90. The method according to claim 82, wherein welding is terminated if the dew point level of the shield gas employed in welding indicates that the shield gas exceeds a predetermined maximum humidity value.

91. A welder arrangement for welding a seam in materials and a consumable to be joined with a weld puddle traveling along said seam, said arrangement effective for establishing an arc of current between the arrangement and said weld puddle, said arc and said weld puddle substantially enclosed in a shield gas during welding operation to protect said weld from degradation during its establishment, said welder arrangement including detection means for detecting the infrared geometry of the leading edge of said weld puddle, said geometry comprising the shape and separation of isotherms characterizing the heat in said weld puddle at the time of detection, said welder arrangement including analysis means for analyzing the features detected by said detection means, and including modifying means for modifying weld process parameters in response to said analysis.

92. The arrangement of claim 91, wherein said detection means is effective for detecting protrusions in the leading edge of said weld puddle.

93. The arrangement of claim 92, wherein said analysis is effective for classifying the kind of defect which has caused said protrusion.

94. The arrangement of claim 91, wherein said modifying means includes means for modifying the weld speed in response to analysis by said analysis means.

95. The arrangement of claim 91, wherein said modifying means includes means for modifying the weld current in response to analysis by said analysis means.

96. The arrangement of claim 91, wherein said modifying means includes means for modifying the track of said welder in response to analysis by said analysis means.

97. The arrangement of claim 91, wherein said modifying means includes means for modifying the angle of said welder from the perpendicular in response to analysis by said analysis means.

98. The arrangement of claim 92, wherein the detected protrusions are indicative of misalignment.

99. The arrangement of claim 92, wherein the detected protrusions are indicative of mismatch.

100. The arrangement of claim 92, wherein the detected protrusions are indicative of excessive root opening.

101. A real time welding process for welding adjacent materials with a weld puddle formed between the materials, said method comprising the steps of bringing a welding apparatus that employs a gas shield to form and protect the puddle and the materials together into position to form the weld puddle at the interface of the adjacent materials, thermographically scanning the weld puddle and its adjacent heat affected zone and producing image signals representative of a thermographic image of the weld, analyzing said puddle image signals to extract therefrom data indicative of irregularities in the welding process, adjusting the welding procedure to reduce said irregularities, determining the dew point of the shield gas employed during welding, and aborting the welding operation when selected irregularities appear and the dew point of the gas indicates the shield gas is too humid.

102. A welding arrangement for controlling the welding of selected adjacent materials with a weld puddle along their interface, said welding arrangement comprising detection means for observing radiation from said weld puddle, said detection means effective for producing weld signals indicative of conditions detected with regard to welding operations, analysis means for receiving weld signals produced by said detection means, said analysis means effective for analyzing said weld signals to establish an analytical representation thereof, controller means for receiving the results of analysis from said analysis means, said controller means comprising memory means for holding a plurality of knowledge bases including a semantic network effective for defining the interrelationship of predetermined goals and subgoals descriptive of the accomplishment of the welding operation, said memory means further including a rule base including predetermined rules enabling the development of inferences with respect to said analysis of said weld signals, and knowledge mechanism means for implementing directions provided to said respective knowledge bases; and scheduling means for determining the performance of inferencing operations according to the rules in said rule base;

wherein said rule base halts the operation of welding, if the shield gas dew point indicates the shield gas is more humid than a predetermined limit.

103. A welding apparatus for controlling the welding of selected adjacent materials with a weld puddle forming at the point of welding and including an automated welding apparatus, said welding apparatus comprising:

image capturing means for capturing an image of at least a single selected zone of the weld puddle and producing a digital representation of said image;

first high-speed information processing means connecting to said image capturing means to receive said digital representation for extracting form said representation at high speed a much smaller amount of data indicative of irregularities in the welding process, or the lack thereof;

second artificial intelligence information processing means connecting to said first high-speed information processing means to receive said data indicative of irregularities in the welding process, or the lack thereof, for analyzing said data using the principles of artificial intelligence programming and for generating process control data;

third high-speed information processing means connecting to said second artificial intelligence information processing means to receive said process control data and connecting to said welding apparatus for operating said welding apparatus under the control of said process control data;

means for monitoring shield gas dew point during welding;

means for aborting the welding operation when the dew point indicates the shielding gas is too humid;

whereby real time control of welding under artificial intelligence programming control is achieved.

104. A welding method for welding materials along a seam established therebetween by the progress of a weld puddle, said method comprising the steps of beginning the welding operation, inspecting the geometry of said weld puddle in terms of protrusions along its leading edge, determining whether said inspection discloses any of a number of predetermined weld defects, modifying weld process parameters in response to said determination, and terminating welding if the dew point level of the shield gas employed in welding indicates that the shield gas humidity exceeds a predetermined maximum value.

105. A real time welding process for welding adjacent materials, said method comprising the steps of bringing a welding apparatus and the materials together into position for welding, thermographically scanning the heat affected zone, producing image signals representative of the thermographic image of the weld, analyzing said puddle image signals to extract therefrom data indicative of irregularities in the welding procedure, adjusting the welding procedure to reduce said irregularities, and storing the procedure variables in real time for later analysis as a record of the quality of the weld.

* * * * *

UNITED STATES PATENT AND TRADEMARK OFFICE
CERTIFICATE OF CORRECTION

PATENT NO. : 4,877,940
DATED : October 31, 1989
INVENTOR(S) : Edmund R. Bangs et al.

It is certified that error appears in the above-identified patent and that said Letters Patent is hereby corrected as shown below:

IN THE DRAWINGS:

Sheet 1 of 16, FIG. 4, in the innermost circle, after "USER" insert --400--.

Sheet 5 of 16, FIG. 3B, change "16(1)" to --16(3)--.

Sheet 6 of 16, FIG. 5, change "CONTROLLED DEVICE" to --CONTROLS--.

Sheet 8 of 16, FIG. 9, after "BLACKBOARD" insert --, QUEUES--; and after "742" insert --743, 734, 736--.

Sheet 10 of 16, FIG. 12, change "605" to --218(1)--; change "601" to --218(2)--; and change "609" to --218(3)--.

Sheet 13 of 16, FIG. 16, change "737" to --734--.

Sheet 15 of 16, FIG. 19, change "IR 17 DETECTOR" to --IR DETECTOR 17--; and change "742" to --743--.

Sheet 16 of 16, FIG. 20, change "CONTROLLED ELEMENTS" to --CONTROLS--.

Column 6, line 64, after "hardware" insert --and--.
Column 8, line 30, change "imaginary" to --image--.
Column 11, line 22, after "respectively" insert --, are examined--.

UNITED STATES PATENT AND TRADEMARK OFFICE
CERTIFICATE OF CORRECTION

PATENT NO. : 4,877,940

DATED : October 31, 1989

INVENTOR(S) : Edmund R. Bangs et al.

It is certified that error appears in the above-identified patent and that said Letters Patent is hereby corrected as shown below:

Column 11, line 59, change "coding" to --cooling--.

Column 12, line 31, after "establish" insert --the--.

Column 14, line 30, change "116(1) to --16(1)--.

Column 15, line 44, change "742" to --743--.

Column 16, line 21, change "115" to --115i--.

Column 16, line 23, change "166" to --16(1)--.

Column 16, line 63, after "152" insert --includes an inference scheduler or processor 218 (FIGS. 19 and 10) which--.

Column 16, line 64, delete "218".

Column 17, line 20, change "132" to --152--.

Column 18, line 5, change "742" to --743--.

Column 18, line 8, change "742" o --743--.

Column 18, line 11, change "742" to --743--.

Column 18, line 13, change "742" to --743--.

Column 18, line 15, delete the comma.

Column 18, line 18, delete the comma.

Column 18, line 29, change "Lisp" to --image--.

Column 18, line 30, change "1152" to --115i--.

Column 19, line 23, change "16(1)" to --16(3)--.

UNITED STATES PATENT AND TRADEMARK OFFICE
CERTIFICATE OF CORRECTION

PATENT NO. : 4,877,940
DATED : October 31, 1989
INVENTOR(S) : Edmund R. Bangs et al.

It is certified that error appears in the above-identified patent and that said Letters Patent is hereby corrected as shown below:

Column 19, line 32, change "16(1)" to --16(3)--.

Column 19, line 66, after "devices" insert --or controls--.

Column 20, line 41, change "external control 117" to --auxiliary controller 115x--.

Column 20, line 49, change "13" to --16--.

Column 20, line 53, change "115ad" to --115i--.

Column 20, line 55, change "17" to --116--.

Column 20, line 56, change "169" to --116a--.

Column 20, line 57, change "115x" to --115e--.

Column 20, line 64, change "117" to --116--.

Column 20, line 66, after "Knowledge layer" insert --151--.

Column 21, line 33, change "155p" to --115p--.

Column 21, line 48, change "6 and 9" to --9 and 13--.

Column 21, line 49, change "FIGS. 6 and 9," to --FIG. 9--.

Column 23, line 19, change "60'" to --601--.

UNITED STATES PATENT AND TRADEMARK OFFICE
CERTIFICATE OF CORRECTION

PATENT NO. : 4,877,940

DATED : October 31, 1989

INVENTOR(S) : Edmund R. Bangs et al.

It is certified that error appears in the above-identified patent and that said Letters Patent is hereby corrected as shown below:

Column 23, line 22, change "(FIG. 8)" to --(FIG. 13)--.

Column 23, line 33, change "215" to --601--.

Column 25, line 31, change "281(3)" to --218(3)--.

Column 26, line 25, change "breakhandler" to --break inference interrupt handler--.

Column 26, line 27, change "(FIG. 1a)" to --(FIG. 19)--.

Column 26, line 38, change "734" to --737--.

Column 26, line 41, after "break" insert --inference interrupt--.

Column 26, line 43, change "734" to --737--.

Column 26, line 46, after "218" insert --(2)--.

Column 26, line 52, change "219(1)" to --218(1)--.

Column 26, line 62-63, after "port" insert --message--.

Column 27, line 6, after "739'" insert --(FIG. 16)--.

Column 27, line 14, after "218″" insert --(FIG. 17)--.

UNITED STATES PATENT AND TRADEMARK OFFICE
CERTIFICATE OF CORRECTION

PATENT NO. : 4,877,940
DATED : October 31, 1989
INVENTOR(S) : Edmund R. Bangs et al.

It is certified that error appears in the above-identified patent and that said Letters Patent is hereby corrected as shown below:

Column 27, line 37, change "152" to --153--.

Column 28, line 13, change "215" to --601--.

Column 28, line 14, change "representation" to --base 215--.

Column 29, line 61, after "601" (second occurrence) insert --(FIG. 13)--

Column 30, line 38, change "procedure 718" to --interrupt handler 717--.

Column 30, line 44, change "Control break" to --The clock 719--.

Column 30, line 50, change "blackboard" to --non-priority message queue--.

Column 30, line 52, change "an important" to --a priority--.

Column 31, line 13, change "blackboard" to --message queue--.

Column 31, line 14, change "blackboard" to --message--.

Column 31, line 21, change "742" to --743--.

Column 31, line 34, change "742" to --743--.

UNITED STATES PATENT AND TRADEMARK OFFICE
CERTIFICATE OF CORRECTION

PATENT NO. : 4,877,940

DATED : October 31, 1989

INVENTOR(S) : Edmund R. Bangs et al.

It is certified that error appears in the above-identified patent and that said Letters Patent is hereby corrected as shown below:

Column 31, lines 39-40, after "break" (first occurrence) insert --priority queue--.

Column 31, line 40, after "break" (second occurrence) insert --non-priority queue--.

Column 31, line 54, change "rule base" to --rules--.

Column 31, line 57, change "rule base" to --rules--.

Column 32, line 17, change "508" to --970--.

Column 32, line 18, change "508" to --970--.

Column 32, line 30, change "741" to --743--.

Column 32, line 33, change "741" to --743--.

Column 32, line 36, change "741" to --743--.

Column 32, line 46, change "21" to --19--.

Column 32, line 48, change "711" to --152'--.

Column 32, line 52, change "709" to --152--.

Column 32, line 68, change "11" to --10--.

Column 33, line 19, change "218(21)" to --218(2)--.

Column 33, line 39, change "rule set" to --rules--.

UNITED STATES PATENT AND TRADEMARK OFFICE
CERTIFICATE OF CORRECTION

PATENT NO. : 4,877,940

DATED : October 31, 1989

INVENTOR(S) : Edmund R. Bangs et al.

It is certified that error appears in the above-identified patent and that said Letters Patent is hereby corrected as shown below:

Column 33, line 68, delete ")" (last occurrence).

Column 34, line 8, Before "." insert --)--.

Column 34, line 11-12, change "rule set" to --rules--.

Column 34, line 42, change "minimum" to --maximum--.

Column 35, line 44, after "including" insert --(see FIG. 20)--.

Column 35, line 45, after "controller" insert --115e--.

Column 35, line 50, change "115" to --115x (FIG. 8)--; and after "XADVAC" insert --(FIG. 5)--.

Column 35, line 53, after "115ad" insert --(FIG. 20)--.

Column 35, line 54, after "124" insert --(FIG. 6)--.

Column 35, line 58, after "115a" insert --(FIGS. 8 or 20)--.

UNITED STATES PATENT AND TRADEMARK OFFICE
CERTIFICATE OF CORRECTION

PATENT NO. : 4,877,940

DATED : October 31, 1989

INVENTOR(S) : Edmund R. Bangs et al.

It is certified that error appears in the above-identified patent and that said Letters Patent is hereby corrected as shown below:

Column 35, line 60, change "controllable device" to --controls--.

Column 35, line 62, after "130" insert --(FIG. 6)--.

Column 36, line 13, after "controller" insert --115e--.

Column 36, line 14, change "115ad ad" to --115ad and--.

Column 36, line 22, change "129" to --124--.

Column 37, line 20, after "elements" insert --or controls--.

Column 37, line 24, change "rule" to --rules--.

Column 37, line 29, change "ccntroller" to --controller--.

Column 39, line 7, change "742" to --743--.

Column 39, line 26, change "minimus" to --minimum--.

UNITED STATES PATENT AND TRADEMARK OFFICE
CERTIFICATE OF CORRECTION

PATENT NO.   :   4,877,940
DATED        :   October 31, 1989
INVENTOR(S)  :   Edmund R. Bangs et al.

It is certified that error appears in the above-identified patent and that said Letters Patent is hereby corrected as shown below:

Column 41, line 10, after "message" insert --"--.

Column 41, line 10, after "))))" add --)--.

Column 41, line 18, after "))" insert --)--.

Column 42, line 28, delete ")" (last occurrence).

Column 274, line 22, after "welding" (first occurrence) delete the comma.

Column 276, line 40, delete "by" (first occurrence).

Column 276, line 51, change "Claim" to --Claims--.

Column 282, line 8, change "form" to --from--.

Signed and Sealed this

Twenty-third Day of July, 1991

*Attest:*

HARRY F. MANBECK, JR.

*Attesting Officer*  Commissioner of Patents and Trademarks